(12) United States Patent
Oka et al.

(10) Patent No.: US 6,196,641 B1
(45) Date of Patent: Mar. 6, 2001

(54) FLUID PRESSURE BOOSTING DEVICE AND BRAKE PRESSURE BOOSTING SYSTEM EMPLOYING THE DEVICE

(75) Inventors: Hiroyuki Oka; Michio Kobayashi; Masahiro Shimada; Satoru Watanabe; Junichi Hirayama, all of Higashimatsuyama; Mamoru Sawada; Yuzo Imoto, both of Kariya, all of (JP)

(73) Assignees: Bosch Braking Systems Co., Ltd., Tokyo; Denso Corporation, Kariya, both of (JP)

( * ) Notice: Subject to any disclaimer, the term of this patent is extended or adjusted under 35 U.S.C. 154(b) by 0 days.

(21) Appl. No.: 09/181,994

(22) Filed: Oct. 29, 1998

(30) Foreign Application Priority Data

| Oct. 30, 1997 | (JP) | 9-298163 |
|---|---|---|
| Nov. 7, 1997 | (JP) | 9-305869 |
| Nov. 17, 1997 | (JP) | 9-315118 |
| Feb. 4, 1998 | (JP) | 10-023139 |
| Feb. 6, 1998 | (JP) | 10-025576 |
| Feb. 6, 1998 | (JP) | 10-025578 |
| Feb. 6, 1998 | (JP) | 10-025579 |
| Feb. 16, 1998 | (JP) | 10-032878 |
| Oct. 13, 1998 | (JP) | 10-290495 |
| Oct. 13, 1998 | (JP) | 10-290499 |

(51) Int. Cl.$^7$ .................................................. B60T 8/44
(52) U.S. Cl. ........................... 303/114.1; 303/10; 303/11; 303/155; 60/553
(58) Field of Search ................. 303/114.1, 10, 303/11, 155; 188/358, 359; 60/552, 553; 91/370, 372

(56) References Cited

U.S. PATENT DOCUMENTS

| 4,831,826 | * | 5/1989 | Belart et al. | 303/10 |
|---|---|---|---|---|
| 5,079,990 | * | 1/1992 | Kobayashi | 91/369.1 |
| 5,171,072 | * | 12/1992 | Maehara | 303/114.1 |
| 5,176,064 | * | 1/1993 | Kobayashi | 91/376 R |
| 5,289,757 | * | 3/1994 | Yamashita | 91/373 |
| 5,890,363 | * | 4/1999 | Kobayashi et al. | 60/560 |

* cited by examiner

Primary Examiner—Matthew C. Graham
Assistant Examiner—Mariano Sy
(74) Attorney, Agent, or Firm—Kanesaka & Takeuchi

(57) ABSTRACT

A fluid pressure boosting device of the present invention performs jumping action at a higher servo ratio until fluid pressure in a power chamber (25) reaches a first predetermined value and a rear end (20e) of a reaction piston (20)comes in contact with a step of an input shaft (18). Since a switching valve is set in a first position I until the fluid pressure in the power chamber (25) reaches a second predetermined pressure, a reaction chamber (41) is connected to the reservoir (33) so as to be at atmospheric pressure. In this state, the normal brake control at a lower servo ratio is performed. As the fluid pressure in the power chamber (25) reaches a second predetermined value, the switching valve is set in a second position II by the fluid pressure so that the pressurized fluid in the power chamber is introduced into the reaction chamber (41). The fluid pressure in the reaction chamber 41 acts on the step between the reaction piston (20) and the input shaft (18) so that the servo ratio becomes higher. Then, the servo control at a higher servo ratio is performed. The fluid pressure boosting device can be provided with the reversed two-stage servo characteristic, so with simple structure, output larger than the normal output can be obtained when input exceeds a predetermined value.

29 Claims, 53 Drawing Sheets

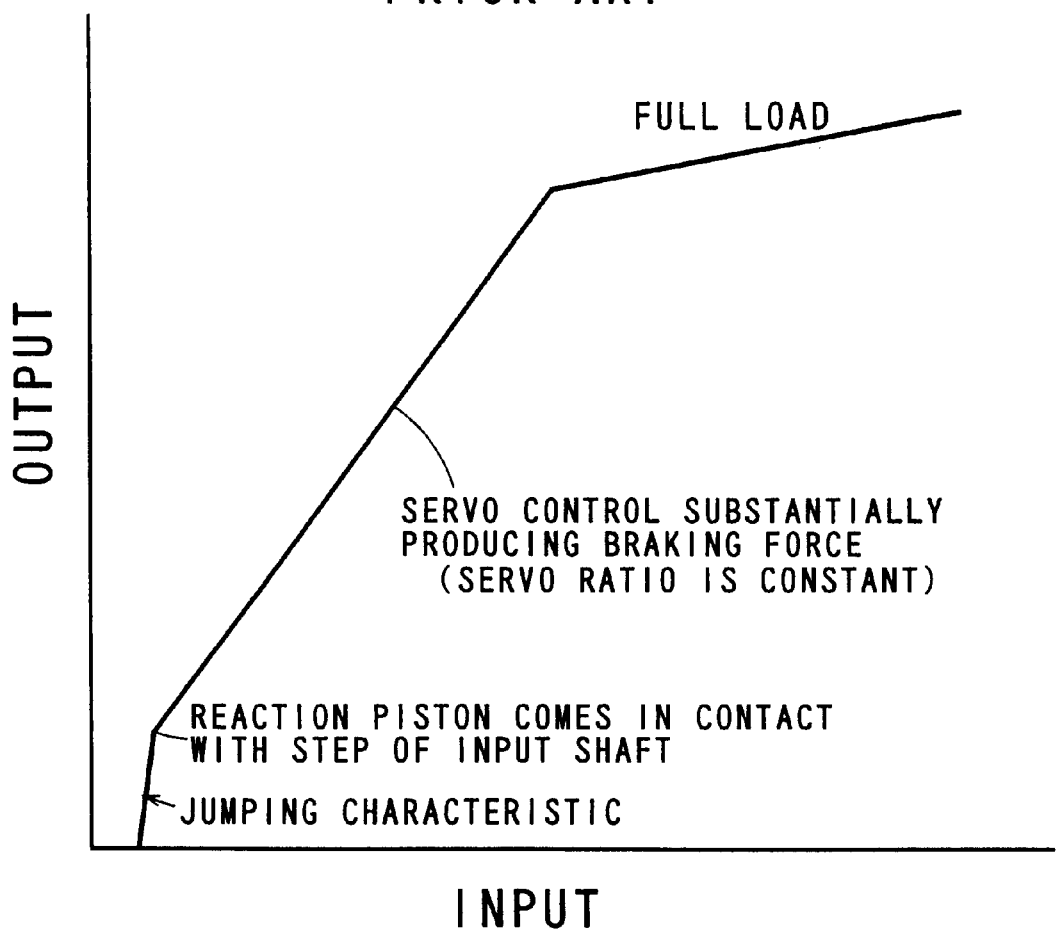

FLUID PRESSURE BOOSTING DEVICE AND BRAKE PRESSURE BOOSTING SYSTEM EMPLOYING THE DEVICE

BACKGROUND OF THE INVENTION

The present invention relates to a fluid pressure boosting device, which hydraulically boosts input into predetermined magnitude, and a brake pressure boosting device employing the device. More particularly, the present invention relates to a fluid pressure boosting device, which can vary the servo ratio during the servo control and a brake pressure boosting device employing the device.

The fluid pressure boosting device employed in a brake pressure boosting device of the type utilized in automotive vehicles functions to obtain large output from small input. As an example of the fluid pressure boosting device, a brake pressure boosting device employed in a brake system of an automobile is proposed in Japanese Utility Model Application No. 4-33402 (Japanese Utility Model Unexamined Publication No. 5-84553) which is stored on a microfilm.

FIG. 52 is a view showing the brake pressure boosting device disclosed in this microfilm. In this figure, numeral 1' designates a brake pressure boosting device, 2' designates a housing, 3' designates a plug, 4' designates a power piston, 5' designates a control valve, 6' designates a valve seat, 7' designates a cylindrical fixing member, 8' designates a nut, 9' designates a valve ball, 10' is a valve body, 11' designates a cylindrical member, 12' designates an input shaft, 13' designates a cylindrical stopper, 14' designates a reaction piston, 15' designates a power chamber, and 16' designates an output shaft.

In the brake pressure boosting device 1', in the non-operation state as illustrated, the valve ball 9' of the control valve 5' is seated in the valve seat 6' and a valve portion at the end of the cylindrical member 11' is separated from the valve ball 9'. Therefore, the power chamber 15' is shut off from an input port 17', which always communicates with the fluid pressure source not shown, and communicates with a chamber 18', which always communicates with a reservoir not shown. Accordingly, no fluid pressure is introduced in the power chamber 15' so that the power piston 4' is not actuated.

As input is applied from this non-operation state, the input shaft 12' advances and the cylindrical member 11' also advances. The valve portion at the end of the cylindrical member 11' therefore comes into contact with the valve ball 9' of the control valve 5' and pushes the valve ball 9' so that the valve ball 9' is separated from the valve seat 6'. Accordingly, the power chamber 15' communicates with the input port 17' and is shut off from the chamber 18' so that fluid pressure is introduced into the power chamber 15' and the power piston 4' is thus actuated. By the actuation of the power piston 4', the brake pressure boosting device 1' produces output through an output shaft 16' to actuate a piston of a master cylinder not shown so that the master cylinder produces brake pressure. As the fluid pressure in the power chamber 15' reaches the magnitude corresponding to the input, the valve ball 9' is seated in the valve seat 6', so the output of the brake pressure boosting device 1' becomes a boosted value relative to the input.

By the fluid pressure in the power chamber 15', a reaction piston 14' is pushed rearwardly against the biasing force of a spring 19'. In the initial stage, the fluid pressure in the power chamber 15' is still small and play in stroke of the brake system is not yet cancelled so that substantially no braking force is developed. In this state, the reaction piston 14' is not in contact with a stepped portion 12'a of the input shaft 12'. Therefore, jumping action by the servo control with quite high boosting ratio, i.e. servo ratio, is performed. When the fluid pressure in the power chamber 15' reaches the predetermined pressure and the reaction piston 14' comes into contact with the stepped portion 12'a of the input shaft 12', braking force is then substantially produced and the servo ratio is reduced to normal servo ratio. After that, the brake pressure boosting device 1' performs the servo control for normal braking to produce output which is a boosted force relative to the input at the servo ratio.

The fluid pressure in the power chamber 15' reaches the maximum pressure, which is decided based on the pressure produced from the fluid pressure source, so the fluid pressure no more increases. The brake pressure boosting device 1' is fully loaded and does not perform the servo control. Therefore, after that, the output increases in proportion to the input without magnification.

As the input is cancelled, the input shaft 12' is moved rearwardly by a return spring not shown and the cylindrical member 11' is also moved rearwardly so that the valve portion at the end of the cylindrical member 11' is spaced apart from the valve ball 9' of the control valve 5'. As a result of this, the power chamber 15' is shut off from the input port 17' and communicates with the chamber 18' so that the fluid introduced into the power chamber 15' is discharged to the reservoir and the power piston 4' is moved rearwardly by the return spring 20'. As the cylindrical stopper 13' fixed to the input shaft 12' comes into contact with a stopper 21' of the plug 3', the input shaft 12' is moved to the rearmost position where it is no more moved rearwardly, that is, the input shaft 12' returns to the non-operation state as illustrated. As the fluid in the power chamber 15' is completely discharged, the power piston 4' also returns to the non-operation state as illustrated so that the brake pressure boosting device 1'outputs nothing and the master cylinder also returns to the non-operation state.

In the conventional brake pressure boosting device 1', the servo ratio of the servo control is constant while braking forces are substantially outputted as shown in FIG. 53. The servo ratio is normally set to correspond to the input-output characteristic which is desired in normal braking. Since the servo ratio is constant, the input-output characteristic for emergency braking should be the same as that of the normal braking. That is, even for normal braking or emergency braking, the braking force is always increased at the same speed as long as the same input is applied.

In a brake system for a vehicle, however, it is desired that, in case of emergency braking, the boosting device quickly produces braking force larger than that in case of normal braking. Among inexpert drivers, there must be a person who can not pedal a brake pedal fully so that it can develop large braking force. In this case, it is desired to provide brake assist for ensuring that large braking force is obtained even by such an inexpert driver.

In the conventional brake pressure boosting device 1', however, since the servo ratio of the servo control is constant while braking forces are substantially outputted, braking force larger than that of normal braking can not be produced for emergency braking, but also no braking assist for ensuring that large braking force is obtained even by the inexpert driver is provided. Therefore, it is difficult to meet the aforementioned demands.

In addition, as the servo ratio is constant, the output is always increased at the same rate relative to the increase in the input even after the braking force is increased relatively, so the braking force is apt to become larger than necessary. This should give the driver a quite bad operational feeling. Therefore, it is preferable that, after the braking force is increased relatively, the increase in the output is small relative to the increase in the input to prevent the braking force from being larger than necessary, thereby improving the operational feeling.

Among conventional brake pressure boosting systems, a brake pressure boosting system has been developed which is provided with Anti-Lock Control (hereinafter, sometimes referred to as ABS) for controlling braking pressure of a wheel cylinder when the a braked wheel is in locking tendency in order to cancel the locking tendency, Traction Control (hereinafter, sometimes referred to as TRC) for controlling the rotational driving force of driving wheels by automatically braking the driving wheels when the driving wheels are in slipping tendency in order to cancel the slipping tendency, Vehicle Stability Control (hereinafter, sometimes referred to as VSC) for controlling the attitude of a vehicle by automatically braking inside wheels when the vehicle turns, and Auto Cruise Control (hereinafter, sometimes referred to as ACC) for controlling the vehicle to run at a constant speed by automatically braking wheels.

Also in the above brake pressure boosting system, that brake assist is preferably provided for securely producing large braking force. In this case, it is preferable to utilize conventional parts as much as possible not to require any special parts for the brake assist.

The conventional brake fluid pressure boosting device 1' does not have hysteresis, that is, in the servo-ratio characteristic, the line in the operative direction and the line in the operation release direction coincide with each other. Accordingly, also in the brake characteristic thereof, the line in the operative direction and the line in the operation release direction always coincide with each other.

SUMMARY OF THE INVENTION

It is an object of the present invention to provide a fluid pressure boosting device with simple structure which can produce output larger than normal output when input exceeding a predetermined value is applied.

It is another object of the present invention to provide a fluid pressure boosting device with simple structure which can control servo ratio to be small after a point in the process of servo control in order to smooth input-output characteristic.

It is further another object of the present invention to provide a fluid pressure boosting device with simple structure which can be manufactured cheaply and has hysteresis.

It is still further another object of the present invention to provide a brake pressure boosting system which can provide quickly large braking force during emergency braking, and which can assist an inexpert driver to securely produce large braking force.

It is yet another object of the present invention to provide a brake pressure boosting system which can provide brake assist with simple structure at a low cost.

To accomplish the objects mentioned above, a fluid pressure boosting device of the present invention comprises: a fluid pressure source producing fluid pressure; a reservoir for storing fluid; a power piston for producing output; a power chamber, where the pressure receiving surface of the power piston confronts; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; and an input shaft, for controlling the operation of the control valve, which has a step on the outer periphery thereof, and the fluid pressure boosting device is characterized in that a reaction chamber is formed so that the step of the input shaft is positioned therein, and that a servo ratio is controlled by introducing pressurized fluid at a servo-ratio control pressure into the reaction chamber.

In the fluid pressure boosting device of the invention of the above structure, with simple structure by forming the step on the input shaft, positioning the step in the reaction chamber, and fitting the reaction piston onto the small-diameter portion of the input shaft, the fluid pressure boosting device exhibits two-stage servo characteristic in which the servo ratio is shifted when the input exceeds the predetermined value.

Further, a fluid pressure boosting device of the present invention comprises: a fluid pressure source producing fluid pressure; a reservoir for storing fluid; a power piston producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source to the power chamber corresponding to its operation; an input shaft, for controlling the operation of the control valve, which has a small-diameter portion at the control valve side, a large-diameter portion at the opposite side of the control valve, and a step therebetween; a reaction piston which is formed in a cylindrical shape to have larger outer diameter than that of the large-diameter portion of the input shaft and is slidably fitted onto the small-diameter portion of the input shaft, the front end of the reaction piston confronting the power chamber and the rear end of the reaction piston being able to be in contact with the step of the input shaft; a spring which normally biases the reaction piston in such a direction that the rear end of the latter is separated from the step of the input shaft and allows the rear end of the reaction piston to be in contact with the step of the input shaft when the fluid pressure in the power chamber exceeds a first predetermined value; and an operational means to which input is applied to operate the input shaft, and the fluid pressure boosting device is characterized by a reaction chamber in which the step of the input shaft is positioned, and a pressure control valve for a servo ratio, which introduces pressurized fluid for controlling the servo ratio into the reaction chamber when the fluid pressure in the power chamber exceeds a second predetermined value that is higher than the first predetermined value, and which discharges the pressurized fluid in the reaction chamber to the reservoir when the fluid pressure in the power chamber is lower than the second predetermined value.

In the fluid pressure boosting device of the invention of the above structure, when the fluid pressure of the power chamber is lower than the first predetermined value during the operation of the device, the reaction piston is not in contact with the step of the input shaft so that the fluid pressure boosting device performs the jumping action. After the reaction piston comes in contact with the step of the input shaft and the jumping action is terminated, the inside of the reaction chamber is at atmospheric pressure while the fluid pressure is lower than the second pressure so that the servo ratio is a lower servo ratio for normal braking and the servo control is performed at this servo ratio. When the fluid pressure in the power chamber exceeds the second predetermined value, the pressurized fluid for controlling the servo ratio is introduced into the reaction chamber and the pressure of the pressurized fluid acts on the step between the reaction piston and the input shaft in the same direction as the input of the input shaft, so the servo ratio becomes a higher servo ratio and the output of the fluid pressure boosting device is thus increased.

With simple structure by forming the step on the input shaft, positioning the step in the reaction chamber, and fitting the reaction piston onto the small-diameter portion of the input shaft, the fluid pressure boosting device exhibits reversed two-stage servo characteristic for allowing the shift from a lower servo ratio to a higher servo ratio when the input exceeds the predetermined value.

Further, a fluid pressure boosting device of the present invention comprises: a fluid pressure source producing fluid pressure; a reservoir for storing fluid; a power piston producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source to the power chamber corresponding to its operation; an input shaft, for controlling the operation of the control valve, which has a large-diameter portion at the control valve side, a small-diameter portion at the opposite side of the control valve, and a step therebetween; and an operational means to which input is applied to operate the input shaft, and the fluid pressure boosting device is characterized by a reaction chamber in which the step of the input shaft is positioned, and a pressure control valve for a servo ratio, which introduces pressurized fluid for controlling the servo ratio into the reaction chamber when the fluid pressure in the power chamber exceeds a predetermined value, and which discharges the pressurized fluid in the reaction chamber to the reservoir when the fluid pressure in the power chamber is lower than the predetermined value.

The fluid pressure boosting device of the invention of the above structure performs the reversed two-stage servo action in the same manner as the invention mentioned above, but not performing the jumping action.

Further, a fluid pressure boosting device of the present invention comprises: a fluid pressure source producing fluid pressure; a reservoir for storing fluid; a power piston producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source to the power chamber corresponding to its operation; an input shaft, for controlling the operation of the control valve, which has a large-diameter portion at the control valve side, a small-diameter portion at the opposite side of the control valve, and a step therebetween; and an operational means to which input is applied to operate the input shaft, and the fluid pressure boosting device is characterized by a reaction chamber in which the step of the input shaft is positioned, and a pressure control valve for a servo ratio, which introduces pressurized fluid for controlling the servo ratio into the reaction chamber when the fluid pressure in the power chamber is lower than a first predetermined value or exceeds a second predetermined value that is higher than the first predetermined value, and which discharges the pressurized fluid in the reaction chamber to the reservoir when the fluid pressure in the power chamber is between the first predetermined value and the second predetermined value.

In the fluid pressure boosting device of the invention of the above structure, when the fluid pressure of the power chamber is lower than the first predetermined value during the operation of the device, the pressurized fluid for controlling the servo ratio is introduced into the reaction chamber and the pressure of the pressurized fluid acts on the step of the input shaft in the same direction as the input of the input shaft, so the servo ratio becomes a higher servo ratio and the output of the fluid pressure boosting device is thus increased. Therefore, the fluid pressure boosting device performs the jumping action. When the fluid pressure in the power chamber is between the first predetermined value and the second predetermined value, the pressurized fluid in the reaction chamber is discharged to the reservoir and the inside of the reaction chamber is thus at atmospheric pressure so that the servo ratio is a lower servo ratio for normal braking and the servo control is performed at this servo ratio. When the fluid pressure in the power chamber exceeds the second predetermined value, the pressurized fluid for controlling the servo ratio is introduced into the reaction chamber again, so the servo ratio becomes a higher servo ratio and the output of the fluid pressure boosting device is thus increased.

Further, a fluid pressure boosting device comprises: a fluid pressure source producing fluid pressure; a reservoir for storing fluid; a power piston producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; an input shaft, for controlling the operation of the control valve, which has a small-diameter portion at the control valve side, a large-diameter portion at the opposite side of the control valve, and a step therebetween; and an operational means to which input is applied to operate the input shaft, and the fluid pressure boosting device is characterized by a reaction chamber in which the step of the input shaft is positioned, and a pressure control valve for a servo ratio, which introduces pressurized fluid for controlling the servo ratio into the reaction chamber when the fluid pressure in the power chamber is between a first predetermined value and a second predetermined value that is higher than the first predetermined value, and which discharges the pressurized fluid in the reaction chamber to the reservoir when the fluid pressure in the power chamber is lower than the first predetermined value or is higher than the second predetermined value.

In the fluid pressure boosting device of the invention of the above structure, when the fluid pressure of the power chamber is lower than the first predetermined value during the operation of the device, the reaction chamber is connected to the reservoir so that the inside of the reaction chamber is at atmospheric pressure so that servo ratio is a higher servo ratio and the output of the fluid pressure boosting device is thus increased. Therefore, the fluid pressure boosting device performs the jumping action. When the fluid pressure in the power chamber is between the first predetermined value and the second predetermined value, the pressurized fluid for controlling the servo ratio is introduced into the reaction chamber so that the pressure of the pressurized fluid acts on the step of the input shaft in the direction opposite to the input of the input shaft. Therefore, the servo ratio becomes a lower servo ratio for normal braking and the servo control is performed at this servo ratio. When the fluid pressure in the power chamber exceeds the second predetermined value, the reaction chamber is connected to the reservoir again and the pressurized fluid in the reaction chamber is discharged to the reservoir, so the inside of the reaction chamber is at atmospheric pressure. Then, the servo ratio becomes a higher ratio and the output of the fluid pressure boosting device is increased.

With simple structure by forming the step on the input shaft and positioning the step in the reaction chamber, the fluid pressure boosting device of this invention or the invention immediately before this invention exhibits the jumping characteristic and the eat reversed two-stage servo characteristic.

A brake pressure boosting system of the invention comprises: any one of the aforementioned fluid pressure boosting devices; a master cylinder which is controlled by the output of the fluid pressure boosting device to produce brake fluid pressure; and brake cylinders into which the brake fluid pressure of the master cylinder is introduced to produce braking force.

Further, a brake pressure boosting system, which has a two-circuit brake system, comprises: any one of the aforementioned fluid pressure boosting devices; a master cylinder which is controlled by the output of the fluid pressure boosting device to produce brake fluid pressure; at least one brake cylinder relating to one of the circuits into which the fluid pressure of the power chamber of the fluid pressure boosting device is introduced to produce braking force; and at least one brake cylinder relating to the other circuit into which the brake fluid pressure of the master cylinder is introduced to produce braking force, so that the brake system provides semi-full power brakes.

The brake pressure boosting systems of the aforementioned inventions structured above, with simple structure, can provide quick increase in braking force by the jumping characteristic, and can exhibit the reversed two-stage servo characteristic, thereby providing quickly large braking force during emergency braking and even by an inexpert driver.

Further, a fluid pressure boosting device of the present invention comprising: a fluid pressure source producing fluid pressure; a reservoir for storing fluid; a power piston for producing output having a step formed on the outer periphery thereof; a power chamber, where a pressure receiving surface on the rear end of the power piston confronts; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; and an input shaft, for controlling the operation of the control valve, and the fluid pressure boosting device is characterized in that a reaction chamber is formed so that the step of the power piston is positioned therein, and that a servo ratio is controlled by introducing pressurized fluid at a servo-ratio control pressure into the reaction chamber.

In the fluid pressure boosting device of the invention of the above structure, with simple structure by forming the step on the power piston and positioning the step in the reaction chamber, the fluid pressure boosting device exhibits two-stage servo characteristic in which the servo ratio is shifted when the input exceeds the predetermined value.

Further, a fluid pressure boosting device of the invention comprises: a fluid pressure source producing fluid pressure; a reservoir for storing fluid; a power piston for producing output including a small-diameter portion at the front side, a large-diameter portion at the rear side, and a step therebetween; a power chamber, the pressure receiving surface of a rear portion of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; and an input shaft, for controlling the operation of the control valve, and the fluid pressure boosting device is characterized by a reaction chamber in which the step of the power piston is positioned, and a pressure control valve for a servo ratio, which introduces pressurized fluid for controlling the servo ratio into the reaction chamber when the fluid pressure in the power chamber is lower than a predetermined value, and which discharges the pressurized fluid in the reaction chamber to the reservoir when the fluid pressure in the power chamber exceeds the predetermined value.

In the fluid pressure boosting device of the invention as structured above, when the fluid pressure in the power chamber is lower than the predetermined value during the operation, the fluid pressure in the reaction chamber is equal to that of the power chamber, the pressure of the reaction chamber for controlling the servo ratio acts the step of the power piston to oppose the fluid pressure in the power chamber. Then, the servo ratio becomes a lower servo ratio for normal braking and the servo control is performed at this servo ratio. When the fluid pressure in the power chamber exceeds the predetermined value, the pressurized fluid in the reaction chamber is discharged to the reservoir so that the inside of the reaction chamber becomes at atmospheric pressure. Since, therefore, no more pressure acts on the step of the power piston, the servo ratio becomes a higher servo ratio so that the output of the fluid pressure boosting device is increased.

With simple structure by forming the step on the power piston and positioning the step in the reaction chamber, the fluid pressure boosting device of this invention exhibits the reversed two-stage servo characteristic for allowing the shift from a lower servo ratio to a higher servo ratio when the input exceeds the predetermined value. Further, a fluid pressure boosting device of the invention comprises: a fluid pressure source producing fluid pressure; a reservoir for storing fluid; a power piston for producing output including a small-diameter portion at the front side, a large-diameter portion at the rear side, and a step therebetween; a power chamber, the pressure receiving surface of a rear portion of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; an input shaft, for controlling the operation of the control valve; a reaction piston which is formed in a cylindrical shape to have larger outer diameter than that of the large-diameter portion of the power piston and is slidably fitted onto the small-diameter portion of the power piston, the front end of the reaction piston confronting the power chamber and the rear end of the reaction piston being able to be in contact with the step of the power piston; a spring which normally biases the reaction piston in such a direction that the rear end of the latter is separated from the step of the power piston and allows the rear end of the reaction piston to be in contact with the step of the power piston when the fluid pressure in the power chamber exceeds a first predetermined value; and an operational means to which input is applied to operate the input shaft, and the fluid pressure boosting device is characterized by a reaction chamber in which the step of the power piston is positioned, and a pressure control valve for a servo ratio, which introduces pressurized fluid for controlling the servo ratio into the reaction chamber when the fluid pressure in the power chamber is lower than a second predetermined value that is higher than the first predetermined value, and which discharges the pressurized fluid in the reaction chamber to the reservoir when the fluid pressure in the power chamber exceeds the second predetermined value.

In the fluid pressure boosting device of the invention as structured above, when the fluid pressure of the power chamber is lower than the first predetermined value during the operation of the device, the reaction piston is not in contact with the step of the input shaft so that the fluid pressure boosting device performs the jumping action. After the reaction piston comes in contact with the step of the input shaft and the jumping action is terminated, the fluid pressure boosting device performs the reversed two-stage servo action in the same manner as the invention.

A brake pressure boosting system of the invention comprises: any one of the fluid pressure boosting devices as mentioned above; a master cylinder which is controlled by the output of the fluid pressure boosting device to produce brake fluid pressure; and brake cylinders into which the brake fluid pressure of the master cylinder is introduced to produce braking force.

Further, a brake pressure boosting system, which is a two-circuit brake system, comprises: any one of the fluid pressure boosting devices as mentioned above; a master cylinder which is controlled by the output of the fluid pressure boosting device to produce brake fluid pressure; at least one brake cylinder relating to one of the circuits into which the fluid pressure of the power chamber of the fluid pressure boosting device is introduced to produce braking force; and at least one brake cylinder relating to the other circuit into which the brake fluid pressure of the master cylinder is introduced to produce braking force, so that the brake system provides semi-full power brakes.

In the brake pressure boosting systems of the aforementioned inventions structured above, with simple structure, can provide quick increase in braking force by the jumping characteristic, can exhibit the reversed two-stage servo characteristic, thereby providing quickly large braking force during emergency braking and even by an inexpert driver.

Further, a fluid pressure boosting device of the invention comprises: a fluid pressure source producing fluid pressure; a reservoir for storing fluid; a power piston for producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber corresponding to its operation; and an input shaft, for controlling the operation of the control valve, which has a small-diameter portion at the control valve side, a large-diameter portion at the opposite side of the control valve, and a step therebetween, and the fluid pressure boosting device is characterized by a reaction chamber in which the step of the input shaft is positioned, and a pressure control valve for a servo ratio, which introduces the atmospheric pressure into the reaction chamber when the fluid pressure in the power chamber is lower than a predetermined value, and introducing pressurized fluid for controlling the servo ratio into the reaction chamber when the fluid pressure in the power chamber exceeds the predetermined value.

In the fluid pressure boosting device of the invention as structured above, when the fluid pressure in the power chamber is lower than the predetermined value during the operation, the inside of the reaction chamber is at atmospheric pressure so that servo ratio is a higher servo ratio and the output of the fluid pressure boosting device is thus largely increased relative to the increase of the input of the input shaft. When the fluid pressure in the power chamber exceeds the predetermined value, the pressure for controlling the servo ratio is introduced into the reaction chamber and the pressure for controlling the servo ratio acts on the step of the input shaft in a direction opposing the input. Therefore, the servo control at a lower servo ratio is performed and the increase in the output of the fluid pressure boosting device is smaller than the increase in the input.

As mentioned above, with simple structure by forming the step on the input shaft, positioning the step in the reaction chamber, and controlling the fluid pressure in the reaction chamber, the fluid pressure boosting device of this invention exhibits the reversed two-stage servo characteristic for allowing the shift from a higher servo ratio to a lower servo ratio during the servo control at a higher servo ratio.

By virtue of the reversed two-stage servo characteristic, the increase in the output exceeding the predetermined value is restricted, thereby smoothing the input-output characteristic of the fluid pressure boosting device.

The fluid pressure boosting device of the invention is characterized in that a switching valve or shut-off valves are controlled by the fluid pressure in the power chamber or by electromagnetic force excited corresponding to the fluid pressure in the power chamber.

In case where the switching valve or the shut-off valves are controlled by electromagnetic force excited corresponding to the fluid pressure in the power chamber, the fluid pressure boosting device of the invention according to the above structure can delay the shift from a higher servo ratio to a lower servo ratio by delaying the switching of the switching valve or the shut-off valves during rapid increase in the servo control and thus delaying the increase in the fluid pressure of the reaction chamber. That is, servo-ratio switching point is varied, whereby the output of the fluid pressure boosting device becomes larger than that for normal braking.

The fluid pressure boosting device of the present invention is characterized by further comprising at least an orifice on a line between the pressure control valve for the servo ratio and the reaction chamber and a low pressure accumulator positioned on the line at the pressure control valve side than the orifice.

In the fluid pressure boosting device of the invention as structured above, the fluid pressure for controlling the servo ratio can be throttled by the orifice during rapid increase in the pressure for controlling the servo ratio, thereby delaying the increase in the fluid pressure of the reaction chamber. The shift from a higher servo ratio to a lower servo ratio can be delayed. That is, the servo-ratio switching point is varied, whereby the output of the fluid pressure boosting device becomes larger than that for normal braking.

A brake pressure boosting system of the invention comprises: the aforementioned fluid pressure boosting device; a master cylinder which is controlled by the output of the fluid pressure boosting device to produce brake fluid pressure; and brake cylinders into which the brake fluid pressure of the master cylinder is introduced to produce braking force.

Further, a brake pressure boosting system of the invention which is a two-circuit brake system, comprises: the aforementioned fluid pressure boosting device; a master cylinder which is controlled by the output of the fluid pressure boosting device to produce brake fluid pressure; at least one brake cylinder relating to one of the circuits into which the fluid pressure of the power chamber of the fluid pressure boosting device is introduced to produce braking force; and at least one brake cylinder relating to the other circuit into which the brake fluid pressure of the master cylinder is introduced to produce braking force, so that the brake system provides semi-full power brakes.

The brake fluid pressure boosting system of the invention as structured above can, with simple structure, perform the two-stage servo control for shifting a higher servo ratio to a lower servo ratio during the servo control, thereby improving the operational feeling.

Further, a fluid pressure boosting device of the present invention comprises: a fluid pressure source producing fluid pressure; a reservoir for storing fluid; a power piston for producing output; a power chamber, where a pressure receiving surface of the power piston confronts; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber; and an input shaft for controlling the operation of the control valve by advancing in its operated state and retreating in its released state, wherein the input shaft has a step formed on the outer periphery thereof, and the fluid pressure boosting device is characterized in that a reaction chamber is formed so that the step of the input shaft is positioned therein, and the pressure introduced during the advance of the input shaft and the pressure introduced during the retreat of the input shaft are different from each other so that the fluid pressure boosting device has hysteresis in which the input-output characteristics are different between the advance and the retreat of the input shaft.

In the fluid pressure boosting device as structured above, since the pressure introduced during the advance of the input shaft and the pressure introduced during the retreat of the input shaft are different from each other so that the fluid pressure boosting device has hysteresis that the input-output characteristics are different between the operative direction and the operation release direction, the input-output characteristics are not constant and can be varied.

Furthermore, a fluid pressure boosting device of the invention comprises: a fluid pressure source producing fluid pressure; a reservoir for storing fluid; a power piston for producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber; an input shaft for controlling the operation of the control valve by advancing in its operational state and retreating in its operation release state, wherein the input shaft has a small-diameter portion at the control valve side, a large-diameter portion at the opposite side of the control valve, and a step therebetween; and a reaction piston which is formed in a cylindrical shape to have larger outer diameter than that of the large-diameter portion of the input shaft and is slidably fitted onto the small-diameter portion of the input shaft, the front end of the reaction piston confronting the power chamber and the rear end of the reaction piston being able to be in contact with the step of the input shaft, and the fluid pressure boosting device is characterized by a reaction chamber in which the step of the input shaft is positioned, and a pressure control means which introduces pressure into the reaction chamber, wherein the pressure introduced during the advance of the input shaft and the pressure introduced during the retreat of the input shaft are different from each other.

In the fluid pressure boosting device of the invention as structured above, the pressure control means enables that the pressure introduced during the advance of the input shaft and the pressure introduced during the retreat of the input shaft are different from each other. The fluid pressure boosting device can be mechanically provided with hysteresis different between the operative direction and the operation release direction because different pressure of the reaction chamber acts on the rear end of the reaction piston in contact with the step of the input.

Moreover, a brake pressure boosting system of the invention comprises: the aforementioned fluid pressure boosting device; a master cylinder having a master cylinder piston which produces master cylinder pressure by the output of the fluid pressure boosting device; brake cylinders into which the master cylinder pressure is introduced to produce braking force; a second fluid pressure source for producing fluid pressure; a fluid pressure supply valve composed of a solenoid valve which, in the operative state, introduces the fluid pressure form the second fluid pressure source to the power chamber not through the control valve; and an electronic control unit which controls the fluid pressure supply valve as necessary, wherein the pressure control means is composed of a first check valve, which is disposed on a line connecting the reaction chamber to the reservoir and allows only the flow of fluid from the reservoir toward the reaction chamber, and a second check valve, which is disposed on a line connecting the reaction chamber to the brake cylinders and allows only the flow of fluid from the reaction chamber toward the brake cylinders.

In the brake pressure boosting system of the invention as structured above, by virtue of the hysteresis characteristic of the fluid pressure boosting device and the fluid pressure of the second fluid pressure source, the braking force can be increased when brake assist is necessary and even with the same input, variable outputs can be obtained within a hysteretic range of the input-output characteristic of the fluid pressure boosting device.

Further, a fluid pressure boosting device of the invention comprises: a fluid pressure source producing fluid pressure;

a reservoir for storing fluid; a power piston for producing output; a power chamber, the pressure receiving surface of the power piston confronting the power chamber; a control valve, which in its inoperative state, shuts off the power chamber from the fluid pressure source and connects the power chamber to the reservoir, and in its operative state, shuts off the power chamber from the reservoir and connects the power chamber to the fluid pressure source to introduce pressurized fluid in the fluid pressure source into the power chamber; an input shaft for controlling the operation of the control valve by advancing in its operational state and retreating in its operation release state, wherein the input shaft has a small-diameter portion at the control valve side, a large-diameter portion at the opposite side of the control valve, and a step therebetween; and a reaction piston which is formed in a cylindrical shape to have larger outer diameter than that of the large-diameter portion of the input shaft and is slidably fitted onto the small-diameter portion of the input shaft, the front end of the reaction piston confronting the power chamber and the rear end of the reaction piston being able to be in contact with the step of the input shaft, and the fluid pressure boosting device is characterized in that the reaction piston in the operative direction is separated from the step of the input shaft when the fluid pressure in the power chamber is lower than a predetermined value, and comes in contact with the step of the input shaft when the fluid pressure in the power chamber exceeds the predetermined value, and the reaction piston in the operation release direction is separated from the step of the input shaft when the fluid pressure boosting device is in the middle load state.

In the fluid pressure boosting device of the invention as structured above, the reaction piston in the operative direction is separated from the step of the input shaft when the fluid pressure in the power chamber is lower than a predetermined value, and comes in contact with the step of the input shaft when the fluid pressure in the power chamber exceeds the predetermined value, and the reaction piston in the operation release direction is separated from the step of the input shaft when the fluid pressure boosting device is in the middle load state, whereby the fluid pressure boosting device can be mechanically provided with hysteresis different between the operative direction and the operation release direction. The input-output characteristic of the fluid pressure boosting device in this case has hysteresis in which the servo ratio is small in the operative direction and large in the operation release direction.

Moreover, a brake pressure boosting system of the invention comprises: the aforementioned fluid pressure boosting device; a master cylinder having a master cylinder piston which produces master cylinder pressure by the output of the fluid pressure boosting device; brake cylinders into which the master cylinder pressure of the master cylinder is introduced to produce braking force; a second fluid pressure source for producing fluid pressure; a fluid pressure supply valve composed of a solenoid valve which, in its operative state, introduces the fluid pressure from the second fluid pressure source to the power chamber not through the control valve; and an electronic control unit which controls the operation of the fluid pressure supply valve as necessary.

In the brake pressure boosting system of the invention as structured above, by virtue of the hysteresis characteristic of the fluid pressure boosting device and the fluid pressure of the second fluid pressure source, the braking force can be increased when brake assist is necessary and even with the same input, the output can be varied within a hysteretic range of the input-output characteristic of the fluid pressure boosting device.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 53 is a diagram showing input-output characteristics of the brake pressure boosting device shown in FIG. 52.

DESCRIPTION OF THE PREFERRED EMBODIMENTS

Figure 1:
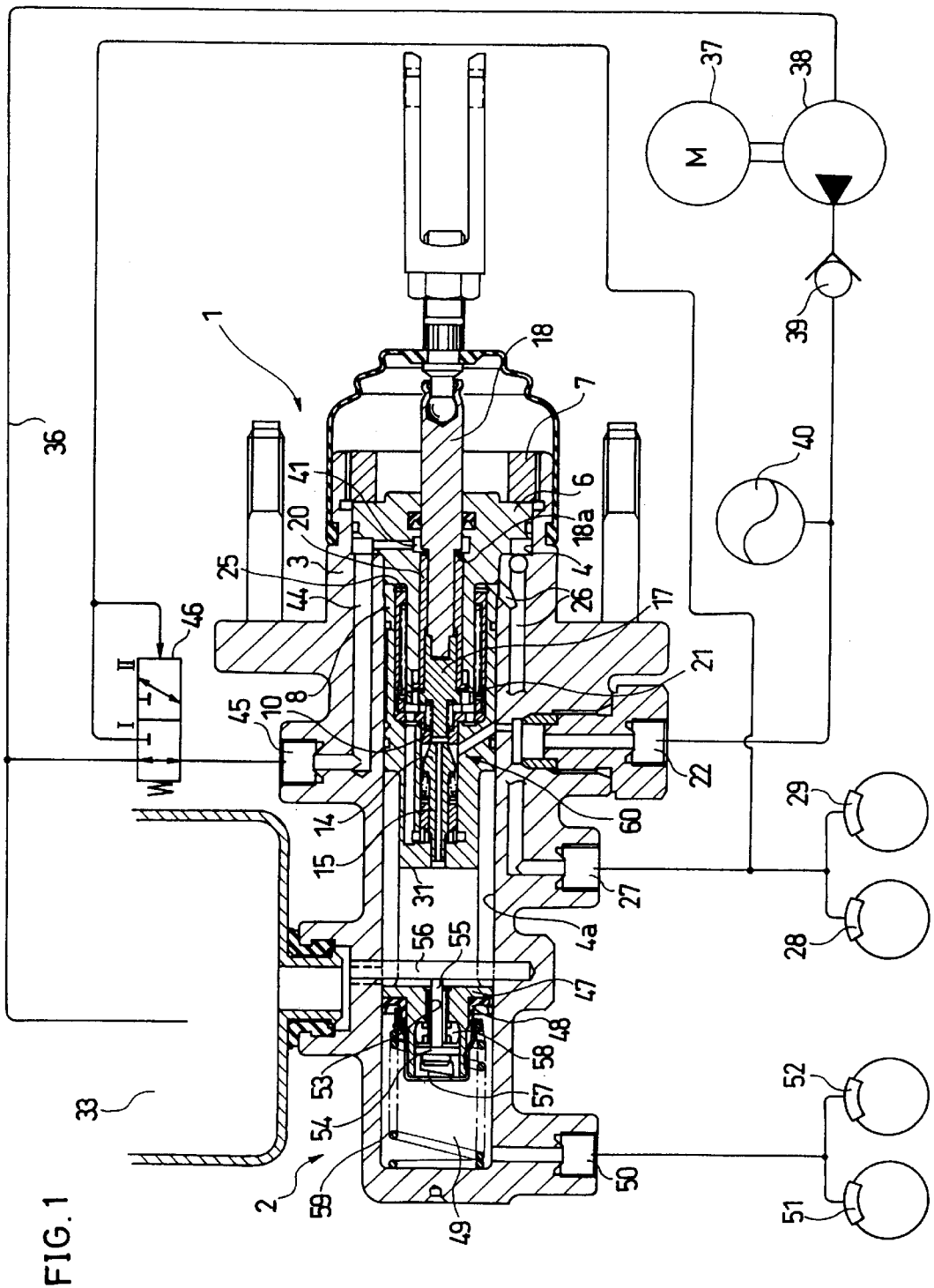
FIG. 1 is a sectional view showing a first embodiment of a brake pressure boosting device accordance with the present invention.
Figure 2:
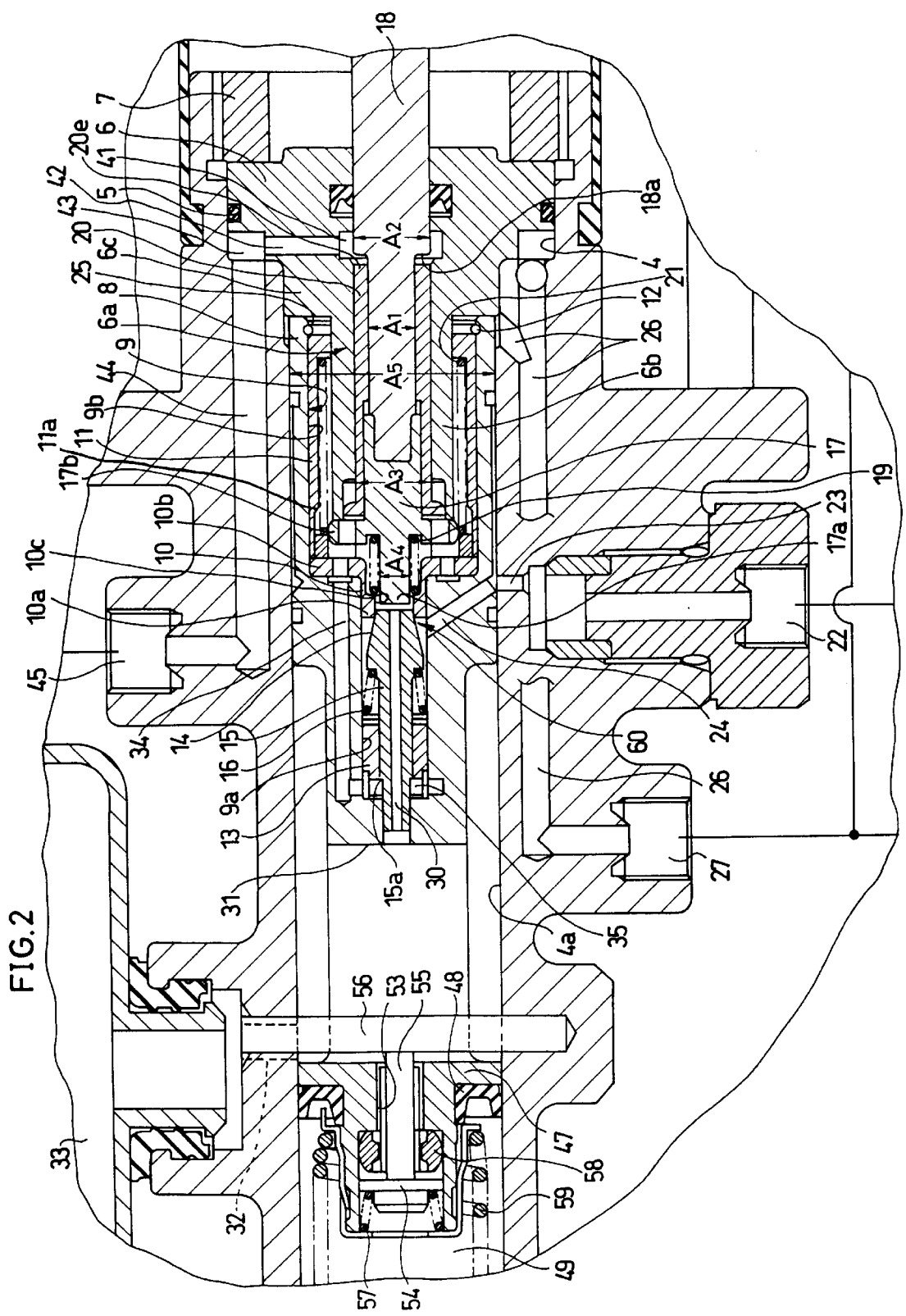
FIG. 2 is a partially enlarged sectional view of the brake pressure boosting device shown in FIG. 1.

FIG. 1 is a sectional view showing a first embodiment of the brake pressure boosting device in accordance with the present invention, and FIG. 2 is a partially enlarged sectional view of FIG. 1.

As shown in FIGS. 1 and 2, the brake pressure boosting device 1 of the first embodiment is formed integrally with a master cylinder (hereinafter, sometimes referred to as MCY) 2 and comprises a housing 3 common to the master cylinder 2.

The housing 3 has a stepped hole 4, which is relatively long in the axial direction and has an open end on the right side in FIG. 1 and the stepped hole 4 has a small-diameter portion 4a extending from the brake pressure boosting device 1 to the MCY 2 with the sectional area of the small-diameter portion 4a being constant. The open end of the axial stepped hole 4 is fluid sealed by a plug 6 having an O-ring 5. The plug 6 has a stepped cylindrical projection 6a. The stepped cylindrical projection 6a has a small-diameter projection 6b, which is positioned inside the small-diameter portion 4a of the stepped hole 4, and a large-diameter projection 6c, which is press fitted into the small-diameter portion 4a. The plug 6 is brought into contact with the step of the stepped hole 4 by a nut 7 threaded into the housing 3 and is thereby fixed to the housing 3.

A power piston 8 is sealingly slidably disposed inside the small-diameter portion 4a of the stepped hole 4. The power piston 8 has a stepped hole 9, which is formed in the center thereof to extend in the axial direction and opens at the rear end of the power piston (at the right side of the FIG. 1 and FIG. 2). The stepped hole 9 has a small-diameter portion 9a into which a cylindrical valve seat member 10 having a first valve seat 10a at an end thereof is press fitted. The valve seat member 10 has a flange 10b at the rear end thereof which is in contact with the step of the stepped hole 9 and is axially supported by a cylindrical fixing member 11 inserted into a large-diameter portion 9b of the stepped hole 9. The cylindrical fixing member 11 is fixed to the power piston 8 by a C-ring 12.

Press fitted into the small-diameter portion 9a of the stepped hole 9 is a collar 13 in which a cylindrical valve body 15 is slidably inserted The valve body 15 is formed integrally with a valve cone 14 and is always biased by a spring 16 in such a direction that the valve cone 14 is seated in the first valve seat 10a of the valve seat member 10. A valve operating member 17 has a second valve seat 17a formed at an end thereof and the second valve seat 17a is slidably disposed in an axial hole 10c of the valve seat member 10 so that the second valve seat 17a can come in contact with the valve cone 14. The valve operating member 17 is fitted on and fixed to the input shaft 18 and has a flange-like stopper 17b formed integrally therewith which is able to be in contact with the end of the small-diameter projection 6b of the plug 6, thereby defining the rearward limitation of the input shaft 18. Compressed and disposed between the valve seat member 10 and the valve operating member 17 is a spring 19 which always biases the valve operating member 17 and the input shaft 18 to the right in the figures. The input shaft 18 sealingly penetrates the plug 6 and is connected with a brake pedal not shown at the rear end thereof.

Figure 3:
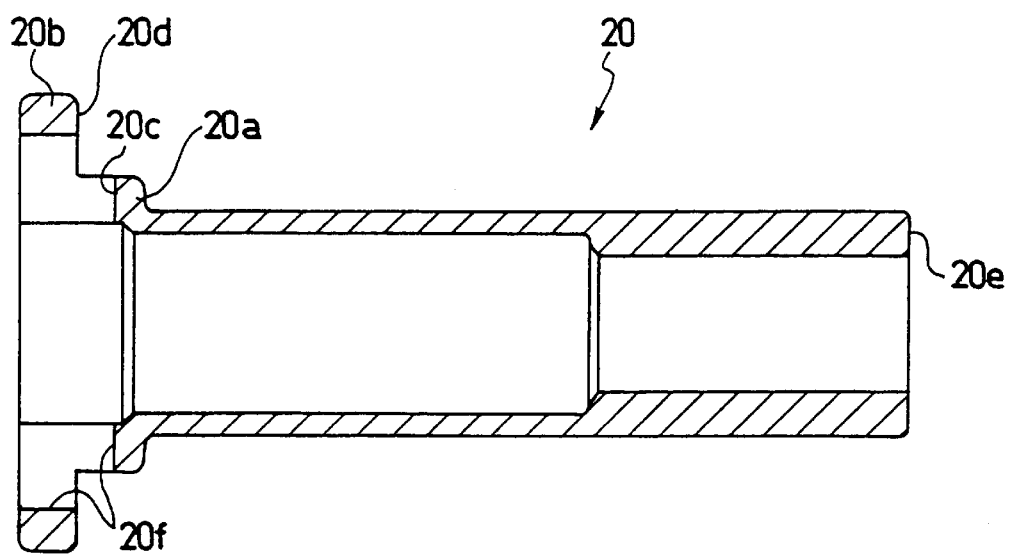
FIG. 3 is a sectional view of a reaction piston used in the brake pressure boosting device shown in FIG. 1.

A cylindrical reaction piston 20 is slidably fitted in a space between the peripheral surfaces of the input shaft 18 and the valve operating member 17 and the inner surface of the axial hole of the small-diameter projection 6b of the plug 6. As shown in FIG. 3, the reaction piston 20 is provided with a first flange 20a and the second flange 20b at the left end thereof in FIG. 3. The left end of the first flange 20a can contact with the stopper 17b. When the stopper 17b comes into contact with the left end of the first flange 20a, the valve operating member 17 is stopped from moving further rearward against the reaction piston 20. Therefore, the left end of the first flange 20a functions as a stopper 20c. In other words, the stopper 17b of the valve operating member 17 comes into contact with the stopper 20c of the reaction piston 20, thereby stopping the rearward movement of the input shaft 18 against the reaction piston 20.

The right end of the second flange 20b functions as an engaging portion 20d, which engages the step 11a of the cylindrical fixing member 11 when the reaction piston 20 moves with a predetermined amount rearwardly relative to the power piston 8. Further, the rear end 20e of the reaction piston 20 can be in contact with the step 18a of the input shaft 18. Compressed and disposed between the second flange 20b of the reaction piston 20 and the cylindrical fixing member 11 is a spring 21 which biases in such a manner that the second flange 20b of the reaction piston 20 is normally in contact with the flange 10b of the valve seat member 10.

The housing 3 is provided with an input port 22 through which fluid is introduced, and a passage 23 allowing the communication between the input port 22 and the small-diameter portion 4a of the stepped hole 4. The power piston 8 is provided with a passage 24 allowing the communication between the passage 23 and the small-diameter portion 9a of the stepped hole 9. In this case, the passage 24 opens toward the small-diameter portion 9a between the valve seat member 10 and the collar 13. The input port 22 and the passages 23, 24 compose together a fluid pressure supplying path.

A power chamber 25 is formed between the plug 6 and the right end of the power piston 8, which always communicates with the axial hole 10c of the valve seat member 10. Inside the power chamber 25, the stopper 17b of the valve operating member 17 and the first and second flanges 20a, 20b of the reaction piston 20 are positioned, respectively. There is a space between the peripheral surface of the small-diameter projection 6b of the plug 6 and the inner surface of the cylindrical fixing member 11 so that the fluid can freely flow between both axial sides of the cylindrical fixing member 11.

The power chamber 25 always communicates with the output port 27 through a passage 26 formed in the housing 3. The output port 27 always communicates with wheel cylinders (hereinafter, sometimes referred to as WCYs) 28, 29 relating to one circuit of two brake circuits.

The valve body 15 is provided with an axial hole 30 axially penetrating the valve body. The axial hole 30 always communicates with a radial hole 31 formed in the power piston 8. The radial hole 31 always communicates with a discharge port 32 formed in the housing 3 through the small-diameter portion 4a and the discharge port 32 always communicates with the reservoir 33.

The power chamber 25 always communicates with a chamber 35 confronting the step 15a of the valve body 15 through a passage 34 formed in the power piston 8.

A hydraulic circuit 36 connecting the input port 22 and the reservoir 33 includes a hydraulic pump 38 driven by a motor 37, and an accumulator 40 on the discharge side of the hydraulic pump 38 via a check valve 39. Predetermined pressure is always accumulated in the accumulator 40 by discharge pressure of the hydraulic pump 38.

The brake pressure boosting device 1 of the embodiment is provided with a reaction chamber 41 formed in the plug 6. The step 18a of the input shaft 18 and the rear end 20e of the reaction piston 20 face the reaction chamber 41. The reaction chamber 41 always communicates with a radial hole 42 formed in the plug 6, an annular space 43 between the housing 3 and the plug 6, and a control pressure inlet 45 through an axial hole 44 formed in the housing 3.

As shown in FIG. 1, the control pressure inlet 45 is connected to a pressure switching valve 46 composed of a two-position three-way valve. The pressure switching valve 46 switches between a first position I where the control pressure inlet 45 connects to the hydraulic circuit 36 always communicating with the reservoir 33 and a second position II where the control pressure inlet 45 connects to a brake fluid line connecting the output port 27 and the WCYs 28, 29. The pressure switching valve 46 is normally set in the first position I and is set in second position II when the fluid pressure at the output port 27, i.e. the fluid pressure in the power chamber 25, reaches a predetermined working pressure (i.e. servo-ratio switching pressure).

On the other hand, a master cylinder piston 47 of the MCY 2 is formed integrally with the front portion of the power piston 8. The MCY piston 47 is set to have the same effective pressure receiving area as that of the power piston 8 and is slidably fitted in the small-diameter portion 4a of the stepped hole 4 of the housing 3 in such a manner that the MCY piston 47 is sealed only in one direction.

A fluid chamber 49 is defined by the MCY piston 47 in the small-diameter portion 4a and the fluid chamber 49 always communicates with WCYs 51, 52 relating to the other circuit of the two brake circuits through the output port 50. The MCY piston 47 is provided with an axial hole 53 formed therein for allowing the communication between the radial hole 31 i.e. the reservoir 33 and the fluid chamber 49. The axial hole 53 has a valve rod 55 inserted therethrough. The valve rod 55 is provided with a valve 54 at the end thereof and can be in contact with a valve release rod 56 radially penetrating the small-diameter portion 4a of the housing 3. The valve 54 is always biased in such a direction as to sit in a valve seat 58 by a spring 57. When the MCY piston 47 is in the non-operation position as illustrated, the valve rod 55 is in contact with the valve release rod 56 so that the valve 54 is spaced apart form the valve seat 58 against the biasing force of the spring 57 so as to allow the communication between the reservoir 33 and the fluid chamber 49. When the MCY piston 47 advances, the valve 54 is seated in the valve seat 58 by the biasing force of the spring 57 and the valve rod 55 is spaced apart from the valve release rod 56 so as to intercept the communication between the reservoir 33 and the fluid chamber 49, thereby producing master cylinder pressures (MCY pressures).

A return spring 59 is compressed and disposed in the fluid chamber 49 to always bias the power piston 8 integrated with the MCY piston 47 in the inoperative direction.

In this way, the brake system using the brake pressure boosting device 1 integrated with the MCY 2 of this embodiment comprises, as one brake circuit, a fullpower brake system in which the fluid pressure of the power chamber 25 is introduced into the WCYs 28 and 29, and, as the other brake circuit, semi-full-power brake system in which the MCY pressure is introduced into the WCYs 51 and 52.

The description will now be made as regard to the operation of the brake pressure boosting device integrated with the MCY of this embodiment.

When brakes are inoperative where the brake pedal is not pedaled, the valve cone 14, the first valve seat 10a of the valve seat member 10, and the second valve seat 17a of the valve operating member 17 are in the positional relation as shown in FIGS. 1 and 2. That is, the valve cone 14 is seated in the first valve seat 10a of the valve seat member 10 and the second valve seat 17a of the valve operating member 17 is spaced apart form the valve cone 14. In this state, the axial hole 10c of the valve seat member 10 is shut off from the passage 24 which always communicates with the input port 22, and communicates with the axial hole 30 of the valve body 15 which always communicates with the discharge port 32. Therefore, when the brakes are inoperative, the power chamber 25 is shut off from the pump 38 and the accumulator 40 and communicates with the reservoir 33 so that no pressurized fluid is supplied to the power chamber 25.

The rear end 20e of the reaction piston 20 is spaced apart from the step 18a of the input shaft 18. The stopper 17b of the valve operating member 17 is in contact with the small-diameter projection 6b of the plug 6 and is spaced apart from the stopper 20c of the first flange 20a of the reaction piston 20, i.e. in a position ahead of the stopper 20c. The pressure switching valve 46 is in the first position I as illustrated and the reaction chamber 41 communicates with the reservoir 33.

When the brakes are operative where the brake pedal is pedaled, the input shaft 18 advances so that the second valve seat 17a of the valve operating member 17 is brought in contact with the valve cone 14, i.e. the valve cone 14 is seated in the second valve seat 17a of the valve operating member, and the valve cone 14 is spaced apart from the first valve seat 10a of the valve seat member 10. This state allows the communication between the passage 24 and the axial hole 10c of the valve seat member 10 and intercepts the communication between the axial hole 10c of the valve seat member 10 and the axial hole 30 of the valve body 15. Therefore, the power chamber 25 is shut off from the reservoir 33 and communicates with the pump 38 and the accumulator 40 so that the pressurized fluid of the accumulator 40 is supplied to the power chamber 25. In this case, the valve cone 14, the first valve seat 10a, and the second valve seat 17a compose a control valve 60 of the brake pressure boosting device 1 which controls to selectively switch the power chamber 25 to communicate with the pump 38 and the pressurized fluid source of the accumulator 40 or with the reservoir 33.

As the fluid pressure in the power chamber 25 reaches a value overcoming the biasing force of the return spring 59, the power piston 8 advances by the fluid pressure so that the brake pressure boosting device 1 produces output and the MCY piston 47 advances so that the valve 54 sit in the valve seat 58 and MCY pressure is developed in the fluid chamber 49. The pressurized fluid in the power chamber 25 is introduced into both the WCYs 28, 29 relating to the one circuit and the MCY pressure is introduced into both the WCYs 51, 52 relating to the other circuit so that the brakes of the both circuits are actuated Since the effective pressure receiving area of the power piston 8, on which the fluid pressure in the power chamber 25 is applied, is the same as the effective pressure receiving area of the MCY piston 47, on which the MCY pressure in the fluid chamber 49 is applied, the fluid pressure of the power chamber 25 and the MCY pressure are balanced to be equal. Therefore, the pressure of the pressurized fluid supplied to the WCYs 28, 29; 51, 52 should be equal.

Because of the fluid pressure in the power chamber 25, the reaction piston 20 is moved to the right relative to the power piston 8 and the input shaft 18 against the biasing force of the spring 21. In the initial stage where the fluid pressure in the power chamber 25 is relatively small, however, the rear end 20e of the reaction piston 20 is not yet brought into contact with the step 18a of the input shaft 18.

The pressurized fluid in the power chamber 25 is also introduced into the chamber 35 via the axial passage 34. Thus, the fluid pressure in the chamber 35 acts on the step 15a of the valve body 15 so that the valve body 15 is biased in a direction opposing the fluid pressure in the power chamber 25.

In the initial stage of operation where the WCYs 28, 29; 51, 52 still develop substantially no braking force because of plays in strokes of the WCYs, the rear end 20e of the reaction piston 20 is not in contact with the step 18a of the input shaft 18 so that no force from the reaction piston 20 is applied to the input shaft 18. Therefore, applied to the input shaft 18 is force by the fluid pressure in the power chamber 25 received by the effective pressure receiving area, which is relatively small, at the end of the valve operating member 17. The force is transmitted as reaction to the driver.

As the reaction of the input shaft 18 becomes equal to the input of the input shaft 18, the valve cone 14 is seated in the first valve seat 10a of the valve seat member 10 and also in the second valve seat 17a of the valve operating member 17 so that the power chamber 25 is shut off from both the accumulator 40 and the reservoir 33. As the input of the input shaft 18 is further increased, the valve cone 14 is separated from the first valve seat 10a again so that the pressurized fluid is further supplied into the power chamber 25, thereby further increasing the fluid pressure in the power chamber 25. After that, by repeating the seating and separating of the valve cone 14 relative to the first valve seat 10a, the fluid pressure in the power chamber 25 is increased corresponding to the increase of the input shaft 18.

In the initial stage where the input is still small, the rear end 20e of the reaction piston 20 is not in contact with the step 18a of the input shaft 18 so that the effective pressure receiving area of the input shaft 18, on which the fluid pressure in the power chamber 25 is applied, is small. Accordingly, the boosting rate, i.e. servo ratio, at this time is high. The output of the brake pressure boosting device 1 is therefore largely increased at higher servo ratio relative to the increase of the input of the input shaft 18. That is, the brake pressure boosting device 1 performs so-called jumping action.

Figure 4:
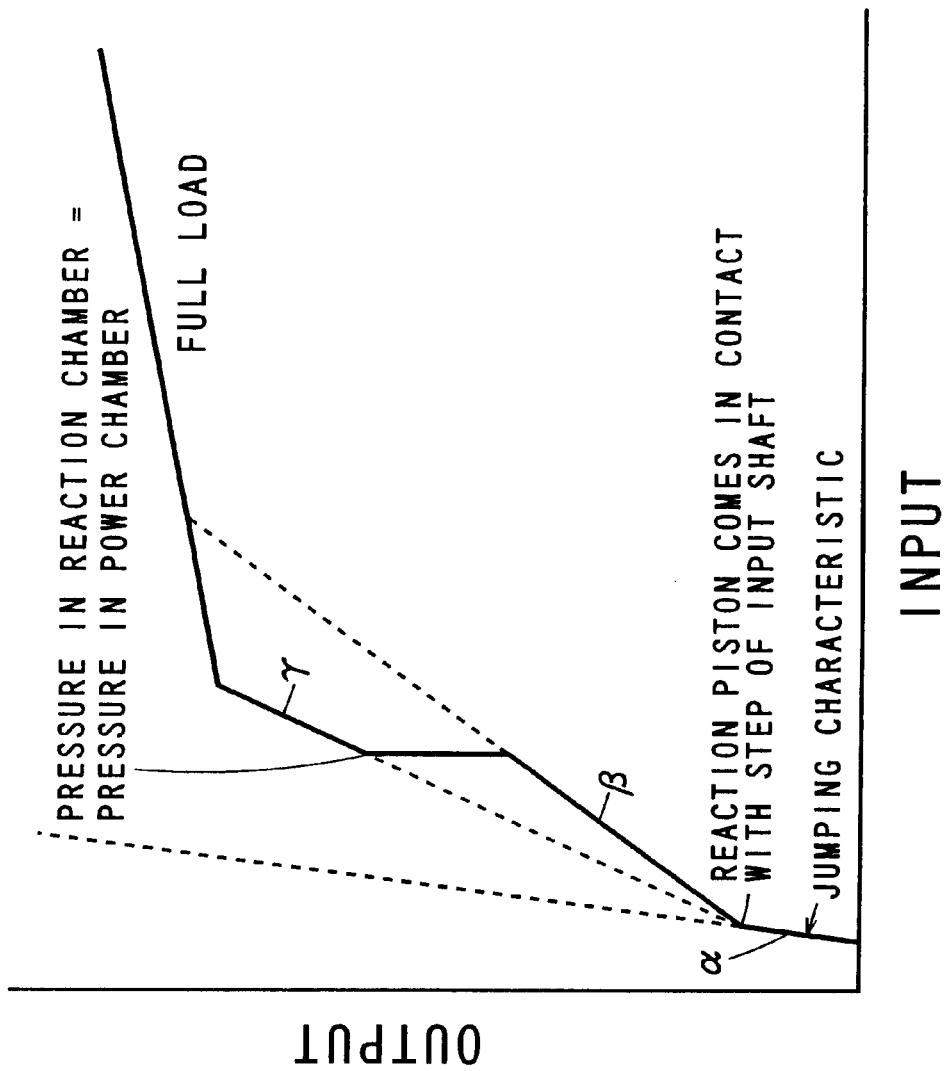
FIG. 4 is a diagram showing input-output characteristics of the brake pressure boosting device shown in FIG. 1.

Assuming that the output of the brake pressure boosting device 1 is $F_{out}$, the input of the brake pressure boosting device 1 is $F_{in}$, the sectional area of the small-diameter portion of the stepped input shaft 18 (effective pressure receiving area: hereinafter, the same is true for other sectional areas) is A, (shown in FIG. 2: hereinafter, the same numeral A is used for the other sectional areas), the sectional area of the large-diameter portion of the input shaft 18 is $A_2$, the sectional area of the outer diameter of the reaction piston 20 is $A_3$, the sectional area of the seated portion between the valve cone 14 and the second valve seat 17a is $A_4$, the sectional area of the outer diameter of the power piston 8 is $A_5$, (wherein $A_4 < A_1 < A_2 < A_3 < A_5$), and the biasing forces of the springs 19, 21, and 59 are $SPG_1$, $SPG_2$, $SPG_3$, the input-output characteristic of the brake pressure boosting device 1 is found by the following equation 1;

$$F_{out}=(A_5/A_1-A_4)*F_{in}-(A_5/A_1-A_4)*SPG_1-SPG_3 \qquad 1$$

and is represented by a straight line a as shown in FIG. 4.

When the fluid pressure in the power chamber 25 is further increased, the power piston 8 further advances so as to cancel the plays in the strokes of the WCYs 28, 29; 51, 52. Then, the WCYs 28, 29; 51, 52 start to produce braking forces and the brakes start substantial working. In this state, the rear end 20e of the reaction piston 20 comes into contact with the step 18a of the input shaft 18 by the increased fluid pressure in the power chamber 25 and the reaction piston 20 acts to oppose the input of the input shaft 18 with force developed by the fluid pressure in the power chamber 25. As the reaction acting on the input shaft 18 is increased, the jumping action is finished. After that, the increase in the output of the brake pressure boosting device 1 is smaller than that during the plays in strokes relative to the increase in the input of the input shaft 18. That is, since the reaction of the brake pressure boosting device 1 is increased, the servo control is performed in such a manner that the input of the input shaft 18 is boosted at a lower servo ratio, and the fluid pressure in the power chamber 25 becomes a value corresponding to the magnitude of the servo ratio. At this point, the servo ratio is set in a value for normal braking. During this servo control, the fluid pressure in the power chamber 25 does not reach the working pressure of the pressure switching valve 46 until the input reaches a predetermined value. Therefore, the pressure switching valve 46 is still in the first position I and the reaction chamber 41 is still connected to the reservoir 33.

The WCYs 28, 29; 51, 52 produce braking forces, i.e. the boosted force relative to the input of the input shaft 18, and the vehicle is braked by this braking forces. At this point, the fluid pressure in the power chamber 25 and the MCY pressure are balanced to be equal to each other so that the brake forces produced by the respective WCYs 28, 29; 51, 52 are also equal. The input-output characteristic of the brake pressure boosting device 1 is found by the following equation 2;

$$F_{out}=(A_5/A_3-A_4)*F_{in}-(A_5/A_3-A_4)*(SPG_2-SPG_1)-SPG_3 \qquad 2$$

and is represented by a straight line β as shown in FIG. 4.

As the input reaches the predetermined value and the fluid pressure in the power chamber 25 reaches the working pressure of the pressure switching valve 46, the pressure switching valve 46 is switched to the second position 11. Then, the reaction chamber 41 is connected to brake fluid lines between the output port 27 and the WCYs 28, 29 so that the fluid pressure at the servo-ratio controlling pressure in the output port 27, i.e. the pressurized fluid in the power chamber 25 is introduced into the reaction chamber 41. The introduced fluid pressure in the reaction chamber 41 acts on a portion of the rear end 20e of the reaction piston 20 which is in contact with the step 18a of the input shaft 18 in the same direction as the input applied to the input shaft 18. Accordingly, the reaction acting on the input shaft 18 is reduced and the servo control at the servo ratio for normal braking represented by the straight line β is finished. After that, the increase in the output of the brake pressure boosting device 1 is larger than that in case of the servo control for normal braking. That is, since the reaction of the brake pressure boosting device 1 is reduced, the servo control is performed in such a manner that the input of the input shaft 18 is boosted at a relatively high servo ratio. The servo ratio at this point is higher than the servo ratio for normal braking. The WCYs 28, 29; 51, 52 produce braking forces larger than that of normal braking. The input-output characteristic of the brake pressure boosting device 1 is found by the following equation 3;

$$F_{out}=(A_5/A_2-A_4)*F_{in}-(A_5/A_2-A_4)*(SPG_2-SPG_1)-SPG_3 \qquad 3$$

and is represented by a straight line γ as shown in FIG. 4. In this way, the brake pressure boosting device 1 has a reversed two-stage servo characteristic allowing the servo control at a servo ratio higher than that for normal braking after the input exceeds the predetermined value.

As a result of further increase in the input, the fluid pressure in the power chamber 25 reaches the maximum setting pressure at which pressure is accumulated in the accumulator 40. From this point, the fluid pressure in the power chamber 25 is no more increased, so the brake pressure boosting device 1 finishes the servo control at the high servo ratio and becomes in the full-load state. After that, the output of the brake pressure boosting device 1 increases in proportion to the input without magnification.

As the brakes are canceled by releasing the brake pedal, the input shaft 18 and the valve operating member 17 retreat rightward, the second valve seat 17a of the control valve 60 is moved apart from the valve cone 14, and the pressurized fluid in the power chamber 25 is discharged into the reservoir 33 through the axial hole 10c of the valve seat member 10, the space between valve cone 14 and second valve seat 17a, the axial hole 30 of the valve body 15, the radial hole 31, the small-diameter portion 4a of the stepped hole 4, and the discharge port 32. At this point, the input shaft 18 retreats largely until the stopper 17b of the valve operating member 17 comes into contact with the stopper 20c of the reaction piston 20, so the second valve seat 17a is largely spaced apart from the valve cone 14 so that the pressurized fluid in the power chamber 25 is quickly discharged.

Because of the discharge of the pressurized fluid in the power chamber 25, the pressurized fluid in both the WCYs 28, 29 relating to the one circuit is also quickly discharged into the reservoir 33 through the power chamber 25 so that the fluid pressures in the WCYs 28, 29 are reduced. On the other hand, since the MCY piston 47 and the power piston 8 rapidly retreat by the biasing force of the return spring 59, the fluid pressure in the fluid chamber 49 and the fluid pressures in both the WCYs 51, 52 relating to the other circuit are also reduced. After the valve rod 55 comes in contact with the valve release rod 56, the retreat of the MCY piston 47 moves the valve 54 apart from the valve seat 58 so that the fluid chamber 49 communicates with the reservoir 33. Therefore, the pressurized fluid in the WCYs 51, 52 is also quickly discharged into the reservoir 33 through the fluid chamber 49 so that the fluid pressures in the WCYs 51, 52 are further reduced. In this way, the brakes of both the circuits quickly begin to be canceled.

As the fluid pressure in the power chamber 25 becomes lower than the preset working pressure of the pressure switching valve 46, the pressure switching valve 46 is switched to the first position I so that the reaction chamber 41 communicates with the reservoir 33. As the fluid pressure in the power chamber 25 is further reduced to the predetermined value, the reaction piston 20 moves forward relative to the power piston 8 and the input shaft 18 by the biasing force of the spring 21 and comes into contact with the flange 10b of the valve seat member 10, and the rear end 20e of the reaction piston 20 moves apart from the step 18a of the input shaft 18.

As the input shaft 18 further retreats until the brakes are substantially canceled, the stopper 17b of the valve operating member 17 comes into contact with the end of the small-diameter projection 6b of the plug 6, so the input shaft 18 and the valve operating member 17 no more retreat, i.e. both the input shaft 18 and the valve operating member 17 reach their rearmost limits. Even after the input shaft 18 and the valve operating member 17 are stopped, the power piston 8, the reaction piston 20, the valve cone 14, and the valve seat member 10 still retreat. Therefore, the stopper 17b of the valve operating member 17 departs from the stopper 20c of the reaction piston 20 and the valve cone 14 is closer to the second valve seat 17a of the valve operating member 17.

As the right end of the power piston 8 comes into contact with the plug 6, the retreat of the power piston 8 is stopped so that the MCY piston 47 and the power piston 8 are in the inoperative positions, thereby quickly and completely canceling the brakes. During the brakes are cancelled, the output of the brake pressure boosting device 1 is reduced relative to the decrease in the input along, the full load line, the straight lines γ, β, and α, in contrast with the case of increasing the input.

When the power piston 8 is in the inoperative position, the valve cone 14 is extremely close to the second valve seat 17a of the valve operating member 17 so that the space between the valve cone 14 and the second valve seat 17a becomes quite small, i.e. the valve cone 14 is immediately before the seating. As the brake pedal is pedaled and the input shaft 18 and the valve operating member 17 advance, the second valve seat 17a immediately comes into contact with the valve cone 14 and the valve cone 14 immediately moves apart from the first valve seat 10a of the valve seat member 10. That is, the play in stroke for the switching operation of the control valve 60 is extremely reduced, thereby quickly actuating the brakes.

In this way, the brakes can be quickly worked by the braking operation and the brakes can be quickly canceled by canceling the braking operation, so the brake pressure boosting device 1 has improved responsiveness.

In the brake pressure boosting device 1 of this embodiment, when the fluid pressure in the power chamber 25 exceeds the predetermined pressure, in other words, the input from the brake pedal exceeds the predetermined value, the reversed two-stage servo characteristic allowing the servo control at a servo ratio higher than that for normal braking can be exhibited on the way of the servo control for normal braking. The reversed two-stage servo characteristic can be obtained with a simple structure comprising the reaction chamber 41, which is disposed in a place where the step 18a of the input shaft 18 and the rear end 20e of the reaction piston 20 are positioned, and the pressure switching valve 46, which allows the fluid pressure in the power chamber 25 to be introduced into the reaction chamber 41.

Therefore, in the event of emergency, only by pedaling the brake pedal to the servo-ratio switching point not substantially fully pedaling as conventional one, large braking forces can be quickly obtained. The brake assist for ensuring that large braking force is obtained in the event of emergency even by such an inexpert driver can be provided.

The servo-ratio switching point can be varied by adjusting the preset working pressure of the pressure switching valve 46.

Introduced into the reaction chamber 41 may be the accumulated pressure in the accumulator 40 in place of the fluid pressure of the power chamber 25. In this case, the accumulated pressure is controlled by a pressure regulating valve and is introduced into the reaction chamber 41. Since the accumulated pressure is higher than the fluid pressure in the power chamber 25 during normal braking, higher servo ratio can be obtained, i.e. larger output can be obtained with the same input. The introduction of the accumulated pressure in the accumulator will be described with regard to another embodiment described later.

Figure 5:
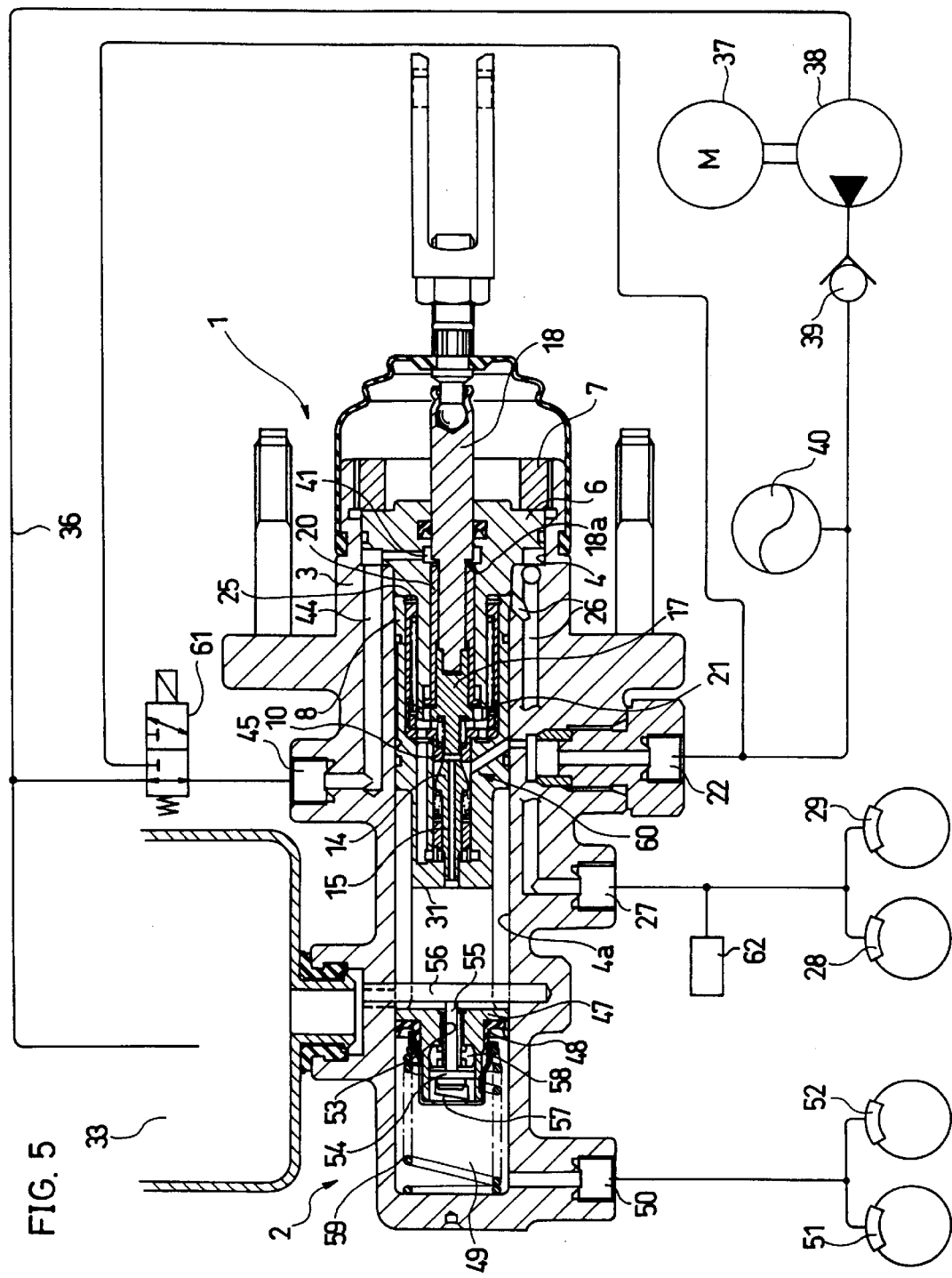
FIG. 5 is a sectional view showing a second embodiment of the present invention.

FIG. 5 is a view similar to FIG. 1 but showing the second embodiment of the present invention. It should be noted that parts similar or corresponding to the parts of the first embodiment will be marked by the same reference numerals so that the description about the parts will be omitted. In addition, the same is true for the description of the following other embodiments, so parts similar or corresponding to the parts of the preceding embodiments will be marked by the same reference numerals and parts not marked are the corresponding parts of the preceding embodiments.

Though the fluid pressure in the power chamber 25 is introduced into the reaction chamber 41 by using the pressure switching valve 46 worked by the fluid pressure in the power chamber 25 for changing the servo ratio in the aforementioned first embodiment, a brake pressure boosting device 1 of the second embodiment employs, instead of the pressure switching valve 46, a solenoid switching valve 61 composed of a two-position three-way valve of the same kind as mentioned above and a pressure sensor 62 for detecting the fluid pressure in the output port 27 i.e. the fluid pressure in the power chamber 25. Detection signals from the pressure sensor 62 are inputted into an electronic control unit not shown. Based on the detection signals, the electronic control unit determines that the fluid pressure in the power chamber 25 exceeds the predetermined pressure and switches the solenoid switching valve 61 to the second position II.

The brake pressure boosting device 1 of the second embodiment also has the same reversed two-stage servo characteristic as shown in FIG. 4 as the first embodiment.

The other structure, action, and effects of the brake pressure boosting device 1 of the second embodiment are the same as those of the first embodiment mentioned above.

Figure 6:
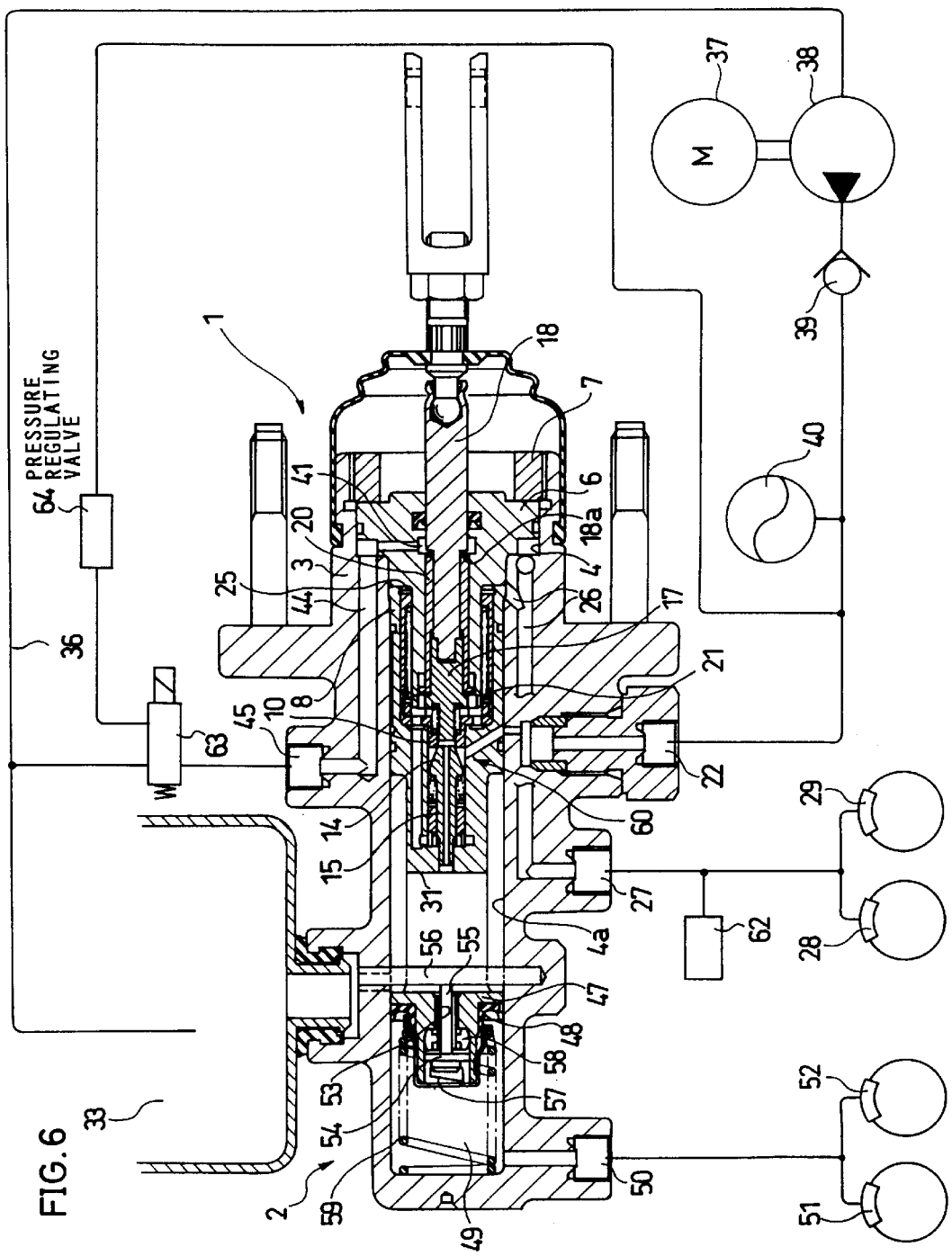
FIG. 6 is a sectional view showing a third embodiment of the present invention.

FIG. 6 is a view similar to FIG. 1 but showing the third embodiment of the present invention.

Though the supply and discharge of the fluid pressure of the power chamber 25 to the reaction chamber 41 are controlled by the solenoid switching valve 61 in the aforementioned second embodiment, a brake pressure boosting device 1 of the third embodiment employs, instead of the solenoid switching valve 61, a solenoid proportional control valve 63 composed of a linear solenoid valve and a pressure regulating valve 64 as shown in FIG. 6. The accumulated pressure in the accumulator 40 is regulated by the pressure regulating valve 64, is then controlled by the solenoid proportional control valve 63, and is introduced into the reaction chamber 41. As the electronic control unit determines, based on the detection signals from the pressure sensor 62, that the fluid pressure in the power chamber 25 exceeds the predetermined value, the electronic control unit outputs a control signal representing the magnitude represented by the detection signal, i.e. the magnitude proportional to the fluid pressure in the power chamber 25, so as to operate the solenoid proportional control valve 63. Though the solenoid proportional control valve 63 is normally connecting the reaction chamber 41 to the reservoir 33, the solenoid proportional control valve 63 in operation shuts off the reaction chamber 41 from the reservoir 33 so that the fluid pressure, which was developed by controlling the regulated accumulated pressure to be proportional to the magnitude of the control signal from the electronic control unit, is introduced into the reaction chamber 41.

The other structure of the brake pressure boosting device 1 of the third embodiment is the same as that of the first and second embodiments mentioned above.

Figure 7:
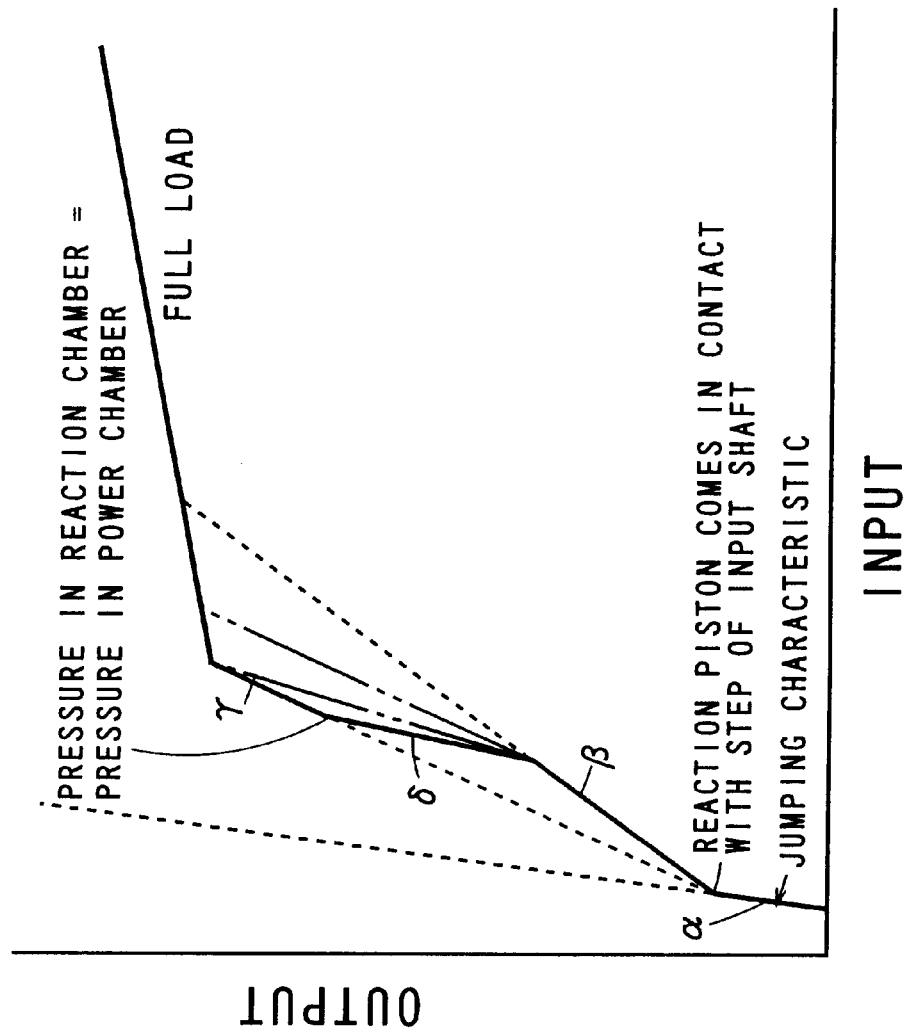
FIG. 7 is a diagram showing input-output characteristics of the brake pressure boosting device shown in FIG. 6.

In the brake pressure boosting device 1 of the third embodiment as structured above, based on the detection signal from the pressure sensor 62, the electronic control unit dose not operate the solenoid proportional control valve 63 when it determines that the fluid pressure in the power chamber 25 is lower than the preset working pressure of the solenoid proportional control valve 63, and connects the reaction chamber 41 to the reservoir 33. In this state, the input-output characteristic of the brake pressure boosting device 1 should be the servo characteristic along the straight line α, i.e. the jumping characteristic, or the servo characteristic for normal braking along the straight line β in the same manner as the first and second embodiment and. As it is determined that the fluid pressure in the power chamber 25 reaches the preset working pressure of the solenoid proportional control valve 63, the latter is operated so as to shut off the reaction chamber 41 from the reservoir 33 and introduce the fluid, which was developed by controlling the regulated accumulated pressure to be proportional to the magnitude of the control signal from the electronic control unit, into the reaction chamber 41. In the same manner as the first and second embodiments, the servo ratio is changed to be higher. Since the fluid pressure introduced into the reaction chamber 41 is increased in proportion to the fluid pressure in the power chamber 25, the servo ratio is also gradually increased proportionally. The input-output characteristic of the brake pressure boosting device 1 is found by the following equation 4;

$$F_{out}=(A_5/A_3-A_4)*F_{in}+\{A_5(A_3-A_2)/A_3-A_4\}*P_2+(A_5/A_3-A_4)*(SPG_2-SPG_1)-SPG_3 \quad 4$$

and is represented by a straight line δ as shown in FIG. 7, wherein $P_2$ is the fluid pressure in the reaction chamber 41.

When the fluid pressure $P_2$ in the reaction chamber 41 becomes equal to the fluid pressure $P_1$ in the power chamber 25, the brake pressure boosting device 1 performs, in completely the same manner as the first embodiment mentioned above, the servo control to output at a high servo ratio along the straight line γ. The input-output characteristics of the brake pressure boosting device 1 at this point is found by Equation 2.

In the brake pressure boosting device 1 of the third embodiment, the shift from the servo ratio represented by the straight line β to the servo ratio represented by the straight line γ can be smoothly performed through the servo ratio represented by the straight line δ. Since the accumulated pressure of the accumulator 40 is introduced into the reaction chamber 41, the output of the brake pressure boosting device 1 can be increased as compared to the case where the fluid pressure in the power chamber 25 is introduced into the reaction chamber 41.

The other action and effects of the brake pressure boosting device 1 of the third embodiment are the same as those of the first and second embodiments mentioned above.

By controlling the fluid pressure in the reaction chamber 41, the smooth shift from the servo ratio represented by the straight line β directly to the full load can be achieved as shown by a chain double-dashed line in FIG. 7. Also in the third embodiment, instead of the accumulated pressure of the fluid pressure in the power chamber 25 may be controlled by the solenoid proportional control valve 63 and then introduced into the reaction chamber 41.

Figure 8:
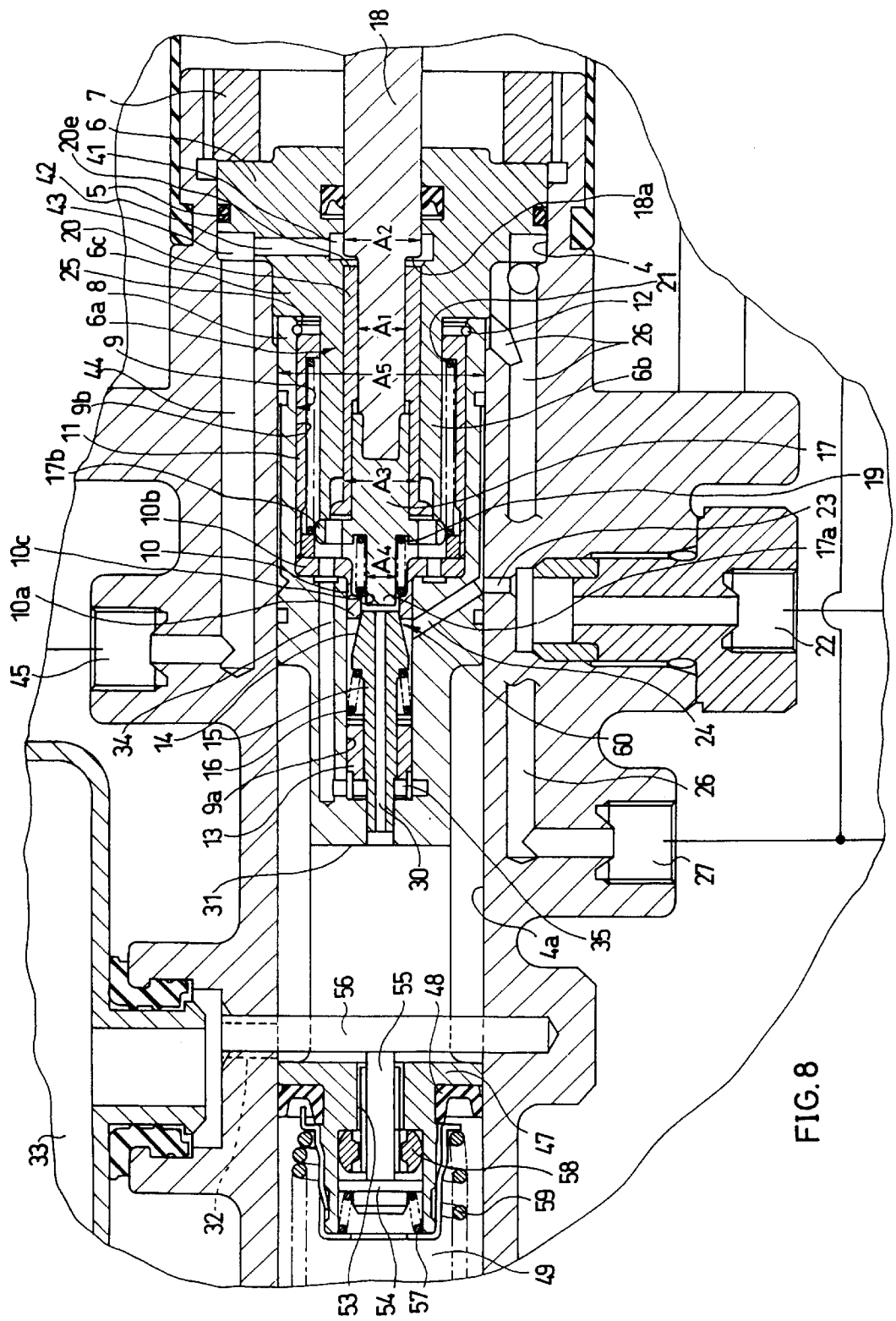
FIG. 8 is a sectional view showing a fourth embodiment of the present invention.

FIG. 8 is a view similar to FIG. 2 but showing the fourth embodiment of the present invention.

Though the brake pressure boosting device 1 of any one of the aforementioned first through third embodiments has the jumping characteristic by using the spring 21 biasing the reaction piston 20, a brake pressure boosting device 1 of the forth embodiment does not use the spring 21 so that the reaction piston 20 is free i.e. does not provide the jumping characteristic in the initial stage of braking operation. The other structures of the brake pressure boosting device 1 of the fourth embodiment is the same as that of the first through third embodiments mentioned above.

Figure 9:
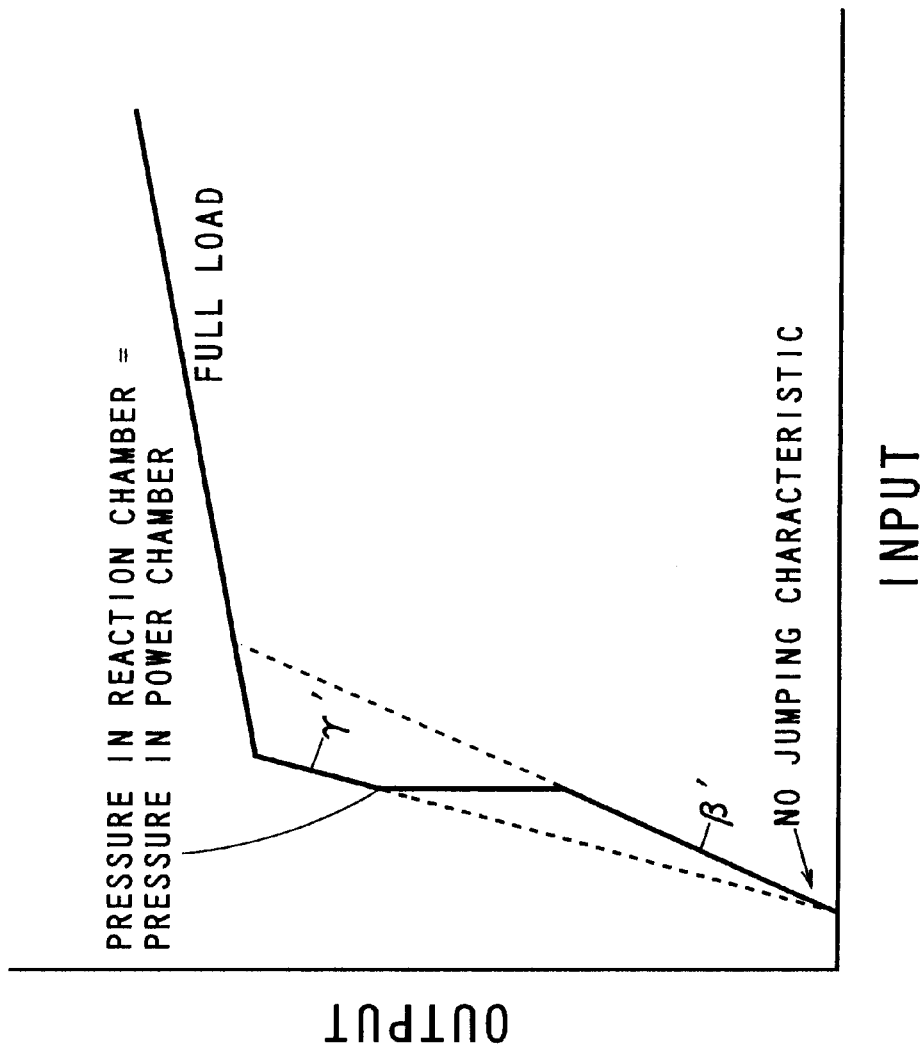
FIG. 9 is a diagram showing input-output characteristics of the brake pressure boosting device shown in FIG. 8.

In the brake pressure boosting device 1 of the fourth embodiment as structure above, as the input shaft 18 advances due to the braking operation so that the fluid pressure is introduced into the power chamber, the reaction piston 20 immediately moves rearwardly relative to the input shaft 18 so that the rear end 20e of the reaction piston 20 immediately comes into contact with the step 18a of the input shaft 18. As a result of this, the outer diameter at the power piston 8 side of the input shaft 18 is increased by the outer diameter of the reaction piston 20. The brake pressure boosting device 1 of the fourth embodiment immediately starts the servo control at the servo ratio for normal braking. The input-output characteristic of the brake pressure boosting device 1 at this point is found by the following equation 5;

$$F_{out}=(A_5/A_3-A_4)*F_{in}-(A_5/A_3-A_4)*SPG_1-SPG_3 \quad 5$$

and is represented by a straight line β' as shown in FIG. 9. That is, the jumping characteristic in the initial stage as the first and the second embodiment is not provided.

In the same manner as the first embodiment, when the fluid pressure in the power chamber 25 reaches the preset working pressure of the pressure switching valve 46, the fluid pressure in the power chamber 25 is introduced into the reaction chamber 41. Therefore, the servo ratio of the brake pressure boosting device 1 is changed to be higher than the servo ratio for normal braking. The input-output characteristic of the brake pressure boosting device 1 at this point is found by the following equation 6;

$$F_{out}=(A_5/A_2-A_4)*F_{in}-(A_5/A_2-A_4)*SPG_1-SPG_3 \quad 6$$

and is represented by a straight line β' as shown in FIG. 9.

The other action and effects of the brake pressure boosting device 1 of the fourth embodiment are the same as one of the first through third embodiments mentioned above.

Figure 10:
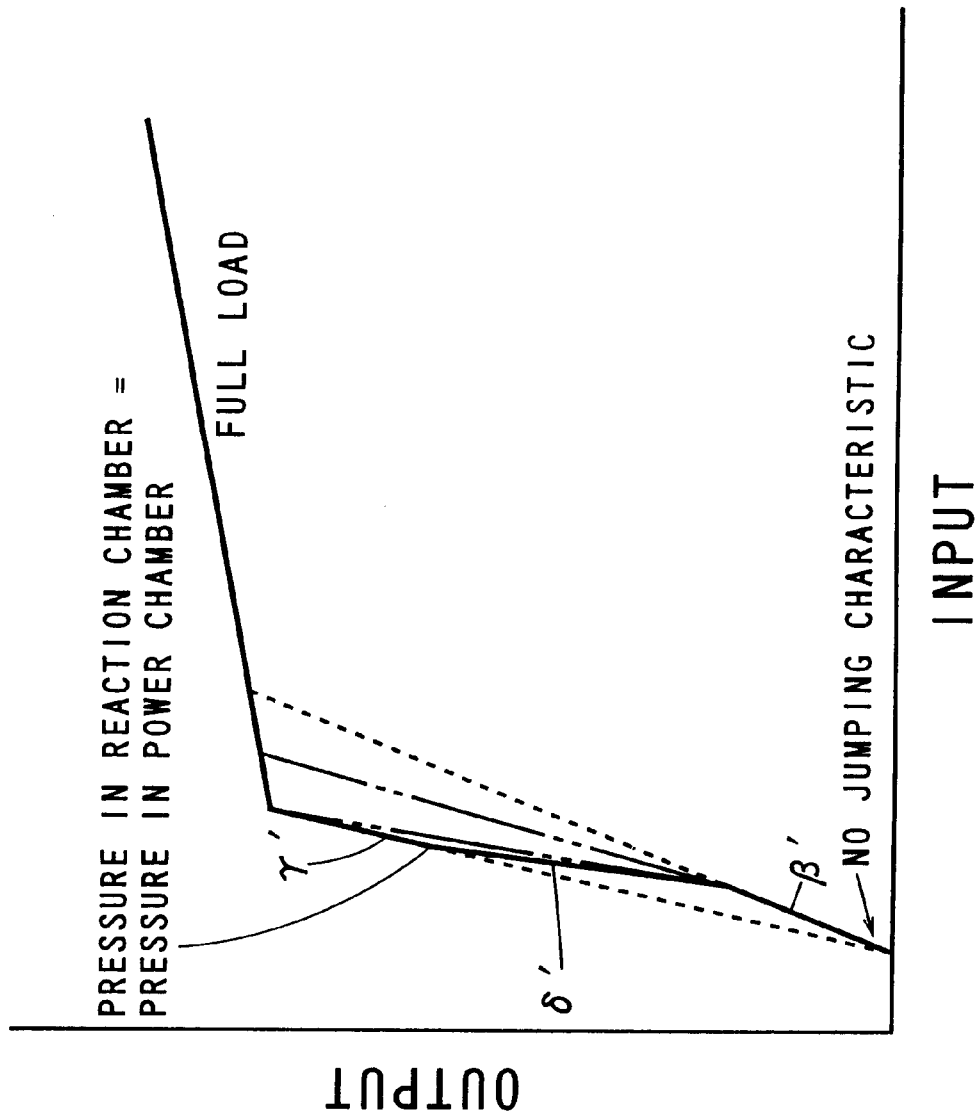
FIG. 10 is a diagram showing input-output characteristics of a variation of the brake pressure boosting device shown in FIG. 8.

The reaction piston 20 is not always required and can be omitted in this fourth embodiment. When the reaction piston 20 is not utilized, the sectional area of a portion of the input shaft 18 facing the power chamber 25 (i.e. a portion including the flange 17b of the valve operating member 17) must be larger than the sectional area of a portion of the input shaft 18 at the brake pedal side and the pressure receiving area on which the fluid pressure is applied in the same direction of the input relative to the input shaft 18, i.e. the outer diameter of the input shaft 18 at the power piston side must be larger than the outer diameter of the input shaft 18 at the brake pedal side. In the brake pressure boosting device 1 of the fourth embodiment, a solenoid switching valve 61 may be used instead of the pressure switching valve 46 in the same manner as the second embodiment. Further, a pressure sensor 62 and the solenoid proportional control valve 63 may be used to control the regulated accumulated pressure to correspond to the fluid pressure of the power chamber 25 and to introduce the thus controlled fluid pressure into the reaction chamber 41, thereby smoothing the change in the servo ratio. The input-output characteristic of the brake pressure boosting device 1 in this case is found by the following equation 7;

$$F_{out}=(A_5/A_3-A_4)*F_{in}+(A_5(A_3-A_2)/A_3-A_4)*P_2-(A_5/A_3-A_4)*SPG_1-SPG_3)\qquad 7$$

and is represented by straight lines β', δ', and γ' as shown in FIG. 10. In this case, the other action and effects of the brake pressure boosting device 1 are the same as those of the third embodiment.

Figure 11:
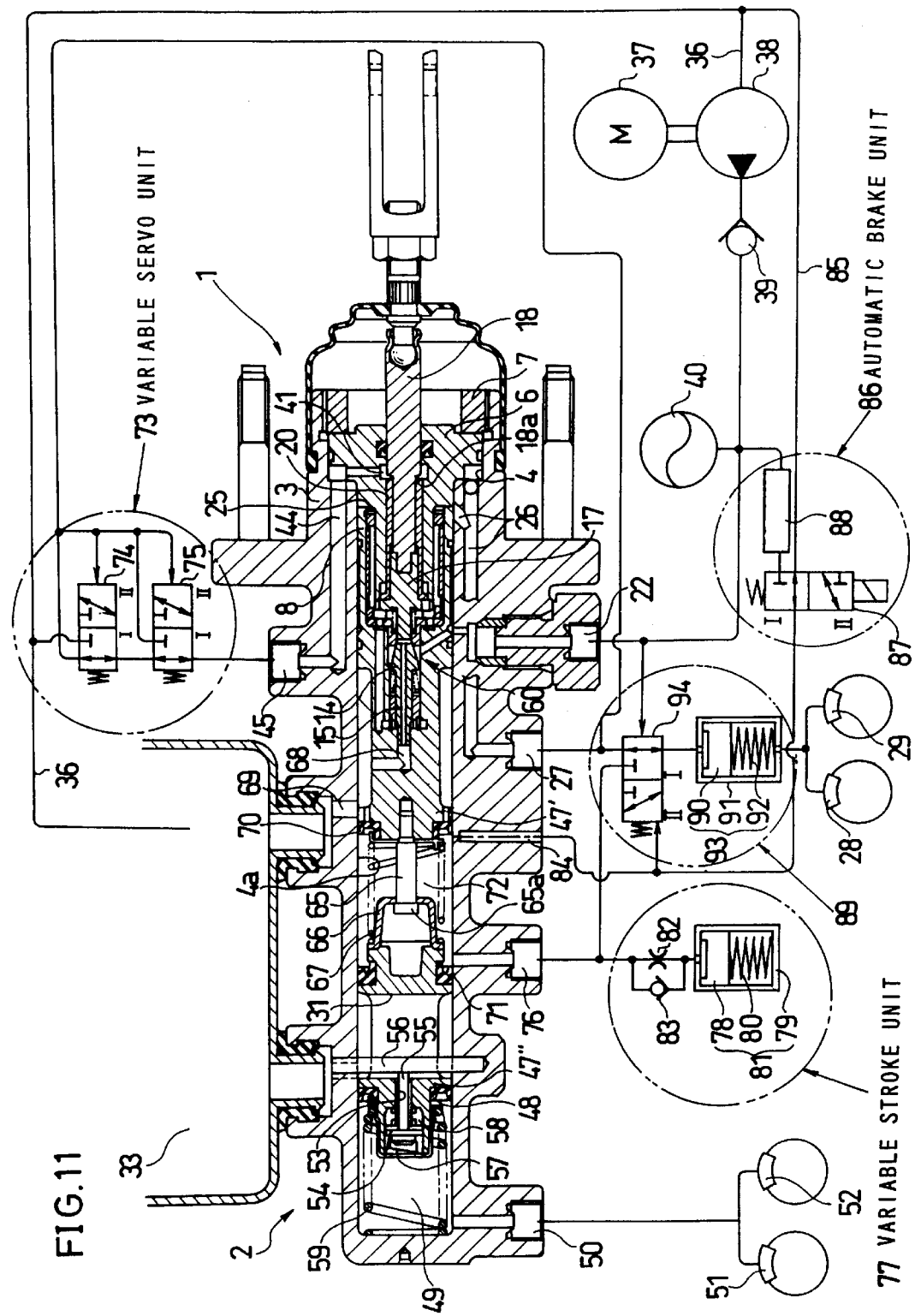
FIG. 11 is a sectional view showing an fifth embodiment of the present invention.

FIG. 11 is a view similar to FIG. 1 but showing a brake pressure boosting device of the fifth embodiment.

The brake pressure boosting device 1 of the fifth embodiment does not have the spring 21 in the same manner as the forth embodiment so that it has no jumping characteristic provided by the reaction piston 20.

In the brake pressure boosting device 1 of the fifth embodiment, a MCY 2 is composed of a tandem master cylinder 2 comprising a primary piston 47' and a secondary piston 47". The primary piston 47' is formed integrally with the front end of the power piston 8. The secondary piston 47" is structured in the same manner as the MCY piston 47 of any one of the aforementioned embodiments, except the rear end thereof.

A distance restricting rod 65 for restricting the distance between the pistons 47' and 47" is disposed to extend into the piston 47' and is fixed. A retainer 66 is fitted onto the distance restricting rod 65 such that it is slidable in the axial direction. A spring 67 is compressed and disposed between the retainer 66 and the front end of the primary piston 47' so as to always bias the retainer 66 in a direction moving apart from the primary piston 47'. Normally, the retainer 66 is in contact with the head 65a of the distance restricting rod 65 and is restricted not to further move apart from the primary piston 47'.

Since the radial hole 31 is formed in the secondary piston 47", the axial hole 30 formed in the valve body 15 of the control valve 60 always communicates with the reservoir 33 through a passage 68 formed in the power piston 8, the small-diameter portion 4a of the stepped hole 4, and a passage 69 formed in the housing 3.

The rear end of the secondary piston 47" is normally in contact with the retainer 66 because of the biasing force of the return spring 59. Cup sealing members 70, 71 are fitted onto the front end of the primary piston 47' and the rear end of the secondary piston 47", respectively, so as to define a fluid chamber 72 in the small-diameter portion 4a between the cup sealing members 70, 71. The cap sealing members 70, 71 allow the flow from the outside of the fluid chamber 72 to the inside of the fluid chamber 72 and blocks the flow from the inside of the fluid chamber 72 to the outside of the fluid chamber 72.

The effective pressure receiving area of the power piston 8, the effective pressure receiving area of the primary piston 47', and the effective pressure receiving area of front and rear ends of the secondary piston 47" are set to be equal to each other.

The control pressure inlet 45 is connected to a variable servo unit 73. The variable servo unit 73 comprises a first switching valve 74 for providing the jumping characteristic to the brake pressure boosting device 1, and a second switching valve 75 connected in series with the first switching valve 72 for providing the reversed two-stage servo characteristic to the brake pressure boosting device 1.

The first switching valve 74 is composed of a two-position three-way valve which is controlled by pilot pressure dependent on the fluid pressure in the power chamber 25. The first switching valve 74 has a first position I for connecting the second switching valve 75 to the output port 27 and a second position II for connecting the second switching valve 75 to the reservoir 33. When the brake pressure boosting device 1 is inoperative, the first switching valve 74 is set in the first position 1. When the fluid pressure in the power chamber 25 reaches a first preset working pressure of terminating the jumping action (corresponding to the working pressure of the reaction piston 20 in the aforementioned embodiment having the spring 21 biasing the reaction piston 20), the first switching valve 74 is switched to the second position II.

The second switching valve 75 is also composed of a two-position three-way valve which is controlled by pilot pressure dependent on the fluid pressure in the power chamber 25. The second switching valve 75 has a first position I for connecting the control pressure inlet 45 to the first switching valve 74, and a second position II for connecting the control pressure inlet 45 to the output port 27. Normally, the second switching valve 75 is set in the first position. When the fluid pressure in the power chamber 25 reaches a second preset working pressure at the servo ratio switching point, the second switching valve 75 is switched to the second position II.

The brake pressure boosting device 1 of the fifth embodiment comprises some units other than the variable servo unit 73.

The fluid chamber 72 is connected to a variable stroke unit 77 through a connecting port 76 of the housing 3. The variable stroke unit 77 comprises a stroke simulator 81 for ensuring the pedal stroke having a piston 78, a cylinder 79, and a spring 80, an orifice 82 disposed between a connection port 76 and the stroke simulator 81, and a check valve 83 disposed on a line bypassing the orifice 82 for allowing only the flow from the stroke simulator 81 to the connection port 76.

The housing 3 has a connection port 84 formed therein which is connected to a fluid path 85, a branch of a fluid pressure circuit 36. An automatic brake unit 86 is disposed on the fluid path 85. The automatic brake unit 86 comprises a solenoid switching valve 87 composed of a two-position three-way valve and a pressure regulating valve 88. The solenoid switching valve 87 has a first position I for connecting the connection port 84 to the reservoir 33, and a second position II for connecting the connection port 79 to the accumulator 40 through the pressure regulating valve 88. The solenoid switching valve 87 is normally set in the first position I and is switched to be set in the second position II during the automatic braking operation. When the primary piston 47' is in inoperative position, the cup sealing member 70 is positioned between the passage 69 and the connection port 84. Therefore, in non-operation, the fluid freely flows between the fluid chamber 72 and the connection port 84 in the both directions. As the power piston 8 advances and the cup sealing member 70 passes over the connection port 84, the flow from the fluid chamber 72 to the connection port 84 is shut off while the flow from the connection port 84 to the fluid chamber 72 is allowed.

An alternative brake operating unit 89 is disposed on a fluid line connecting the output port 27 of the brake pressure boosting device 1 and the WCYs 28, 29 relating to the one circuit in order to ensure the braking operation of the one circuit in case of failure in the fluid pressure sources such as the pump 38 and the accumulator 40. The alternative brake operating unit 89 comprises a pressure transducer 93 having a piston 90, a cylinder 91, and a spring 92, and a pressure control switching valve 94 composed of a two-position three-way valve.

When the pressurized fluid discharged from the pump 38 is introduced into the pressure transducer 93, the piston 90 is actuated to develop brake pressure which is in turn introduced into the WCYs 28, 29. In case that the fluid pressure failure is a result of failure in the WCYs 28, 29, the pressure transducer 93 prevents the fluid discharged from the pump 38 (i.e. accumulator's pressurized fluid) from flowing out the damaged portion.

The pressure control switching valve 94 is controlled by pilot pressure dependent on the accumulated pressure in the accumulator 40. The pressure control switching valve 94 has a first position I for connecting the pressure transducer 93 to the output port 27, and a second position II for connecting the pressure transducer 93 to the connection port 76. When the fluid pressure is in normal state, the pressure control switching valve 94 is set in the first position I. In case of the fluid pressure failure, the pressure control switching valve 94 is switched to the second position II.

The other structure of the brake pressure boosting device 1 of the fifth embodiment is the same as that of the fourth embodiment.

The brake pressure boosting device 1 of the fifth embodiment as structured above is in the illustrated state when the fluid pressure is in normal and non-operating state. As the normal braking operation is conducted in this state, the fluid pressure is introduced into the power chamber 25. Accordingly, the power piston 8 advances and the reaction piston 20 operates soon so that the rear end 20e comes into contact with the step 18a of the input shaft 18. At the same time, the fluid pressure in the power chamber 25 is introduced into the reaction chamber 41. The brake pressure boosting device 1 thus performs the servo control at a servo ratio higher than that for normal braking in the same manner as the aforementioned embodiments. The input-output characteristic of the brake pressure boosting device 1 is found by Equation 6 mentioned above and is represented by a straight line $\alpha''$ shown in FIG. 12. Therefore, the servo control at the servo ratio represented by the straight line $\alpha''$ provides substantially the same jumping action as that by the reaction piston 20.

The advance of the power piston 8 moves the primary piston 47' forward. As the cup sealing member 70 passes over the connection port 84, the fluid chamber 72 is shut off and sealed from the reservoir 33. Therefore, the advance of the primary piston 47' causes the fluid in the fluid chamber 72 to flow into the stroke simulator 81 of the variable stroke unit 77 via the connection port 76. At this point, the primary piston 47' advances at a normal speed because it now operates for normal braking, so the orifice effect by the orifice 82 to the fluid flowing toward the stroke simulator is small. Therefore, the primary piston 47' i.e. power piston 8 moves at the normal speed for a distance corresponding to the stroke of the piston 78, i.e. simulated stroke of the stroke simulator 81.

As the fluid pressure in the power chamber 25 reaches a first preset working pressure, the first switching valve 74 operates to be set in the second position II and the reaction chamber 41 is shut off from the output port 27 and is connected to the reservoir 33. The fluid pressure in the reaction chamber 41 is discharged into the reservoir 33 so that the servo ratio is reduced to be equal to the servo ratio for normal braking in the same manner as the aforementioned embodiments. After that, the brake pressure boosting device 1 performs the servo control at the servo ratio for normal braking. The input-output characteristic of the brake pressure boosting device 1 at this point is found by Equation 5 and is represented by a straight line $\beta''$ shown in FIG. 12.

As the fluid pressure in the power chamber 25 reaches a second preset working pressure, the second switching valve 75 operates to be set in the second position II so that the reaction chamber 41 is shut off from the reservoir 33 and is connected to the output port 27 again. Therefore, the fluid pressure in the power chamber 25 is introduced into the reaction chamber 41 again, so the brake pressure boosting device 1 performs the servo control at the servo ratio higher than that for normal braking in the same manner as the aforementioned embodiments. The input-output characteristic of the brake pressure boosting device 1 at this point is found by Equation 6 and is represented by a straight line $\gamma''$ substantially equal to the straight line $\alpha''$, shown in FIG. 12.

In this manner, the brake pressure boosting device 1 of the fifth embodiment performs, in the initial stage of the braking operation, the jumping action depending on the servo control at a higher servo ratio along the straight line $\alpha''$, then performs the normal braking operation depending on the servo control at a lower servo ratio along the straight line $\beta''$, and then as the input becomes relatively large, performs the braking operation for developing large braking force such as emergency braking depending on the servo control at a higher servo ratio along the straight line $\gamma''$ again.

The brake pressure boosting device 1 of the fifth embodiment is provided with the jumping characteristic by the first switching valve 74 in a simple manner not by the reaction piston 20 and also provided with the reversed two-stage servo characteristic by the second switching valve 75.

In addition, the brake pressure boosting device 1 of the fifth embodiment performs not only the jumping action and the variable servo action by the reversed two-stage servo characteristic but also variable stroke action, automatic braking action, and alternative braking action for the fluid pressure failure.

The description will now be first made with regard to the variable stroke action. When the driver pedals the brake pedal at a speed for normal braking, the brake pressure boosting device 1 operates as mentioned above. When the driver pedals the brake pedal at a high speed for emergency braking, the power piston 8 and the primary piston 47' advance quickly, so the fluid in the fluid chamber 72 is quickly supplied to the stroke simulator 81 through the connection port 76. Since the flow velocity of the fluid from the connection port 76 is high at this point, the orifice effect by the orifice 82 becomes large so as to develop high fluid pressure in the fluid chamber 72. The high fluid pressure in the fluid chamber 72 acts as large reaction on the input shaft 18 via the primary piston 47' and the power piston 8, so the pedal stroke is shorter than that in the case of normal braking. By the large reaction, the brake pressure boosting device 1 develops large output which in turn causes the secondary piston 47" of the MCY 2 to develop high MCY pressure. Since the effective pressure receiving area of the secondary piston 47" and the effective pressure receiving area of the power piston 8 are equal to each other, the fluid pressure in the power chamber 25 becomes high pressure equal to the MCY pressure.

The high fluid pressure in the power chamber 25 is introduced to the pressure transducer 93 through the outlet port 27, so the piston 90 of the pressure transducer 93 operates to develop high brake pressure which is in turn introduced into the WCYs 28, 29. As a result of this, the WCYs 28, 29 produce large braking force. On the other hand, the high MCY pressure is introduced into the WCYs 51, 52 through the output port 50, so the WCYs 51, 52 also produce large braking force.

The braking operation is cancelled by releasing the brake pedal, the fluid introduced into the stroke simulator 81 is returned to the fluid chamber 72 via the check valve 83 without delay, so the power piston 8 and the input shaft 18 are returned to the non-operating positions without delay even with the orifice 82.

In this manner, the pedal stroke can be changed by the orifice 82 corresponding to the pedaling speed of the brake pedal. When the brake pedal is pedaled at a high speed, the pressure boosting device 1 can develop large output with a small stroke of the input shaft 18 by the variable stroke unit 77, therefore speeding up the build up of braking force and enabling the quick development of large braking force in both circuits.

Hereinafter, the description will be made as regard to the automatic braking action. When conditions for operating automatic braking are satisfied, an electronic control unit not shown sets the solenoid switching valve 87 to the second position II. The connection port 84 is thus connected to the accumulator 40 through the pressure regulating valve 88. The accumulated pressure in the accumulator 40 is regulated to a predetermined pressure by the pressure regulating valve 88. The regulated pressure is introduced into the fluid chamber 72 through the connection port 84 whereby the pressure control switching valve 94 is set in the second position II. The fluid pressure introduced into the fluid chamber 72 is further introduced into the variable stroke unit 77 through the connection port 76 and is introduced into the pressure transducer 93 of the alternative brake operating unit 89. Then, the piston 90 operates to develop brake pressure which is in turn introduced into the WCYs 28, 29, whereby the brakes of the one circuit work.

On the other hand, since the fluid pressure which is introduced into the fluid chamber 72 and regulated acts on the rear end of the secondary piston 47" of the MCY 2, the secondary piston 47" operates to develop, in the fluid chamber 49, MCY pressure equal to the fluid pressure in the fluid chamber 72. The MCY pressure is introduced into the WCYs 51, 52, whereby the brakes of the other circuit work. In this manner, the automatic braking is securely operated with regard to both circuits.

When conditions for canceling the automatic braking are satisfied, the electronic control unit sets the solenoid switching valve 87 to the first position I again. The connection port 76 is thus connected to the reservoir 33 so that the fluid pressure in the fluid chamber 72 and the fluid pressure in the pressure transducer 93 are discharged to the reservoir 33. As the fluid pressure in the connection port 84 is reduced to some level from this state, the pressure control switching valve 94 is returned to the first position I so that the pressure transducer 93 is connected to the power chamber 25. Therefore, the pressurized fluid of the pressure transducer 93 is discharged to the reservoir 33 through the power chamber 25, whereby the brake pressure dies out and the brakes of the one circuit are cancelled.

The fluid chamber 72 is connected to the reservoir 33 so that the fluid pressure in the fluid chamber 72 is reduced and thus the secondary piston 47" retreats. Since the fluid chamber 49 communicates with the reservoir 33 in the same manner as the case of normal braking when the secondary piston 47" is returned to the inoperative position, the MCY pressure dies out and the brakes of the other circuit are cancelled. In this way, the automatic braking is completely cancelled.

Hereinafter, the description will now be made as regard to the alternative braking operation for the fluid pressure failure. As the fluid pressure of the fluid pressure sources such as the pump 38 and the accumulator 40 fails, the pressure control switching valve 94 is set in the second position II. In this state, even when the driver pedals the brake pedal for normal braking to move the input shaft 18 forward to switch the control valve 60, no fluid pressure is introduced into the power chamber 25. The power piston 8 is never operated by the fluid pressure of the power chamber 25 under the circumstances. As the brake pedal is further largely pedaled and the input shaft 18 thus largely advances, the valve body 15 reaches the maximum stroke and comes in contact with the power piston 8 so as to start to push the power piston 8. The primary piston 47' formed integrally with the power piston 8 advances. As the cup sealing member 70 of the primary piston 47' passes over the connection port 84, fluid pressure is developed in the fluid chamber 72 and is then introduced into the pressure transducer 93 via the connection port 76. After that, the brakes of the one circuit work in the same manner as the case of the automatic braking as mentioned above.

In the alternative braking action for the fluid pressure failure, the advance of the primary piston 47' causes the secondary piston 47" to advance and the valve 54 is seated in the valve seat 58 as mentioned above to develop fluid pressure in the fluid chamber 49. The fluid pressure in the fluid chamber 49 is introduced into the WCYs 51, 52 relating to the other circuit via the output port 50, whereby the brakes of the other circuit work. Since the effective pressure receiving areas of the front and rear ends of the secondary piston 47" are equal to each other, the fluid pressure in the fluid chamber 72 becomes equal to the fluid pressure in the fluid chamber 49. As a result, braking forces of both circuits are equal to each other.

The braking action for the fluid pressure failure is cancelled by releasing the brake pedal in the same manner as the case of normal braking. The release of the brake pedal causes the power piston 8 and the primary piston 47' to retreat so that the fluid pressure of the fluid chamber 72 is reduced and thus the braking force for the one circuit is reduced. The secondary piston 47" also retreats so that the fluid pressure in the fluid chamber 49 is reduced and thus the braking force for the other circuit is also reduced. As the primary piston 47' further retreats in such a manner that the cup sealing member 70 passes over the connection port 84, the fluid chamber 72 communicates with the connection port 84. That is, the fluid chamber 72 communicates with the reservoir 33, whereby the fluid pressure in the fluid chamber 72 and the fluid pressure in the pressure transducer 93 are discharged into the reservoir 33. As a result, the brakes of the one circuit are completely cancelled. Since the MCY piston 47 also further retreats, the valve 54 moves apart form the valve seat 58 in the same manner as the case of canceling normal braking so that the fluid chamber 49 communicates with the reservoir 33. As a result, the brakes of the other circuit are also completely cancelled.

The other action and effects of the brake pressure boosting device 1 of the fifth embodiment are the same as that of the second embodiment.

Figure 13:
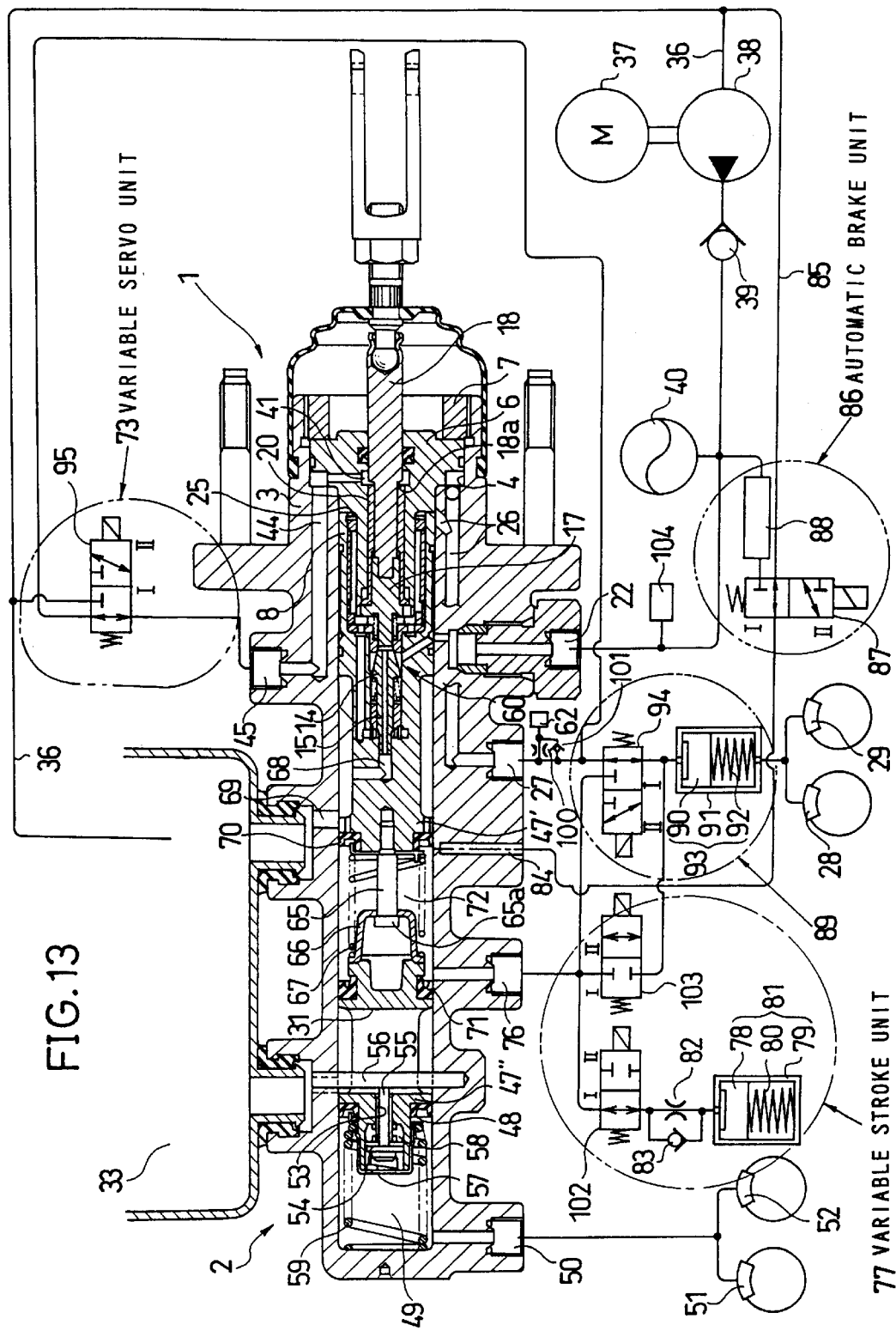
FIG. 13 is a sectional view showing a sixth embodiment of the present invention.

FIG. 13 is a view similar to FIG. 11 but showing the sixth embodiment of the present invention. A brake pressure boosting device 1 of the sixth embodiment is provided with a solenoid switching valve 95 composed of a two-position three-way valve, instead of the first and second switching valves 74, 75 in the variable servo device 73 which are controlled by the fluid pressure in the power chamber 25 of the fifth embodiment shown in FIG. 11. The solenoid switching valve 95 has a first position I for connecting the control pressure inlet 45 to the output port 27 when the brake pressure boosting device 1 is inoperative, and a second position II for connecting the control pressure inlet 45 to the reservoir 33 when the brake pressure boosting device 1 is operative. The brake pressure boosting device 1 has an orifice 100 on a fluid line to the pressure sensor 62 and has a check valve 101 disposed on a line bypassing the orifice 100 for allowing only the flow of the fluid in a direction flowing out of the pressure sensor 62.

The electronic control unit sets the solenoid switching valve 95 to the first position I until the fluid pressure at the output port i.e. the fluid pressure in the power chamber 25, which is detected by the pressure sensor 62, reaches a jumping termination pressure at which the conventional jumping action is terminated, operates the solenoid switching valve 95 to be set in the second position II when the fluid pressure in the power chamber 25 reaches the jumping termination pressure, and sets the solenoid switching valve 95 to the first position I again when the fluid pressure in the power chamber 25 reaches a pressure at a servo-ratio switching point.

The variable stroke unit 77 is connected to the connection port 76 via a first solenoid shut-off valve 102. The first solenoid shut-off valve 102 has a communicating position I and a shut-off position II and is normally set in the communicating position I, i.e. a normally open valve. The variable stroke unit 77 is provided with a second solenoid shut-off valve 103 disposed on a line connecting the connection port 76 and the pressure transducer 93. The second solenoid shut-off valve 103 has a shut-off position I and a communicating position II and is normally set in the shut-off position I, i.e. a normally closed valve.

Though the pressure control switching valve 94 in the alternative brake operating unit 89 of the fifth embodiment is controlled depending on the accumulated pressure in the accumulator 40, a pressure control switching valve 94 in an alternative brake operating unit 89 of the sixth embodiment is composed of a two-position three-way solenoid switching valve. A pressure sensor 104 for detecting the accumulated pressure in the accumulator 40 is provided in order to control the solenoid switching valve.

When conditions for operating the automatic braking are satisfied and when it is determined based on the detected signal from the pressure sensor 104 that the accumulated pressure in the accumulator 40 fails, the electronic control unit switches the pressure control switching valve 94.

The other structure of the brake pressure boosting device 1 of the sixth embodiment is the same as that of the fifth embodiment.

The description will now be made as regard to the operation of the brake pressure boosting device 1 of the sixth embodiment as structured above.

When the brake pressure boosting device 1 is inoperative, the respective elements thereof and the MCY 2 are in inoperative positions as shown in FIG. 13. As the brake pedal is pedaled at a normal speed for normal braking in this state, pressurized fluid is introduced into the power chamber 25 as mentioned above and is in turn introduced at a normal speed into the reaction chamber 41 through the output port 27, the solenoid switching valve 95, and the control pressure inlet 45. In this manner, the brake pressure boosting device 1 performs the servo control at a servo ratio along the straight line α" shown in FIG. 12, i.e. the jumping action.

When the fluid pressure in the power chamber 25 reaches a magnitude for terminating the jumping action, the electronic control unit switches the solenoid switching valve 95 to the second position based on the detection signal of the pressure sensor 62. Since the brake pedal is pedaled at the normal speed and the fluid is throttled little by the orifice 100, the fluid pressure in the pressure sensor 62 is increased at a normal rate so that the solenoid switching valve 95 is normally switched. The reaction chamber 41 is thus connected to the reservoir 33 so that the pressurized fluid introduced into the reaction chamber 41 is discharged into the reservoir 33 through the solenoid switching valve 95 without delay. Therefore, the brake pressure boosting device 1 performs the normal servo control at a lower servo ratio along the straight line β" shown in FIG. 12. As the fluid pressure in the power chamber 25 reaches the servo-ratio switching point, the solenoid switching valve 95 is switched to the first position I again. The reaction chamber 41 is thus connected to the output port 27 again so that the pressurized fluid in the power chamber 25 is introduced into the reaction chamber 41. As a result, the fluid pressure in the reaction chamber 41 becomes equal to the fluid pressure in the power chamber 25. Therefore, the brake pressure boosting device 1 performs the servo control at a higher servo ratio along the straight line γ' shown in FIG. 12.

Figure 12:
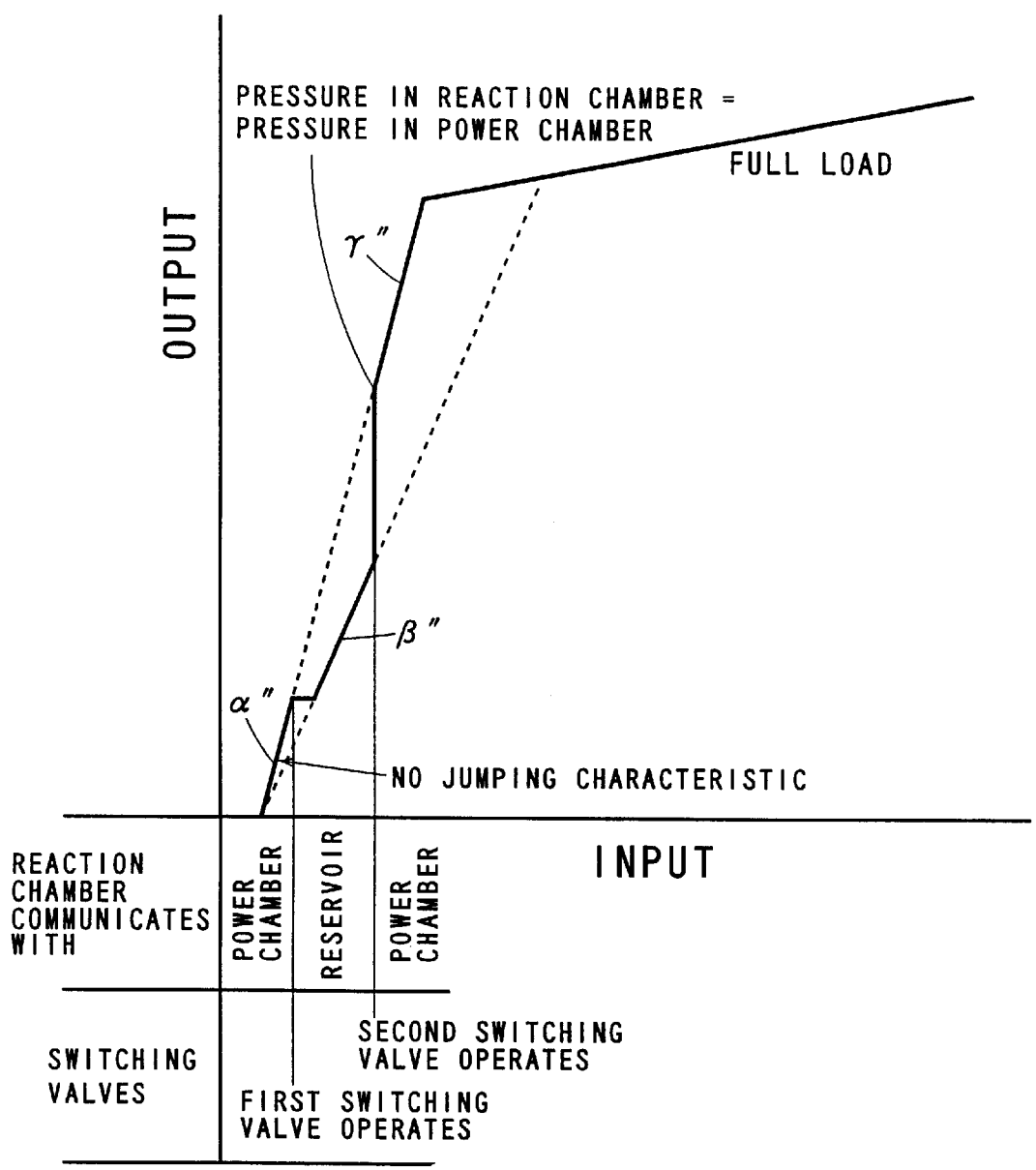
FIG. 12 is a diagram showing input-output characteristics of the fifth through eleventh embodiments of the present invention.

As the brake pedal is pedaled at a speed far higher than the normal speed for emergency braking, the fluid pressure in the power chamber 25 is rapidly increased so that the pressurized fluid in the power chamber 25 rapidly flows into the reaction chamber 41. Since the orifice 100 delays the increase in the fluid pressure of the pressure sensor 62, however, the switching of the solenoid switching valve 95 is delayed. For this delay, the shift from a higher servo ratio along the straight line α" to a lower servo ratio along the straight line β" shown in FIG. 12 is delayed. That is, the servo-ratio switching point is changed and the termination of the jumping action is delayed. As a result of this, the brake pressure boosting device 1 develops larger output, thereby providing larger braking force during the emergency braking.

When the solenoid valves 94, 102, 103 are inoperative positions shown in FIG. 13, the variable stroke unit 77 operates in completely the same manner as that of the fifth embodiment and the brake pedal moves only for a distance corresponding to the simulated stroke of the stroke simulator 81. When only the first solenoid shut-off valve 102 is actuated to be set in the shut-off position II, the fluid chamber 72 is shut off form the stroke simulator 81 and is in the locked state, so the pedal stroke is only a distance corresponding to the stroke of the other circuit connected to the secondary piston 47" of the MCY 2. When the first and second solenoid shut-off valves 102, 103 and the solenoid valve 94 are actuated to be set in the positions II together, the pressure transducer 93 is shut off from the power chamber 25 and is connected to the fluid chamber 72 and the fluid chamber 72 is shut off from the stroke simulator 81. The pedal stroke at this point is a distance corresponding to the strokes of the WCYs 28, 29. When the second solenoid shut-off valve 103 and the solenoid valve 94 both operate to set in the positions II, the pressure transducer 93 is shut off from the power chamber 25 and is connected to the fluid chamber 72. Since the fluid chamber 72 is connected to the stroke simulator 81 at this point, the pedal stroke is a distance corresponding to the sum of the simulated stroke of the stroke simulator 81 and the strokes of the WCYs 28, 29.

In this manner, the pedal stroke can be varied by controlling the operation of the solenoid valves 94, 102, 103. The pedal stroke can be more properly set corresponding to vehicle condition such as load and brake condition or by a driver.

In the automatic braking unit 86, when conditions for operating automatic braking are satisfied, the electronic control unit switches not only the solenoid switching valve 87 to the second position II, but also the solenoid valve 94 to the second position II. Therefore, the automatic braking is operated in completely the same manner as the fifth embodiment mentioned above.

In the alternative brake operation unit 89 for the fluid pressure failure, when the fluid pressure in the accumulator 40 fails, the electronic control unit switches the solenoid valve 94 to the second position II depending on the detection signal from the pressure sensor 104. Therefore, the braking operation can be obtained by pedaling the brake pedal even when the fluid pressure fails in the same manner as the fifth embodiment mentioned above.

Figure 14:
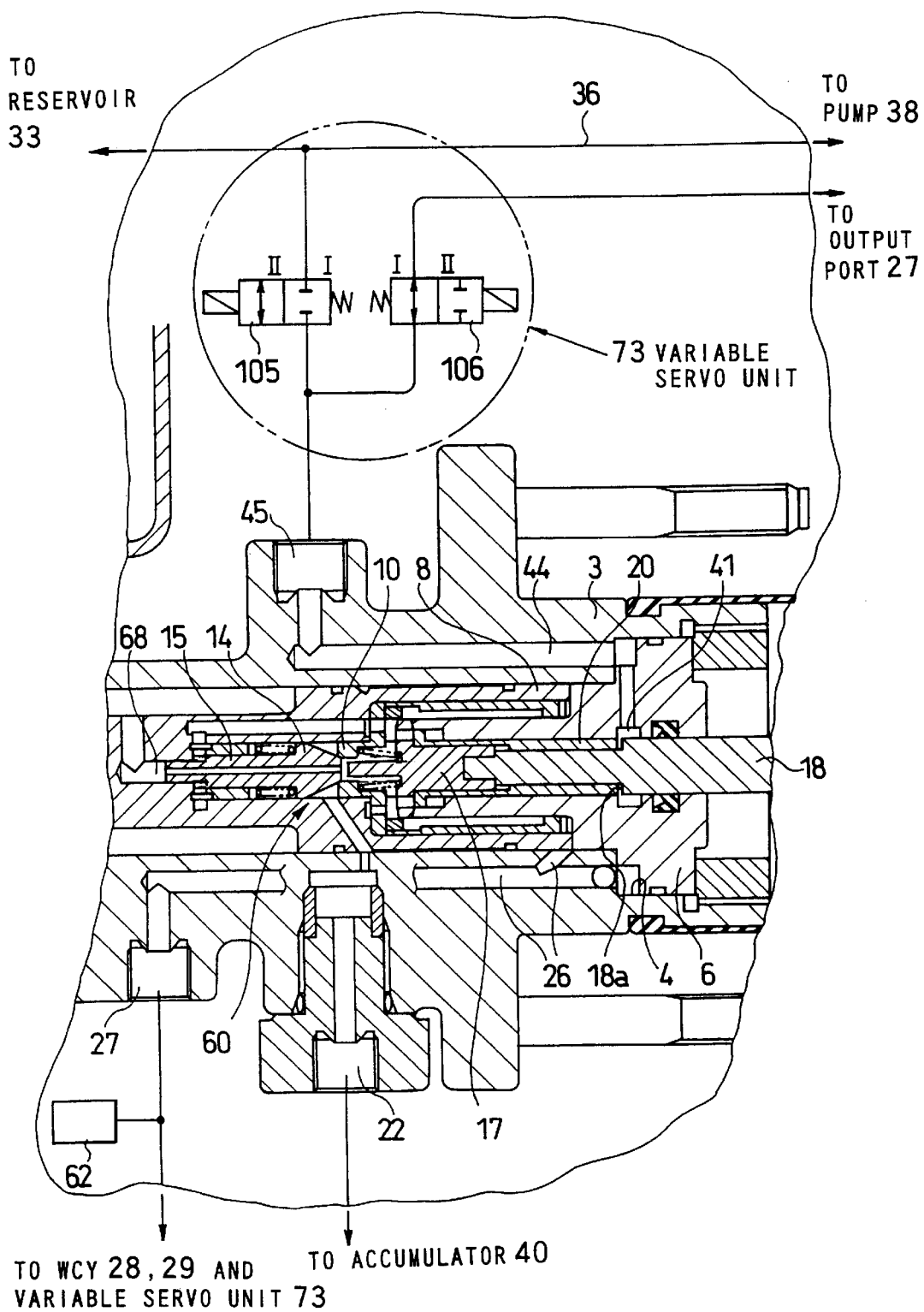
FIG. 14 is a sectional view showing a seventh embodiment of the present invention.

FIG. 14 is a view partially showing the seventh embodiment of the present invention.

Though the fifth embodiment shown in FIG. 11 employs the first and second switching valves 74, 75 to obtain the jumping characteristic and the reversed two-stage servo characteristic, a brake pressure boosting device 1 of the seventh embodiment employs third and fourth solenoid shut-off valves 105, 106 as shown in FIG. 14.

The third solenoid shut-off valve 105 is disposed on a line connecting the control pressure inlet 45 to the reservoir 33 and has a shut-off position I for intercepting the communication between the control pressure inlet 45 and the reservoir 33 and a communicating position II for allowing the communication between the control pressure inlet 45 and the reservoir 33. The third solenoid shut-off valve 105 is normally set in the shut-off position I, i.e. a normally closed valve.

The fourth solenoid shut-off valve 106 is disposed on a line connecting the control pressure inlet 45 to the output port 27 and has a communicating position I for allowing the communication between the control pressure inlet 45 and the output port 27 and a shut-off position II for intercepting the communication between the control pressure inlet 45 and the output port 27. The fourth solenoid shut-off valve 106 is normally set in the communicating position I, i.e. a normally open valve. The third and fourth solenoid shut-off valves 105, 106 are controlled by the fluid pressure in the power chamber 25. For this, the same pressure sensor 62 as mentioned above is disposed for detecting the fluid pressure in the power chamber 25.

The other structure of the brake pressure boosting device 1 of the seventh embodiment is the same as that of the fifth embodiment.

As the normal braking operation is conducted from the inoperative state shown in FIG. 14, the brake pressure boosting device 1 of the seventh embodiment as structured above performs the jumping action at the servo ratio along the straight line $\alpha''$ shown in FIG. 12. As the fluid pressure in the power chamber 25 reaches a magnitude corresponding to the pressure for terminating the jumping action, the electronic control unit sets the third solenoid shut-off valve 105 to the communicating position II and sets the fourth solenoid shut-off valve 106 to the shut-off position II based on the detection signal from the pressure sensor 62. Since the reaction chamber 41 is thus connected to the reservoir 33, the brake pressure boosting device 1 performs the servo control for normal braking at a servo ratio along the straight line $\beta''$ shown in FIG. 12. As the fluid pressure in the power chamber 25 reaches the magnitude at the servo-ratio switching point, the electronic control unit sets the third solenoid shut-off valve 105 to the shut-off position I and sets the fourth solenoid shut-off valve 106 to the communicating position I based on the detection signal from the pressure sensor 62. Since the reaction chamber 41 is then connected to the output port 27, the brake pressure boosting device 1 performs the servo control at a higher servo ratio along the straight line $\gamma''$ shown in FIG. 12.

The other structure and the other action and effects of the brake pressure boosting device 1 of the seventh embodiment are the same as those of the fifth embodiment.

An orifice 100 and a check valve 101 just like the sixth embodiment may be disposed on a line for introducing pilot pressure to the first switching valve 74 of the brake fluid pressure boosting device 1 of the fifth embodiment shown in FIG. 11, whereby the switching of the first switching valve 74 to the second position II is delayed in an emergency so that large braking force can be obtained in the same manner as mentioned above.

Figure 15:
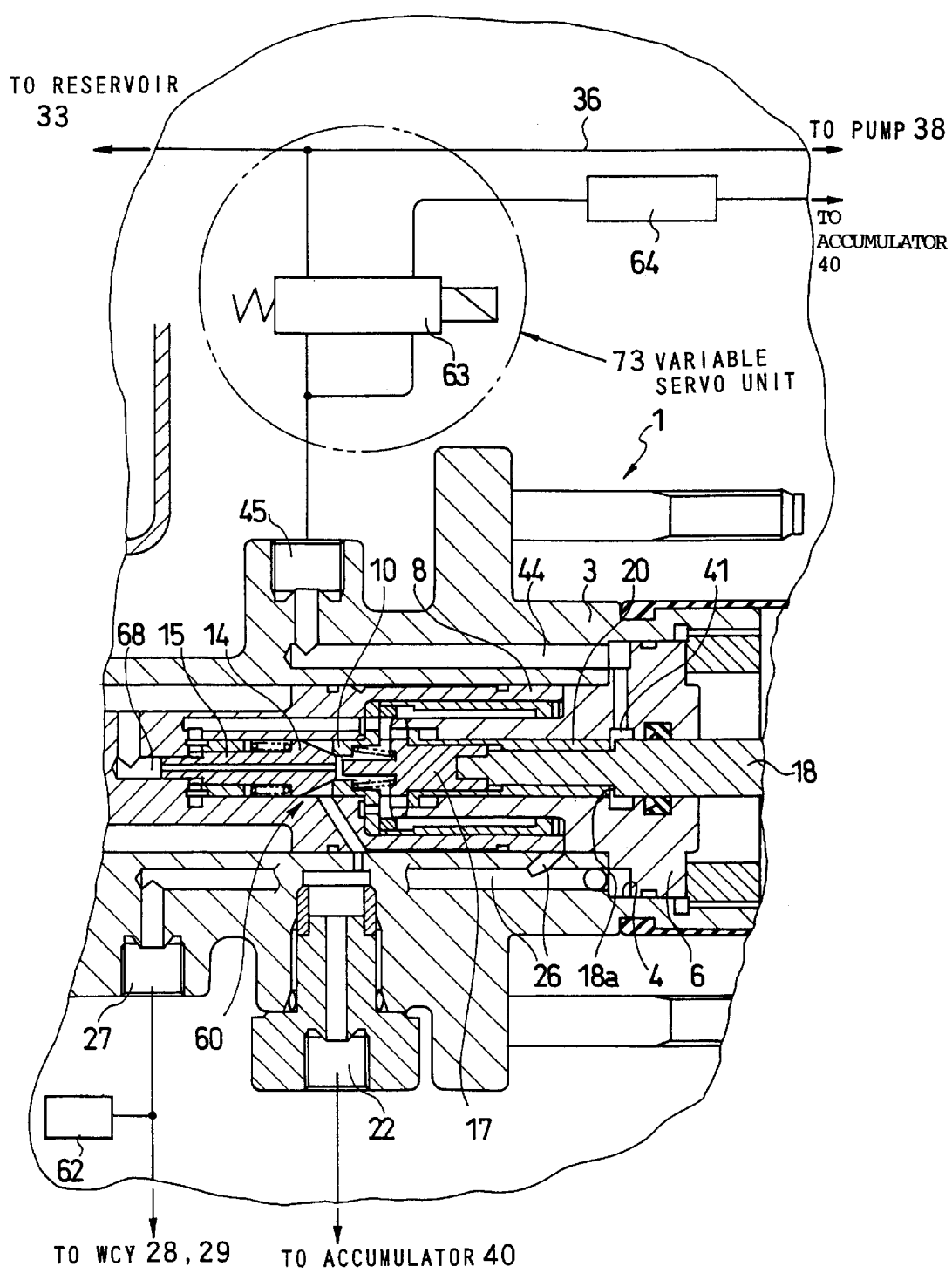
FIG. 15 is a sectional view showing an eighth embodiment of the present invention.

FIG. 15 is a view partially showing the eighth embodiment of the present invention.

As shown in FIG. 15, a variable servo unit 73 of a brake pressure boosting device 1 of the eighth embodiment is provided with a solenoid proportional control valve 63 and a pressure regulating valve 64 as shown in FIG. 6 so that the accumulated pressure of the accumulator 40 is regulated by the pressure regulating valve 64, then controlled by the solenoid proportional control valve 63, and is introduced into the reaction chamber 41.

The other structure of the brake pressure boosting device 1 of the eighth embodiment is the same as that of the fifth embodiment.

In the brake pressure boosting device 1 of the eighth embodiment, the solenoid proportional control valve 63 shuts off the reaction chamber 41 from the reservoir 33 and connects to the pressure regulating valve 64 at full open position when the brake pressure boosting device 1 is inoperative, so the fluid pressure which is regulated pressure of the accumulated pressure of the accumulator 40 by the pressure regulating valve 64 is introduced into the reaction chamber 33. When the normal braking operation is conducted in this state, the brake pressure boosting device 1 performs the servo control at a higher servo ratio along the straight line $\alpha''$ shown in FIG. 12, i.e. the jumping action.

As the fluid pressure in the power chamber 25 reaches the magnitude terminating the jumping action, the electronic control unit controls the solenoid proportional control valve 63 based on the detection signal of the pressure sensor 62 so that the solenoid proportional valve 63 controls the fluid pressure in the reaction chamber 41 to correspond to the fluid pressure in the power chamber 25. As a result of this, the brake pressure boosting device 1 performs the normal servo control at a lower servo ratio along the straight line $\beta''$ shown in FIG. 12. When the fluid pressure in the power chamber 25 reaches the servo-ratio switching point, the solenoid proportional control valve 63 is returned to the inoperative state, and fluid pressure regulated by the pressure regulating valve 64 is introduced into the reaction chamber 41. Therefore, the brake pressure boosting 1 performs the servo control at a higher servo ratio along the straight line $\gamma''$ substantially equal to the straight line $\alpha''$ shown in FIG. 12.

In this manner, the brake pressure boosting device 1 of the eighth embodiment performs the jumping action and the reversed two-stage servo action.

The other action and effects of the brake pressure boosting device 1 of the eighth embodiment are the same as those of the fifth embodiment. By properly controlling the solenoid proportional control valve 63 during the shift from a lower servo ratio to a higher servo ratio, the smooth shift can be accomplished as shown by the straight lines $\delta$, $\delta'$ in FIG. 7 and FIG. 10. Instead of the accumulated pressure in the accumulator, the fluid pressure in the power chamber 25 can be used as fluid pressure to be introduced into the reaction chamber 41.

Though the input shaft 18, which is provided with the small-diameter portion at the power piston 8 side and with the large-diameter portion at the brake pedal side, and the reaction piston 20 are used to have a step portion the outer diameter of which is larger than the large-diameter portion of the input shaft 18 and the step portion is positioned in the reaction chamber 41 in the fifth through eighth embodiments, the reaction piston 20 is omitted in the following embodiments, so an input shaft 18 is provided with a small-diameter portion at the power piston 8 side, with a large-diameter portion at the brake pedal side, and with a step therebetween which is positioned in the reaction chamber 41.

Figure 16:
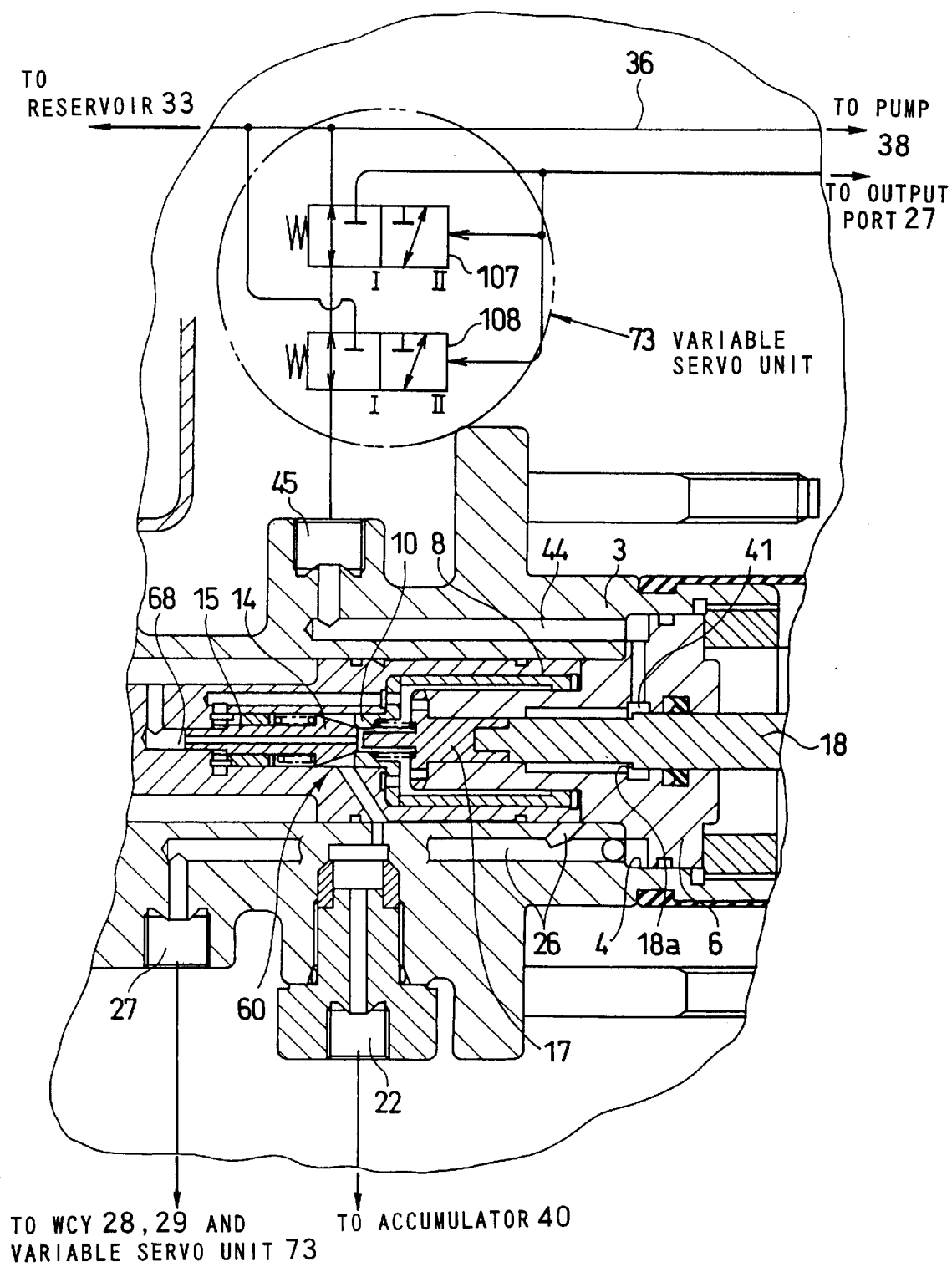
FIG. 16 is a sectional view showing a ninth embodiment of the present invention.

FIG. 16 is a view partially showing the ninth embodiment of the present invention.

In the fifth embodiment shown in FIG. 11, the outer diameter at the power piston 8 side of the input shaft 18 is set to be larger than the outer diameter of the brake pedal side because the reaction piston 20 is fitted onto the portion at the power piston 8 side so that the outer diameter at the power piston 8 side becomes substantially the outer diameter (pressure receiving area $A_3$) of the reaction piston 20, so the fluid pressure in the reaction chamber 41 acts on the step portion between the outer diameter of the reaction piston 20 and the outer diameter of the brake pedal side of the input shaft 18 in the same direction as the input of the input shaft. In a brake pressure boosting device 1 of the ninth embodiment as shown in FIG. 16, however, the reaction piston 20 is omitted, so the outer diameter (pressure receiving area $A_1$) of the power piston 8 side of the input shaft 18 is set to be smaller than the outer diameter (pressure receiving area $A_2$) of the brake pedal side of the input shaft 18 so that the fluid pressure in the reaction chamber 41 acts on the step 18$a$ of the input shaft 18 in a direction opposite to the direction of the input of the input shaft 18.

A variable servo unit 73 to be connected to the control pressure inlet 45 comprises a first switching valve 107 for performing the jumping action, and a second switching valve 108 connected in series with the first switching valve 107 for performing the reversed two-stage servo action.

The first switching valve 107 is composed of a two-position three-way valve and is controlled by pilot pressure dependent on the fluid pressure in the power chamber 25. The first switching valve 107 has a first position I for connecting the second switching valve 108 to the reservoir 33, and a second position II for connecting the second switching valve 108 to the output port 27. The first switching valve 107 is set in the first position I when the brake pressure boosting device 1 is inoperative and is switched to be set in the second position II when the fluid pressure in the power chamber 25 reaches a first preset working pressure for terminating the jumping action.

The second switching valve 108 is also composed of a two-position three-way valve and is controlled by pilot pressure dependent on the fluid pressure in the power chamber 25. The second switching valve 108 has a first position I for connecting the control pressure inlet 45 to the first switching valve 107 and a second position II for connecting the control pressure inlet 45 to the reservoir 33. The second switching valve 108 is normally set in the first position I and is switched to be set in the second position II when the fluid pressure in the power chamber 25 reaches a second preset working pressure equal to the fluid pressure at the servo-ratio switching point.

The other structure of the brake pressure boosting device 1 of the ninth embodiment is the same as that of the fifth embodiment.

The brake pressure boosting device 1 of the ninth embodiment as structured above is in the illustrated states when it is inoperative. When the normal braking operation is conducted in this state and fluid pressure is introduced into the power chamber 25, the power piston 8 advances. Since the first switching valve 107 is set in the first position I at this point, the fluid pressure in the power chamber 25 is not introduced into the reaction chamber 41. Therefore, the brake pressure boosting device 1 performs the servo control at a servo ratio higher than that for normal braking in the same manner as the aforementioned embodiments. The input-output characteristic of the brake pressure boosting device 1 at this point is found by Equation 1 as mentioned above and is represented by the straight line $\alpha''$ shown in FIG. 12. Therefore, the brake pressure boosting device 1 perform the jumping action at the servo ratio along the straight line $\alpha''$.

As the fluid pressure in the power chamber 25 reaches the first preset working pressure, the first switching valve 107 operates to be set in the second position II so that the reaction chamber 41 is connected to the output port 27 and the fluid pressure in the power chamber 25 is introduced into the reaction chamber 41. As a result of this, the servo ratio is decreased to the value for the normal braking. After that, the brake pressure boosting device 1 performs the servo control at the servo ratio for the normal braking. The input-output characteristic of the brake pressure boosting device 1 is found by Equation 6 and is represented by the straight line $\beta''$ shown in FIG. 12.

When the fluid pressure in the power chamber 25 reaches the second preset working pressure, the second switching valve 108 operates to be set in the second position II so that the reaction chamber 41 is connected to the reservoir 33. The pressurized fluid in the reaction chamber 41 is discharged to the reservoir 33 so that the fluid in the reaction chamber 41 becomes at atmospheric pressure. Therefore the pressure boosting device 1 performs the servo control at a servo ratio higher than that for the normal braking. The input-output characteristic of the brake pressure boosting device 1 at this point is found by Equation 1 as mentioned above and is represented by the straight line $\gamma''$ substantially equal to the straight line $\alpha''$ shown in FIG. 12.

In this manner, the brake pressure boosting device 1 of the ninth embodiment performs the jumping action by the servo control at a higher servo ratio along the straight line $\alpha''$ in the initial stage of the braking operation. As the input is increased to a certain level, the brake pressure boosting device 1 performs the braking operation with large braking force by the servo control at a higher servo ratio along the straight line $\gamma''$. In this manner, the brake pressure boosting device 1 of the ninth embodiment is provided with the jumping characteristic by the behavior of the first switching valve 107 and with the reversed two-stage servo characteristic by the behavior of the second switching valve 108 even without the reaction piston 20.

The other action and effects of the brake pressure boosting device 1 of the ninth embodiment are the same as those of the fifth embodiment.

Figure 17:
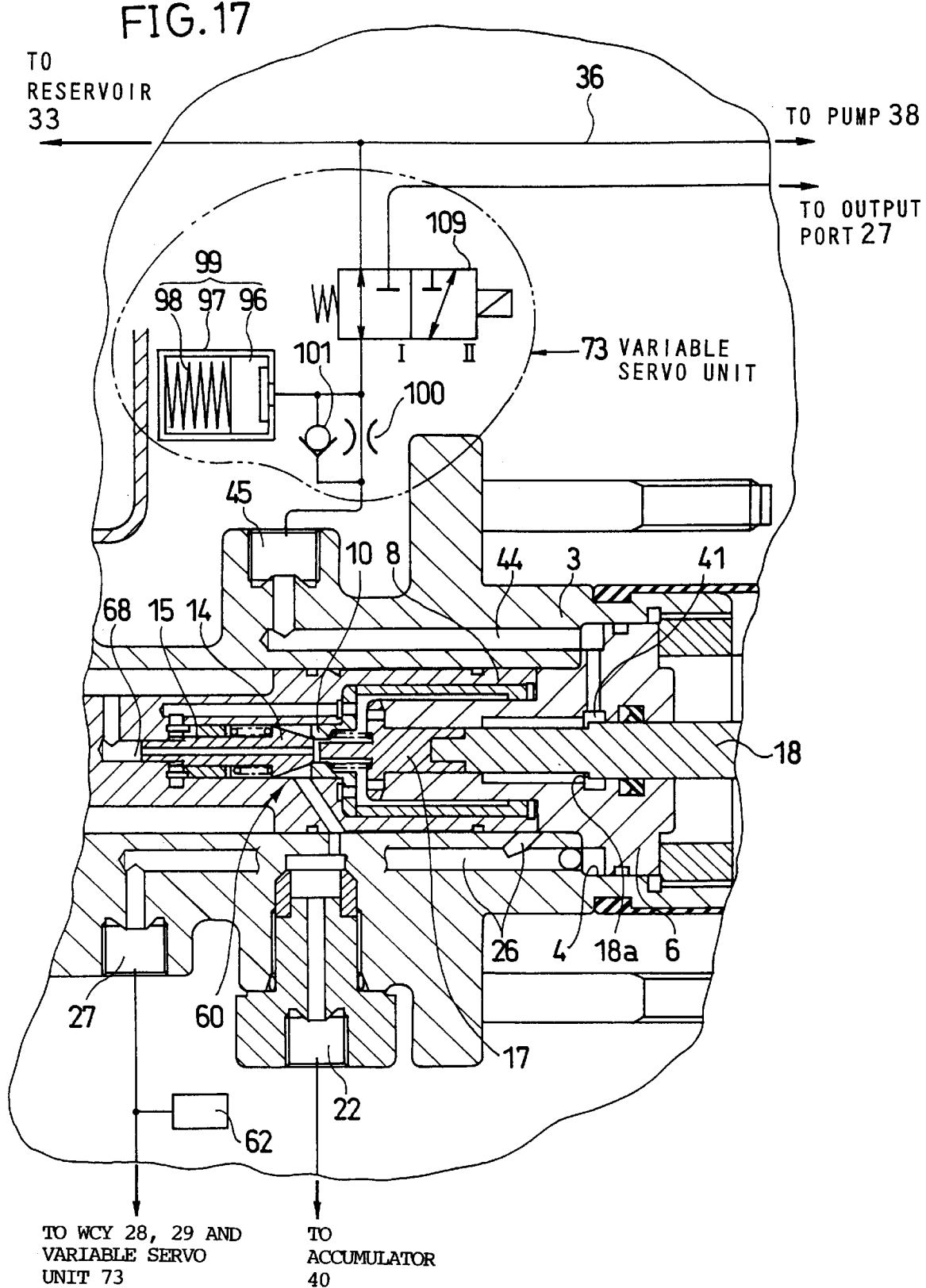
FIG. 17 is a sectional view showing a tenth embodiment of the present invention.

FIG. 17 is a view partially showing the tenth embodiment of the present invention.

Though the supply and discharge of the pressurized fluid to the reaction chamber 41 is controlled by two switching valves 107, 108 in the ninth embodiment shown in FIG. 16, a solenoid switching valve 109 is provided, instead of the switching valves 107, 108, in a variable servo unit 73 of a brake pressure boosting device 1 of the tenth embodiment as shown in FIG. 17. The variable servo unit 73 comprises a low pressure accumulator 99 for accumulating fluid having a piston 96, a cylinder 97, and a spring 98, an orifice 100 disposed on a line between the control pressure inlet 45 and a line for the solenoid switching valve 109 and the low pressure accumulator 99, a check valve 101 allowing only the flow of fluid from the control pressure inlet 45 to the solenoid switching valve 109 and the low pressure accumulator 99.

The solenoid switching valve 109 has a first position I for connecting the control pressure inlet 45 to the reservoir 33 when it is inoperative and a second position II for connecting the control pressure inlet 45 to the output port 27 when it is operative. The electronic control unit sets the solenoid switching valve 109 in the first position until the fluid pressure in the power chamber 25 which is detected by the pressure sensor 62 reaches a jumping termination pressure at which the conventional jumping action is terminated, operates the solenoid switching valve 95 to be set in the second position II when the fluid pressure in the power chamber 25 reaches the jumping termination pressure, and sets the solenoid switching valve 95 to the first position I again when the fluid pressure in the power chamber 25 reaches a pressure at the servo-ratio switching point.

The other structure of the brake pressure boosting device of the tenth embodiment is the same as that of the ninth embodiment.

When the brake pressure boosting device 1 of the tenth embodiment is inoperative, the reaction chamber 41 is connected to the reservoir 33 so that the inside of the reaction chamber 41 is at atmospheric pressure. When the normal braking operation is conducted in this state, the brake pressure boosting device 1 performs the servo control at a higher servo ratio along the straight line α" shown in FIG. 12, i.e. the jumping action.

As the fluid pressure in the power chamber 25 reaches the magnitude terminating the jumping action, the electronic control unit switches the solenoid switching valve 109 to the second position II based on the detection signal of the pressure sensor 62, so the pressurized fluid in the power chamber 25 is introduced into the reaction chamber 41. Since the normal braking is conducted now, the fluid is not throttled by the orifice 100 and flows at a normal speed. Therefore, the brake pressure boosting device 1 terminates the jumping action without delay and performs the normal servo control at a lower servo ratio along the straight line β" shown in FIG. 12. As the fluid pressure in the power chamber 25 reaches the servo-ratio switching point, the solenoid switching valve 109 is switched to the first position I again and the reaction chamber 41 is connected to the reservoir 33 again. The pressurized fluid in the power chamber 25 is thus discharged to the reservoir 33 and the inside of the reaction chamber 41 becomes at atmospheric pressure. Therefore, the brake pressure boosting 1 performs the servo control at a higher servo ratio along the straight line γ" substantially equal to the straight line α" shown in FIG. 12 again.

When emergency braking is conducted, the fluid pressure in the power chamber 25 is rapidly increased. Therefore, when the solenoid switching valve 109 is switched to the second position II, the fluid pressure in the power chamber 25 rapidly flows into the reaction chamber 41 but is throttled by the orifice 100 and is accumulated in the low pressure accumulator 99. As a result, the low pressure accumulator 99 has accumulated pressure. Since this delays the increase in the fluid pressure of the reaction chamber 41, the shift from a higher servo ratio along the straight line α" to a lower servo ratio along the straight line β" shown in FIG. 12 is delayed. That is, the servo-ratio switching point is changed and the termination of the jumping action is delayed. As a result of this, the brake pressure boosting device 1 develops larger output, thereby providing larger braking force during the emergency braking.

In this manner, the brake pressure boosting device 1 of the tenth embodiment also performs the jumping action and the reversed two-stage servo action.

The other action and effects of the brake pressure boosting device of the tenth embodiment are the same as those of the ninth embodiment.

Figure 18:
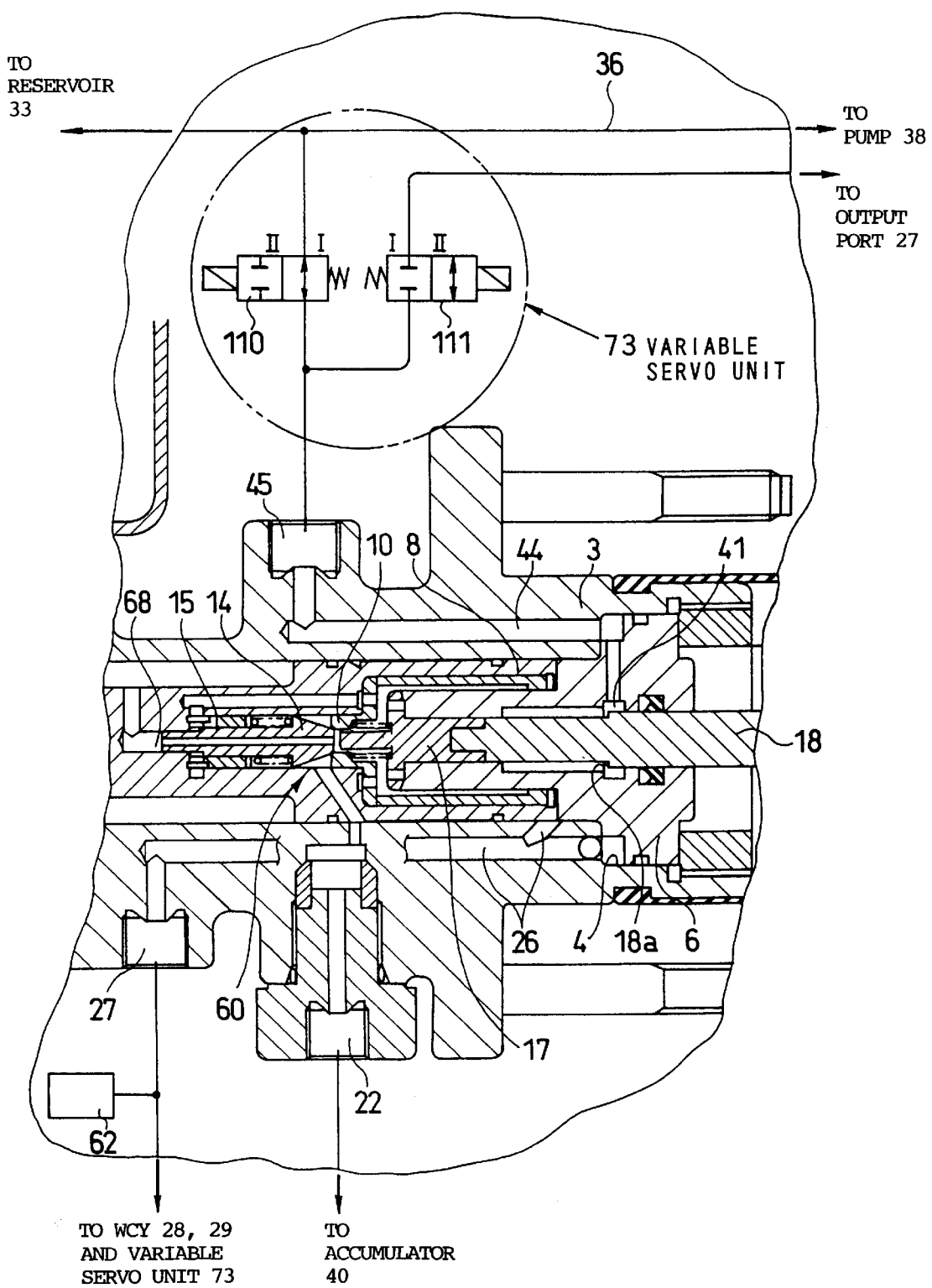
FIG. 18 is a sectional view showing an eleventh embodiment of the present invention.

FIG. 18 is a view partially showing the eleventh embodiment of the present invention.

As shown in FIG. 18, a variable servo unit 73 of a brake pressure boosting device 1 of the eleventh embodiment comprises third and fourth solenoid shut-off valves 110, 111 just like the seventh embodiment shown in FIG. 14.

The third solenoid shut-off valve 110 is the same normally open valve as the fourth solenoid shut-off valve 106 of the seventh embodiment and the fourth solenoid shut-off valve 111 is the same normally closed valve as the third solenoid shut-off valve 105 of the seventh embodiment.

The other structure of the brake pressure boosting device of the eleventh embodiment is the same as that of the ninth embodiment.

When the brake pressure boosting device 1 of the eleventh embodiment is inoperative, the reaction chamber 41 is connected to the reservoir 33 so that the inside of the reaction chamber 41 is at atmospheric pressure. When the normal braking operation is conducted in this state, the brake pressure boosting device 1 performs the servo control at a higher servo ratio along the straight line α" shown in FIG. 12, i.e. the jumping action.

As the fluid pressure in the power chamber 25 reaches the magnitude terminating the jumping action, the electronic control unit switches both the third and fourth solenoid shut-off valves 110, 111 to the second positions II based on the detection signal of the pressure sensor 62, so the pressurized fluid in the power chamber 25 is introduced into the reaction chamber 41. Therefore, the brake pressure boosting device 1 performs the normal servo control at a lower servo ratio along the straight line β" shown in FIG. 12. As the fluid pressure in the power chamber 25 reaches the servo-ratio switching point, both the third and fourth solenoid shut-off valves 110, 111 are switched to the first positions I again and the reaction chamber 41 is connected to the reservoir 33 again. The pressurized fluid in the power chamber 25 is thus discharged to the reservoir 33 and the inside of the reaction chamber 41 becomes at atmospheric pressure. Therefore, the brake pressure boosting 1 performs the servo control at a higher servo ratio along the straight line γ" substantially equal to the straight line α" shown in FIG. 12 again.

In this manner, the brake pressure boosting device 1 of the eleventh embodiment also perform the jumping action and the reversed two-stage servo action.

The other action and effects of the brake pressure boosting device of the eleventh embodiment are the same as those of the ninth embodiment.

Figure 19:
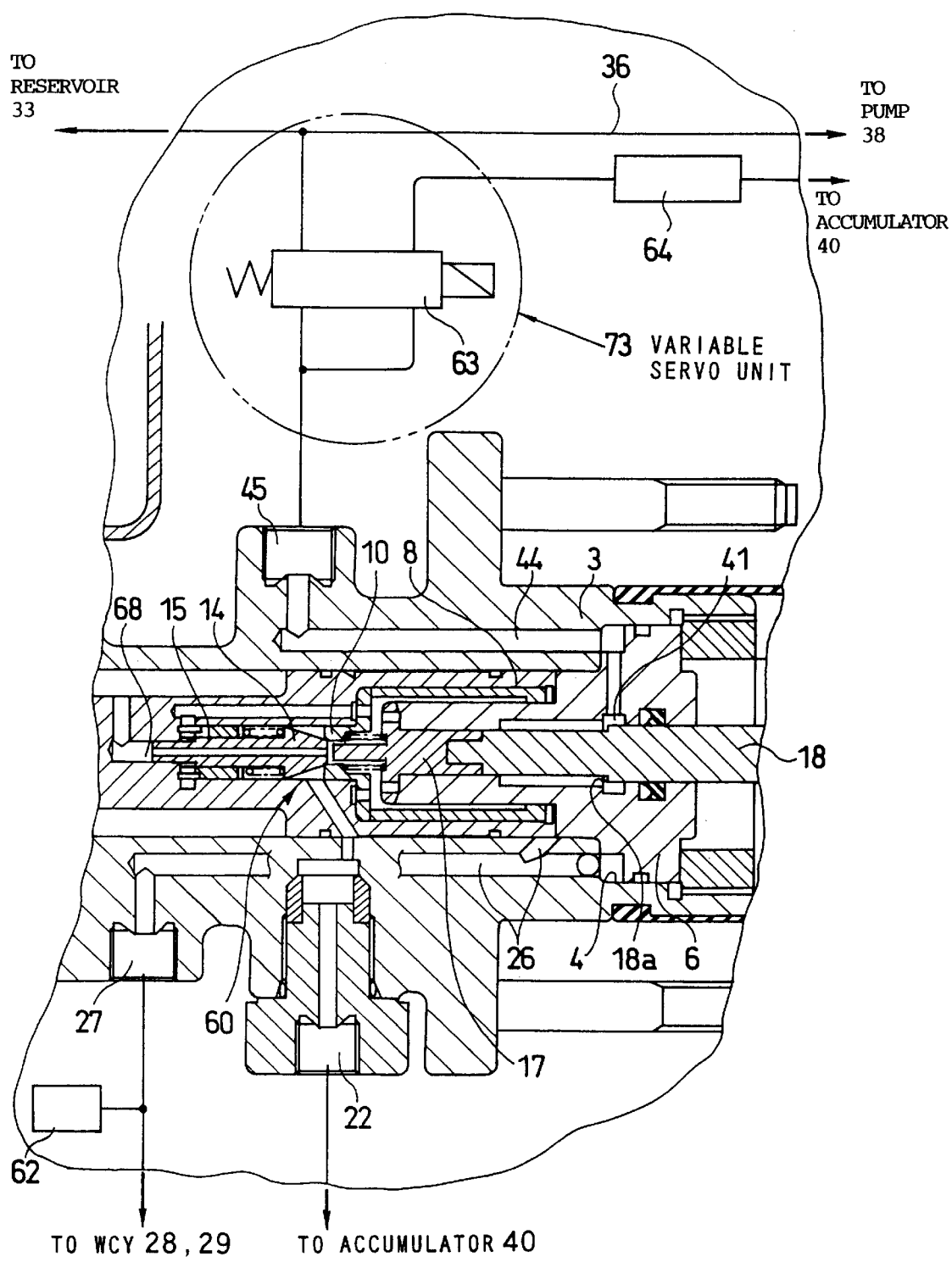
FIG. 19 is a sectional view showing a twelfth embodiment of the present invention.

FIG. 19 is a view partially showing the twelfth embodiment of the present invention.

As shown in FIG. 19, a variable servo unit 73 of a brake pressure boosting device 1 of the twelfth embodiment comprises a solenoid proportional control valve 63 and a pressure regulating valve 64 as shown in FIG. 6. The accumulated pressure in the accumulator 40 is regulated by the pressure regulating valve 64, is then controlled by the solenoid proportional control valve 63, and is introduced into the reaction chamber.

The other structure of the brake pressure boosting device of the twelfth embodiment is the same as that of the ninth embodiment.

When the brake pressure boosting device 1 of the twelfth embodiment is inoperative, the solenoid proportional control valve 63 connects the reaction chamber 41 to the reservoir 33 so that the inside of the reaction chamber 41 is at atmospheric pressure. When the normal braking operation is conducted in this state, the brake pressure boosting device 1 performs the servo control at a higher servo ratio along the straight line α" shown in FIG. 12, i.e. the jumping action.

As the fluid pressure in the power chamber 25 reaches the magnitude terminating the jumping action, the electronic control unit switches, based on the detection signal of the pressure sensor 62, controls the solenoid proportional control valve 63 to operate so that the solenoid proportional control valve 63 outputs pressure corresponding to the fluid pressure in the power chamber 25. The fluid at the outputted pressure is introduced into the reaction chamber 41. Therefore, the brake pressure boosting device 1 performs the normal servo control at a lower servo ratio along the straight line β" shown in FIG. 12. As the fluid pressure in the power chamber 25 reaches the servo-ratio switching point, the solenoid proportional control valve 63 is switched to be inoperative and the reaction chamber 41 is connected to the reservoir 33 again. The pressurized fluid in the power chamber 25 is thus discharged to the reservoir 33 and the inside of the reaction chamber 41 becomes at atmospheric pressure. Therefore, the brake pressure boosting 1 performs the servo control at a higher servo ratio along the straight line γ" substantially equal to the straight line α" shown in FIG. 12 again.

In this manner, the brake pressure boosting device 1 of the twelfth embodiment also performs the jumping action and the reversed two-stage servo action.

The other action and effects of the brake pressure boosting device of the twelfth embodiment are the same as those of the ninth embodiment.

By properly controlling the solenoid proportional control valve 63 during the shift from a higher servo ratio to a lower servo ratio, the smooth shift can be accomplished as shown by the straight lines δ, δ' in FIG. 7 and FIG. 10. Instead of the accumulated pressure in the accumulator, the fluid pressure in the power chamber 25 can be used as fluid pressure to be introduced into the reaction chamber 41.

Figure 20:
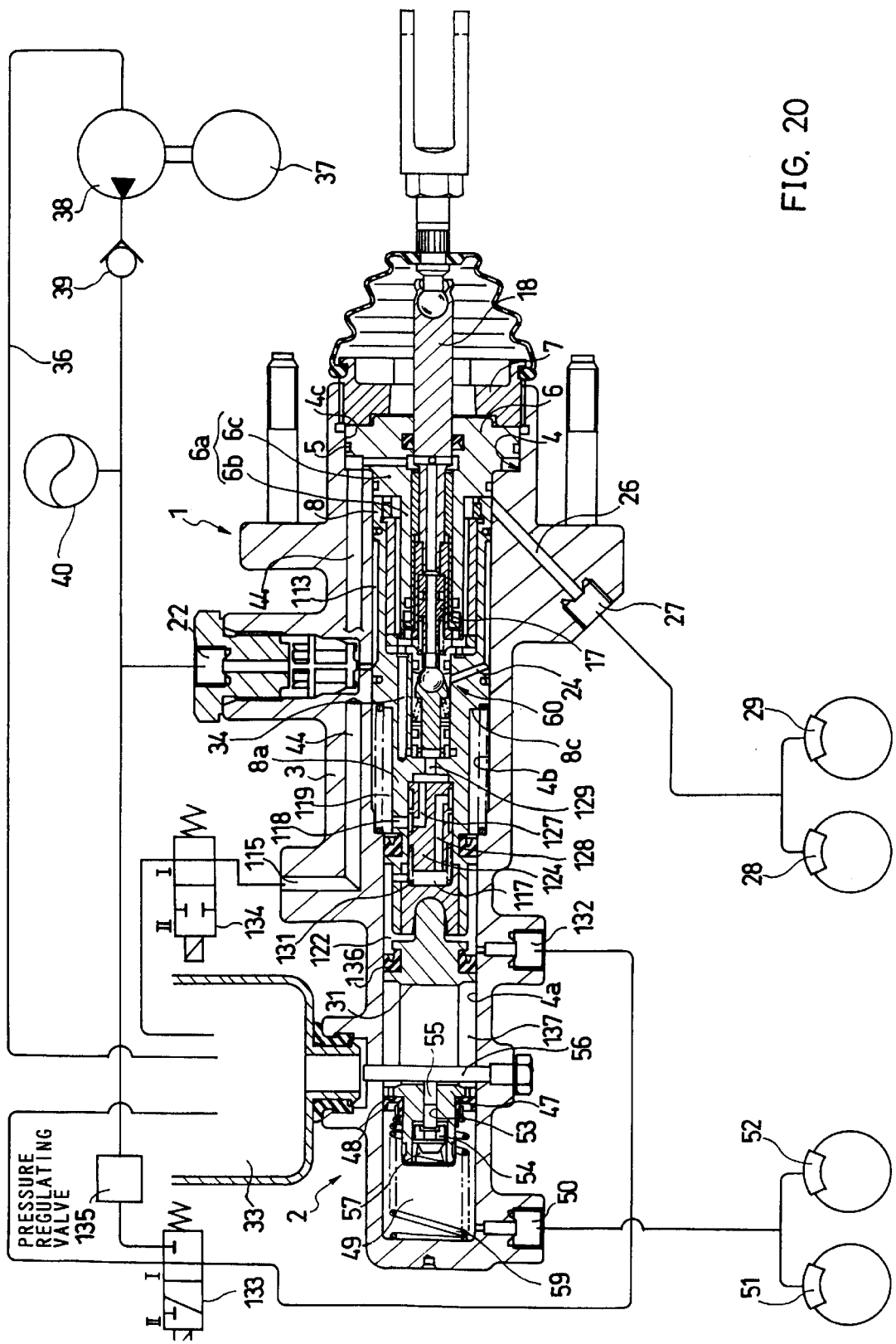
FIG. 20 is a sectional view of a thirteenth embodiment of a brake pressure boosting system in accordance with the present invention.
Figure 21:
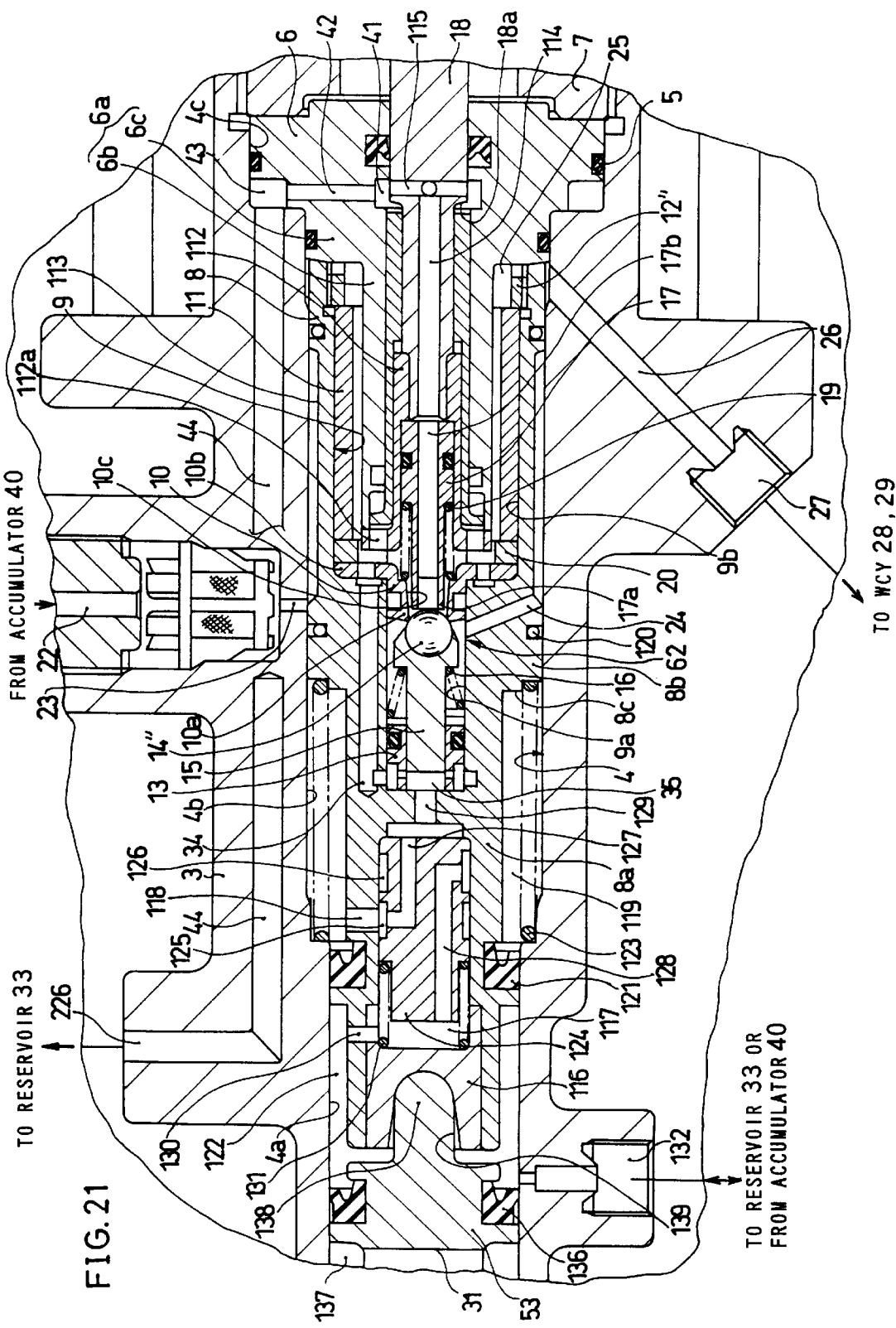
FIG. 21 is a partially enlarged sectional view of the brake pressure boosting system shown in FIG. 20.

FIG. 20 is a sectional view showing the thirteenth embodiment of the present invention and FIG. 21 is a partially enlarged view of FIG. 20.

As shown in FIG. 20 and FIG. 21, in a brake pressure boosting device 1 of the thirteenth embodiment, a stepped hole 4 formed in the housing 3 comprises a small-diameter portion 4a, a middle-diameter portion 4b, and a large-diameter portion 4c. A small-diameter projection 6b of a stepped cylindrical projection 6a is positioned in the middle-diameter portion 4b of the stepped hole 4 of the housing 3 and a large-diameter projection 6c of the stepped cylindrical projection 6a is sealingly fitted in the middle-diameter portion 4b. The plug 6 is brought in contact with a step between the middle-diameter diameter portion 4b and the large-diameter portion 4c of the stepped hole 4 by a nut 7 threaded into the housing 3 whereby the plug 6 is fixed to the housing 3.

A cylindrical valve seat member 10 having a first valve seat 10a is fitted in a small-diameter portion 9a of a stepped hole 9. A flange 10b on the right end of the valve seat member 10 is in contact with a step of the stepped hole 9 and is axially supported, via a reaction piston 20, by a cylindrical fixing member 11 fitted in the large-diameter portion 9b of the stepped hole. The cylindrical fixing member 11 is fixed to a power piston 8 by a nut 12". Though the reaction piston 20 functions for providing the jumping characteristic to the brake pressure boosting device 1 in the above description, the reaction piston 20 does not directly relates to the function of the brake pressure boosting device 1 because it is not allowed to operate in the thirteenth embodiment, so the reaction piston 20 may be omitted. In this case, the flange 10b on the right end of the valve seat member 10 is axially supported directly by the cylindrical fixing member 11.

Fitted into the small-diameter portion 9a of the stepped hole 9 is a collar 13 in which a cylindrical valve body 15 supporting a valve ball 14" is slidably inserted. The valve body 15 is always biased by a spring 16 in such a direction that the valve ball 14" is seated in the first valve seat 10a of the valve seat member 10. A cylindrical valve operating member 17 is disposed in such a manner that the end thereof is positioned in an axial hole 10c of the valve seat member 10 and is provided with a second valve seat 17a disposed on the end in which the valve ball 14" is seated. The rear end of the valve operating member 17 is sealingly fitted in a cylindrical stopping member 112 fitted and fixed to an end of the input shaft 18 having a step 18a.

The cylindrical stopping member 112 has a flange-like stopper 112a which is able to be in contact with the end of the small-diameter projection 6b of the plug 6, thereby defining the rearward limitation of the input shaft 18. Compressed and disposed between the valve seat member 10 and the valve operating member 17 is a spring 19 which always biases the valve operating member 17 and the input shaft 18 to the right in the drawings. The input shaft 18 sealingly penetrates the plug 6 and is connected with a brake pedal not shown at the rear end thereof.

The housing 3 is provided with an input port 22 through which fluid is introduced, and a passage 23 always allowing the communication between the input port 22 and an annular concave 113 formed in the outer surface of the power piston 8. The power piston 8 is provided with a passage 24 allowing the communication between the annular concave 113 and the small-diameter portion 9a of the stepped hole 9. In this case, the passage 24 opens toward the small-diameter portion 9a between the valve seat member 10 and the collar 13.

A power chamber 25 is formed in the middle-diameter portion 4b of the stepped hole 4 between the plug 6 and the right end of the power piston 8. The power chamber 25 always communicates with the axial hole 10c of the valve seat member 10. Inside the power chamber 25, the stopper 112a of the cylindrical stopping member 112, and the valve operating member 17 are positioned, respectively. There is a space between the peripheral surface of the small-diameter projection 6b of the plug 6 and the inner surface of the cylindrical fixing member 11 so that the fluid can freely flow between both sides of the cylindrical fixing member 11. The power chamber 25 always communicates with the output port 27 through a passage 26 formed in the housing 3 and the output port 27 always communicates with WCYs 28, 29 relating to one circuit of two brake circuits.

The valve operating member 17 has an axial passage 17c which opens at both right and left ends. The axial passage 17c always communicates with a discharge port 226 through an axial passage 114 and a passage 115 formed in the input shaft, a reaction chamber 41 and a radial hole 42 formed in the plug 6, an annular space 43 formed between the plug 6 and the housing 3, and an axial hole 44 formed in the housing 3. The discharge port 226 can communicate with the reservoir 33. Further, the power chamber 25 always communicates a chamber 35 facing the left end of the valve body 15 through a passage 34 formed in a power piston 8.

A hydraulic circuit 36 connecting the input port 22 and the reservoir 33 includes a hydraulic pump 38 driven by a motor 37, and an accumulator 40 on the discharge side of the hydraulic pump 38 via a check valve 39. Predetermined pressure is always accumulated in the accumulator 40 by discharge pressure of the hydraulic pump 38.

An axial space 117 is formed between the power piston 8 and a plug 116 at the front side of the power piston 8. The axial space 117 always communicates with an annular reaction chamber 119, which is formed between the outer surface of the small-diameter portion 8a of the power piston 8 and the inner surface of the middle-diameter portion 4b of the stepped hole 4 in the housing 3, through a radial passage 118 of the power piston 8. The reaction chamber 119 is sealed in the axial direction by an O-ring 120 provided on the large-diameter portion 8b of the power piston 8 and a cup sealing member 121 provided on the small-diameter portion 8a. The cup sealing member 121 allows the flow of fluid flowing from a chamber 122 formed in the small-diameter portion 4a of the stepped hole 4 toward the reaction chamber 119. The reaction chamber 119 accommodates a return spring 123 compressed between the step 8c of the power piston 8 and the step between the small-diameter portion 4a and the middle-diameter portion 4b of the stepped hole 4. The return spring 123 always biases the power piston 8 in the inoperative direction.

A spool valve 124 is slidably disposed in the axial space 117. The spool valve 124 is provided with first and second annual grooves 125, 126 formed in the outer surface thereof. The spool valve 124 is also provide with a first passage 127, which communicates with the first annular groove 125 and opens at the rear end of the spool valve 124, and a second passage 128, which communicates with the second annular groove 126 and opens at the front end of the spool valve 124. The rear end of the spool valve 124 always faces the chamber 35 through a passage 129 formed in the power chamber 8. The front end of the spool valve 124 always faces the chamber 122 through a passage 130 formed in the power piston 8 and the plug 116.

The spool valve 124 is always biased rearwardly by a spring 131 and is thus normally set in the inoperative position as illustrated. When the spool valve 124 is in the inoperative position, the first annular groove 125 communicates with the radial passage 118 and the second annular groove 126 is shut off from the radial passage 118. In this state, the reaction chamber 119 communicates with the power chamber 25 through the radial passage 118, the first annual groove 125, the first passage 127, the passage 129, the chamber 35, and the passage 34, and is shut off from the chamber 122. When the fluid pressure in the chamber 35 i.e. the fluid pressure in the power chamber 25 exceeds a predetermined value, the spool valve 124 advances against the biasing force of the spring 131. As a result, the first annual groove 125 is shut off from the radial passage 118 and the second annual groove 126 communicates with the radial passage 118. In this state, the reaction chamber 119 communicates with the chamber 122 through the radial passage 118, the second annual groove 126, the second passage 128, and the passage 130, and is shut off from the chamber 35. The chamber 122 always communicates with a connection port 132.

The brake pressure boosting device of the thirteenth embodiment has an automatic braking function and is provided with a solenoid switching valve 133 and solenoid shut-off valve 134 for the automatic braking function. The solenoid switching valve 133 has a first position I for connecting the connection port 132 to the reservoir 33 and a second position II for connecting the connection port 132 to the accumulator 40 through a pressure regulating valve 135. The solenoid valve 132 is normally set in the first position 1. The solenoid shut-off valve 134 has a first position I for connecting the discharge port 226 to the reservoir 33 and a second position for shutting off the discharge port 226 from the reservoir 33. The solenoid shut-off valve 134 is normally set in the first position.

The MCY piston 47 of the MCY 2 is disposed in front of the power piston 8. The MCY piston 47 has the same effective pressure receiving area as that of the small-diameter portion 8a of the power piston 8 and is slidably fitted in the small-diameter portion 4a of the stepped hole 4 of the housing 3. The MCY piston 47 defines a fluid chamber 49 in the small-diameter portion 4a of the housing 3. The fluid chamber 49 always communicates with WCYs 51, 52 relating to the other circuit of the two brake circuits.

Cup sealing members 48, 136 are fitted onto both ends of the MCY piston 47. The cup sealing member 48 blocks the flow of fluid from the fluid chamber 49 toward the chamber 137 located behind the cup sealing member 48 and allows the flow of fluid from chamber 137 to the fluid chamber 49. The cup sealing member 136 blocks the flow of fluid from the chamber 122 to the chamber 137 and allows the flow of fluid from the chamber 137 to the chamber 122. The chamber 127 always communicates with the reservoir 33 through a brake fluid path (not shown) formed in the housing 3.

A valve rod 55 provided with a valve 54 at the end thereof is inserted through the axial hole 53 formed in the MCY piston 47 in such a manner that the valve rod 55 can come in contact with the valve release rod 56 provided in the housing. The valve release rod 56 radially penetrates the MCY piston 47 and the small-diameter portion 4a of the stepped hole 4 and MCY piston 47 can slide relative to the valve release rod 56 in the axial direction. The valve 54 is always biased by a spring 57 in a direction of closing the MCY piston.

When the MCY piston is in the inoperative position as illustrated and the valve rod 55 comes into contact with the valve release rod 56, the valve 54 advances against the biasing force of the spring 57 to open the axial hole 53, thereby allowing the communication between the fluid chamber 49 and the chamber 137. As MCY piston advances, the valve rod 55 is separated from the valve release rod 56 and the valve 54 closes the axial hole 53 by the biasing force of the spring 57 so that the communication between the reservoir 33 and the fluid chamber 49 is shut off, thereby producing MCY pressure.

Compressed inside the fluid chamber 49 is a return spring 128 always biasing the MCY piston 47 in the inoperative direction.

A projection 138 is formed on the rear end of the MCY piston 47 and is fitted into a concavity 139 formed in the front surface of the plug 116 at the front end of the power piston 8 and is in contact with the bottom of the concavity 139.

In this way, the brake system using the brake pressure boosting device 1 of this embodiment is a semi-full-power brake system, in which the fluid pressure of the power chamber 25 is introduced into the WCYs 28, 29 relating to the one brake circuit and the MCY pressure is introduced into the WCYs 51, 52 relating to the other brake circuit.

The description will now be made as regard to the operation of the brake pressure boosting device 1 of this embodiment.

When brakes are inoperative where the brake pedal is not pedaled, the valve ball 14", the first valve seat 10a of the valve seat member 10, and the second valve seat 17a of the valve operating member 17 are in the positional relation as shown in FIGS. 20 and 21. That is, the valve ball 14" is seated in the first valve seat 10a of the valve seat member 10 and the second valve seat 17a of the valve operating member 17 is spaced apart form the valve ball 14". In this state, the axial hole 10c of the valve seat member 10 is shut off from the passage 24 which always communicates with the input port 22, and communicates with the axial hole 17c of the valve operating member 17 which always communicates with the discharge port 226. Therefore, when the brakes are inoperative, the power chamber 25 is shut off from the pump 38 and the accumulator 40 and communicates with the reservoir 33 so that no pressurized fluid is supplied to the power chamber 25. The stopper 112 of the cylindrical stopping member 112 is in contact with the small-diameter projection 6b of the plug 6 and the spool valve 55 is in the illustrated position so that the reaction chamber 119 communicates with the power chamber 25. The solenoid switching valve 133 and the solenoid shut-off valve 134 are both set in first positions I so that the chamber 122 and the discharge port 226 are connected to the reservoir 33.

As the brake pedal is pedaled for conducting braking operation in this state, the input shaft 18 advances so that the second valve seat 17a of the valve operating member 17 is brought in contact with the valve ball 14" and the valve ball 14" is spaced apart from the first valve seat 10a of the valve seat member 10. This state allows the communication between the passage 24 and the axial hole 10c of the valve seat member 10 and intercepts the communication between the axial hole 10c of the valve seat member 10 and the axial hole 17c of the valve operating member 17. Therefore, the power chamber 25 is shut off from the reservoir 33 and communicates with the pump 38 and the accumulator 40 so that the pressurized fluid of the accumulator 40 is supplied to the power chamber 25. In this case, the valve ball 14", the first valve seat 10a, and the second valve seat 17a compose a control valve 60 of the brake pressure boosting device 1 which controls to selectively switch the power chamber 25 to communicate with the pump 38 and the pressurized fluid source of the accumulator 40 or with the reservoir 33.

As the fluid pressure in the power chamber 25 reaches a value overcoming the biasing force of the return spring 123, the power piston 8 advances by the fluid pressure so that the brake pressure boosting device 1 produces output and the MCY piston 47 advances so that the valve 54 closes the axial hole 53 and MCY pressure is developed in the fluid chamber 49. The output of the brake pressure boosting device 1 is boosted force relative to the input. The pressurized fluid in the power chamber 25 is introduced into both the WCYs 28, 29 relating to the one circuit and the MCY pressure is introduced into both the WCYs 51, 52 relating to the other circuit so that the brakes of the both circuits work.

The pressurized fluid in the power chamber 25 is also introduced into the chamber 35 via the axial passage 34. Thus, the fluid pressure in the chamber 35 acts on the valve body 15 so that the valve body 15 is biased in a direction opposing the fluid pressure in the power chamber 25. The pressurized fluid in the chamber 35 is introduced into the reaction chamber 119 through the passage 129, the first passage 127, the first annual groove 125, and the passage 118. The fluid pressure in the reaction chamber 119 acts on the step 8c of the power piston 8 to bias the power piston 8 against the output.

Applied to the input shaft 18 is force by the fluid pressure in the power chamber 25 received by the effective pressure receiving areas of the valve operating member 17 and the cylindrical stopping member 112, which is relatively small, at the end of the valve operating member 17. The force is transmitted as reaction to the driver.

As the reaction of the input shaft 18 becomes equal to the input of the input shaft 18, the valve ball 14" is seated in the first valve seat 10a of the valve seat member 10 and also in the second valve seat 17a of the valve operating member 17 so that the power chamber 25 is shut off from both the accumulator 40 and the reservoir 33. The power piston 8 develops output which is boosted force relative to the input.

Figure 22:
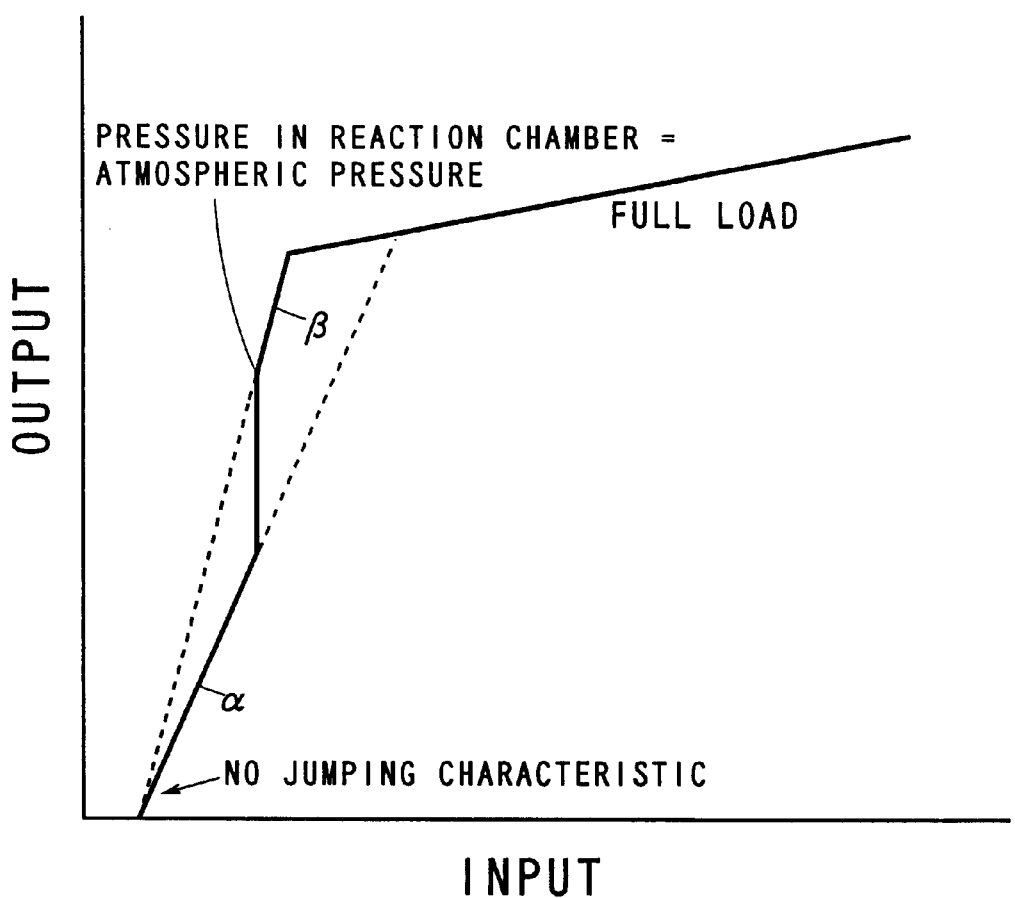
FIG. 22 is a diagram showing input-output characteristics of the brake pressure boosting system shown in FIG. 20.

Assuming that the output of the brake pressure boosting device 1 is $W_1$, the fluid pressure in the power chamber 25 is $P_1$, the effective pressure receiving area of the MCY piston is $A_2$, the biasing force of the return spring 123 is SPG, the output $W_1$ of the brake pressure boosting device 1 is found by the following equation:

$$W_1 = P_1 * A_2 - SPG \qquad 8$$

and is represented by a straight line a of a lower servo ratio (small gradient) for normal braking as shown in FIG. 22.

As the input of the input shaft 18 is further increased, the valve ball 14" is separated from the first valve seat 10a again so that the pressurized fluid is further supplied into the power chamber 25, thereby further increasing the fluid pressure in the power chamber 25.

When the input reaches the predetermined value and the fluid pressure in the power chamber 25 becomes the operating pressure, the spool valve 124 advances against the biasing force of the spring 131 so that the first annular groove 125 is shut off from the passage 118 and the second annular groove 126 is connected to the passage 118. The reaction chamber 119 is thus shut off from the chamber 35 and is connected to the chamber 122 i.e. the reservoir 33, so the pressurized fluid of the reaction chamber 119 is discharged to the reservoir 33 and the inside of the reaction chamber becomes at atmospheric pressure. Therefore, no more fluid pressure acts on the step 8c of the power piston 8 so that that the output of the brake pressure boosting device 1 is increased. After that, the output of the brake pressure boosting device 1 is increased at a servo ratio higher than that for the normal braking relative to the input of the input shaft 18. The WCYs 28, 29; 51, 52 output respective braking forces larger than the braking force for the normal braking relative to the input of the input shaft 18. The output $W_2$ of the brake pressure boosting device 1 at this point is found by the following equation:

$$W_2 = P_1 * A_1 - SPG \qquad 8$$

and is represented by the straight line β of a higher servo ratio (large gradient) as shown in FIG. 22.

The brake pressure boosting device 1 of the thirteenth embodiment performs the reversed two-stage servo action by the servo control at the servo ratio higher than that for the normal braking when the input exceeds the predetermined value.

When the input is further increased and the fluid pressure in the power chamber 25 reaches the maximum preset pressure for accumulating pressure in the accumulator 40, the fluid pressure in the power chamber 25 is no more increased and the brake pressure boosting device 1 terminates the servo control at the higher servo ratio and becomes in the full-load state. After that, the output of the brake pressure boosting device 1 increases in proportion to the input without magnification.

As the brakes are canceled by releasing the brake pedal, the input shaft 18 and the valve operating member 17 retreat, the second valve seat 17a of the control valve 60 is separated from the valve ball 14", and the pressurized fluid in the power chamber 25 is discharged into the reservoir 33 through the axial hole 10c of the valve seat member 10, a space between the valve ball 14" and the second valve seat 17a, the axial passage 17c of the valve operating member 17, the axial passage 114, the radial hole 115, the reaction chamber 41, the radial hole 42, the annual space 43, the axial hole 44, the discharge port 32, and the solenoid shut-off valve 134. At this point, the input shaft 18 retreats largely relative to the power piston 8, so the second valve seat 17a is largely spaced apart from the valve ball 14' so that the pressurized fluid in the power chamber 25 is quickly discharged. Because of this discharge of the pressurized fluid in the power chamber 25, the pressurized fluid in the WCYs 28, 29 is rapidly discharged to the reservoir 33 through the power chamber 25, thereby decreasing the fluid pressure in the WCYs 28, 29.

Because of the biasing force of the return spring 59, the MCY piston 47 retreats, so both the fluid pressure in the fluid chamber 49 and the fluid pressure in the WCYs 51, 52 are decreased. As the valve rod 55 comes into contact with the valve release rod 56, the valve 54 opens the axial hole 53 corresponding to the further retreat of the MCY piston 47 so that the fluid chamber 49 is connected to the reservoir 33. Therefore, the pressurized fluid in the WCYs 51, 52 are rapidly discharged to the reservoir 33 through the fluid chamber 49 so that the fluid pressure in the WCYs 51, 52 is further reduced. In this way, the brakes of both the circuits quickly begin to be canceled.

As the fluid pressure in the power chamber 25 becomes lower than the working pressure of the spool valve 124, the spool valve 114 retreats to the inoperative position so that the reaction chamber 119 is thus shut off and the reaction chamber 41 communicates with the reservoir 33. Then, the fluid pressure in the power chamber 25 is further introduced into the reaction chamber 119 again, so the fluid pressure in the reaction chamber 119 acts on the step 8c of the power piston 8 in the same manner as mentioned above. The output of the brake pressure boosting device 1 is decreased along the straight line α of a lower servo ratio relative to the decrease in the input.

As the input shaft 18 further retreats until the brakes are substantially canceled, the stopper 112a of the cylindrical stopping member 112 comes into contact with the end of the small-diameter projection 6b of the plug 6, so the input shaft 18 and the valve operating member 17 no more retreat, i.e. both the input shaft 18 and the valve operating member 17 reach their rearmost limits. Even after the input shaft 18 and the valve operating member 17 are stopped, the power piston 8, the reaction piston 20, the valve ball 14", and the valve seat member 10 still retreat, so the valve ball 14" comes closer to the second valve seat 17a of the valve operating member 17.

As the rear end of the power piston 8 comes into contact with the plug 6, the retreat of the power piston 8 is stopped so that the power piston 8 is in the inoperative position and the MCY piston 47 is also in the inoperative position, thereby quickly and completely canceling the brakes. While the brakes are being cancelled, the output of the brake pressure boosting device 1 is decreased relative to the decrease in the input along the full load line, the straight lines β and α, in contrast with the case of increasing the input.

When the power piston 8 is in the inoperative position, the valve ball 14" comes extremely closer to the second valve seat 17a of the valve operating member 17 so that the space between the valve ball 14" and the second valve seat 17a is quite small i.e. the valve ball 14" is immediately before the seating. As the brake pedal is pedaled and the input shaft 18 and the valve operating member 17 advance, the second valve seat 17a immediately comes into contact with the valve ball 14" and the valve ball 14" immediately moves apart from the first valve seat 10a of the valve seat member 10. That is, the play in stroke until the switching operation of the control valve 60 is extremely reduced, thereby quickly applying the brakes.

In this way, the brakes can be quickly applied by the braking operation and the brakes can be quickly canceled by canceling the braking operation, so the brake pressure boosting device 1 has improved responsiveness.

When the driving state of the vehicle satisfies conditions for performing the automatic braking, the electronic control unit not shown switches the solenoid switching valve 133 and the solenoid shut-off valve 134 to the respective second positions II, thereby connecting the connection port 132 to the accumulator 40 and shutting off the discharge port 226 from the reservoir 33.

Then, the pressurized fluid in the accumulator 40 is regulated to a predetermined pressure by the pressure regulating valve 135 and is introduced to the connection port 132. Further, the pressurized fluid is introduced into the power chamber 25 through the chamber 122, the cup sealing member 121, the reaction chamber 119, the passage 118, the first passage 127 of the spool valve 124, the passage 129, the chamber 35, and the passage 34. The pressurized fluid introduced into the power chamber 23 is further introduced into the WCYs 28, 29 through the passage 26 and the output port 27, whereby the brakes of the one circuit work. Since the discharge port 226 is shut off from the reservoir 33, the pressurized fluid in the power chamber 25 is not discharged to the reservoir 33 so that the brakes can be applied with little pressure loss.

Since he fluid pressure in the chamber 122 acts on the MCY piston 47, the MCY piston 47 advances and develops MCY pressure in the fluid chamber 49 and the MCY pressure is introduced into the WCYs 51, 52, whereby the brakes of the other circuit work. In this manner, the automatic braking is securely conducted.

When the conditions for performing the automatic braking are cancelled, the electronic control unit returns the solenoid switching valve 133 and the solenoid shut-off valve 134 to the respective first positions I. Then, the pressurized fluid in the chamber 122 is discharged to the reservoir 33 and the pressurized fluid in the power chamber 25, the chamber 35, the reaction chamber 119, and WCYs 28, 29 is discharged. In this way, the automatic braking is cancelled.

By using the brake pressure boosting device 1 of the thirteenth embodiment, the reversed two-stage servo action in which the servo control is conducted at a servo ratio higher than that for the normal braking can be obtained when the fluid pressure in the power chamber 25 reaches a predetermined value, i.e. the input from the brake pedal exceeds the predetermined magnitude during the servo control for the normal braking. In this case, the reversed two-stage servo action can be accomplished by a simple structure that the reaction chamber 119 is provided in a space facing the step of the power piston 8 and the spool valve 124 is provided in the power piston 8 to introduce the fluid pressure in the power chamber 25 into the reaction chamber 119. In particular, because the power piston 8 and the space facing the step thereof are provided in a conventional pressure boosting device which has been widely used, large engineering change is not required to the conventional pressure boosting device. Accordingly, the braking pressure boosting device 1 of the thirteenth embodiment can be structured in a simple manner.

Therefore, in the event of emergency, only by pedaling the brake pedal to the servo-ratio switching point not substantially fully pedaling as conventional one, large braking forces can be quickly obtained. The brake assist for ensuring that large braking force is obtained in the event of emergency even by such an inexpert driver can be provided.

The servo-ratio switching point can be varied by adjusting the working pressure of the spool valve by means of varying the biasing force of the spring 131.

Figure 23:
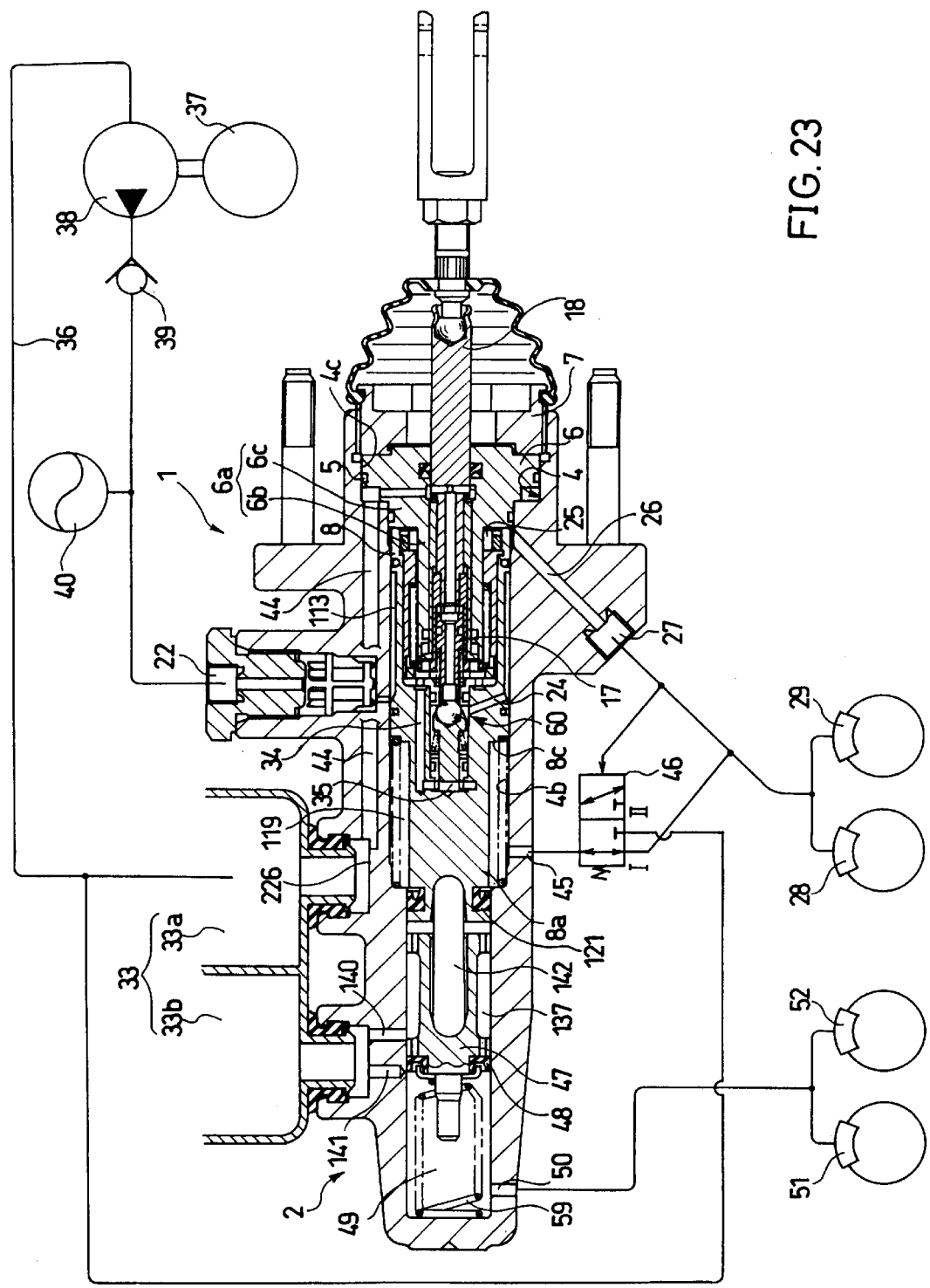
FIG. 23 is a sectional view similar to FIG. 20, but showing a fourteenth embodiment of the present invention.
Figure 24:
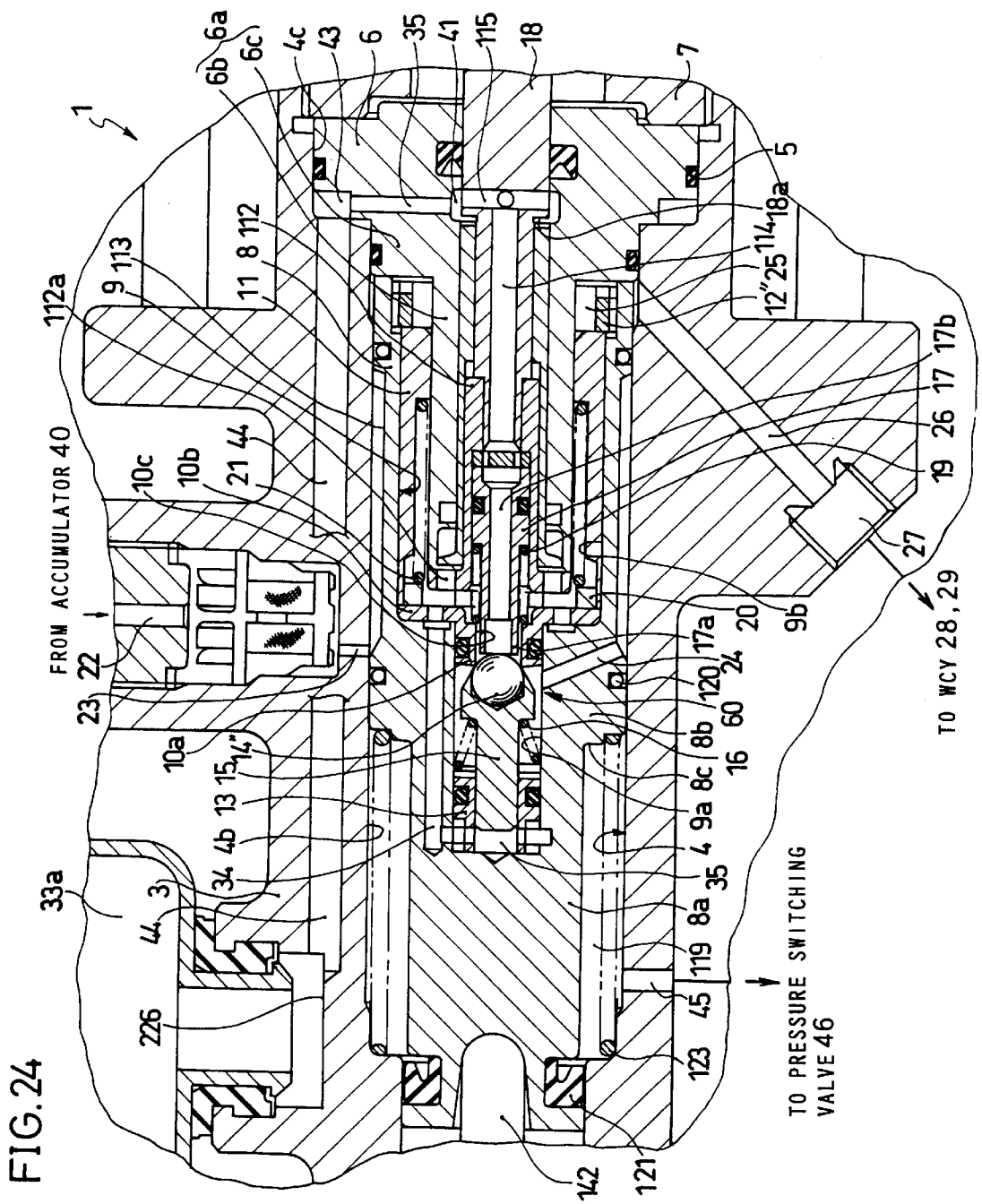
FIG. 24 is a partially enlarged sectional view similar to FIG. 21, but showing the brake pressure boosting device show in FIG. 23.

FIG. 23 and FIG. 24 are the same views as FIG. 20 and FIG. 21 but showing the fourteenth embodiment. It should be noted that parts similar or corresponding to the parts of the thirteenth embodiment will be marked by the same reference numerals so that the description about the parts will be omitted (the same is true for the description of the following other embodiments).

Though the spool valve 124 for varying the servo ratio is provided in the power piston 8 in the aforementioned thirteenth embodiment, a pressure switching valve for varying the servo ratio is provided outside the brake pressure boosting device in the fourteenth embodiment. As shown in FIG. 23 and FIG. 24, a control pressure inlet 45 communicating with the reaction chamber 119 is formed in the housing 3. The pressure switching valve 46 is disposed to the control pressure inlet 45. The pressure switching valve 46 has a first position I for connecting the control pressure inlet 45 to an output port 27 i.e. a power chamber 25 and WCYs 28, 29 and a second position II for connecting the control pressure inlet 45 to the reservoir 33. The pressure switching valve 46 is normally set in the first position I and is switched to be set in the second position II when the fluid pressure at the output port 27 i.e. the fluid pressure in the power chamber 25 exceeds a predetermined value.

In the fourteenth embodiment, the spool valve 124 of the thirteenth embodiment is omitted as well as the axial space 117 and the passages 118, 129, 130 formed with regard to the spool valve 124 by virtue of the presence of the pressure switching valve 46. Since the brake pressure boosting device of the fourteenth embodiment does not have automatic braking function, the solenoid switching valve 133, the solenoid shut-off valve 134, the pressure regulating valve 135, the cup sealing member 136, and the connection port 132 are also omitted.

The brake pressure boosting device 1 of the fourteenth embodiment is provided with a reaction piston 20 for performing the jumping action and a spring 21 for biasing the reaction piston 20. That is, the cylindrical reaction piston 20 shown in FIG. 24 is disposed between the outer surfaces of the input shaft 18 and the cylindrical stopping member 112 and the inner surface of the axial hole of the small-diameter projection 6b of the plug 6 in such a manner that the reaction piston 20 is slidable relative to the respective outer surfaces of the input shaft 18 and the cylindrical stopping member 112, the inner surface of the small-diameter projection 6b, and the inner surface of the cylindrical fixing member 11.

The reservoir 33 is divided into a fluid pressure reservoir 33a and a MCY reservoir 33b, and the pump 38, the discharge port 226, and the pressure switching valve 46 are connected to the fluid pressure reservoir 33a. The housing 3 is provided with a fluid supplying port 140, for allowing the communication between the MCY reservoir 33b and the small-diameter portion 4a of the stepped hole 4, and a fluid compensating port 141 which are formed therein. When the cup sealing member 48 provided on the end of the MCY piston 47 is in the inoperative position where the piston 47 is located at a rear side of the open end of the fluid compensating port 141, the fluid chamber 49 communicates with the MCY reservoir 33b so that no MCY pressure is developed in the fluid chamber 49. When the cup sealing member 48 of the MCY piston 47 advances to a position at front side of the open end of the fluid compensating port 141, MCY pressure is developed in the fluid chamber 49. Brake fluid in the MCY reservoir 33b can be supplied to the fluid chamber 49 through the fluid supplying port 140 formed in the housing 3 and the axial hole formed in the MCY piston 47. Disposed between the power piston 8 and the MCY piston 47 is a connection rod 142.

The other structure of the brake pressure boosting device 1 of the fourteenth embodiment is the same as that of the thirteenth embodiment.

The brake pressure boosting device 1 of the fourteenth embodiment as structured above is in the state shown in FIG. 23 and FIG. 24 when it is inoperative. In this case, the right end 20e of the reaction piston 20 is spaced apart form the step 18a of the input shaft 18. The stopper 112a of the cylindrical stopping member 112 is spaced apart from the stopper 20c of the first flange 20a of the reaction piston 20 and is in a forwarded position from the stopper 20c.

As the brake pedal is pedaled for conducting braking operation in this state, in the same manner as the thirteenth embodiment, the input shaft 18 advances so that pressurized fluid is introduced into the power chamber 25 to operate the power piston 8. The pressurized fluid in the power chamber 25 is introduced into the WCYs 28, 29. The operation of the power piston 8 operates the MCY piston 47 so that the brake fluid in the fluid chamber 49 is introduced into the WCYs 51, 52.

Because of the fluid pressure in the power chamber 25, the reaction piston 20 is moved to the right relative to the power piston 8 and the input shaft 18 against the biasing force of the spring 21. In the initial stage where the fluid pressure in the power chamber 25 is relatively small and the WCYs 28, 29; 51, 52 develop no braking force because of plays in the respective strokes of the WCYs, however, the rear end 20e of the reaction piston 20 is not yet brought into contact with the step 18a of the input shaft 18 so that no force from the reaction piston 20 is applied to the input shaft 18. Therefore, the brake pressure boosting device 1 outputs along the straight line γ' shown in FIG. 25 and thus performs the jumping action.

When the fluid pressure in the power chamber 25 is increased and, because of the increased fluid pressure, the right end 20e of the reaction piston 20 comes into contact with the step 18a of the input shaft 18, the reaction piston 20 acts to oppose the input of the input shaft 18 with force of fluid pressure applied to the input shaft 18. The reaction acting on the input shaft 18 is increased so that the jumping action is terminated. After that, the output of the brake pressure boosting device 1 is increased at a ratio lower than that before the play in the stroke is cancelled relative to the input of the input shaft 18. That is, because of the increased reaction, the brake pressure boosting device 1 performs the servo control in which the input of the input shaft 18 is boosted at a relatively low servo ratio along the straight line α' shown in FIG. 25 and is then outputted. The fluid pressure in the power chamber 25 becomes magnitude corresponding to the servo ratio. The servo ratio at this point is set to be equal to that for normal braking. During the servo control, until the input reaches a predetermined value, the fluid pressure in the power chamber 25 does not rise to the working pressure of the pressure switching valve 46 so that the pressure switching valve 46 is still set in the first position I and the reaction chamber 119 is still connected to the output port 27.

As the fluid pressure in the power chamber 25 reaches the working pressure of the pressure switching valve 46, the pressure switching valve 46 is switched to be set in the second position II by the fluid pressure at the preset pressure. Then, the reaction chamber 119 is shut off from the output port 27 and is connected to the fluid pressure reservoir 33b, so the pressurized fluid of the reaction chamber 119 is discharged to the fluid pressure reservoir 33b and the inside of the reaction chamber 119 thus becomes at atmospheric pressure. No more force by the fluid pressure of the reaction chamber acts onto the power piston 8. Therefore, the pressure boosting device 1 performs the servo control in which the input of the input shaft 18 is boosted at a relatively large servo ratio along the straight line β' shown in FIG. 25.

As the brakes are canceled by releasing the brake pedal, the input shaft 18 largely retreats until the stopper 112a of the cylindrical stopping member 112 comes into contact with the stopper 20c of the reaction piston 20. The second valve seat 17a is therefore spaced largely apart from the valve ball 14" so that the pressurized fluid in the power chamber 25 is rapidly discharged in the same manner as the thirteenth embodiment.

In the fourteenth embodiment, during the brakes are cancelled, the output of the brake pressure boosting device 1 is reduced relative to the decrease in the input along the full load line, the straight lines β', α', and γ', in contrast with the case of increasing the input.

According to the fourteenth embodiment, the brake pressure boosting device 1 can be miniaturized because the pressure switching valve 46 for varying the servo ratio is provided outside the brake pressure boosting device 1.

The other action and effects of the brake pressure boosting device of the fourteenth embodiment are the same as those of the thirteenth embodiment, except parts relating to the automatic braking.

It should be noted that, instead of the fluid pressure in the power chamber 25, the accumulated pressure in the accumulator can be used as fluid pressure to be introduced into the reaction chamber 119. In this case, the accumulated pressure is regulated by a pressure regulating valve and then introduced into the reaction chamber 119. Since the accumulated pressure is normally higher than that of the power chamber 25, larger output can be obtained with the same input. The case of introducing the accumulated pressure will be concretely described with regard to the other embodiment described later.

Figure 26:
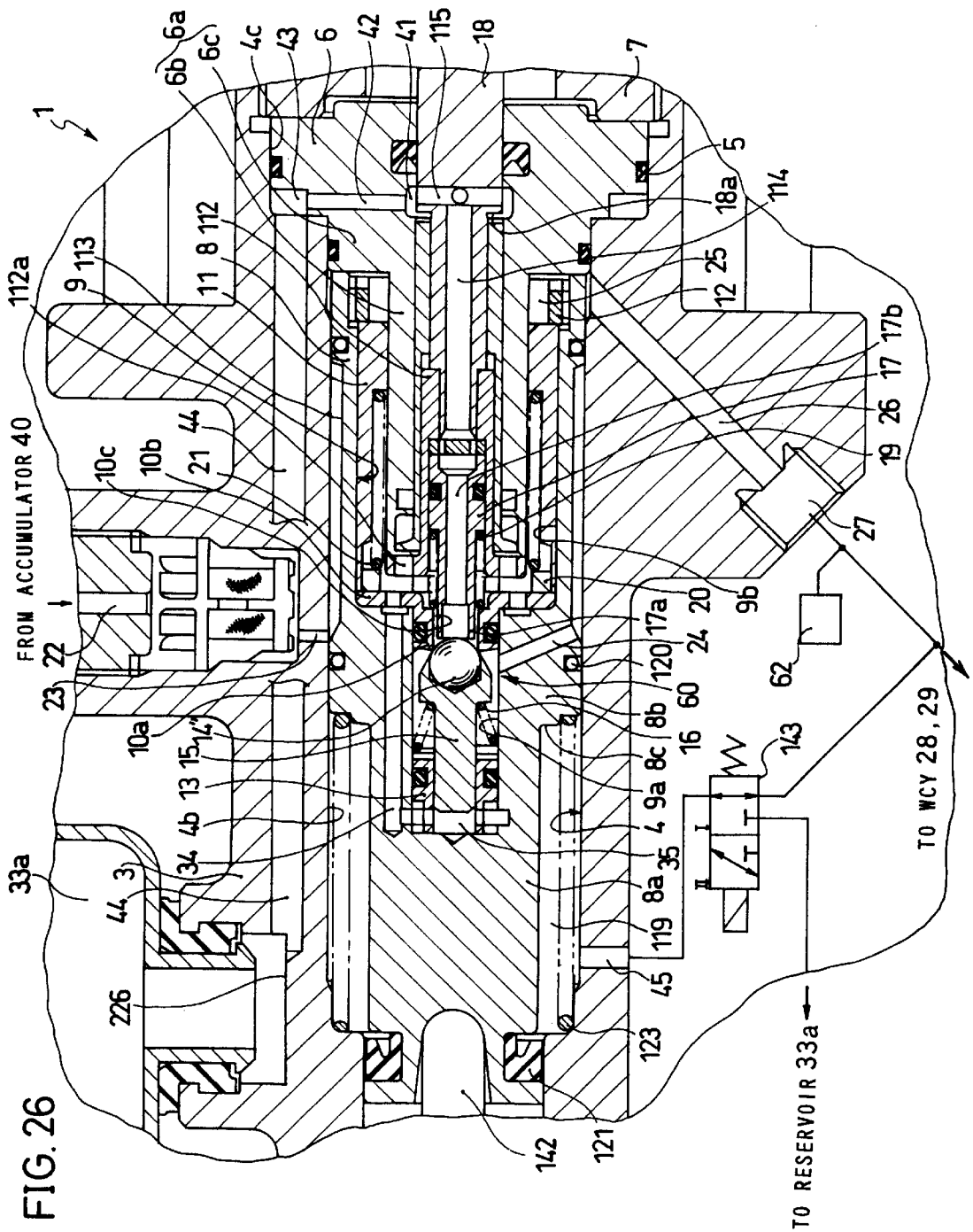
FIG. 26 is a partially enlarged sectional view similar to FIG. 24, but showing a fifteenth embodiment of the present invention.

FIG. 26 is a view similar to FIG. 24, but showing the fifteenth embodiment of the present invention.

Though the pressure switching valve 46 for varying the servo ratio is controlled by the fluid pressure in the power chamber 25 in the aforementioned fourteenth embodiment, a solenoid valve 143 is provided instead of the pressure switching valve 46 and a pressure sensor 62 is provided for detecting the fluid pressure in the power chamber 25 which is the basis for controlling the solenoid valve 143 in the brake pressure boosting device 1 of the fifteenth embodiment. The solenoid valve 143 has, just like the pressure switching valve 46 of the fourteenth, a first position I for connecting the control pressure inlet 45 to an output port 27 and a second position II for connecting the control pressure inlet 45 to the fluid pressure reservoir 33a. The solenoid valve 143 is normally set in the first position I and is switched to be set in the second position II based on the detection signal from the pressure sensor 62 when the fluid pressure in the power chamber 25 exceeds a predetermined value.

Figure 25:
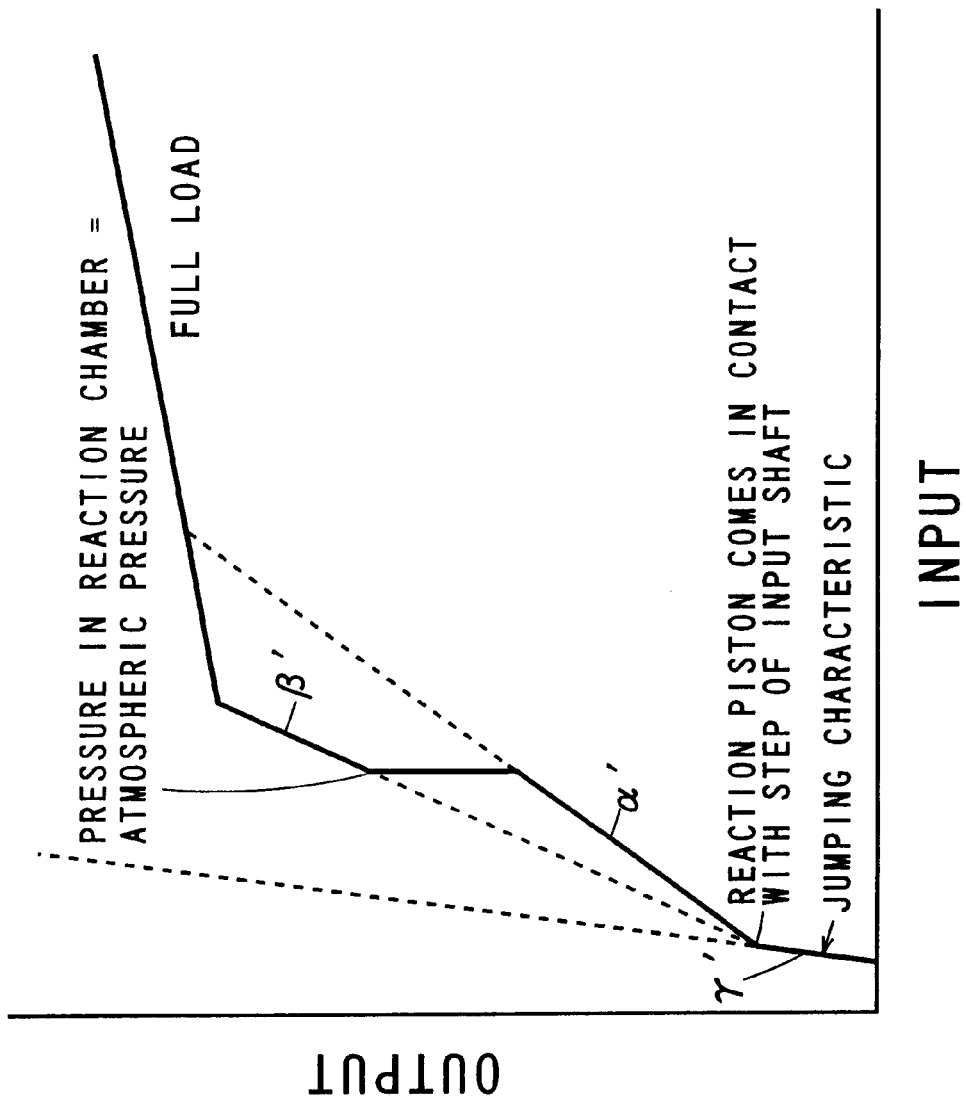
FIG. 25 is a diagram showing input-output characteristics of the brake pressure boosting device shown in FIG. 23.

The brake pressure boosting device 1 of the fifth embodiment also has the jumping characteristic and the reversed two-stage servo characteristic, as shown in FIG. 25 just like the fourteenth embodiment.

The other action and effects of the brake pressure boosting device 1 of the fifteenth embodiment are the same as those of the fourteenth embodiment mentioned above.

Figure 27:
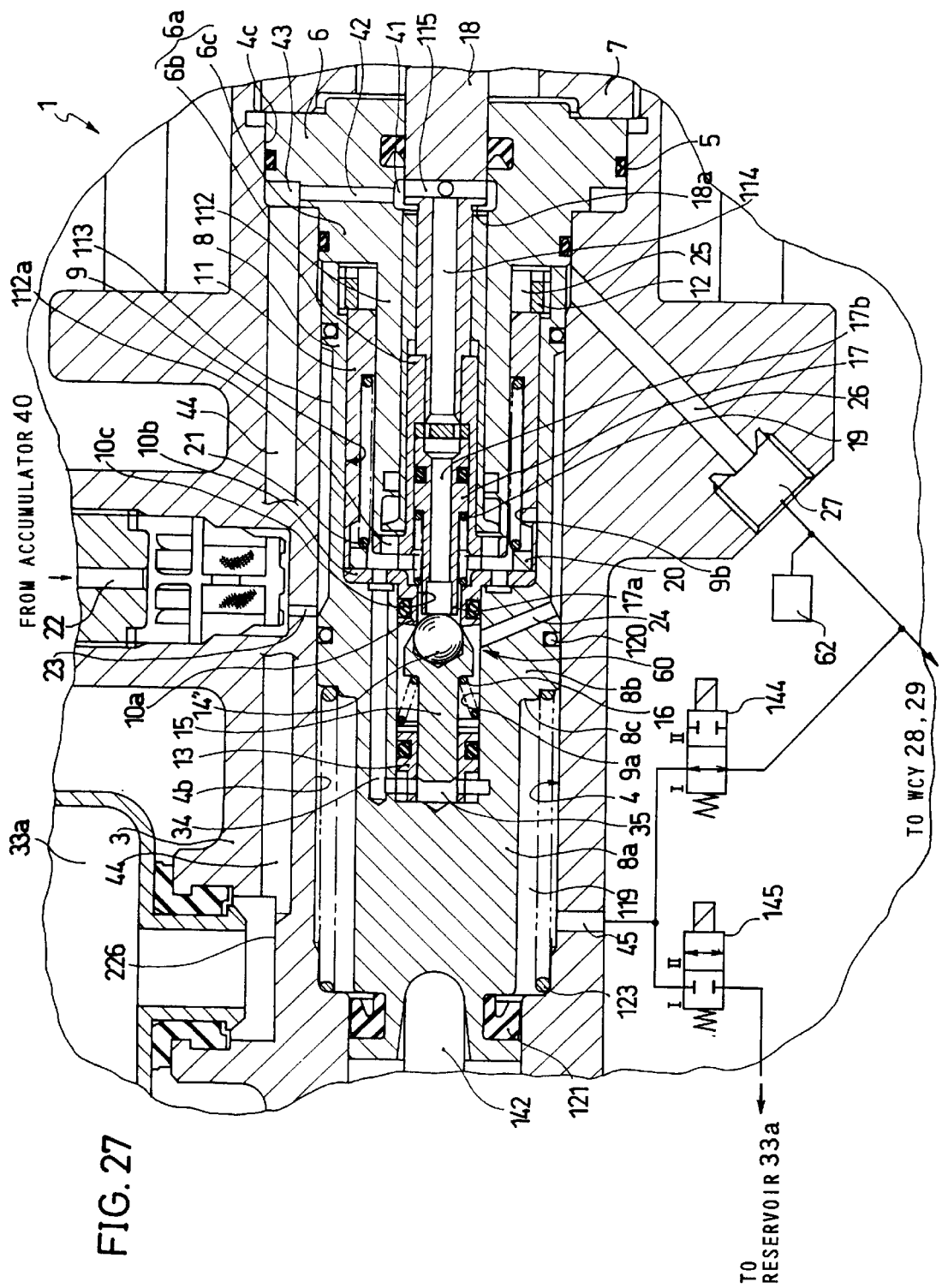
FIG. 27 is a partially enlarged sectional view similar to FIG. 24, but showing a sixteenth embodiment of the present invention.

FIG. 27 is a view similar to FIG. 26 but showing the sixteenth embodiment of the present invention.

Though the solenoid valve 143 is used to provide the reversed two-stage servo characteristic in the fifteenth embodiment, fifth and sixth solenoid shut-off valves 144, 145 are used in the brake pressure boosting device 1 of the sixteenth embodiment as shown in FIG. 27.

The fifth solenoid shut-off valve 144 is disposed on a line connecting the output port 27 and the control pressure inlet 45 and has a communicating position I for allowing the communication between the outlet port 27 and the control pressure inlet 45 and a shut-off position II for intercepting the communication between the outlet port 27 and the control pressure inlet 45. The fifth solenoid shut-off valve 144 is normally set in the communicating position I, i.e. a normally open valve.

The sixth solenoid shut-off valve 145 is disposed on a line between the control pressure inlet 45 and the fluid pressure reservoir 33a and has a shut-off position I for intercepting the communication between the control pressure inlet 45 and the fluid pressure reservoir 33a and a communicating position II for allowing the communication between the control pressure inlet 45 and the fluid pressure reservoir 33a. The sixth solenoid shut-off valve 145 is normally set in the shut-off position I, i.e. a normally closed valve. The fifth and sixth solenoid shut-off valves 144, 145 are controlled by the fluid pressure in the power chamber 25. For this, the same pressure sensor 62 as that of the fifteenth embodiment mentioned above is disposed for detecting the fluid pressure in the power chamber 25.

The other structures of the brake pressure boosting device 1 of the sixteenth embodiment is the same as that of the fifteenth embodiment.

In the brake pressure boosting device 1 of the sixteenth embodiment as structured above, until the fluid pressure in the power chamber 25 reaches the pressure at the servo-ratio switching point, the electronic control unit sets, based on the detection signal from the pressure sensor 62, the fifth solenoid shut-off valve 144 in the communicating position I and sixth solenoid shut-off valve 145 in the shut-off position I as shown in FIG. 27. Therefore, the fluid pressure in the power chamber 25 is introduced into the reaction chamber 119. As the fluid pressure in the power chamber 25 reaches the pressure at the servo ratio switching point, the electronic control unit sets the fifth solenoid shut-off valve 144 to the shut-off position II and sets the sixth solenoid shut-off valve 145 to the communicating position II based on the detection signal from the pressure sensor 62. The pressurized fluid in the reaction chamber 119 is discharged to the fluid pressure reservoir 33b so that the inside of the reaction chamber 119 becomes at atmospheric pressure.

The brake pressure boosting device 1 of the sixteenth embodiment also has the jumping characteristic and the reversed two-stage servo characteristic, as shown in FIG. 25 just like the fourteenth embodiment.

The other structure and the other action and effects of the brake pressure boosting device 1 of the sixteenth embodiment are the same as those of the fifteenth embodiment mentioned above.

Instead of the fifth and sixth solenoid shut-off valves 144, 145, two shut-off valves which are controlled by the fluid pressure in the power chamber 25 in the same manner as the pressure switching valve 46 of the fourteenth embodiment shown in FIG. 23 may be used.

Figure 28:
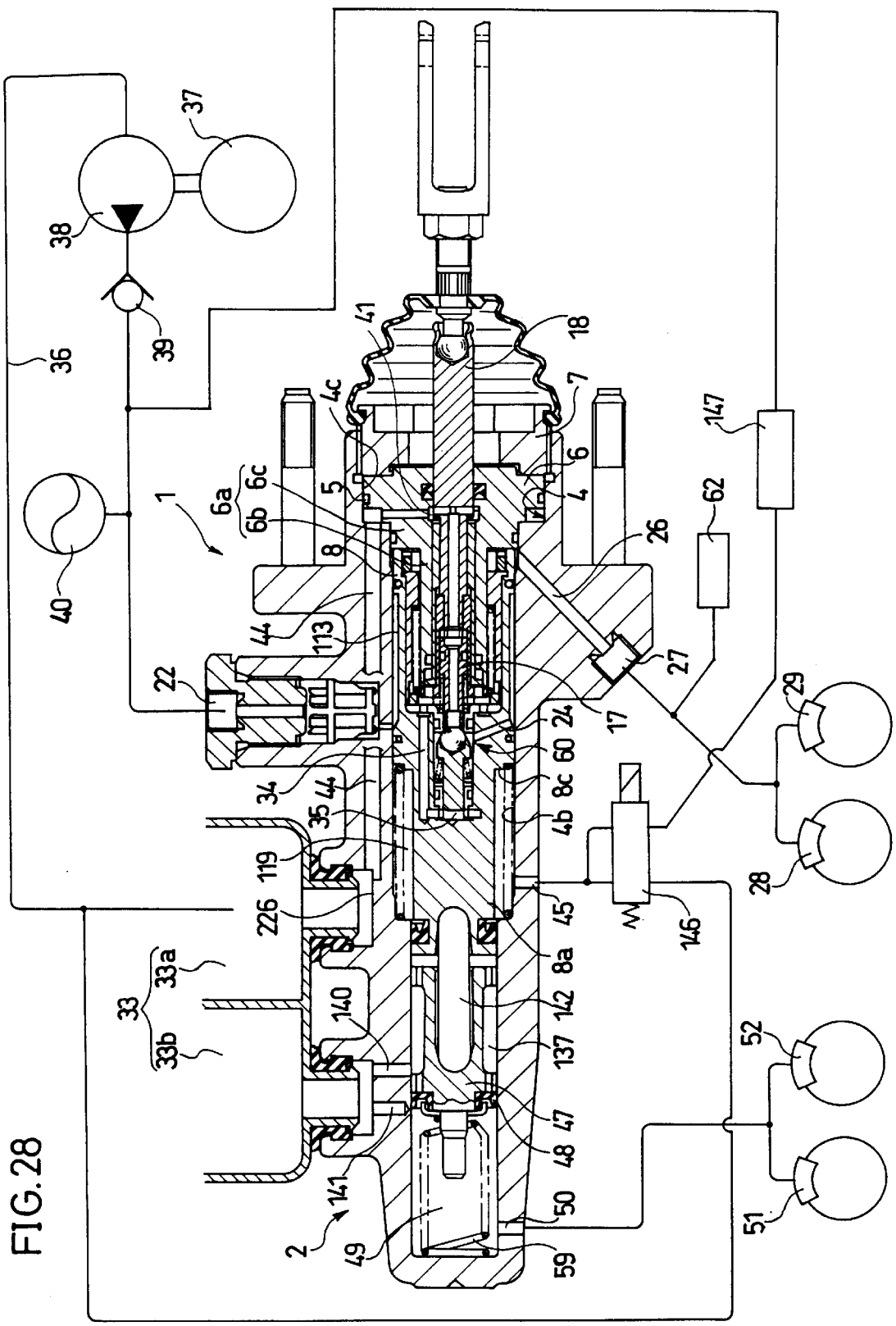
FIG. 28 is a partially enlarge sectional view similar to FIG. 24, but showing a seventeenth embodiment of the present invention.

FIG. 28 is a view similar to FIG. 26, but showing the seventeenth embodiment.

Though the switching valve 143 is used to obtain the reversed two-stage servo characteristic in the fifteenth embodiment shown in FIG. 26, a solenoid proportional control valve 146 and a pressure regulating valve 147 are used in a brake pressure boosting device of the sixteenth embodiment as shown in FIG. 28. The accumulated pressure in the accumulator 40 is regulated by the pressure regulating valve 147. The regulated fluid pressure is controlled by the solenoid proportional control valve 146 and then introduced into the reaction chamber 119. When the electronic control unit determines, based on the detection signals from the pressure sensor 62, that the fluid pressure in the power chamber 25 exceeds a predetermined value, the electronic control unit outputs a control signal representing the magnitude represented by the detection signal, i.e. the magnitude proportional to the fluid pressure in the power chamber 25, so as to operate the solenoid proportional control valve 63.

The solenoid proportional control valve 146 normally connects the reaction chamber 119 to the pressure regulating valve 147 so that the accumulated pressure regulated by the pressure regulating valve 147 is directly introduced into the reaction chamber 119. The solenoid proportional valve 146 in operation discharges the pressurized fluid in the reaction chamber 119 to the fluid pressure reservoir 33b or introduces the fluid pressure from the pressure regulating valve 147 to the reaction chamber 119 in such a manner that the fluid pressure in the reaction chamber 119 becomes value controlled to be proportional to the magnitude represented by the control signal from the electronic control unit.

The other structure of the brake pressure boosting device 1 of the seventeenth embodiment is the same as that of the third and sixteenth embodiments mentioned above.

In the brake pressure boosting device 1 of the seventeenth embodiment as structured above, when the electronic control unit determines, based on the detection signal from the pressure sensor 62, that the fluid pressure in the power chamber 25 is lower than the preset working pressure of the solenoid proportional control valve 146, the electronic control unit does not operate the solenoid proportional control valve 146 so that the solenoid proportional valve 146 connects the reaction chamber 41 to the pressure regulating valve 147 without any limitation. Therefore, the servo control is performed at a lower servo ratio for normal braking.

When the electronic control unit determines that the fluid pressure in the power chamber 25 reaches the working pressure of the solenoid proportional control valve 146, the solenoid proportional control valve 146 is operated to control the fluid pressure in the reaction chamber 119 to the magnitude proportional to the fluid pressure in the power chamber 25. Thus, the fluid pressure in the reaction chamber 119 is reduced and the servo ratio is changed to be higher. Since the decrease in the fluid pressure introduced into the reaction chamber 119 is inversely proportional to the increase in the fluid pressure of the power chamber 25, the servo ratio is also gradually increased proportionally.

Figure 29:
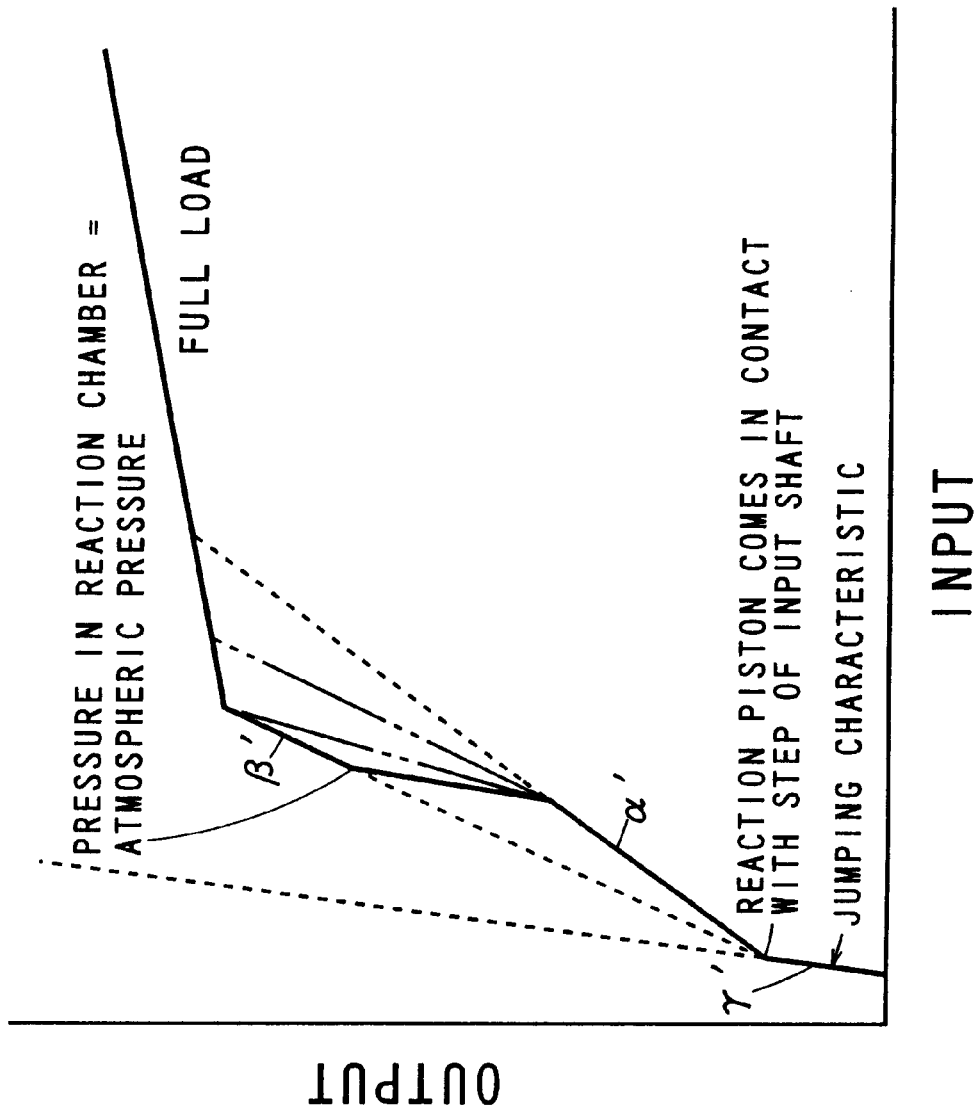
FIG. 29 is a diagram showing input-output characteristics of the brake pressure boosting device shown in FIG. 28.

As the fluid pressure in the reaction chamber 119 becomes equal to the fluid pressure in the power chamber 25, the brake pressure boosting device 1 performs the servo control along the straight line β' of higher servo ratio as shown in FIG. 29, just like the third and sixteenth embodiments. The brake pressure boosting device 1 of the seventeenth embodiment can perform the reversed two-stage servo action whereby the shift from the servo ratio represented by the straight line α' to the servo ratio represented by the straight line β' can be smoothly performed through the servo ratio represented by the straight line δ. Since the accumulated pressure of the accumulator 40 is introduced into the reaction chamber 119, the output of the brake pressure boosting device 1 can be increased as compared to the case where the fluid pressure in the power chamber 25 is introduced into the reaction chamber 119.

The other action and effects of the brake pressure boosting device 1 of the seventeenth embodiment are the same as those of the third and sixteenth embodiments mentioned above.

By controlling the fluid pressure in the reaction chamber 119, the smooth shift from the servo ratio represented by the straight line α' directly to the full load can be achieved as shown by a chain double-dashed line in FIG. 29. Also in the seventeenth embodiment, instead of the accumulated pressure, the fluid pressure in the power chamber 25 may be controlled by the solenoid proportional control valve 146 and then introduced into the reaction chamber 119.

Though in the fourteenth and seventeenth embodiments, the jumping action is performed by the reaction piston 20 with the spring 21, it can be adapted to the pressure boosting devices which do not perform the jumping action by the reaction piston as the thirteenth embodiment shown in FIG. 20 and FIG. 21 that wherein pressure switching valve 46 for varying the servo ratio and the like are disposed outside of the brake pressure boosting device 1.

Figure 30:
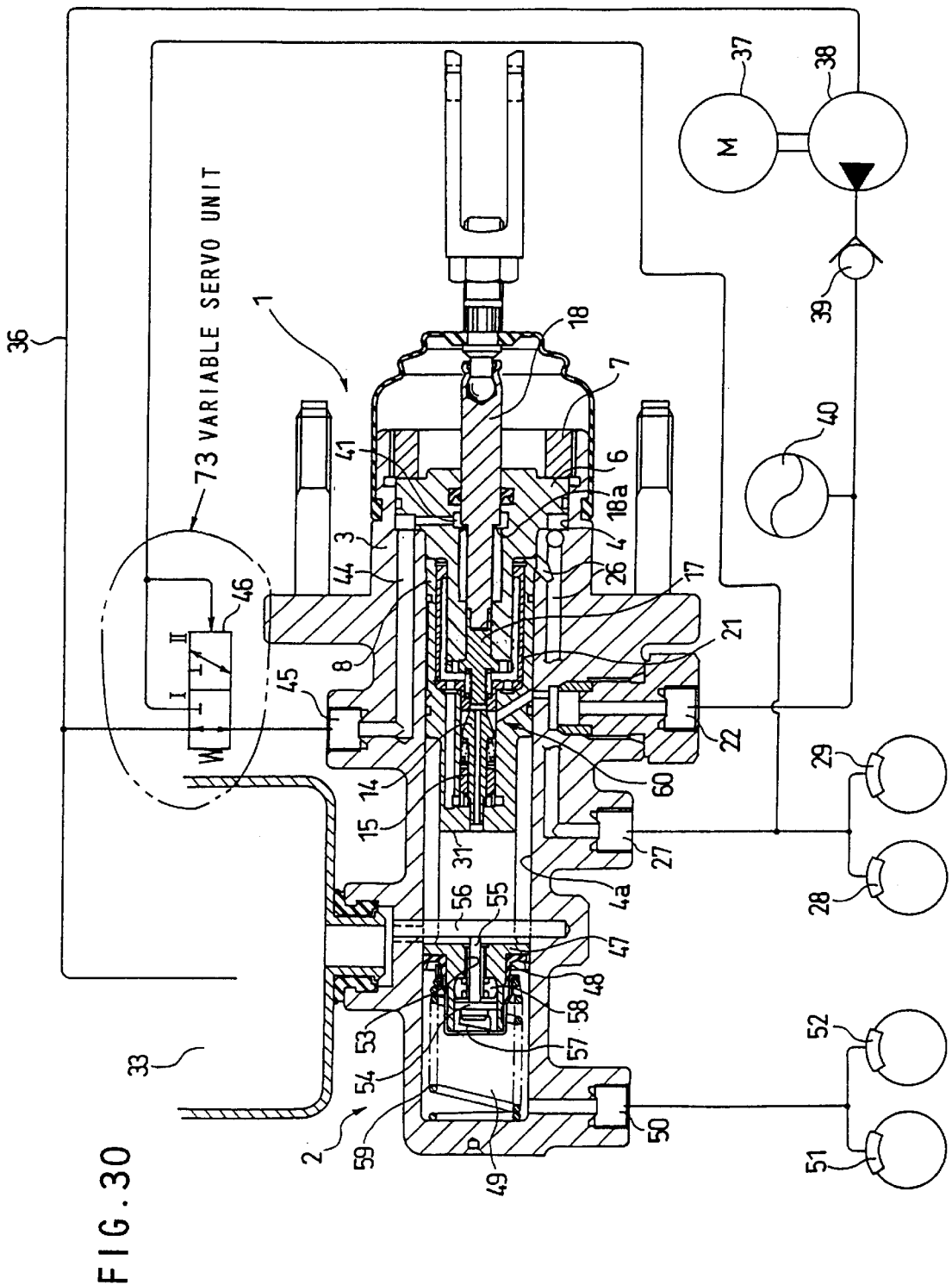
FIG. 30 is a sectional view showing an eighteenth embodiment of the brake pressure boosting device of the present invention.
Figure 31:
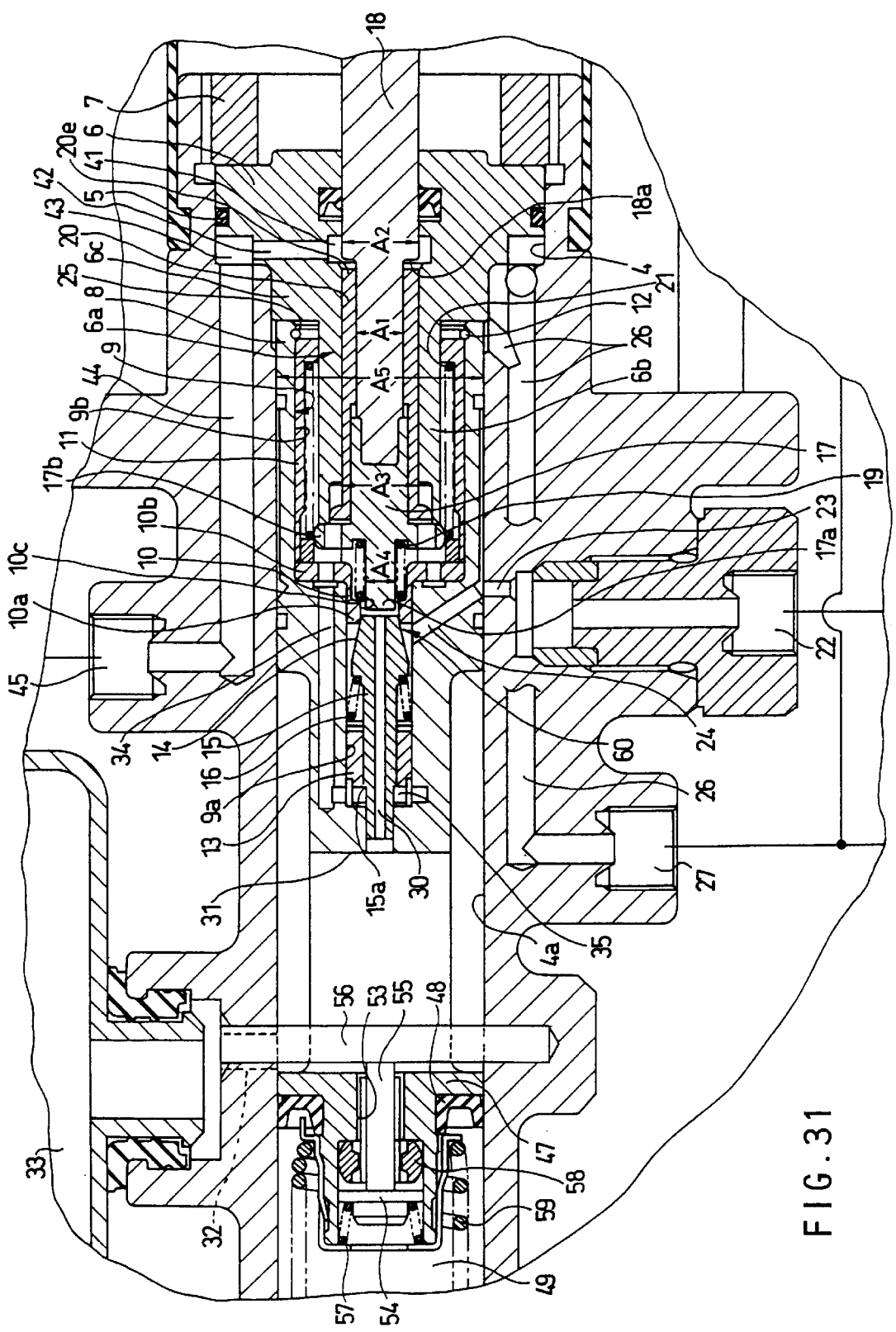
FIG. 31 is a partially enlarged sectional view of a brake pressure boosting device shown in FIG. 30.

FIG. 30 is a sectional view similar to FIG. 1 but showing the eighteenth embodiment of the present invention and FIG. 31 is a partial enlarged sectional view of FIG. 30.

As shown in FIG. 30 and FIG. 31, a brake pressure boosting device of the eighteenth embodiment does not employ the same reaction piston as that of the first embodiment shown in FIG. 1. The input shaft 18 is disposed in the form of a stepped shaft having a small-diameter portion at the front side thereof, a large-diameter portion at the rear side thereof and a step 18 therebetween. The large-diameter portion of the input shaft 18 sealingly penetrates the plug 6 and is connected to a brake pedal not shown at the rear end thereof.

The control pressure inlet 45 is connected to the variable servo unit 73. The variable servo unit 73 comprises the same pressure switching valve 46 as that of the first embodiment.

The other structure of the brake pressure boosting device 1 of the eighteenth embodiment is the same as that of the first embodiment.

When brakes are inoperative where the brake pedal is not pedaled, in the same manner as the first embodiment, the pressurized fluid of the accumulator 40 is supplied to the power chamber 25, the fluid pressure in the power chamber 25 is introduced into both WCYs 28, 29 relating to one circuit and MCY pressure developed in the MCY3 is introduced into both WCYs 51, 52 relating to the other circuit, thereby applying brakes of both circuits.

Figure 32:
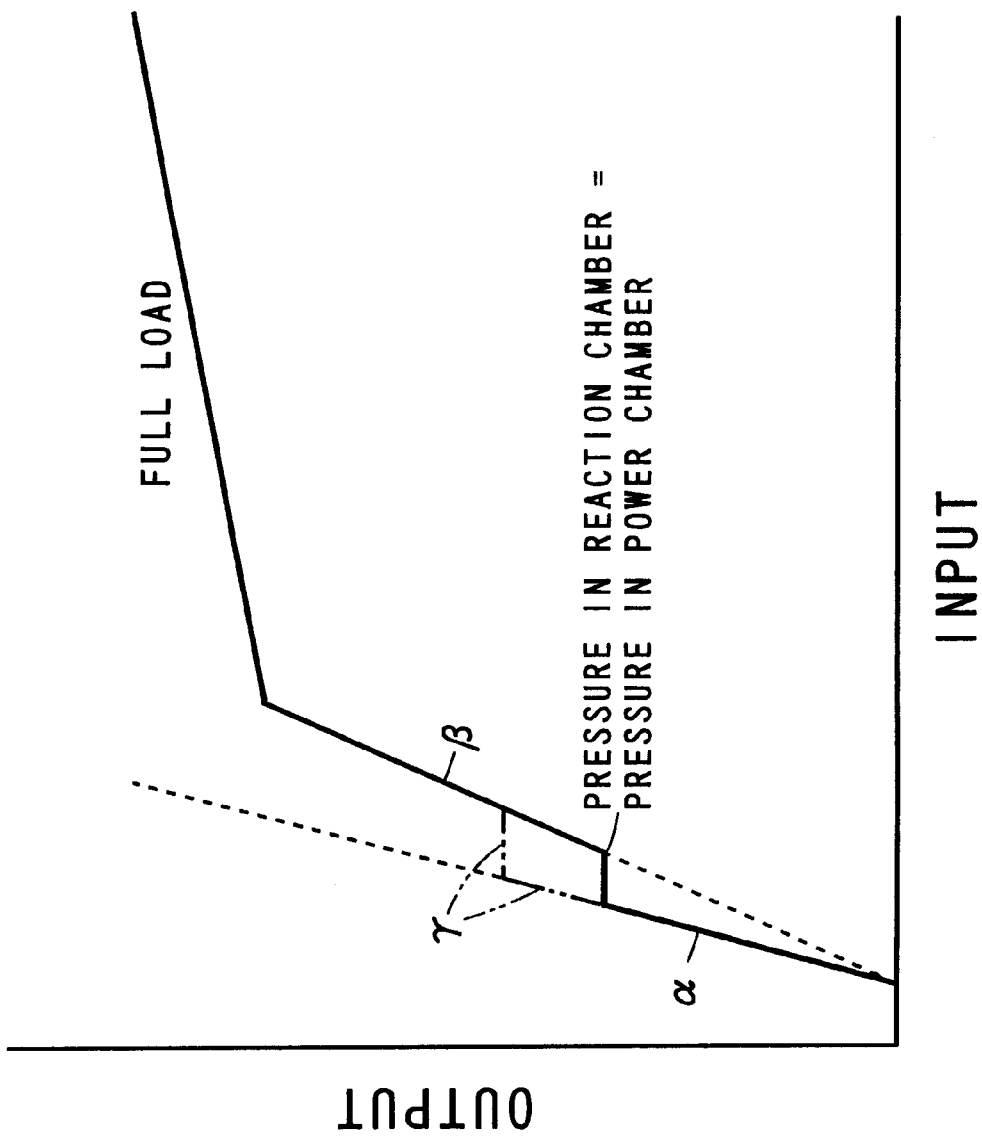
FIG. 32 is a diagram showing input-output characteristics of the brake pressure boosting device shown in FIG. 30.

Assuming that the output of the brake pressure boosting device 1 is $F_{out}$, the input of the brake pressure boosting device 1 is $F_{in}$, the sectional area of the small-diameter portion of the stepped input shaft 18 (effective pressure receiving area: hereinafter, the same is true for other sectional areas) is $A_1$ (shown in FIG. 2: hereinafter, the same numeral A is used for the other sectional areas), the sectional area of the large-diameter portion of the input shaft 18 is $A_2$, the sectional area of the seated portion between the valve cone 14 and the second valve seat 17a is $A_3$, the sectional area of the outer diameter of the power piston 8 is $A_4$, (wherein $A_3<A_1<A_2<A_4$), and the biasing forces of the springs 19, and 59 are $SPG_1$, $SPG_2$, the input-output characteristic of the brake pressure boosting device 1 is found by the following equation 10;

$$F_{out}=(A_4/A_1-A_3)*F_{in}-(A_4/A_1-A_3)*SPG_1-SPG_2 \qquad 10$$

and is represented by a straight line α as shown in FIG. 32. The servo control is performed at a higher servo ratio.

During the servo control until the input reaches a predetermined value, the fluid pressure in the power chamber 25 does not rise to the working pressure of the pressure switching valve 46 so that the pressure switching valve 46 is still set in the first position I and the reaction chamber 49 is still connected to the reservoir 33.

As the input reaches the predetermined value and thus the fluid pressure in the power chamber 25 reaches the working pressure of the pressure switching valve 46, the pressure switching valve 46 is switched to be set in the second position II. Then, the reaction chamber 49 is connected to a brake fluid line between the output port 27 and the WCYs 28, 29, so the fluid pressure at the output port 27 at the servo-ratio control pressure i.e. fluid pressure in the power chamber 25 is introduced into the reaction chamber 41. The fluid pressure introduced into the reaction chamber 41 acts on the step 18a of the input shaft to oppose the input of the input shaft 18. The reaction acting on the input shaft 18 is increased so that the jumping action represented by the straight line a shown in FIG. 32 is terminated. After that, the output of the brake pressure boosting device 1 is increased at a ratio lower than that the preceding servo ratio relative to the input of the input shaft 18. That is, because of the increased reaction, the brake pressure boosting device 1 performs the servo control in which the input of the input shaft 18 is boosted at a relatively low servo ratio and is then outputted. Therefore, the WCYs 28, 29; 51, 52 produce braking forces smaller than that at a ratio along the straight line α relative to the input shaft 18. The input-output characteristic of the brake pressure boosting device 1 at this point is found by the following equation 11;

$$F_{out}=(A_4/A_2-A_3)*F_{in}-(A_4/A_2-A_3)*SPG_1-SPG_2 \qquad 11$$

and is represented by a straight line β as shown in FIG. 32. As mentioned above, the brake pressure boosting device 1 has the reversed two-stage servo characteristic in which, as the input exceeds the predetermined value, the servo control is performed at a servo ratio lower than the preceding servo ratio.

As a result of further increase in the input, the fluid pressure in the power chamber 25 reaches the maximum setting pressure at which pressure is developed in the accumulator 40. From this point, the fluid pressure in the power chamber 25 is no more increased, so the brake pressure boosting device 1 finishes the servo control at the higher servo ratio and becomes in the full-load state. After that, the output of the brake pressure boosting device 1 increases in proportion to the input without magnification.

As the brakes are canceled by releasing the brake pedal, in the same manner as the first embodiment, the input shaft 18 largely retreats and the second valve seat 17a is largely moved apart from the valve cone 14, so the pressurized fluid in the power chamber 25 is quickly discharged. Then, the pressurized fluid in the WCYs 28, 29 relating to the one circuit is quickly discharged to the reservoir 33 so that the fluid pressure in the WCYs 28, 29 are decreased. The pressurized fluid in the WCYs 51, 52 is also quickly discharged to the reservoir 33 so that the fluid pressure in the WCYs 51, 52 is decreased. Therefore, the output of the brake pressure boosting device 1 is decreased at a lower servo ratio along the full load line, the straight line β relative to the input of the input shaft 18. In this way, the brakes of both the circuits quickly begin to be canceled.

As the fluid pressure in the power chamber 25 becomes lower than the servo-ratio switching pressure of the pressure switching valve 46, the pressure switching valve 46 is switched to set in the first position I so that the reaction chamber 41 is connected to the reservoir 33. The reaction chamber 41 has no more fluid pressure acting on the step 18a of the input shaft 18. The servo control is shifted to be performed at a higher servo ratio along the straight line α. After that, the decrease in the output of the brake pressure boosting device 1 is larger than that in case of the servo control at the lower servo ratio along the straight line β relative to the decrease in the input of the input shaft 18.

In the brake pressure boosting device 1 of the eighteenth embodiment, when the fluid pressure in the power chamber 25 exceeds the predetermined pressure, in other words, the input from the brake pedal exceeds the predetermined value, the reversed two-stage servo characteristic allowing the servo control at a servo ratio higher than that for normal braking can be exhibited. The reversed two-stage servo characteristic can be obtained with a simple structure comprising the reaction chamber 41, which is disposed in a place where the step 18a of the input shaft 18 is positioned, and the pressure switching valve 46, which allows the fluid pressure in the power chamber 25 to be introduced into the reaction chamber 41.

Therefore, in the event of emergency, only by pedaling the brake pedal to the servo-ratio switching point not substantially fully pedaling as conventional one, large braking forces can be quickly obtained. The brake assist for ensuring that large braking force is obtained in the event of emergency even by such an inexpert driver can be provided.

In this manner, the increase in the braking force is restricted to some extent when the braking force exceeds the predetermined value in the brake pressure boosting device 1, thereby improving the operational feeling.

The servo-ratio switching point can be varied by adjusting the preset working pressure of the pressure switching valve 46.

The accumulated pressure in the accumulator 40 may be introduced into the reaction chamber 41. In this case, the accumulated pressure in the accumulator 40 may be directly introduced into the reaction chamber 41 or may be regulated by a pressure regulating valve and then introduced into the reaction chamber 41.

The other action and effects of the brake pressure boosting device 1 of the eighteenth embodiment are the same as those of the first embodiment.

Figure 33:
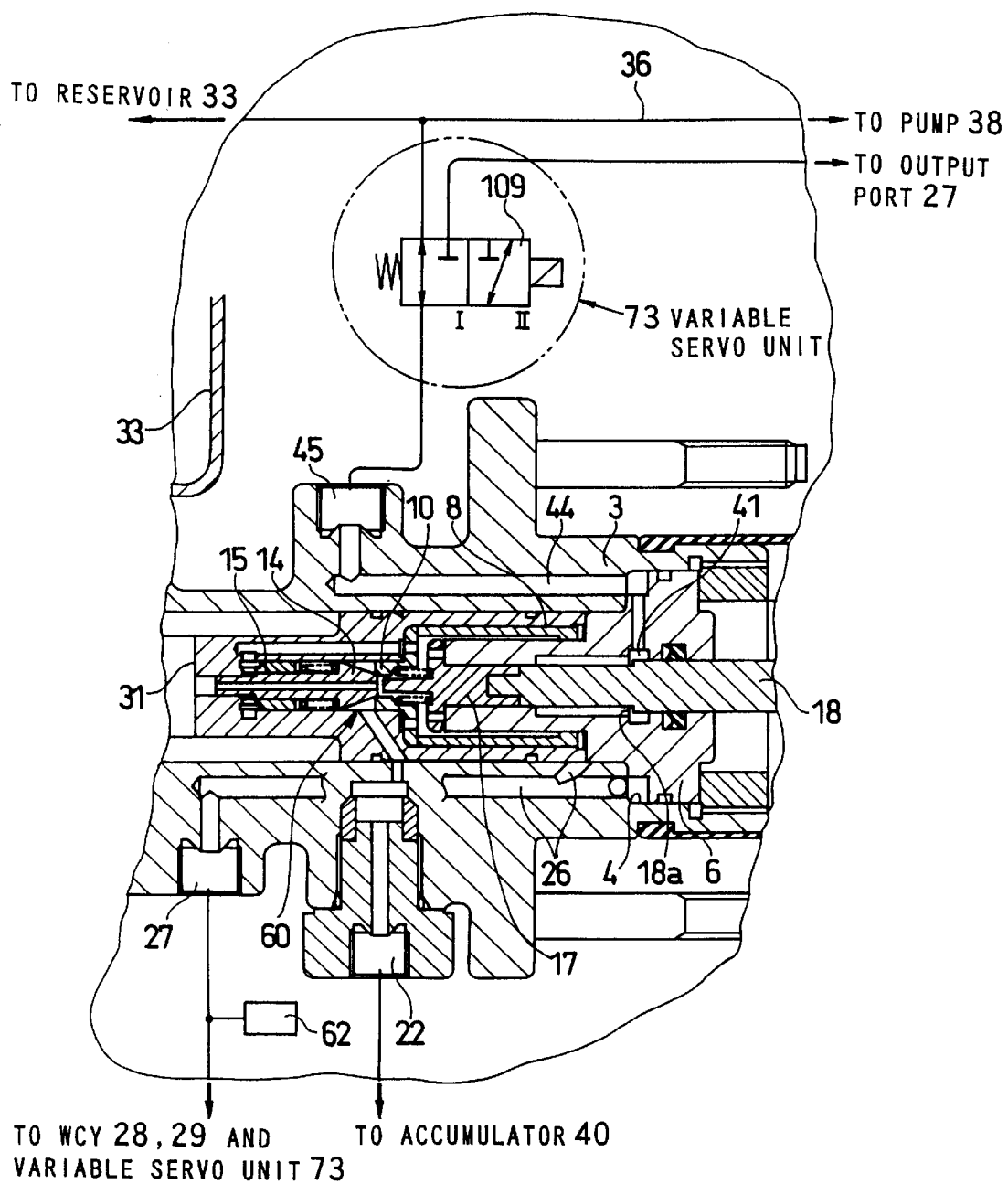
FIG. 33 is a sectional view showing a nineteenth embodiment of the present invention.

FIG. 33 is a partial sectional view showing partially the nineteenth embodiment of the present invention.

Though the variable servo unit 73 is provided with the pressure switching valve 46 which is controlled by the pilot pressure dependent on the fluid pressure in the power chamber 25 in the eighteenth embodiment mentioned above, a variable servo unit 73 is provided with a solenoid switching valve 109 instead of the pressure switching valve 46 as shown in FIG. 33 in a brake pressure boosting device of the nineteenth embodiment. The brake pressure boosting device 1 has a pressure sensor 62 for controlling the switching of the solenoid switching valve 109.

The solenoid switching valve 109 is composed of a two-position three-way valve having a first position I and a second position II, just like the pressure switching valve 46. The pressure sensor 62 detects the fluid pressure in the power chamber 25 and outputs signals to an electronic control unit not shown which switches, based on the detection signal from the pressure sensor 62, the solenoid switching valve 109 to the second position II when the fluid pressure in the power chamber 25 reaches a value equal to the working pressure of the pressure switching valve 46.

In the nineteenth embodiment, when the electronic control unit detects the increase in the fluid pressure in the power chamber 25 faster than that for normal braking based on the detection signal from the pressure sensor 62 and decides that the emergency braking operation is performed, the electronic control unit delays the switching of the solenoid switching valve 109 to the second position II.

The other structure of the brake pressure boosting device 1 of the nineteenth embodiment is the same as that of the eighteenth embodiment mentioned above.

In the brake pressure boosting device 1 of the nineteenth embodiment as structured above, when the fluid pressure in the power chamber 25 is lower than the working pressure of the solenoid switching valve 109, the electronic control unit sets the solenoid switching valve 109 in the first position I so that the reaction chamber 41 is connected to the reservoir and thus becomes at atmospheric pressure. Therefore, the servo control at a higher servo ratio represented by the straight line a shown in FIG. 32. When the fluid pressure in the power chamber 25 exceeds the working pressure of the solenoid switching valve 109, the electronic control unit sets the solenoid switching valve 109 to the second position II, so the fluid pressure in the power chamber 25 is introduced into the reaction chamber and acts on the step 18a of the input shaft 18. Therefore, the servo control at a lower servo ratio represented by the straight line β shown in FIG. 32.

When emergency braking operation is conducted, the fluid pressure in the power chamber 25 is increased more rapidly than the case of the normal braking. The electronic control unit delays the switching of the solenoid switching valve 109 to the second position II when the rapid increase in the fluid pressure of the power chamber 25 is detected. For this delay, the shift from a higher servo ratio along the straight line α to a lower servo ratio along the straight line β as shown by a chain double-dashed line γ in FIG. 32 is delayed. That is, the servo-ratio switching point is changed and the termination of the servo control at the higher servo ratio is delayed. As a result of this, the brake pressure boosting device 1 develops larger output, thereby providing larger braking force during the emergency braking.

The other action and effects of the brake pressure boosting device 1 of the nineteenth embodiment are the same as those of the eighteenth embodiment.

Figure 34:
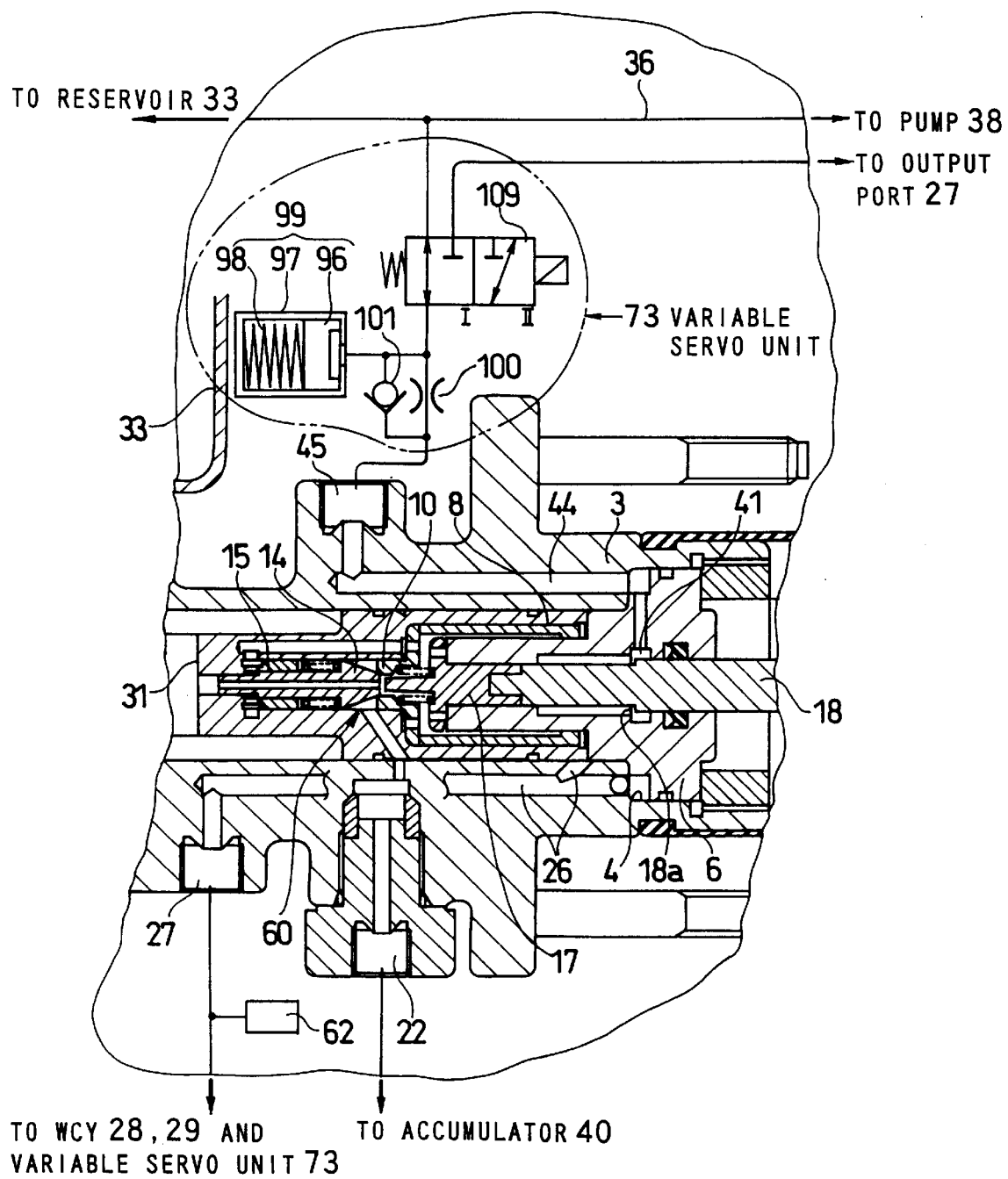
FIG. 34 is a sectional view showing a twentieth embodiment of the present invention.

FIG. 34 is a view partially showing the twentieth embodiment.

Though the shift of the servo ratio is delayed by delaying the switching of the solenoid switching valve 109 in case of rapid increase of the fluid pressure in the power chamber 25 so as to obtain large braking force during the emergency braking in the nineteenth embodiment mentioned above, the variable servo unit 73 of the brake pressure boosting device 1 of the twentieth embodiment comprises a low pressure accumulator 99 for accumulating fluid, which has a piston 96, a cylinder 97, and a spring 98 and is disposed on a line between the same solenoid switching valve 109 as that of the nineteenth embodiment and the control pressure inlet 45, an orifice 100 disposed on a line between the control pressure inlet 45 and the solenoid switching valve 109 and the low pressure accumulator 99, a check valve 101 allowing only the flow of fluid from the control pressure inlet 45 to the solenoid switching valve 109 and the low pressure accumulator 99. The shift of the servo ratio is delayed by the orifice 100 and the low pressure accumulator 99 to obtain large braking force during the emergency braking. The other structure of the brake pressure boosting device 1 of the twentieth embodiment is the same as that of the nineteenth embodiment.

When emergency braking is conducted, the fluid pressure in the power chamber 25 is rapidly increased. Therefore, when the solenoid switching valve 109 is switched to the second position II, the fluid pressure in the power chamber 25 rapidly flows into the reaction chamber 41 but is throttled by the orifice 100 and is accumulated in the low pressure accumulator 99. As a result, the low pressure accumulator 99 has accumulated pressure. Since this delays the increase in the fluid pressure of the reaction chamber 41, the shift from a higher servo ratio along the straight line α to a lower servo ratio along the straight line β shown by chain double-dashed line γ in FIG. 32 is delayed. That is, the servo-ratio switching point is changed and the termination of the servo control at the higher servo ratio is delayed. As a result of this, the brake pressure boosting device 1 develops larger output, thereby providing larger braking force during the emergency braking. After that, when the solenoid switching valve 109 is switched to be set in the first position I, the pressurized fluid in the reaction chamber 41 is rapidly discharged to the reservoir 33 through a check valve 101.

The other action and effects of the brake pressure boosting device of the twentieth embodiment are the same as those of the nineteenth embodiment.

It should be noted that the combination of the delay control of the switching of the solenoid switching valve 109 as the nineteenth embodiment into the brake pressure boosting device 1 of the twentieth embodiment enables to provide further larger braking force.

Figure 35:
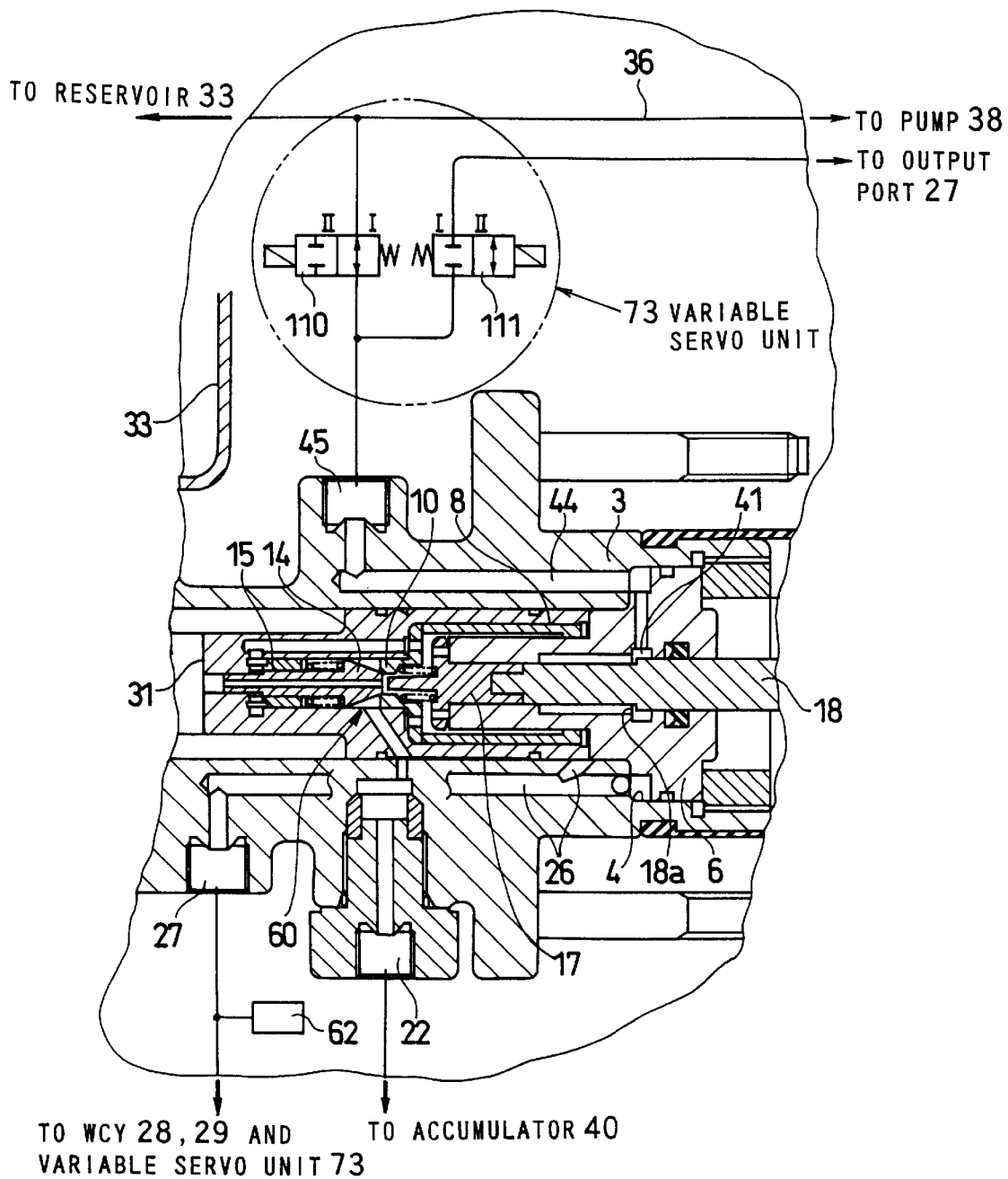
FIG. 35 is a sectional view showing a twenty-first embodiment of the present invention.

FIG. 35 is a view partially showing the twenty-first embodiment of the present invention.

As shown in FIG. 35, a variable servo unit 73 of a brake pressure boosting device 1 of the twenty-first embodiment comprises third and fourth solenoid shut-off valves 110, 111 instead of the solenoid switching valve 109 composed of a two-position three-way valve of the nineteenth embodiment shown in FIG. 33.

The third solenoid shut-off valve 110 is a normally open valve provided with a communicating position I and a shut-off position II and the fourth solenoid shut-off valve 111 is a same normally closed valve provided with a shut-off position I and a communicating position II. When the fluid pressure in the power chamber 25 detected by the pressure sensor 62 is greater than the working pressure of the solenoid shut-off valves 110, 111, the electronic control unit switches the third and fourth solenoid shut-off valves into the respective second position II.

The other structure of the brake pressure boosting device of the twenty-first embodiment is the same as that of the nineteenth embodiment.

Figure 36:
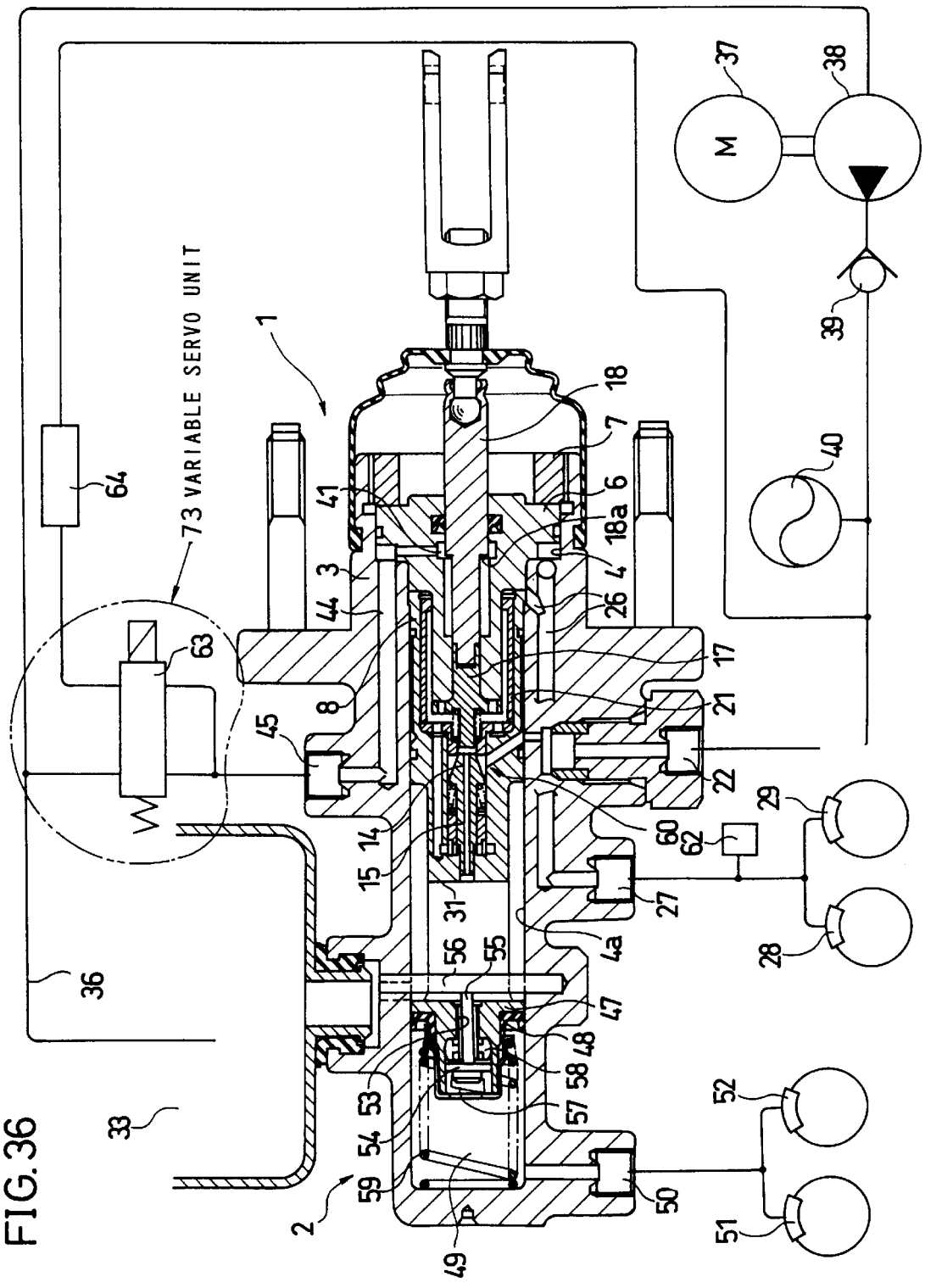
FIG. 36 is a sectional view showing a twenty-second embodiment of the present invention.

FIG. 36 is a view showing the twenty-second embodiment of the present invention.

As shown in FIG. 36, in a brake pressure boosting device 1 of the twenty-second embodiment, a variable servo unit 73 is provided with a solenoid proportional control valve 63 which is connected to the accumulator 40 through a pressure regulating valve 64. The solenoid proportional control valve 63 is controlled by an electronic control unit based on the fluid pressure in the power chamber 25 detected by a pressure sensor 62 in the same manner as the aforementioned solenoid valves in such a manner that the solenoid proportional control valve 63 in non-operation connects the control pressure inlet 45 to the reservoir 33 and in operation, shuts off the control pressure inlet 45 from the reservoir 33 and connects the pressure regulating valve 64. In this case, the solenoid proportional valve 63 proportionally controls the output pressure from the pressure regulating valve 64 to output a controlled signal to be inputted into a solenoid. Therefore, the accumulated pressure of the accumulator 40 is regulated by the pressure regulating valve 64, then controlled corresponding to the fluid pressure in the power chamber 25 by the solenoid proportional control valve 63, and introduced into the reaction chamber 41.

The other structure of the brake pressure boosting device 1 of the twenty-second embodiment is the same as that of the nineteenth embodiment.

In the brake pressure boosting device 1 of the twenty-second embodiment in non-operation, the solenoid proportional control valve 63 connects the reaction chamber 41 to the reservoir 33 so that the inside of the reaction chamber 41 is at atmospheric pressure.

Figure 37:
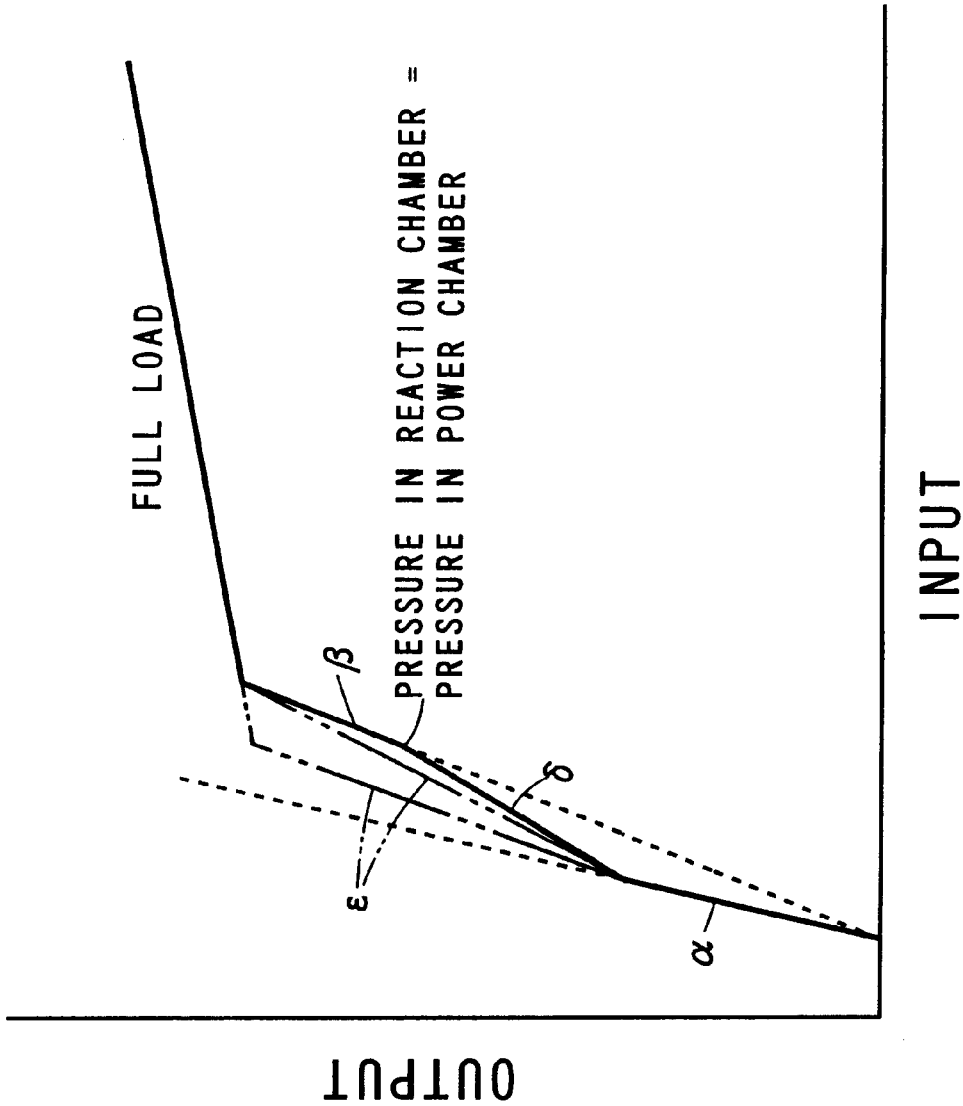
FIG. 37 is a diagram showing input-output characteristics of the brake pressure boosting device shown in FIG. 36.

When braking operation is conducted in this state, the brake pressure boosting device 1 performs the servo control at a higher servo ratio along α straight line as shown in FIG. 37 (the same as the straight line α of FIG. 32).

As the fluid pressure in the power chamber 25 reaches the servo-ratio switching pressure, the electronic control unit operates the solenoid proportional control valve 63, based on the detection signal of the pressure sensor 62, to shut off the reaction chamber 41 from the reservoir 33. After that, since the electronic control unit controls the solenoid proportional control valve 63 corresponding to the fluid pressure in the power chamber 25, the solenoid control valve 63 outputs pressure corresponding to the fluid pressure in the power chamber 25 and pressurized fluid at the outputted pressure is introduced into the reaction chamber 41. Therefore, the brake pressure boosting device 1 gradually shifts the servo ratio from the ratio represented by the straight line α to the ratio represented by the straight line β via the ratio represented by the straight line γ. In this manner, in the brake pressure boosting device 1 of the twenty-second embodiment, the servo ratio can be smoothly shifted.

By properly controlling the fluid pressure in the solenoid proportional control valve 63, the shift from the servo ratio represented by the straight line α directly to the full load can be achieved as shown by a chain double-dashed line d in FIG. 37. Also, instead of the accumulated pressure, the fluid pressure in the power chamber 25 may be employed as the fluid pressure to be introduced into the reaction chamber 41.

Figure 38:
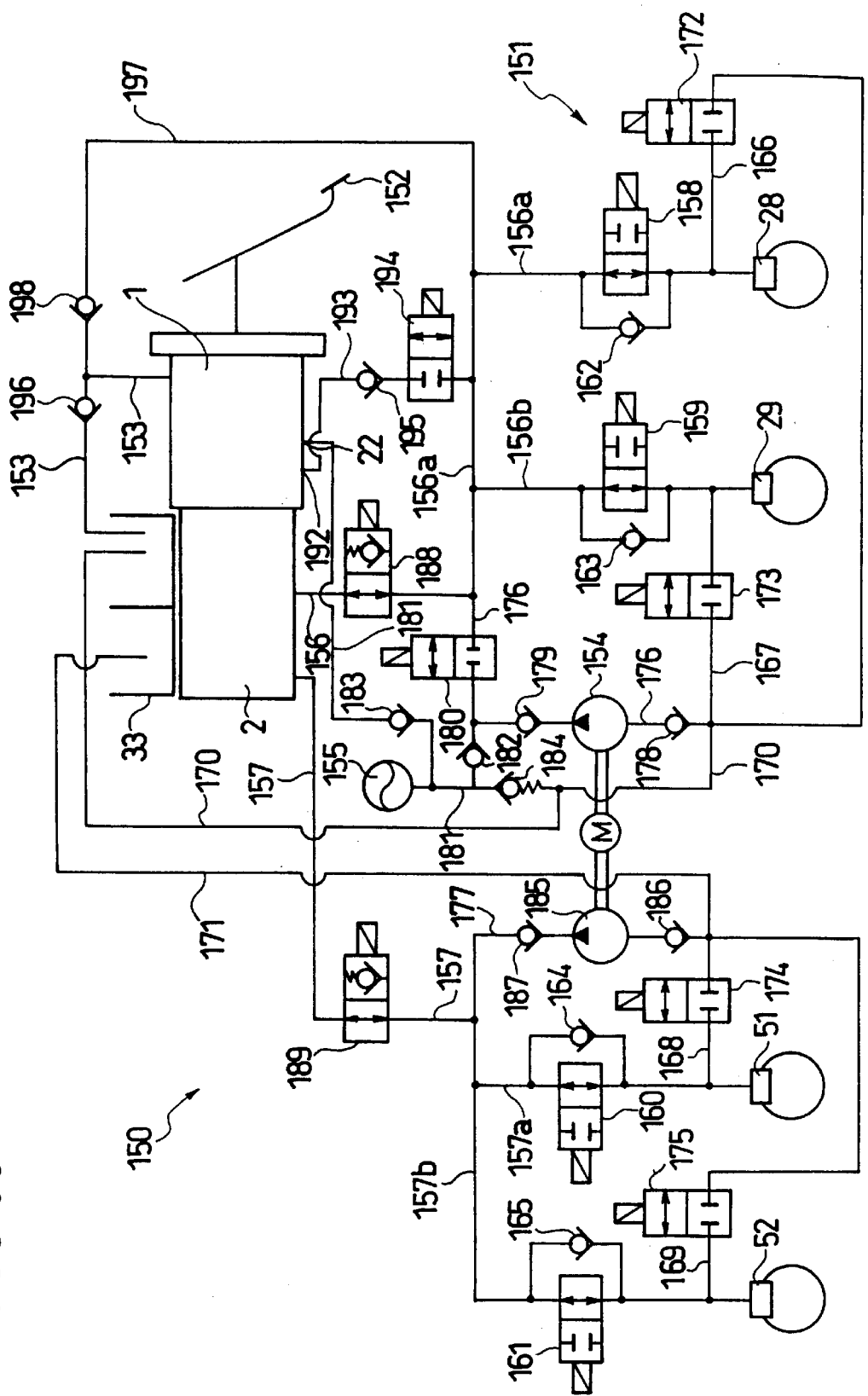
FIG. 38 is a view showing a twenty-third embodiment of the brake pressure boosting system according to the present invention.
Figure 39:
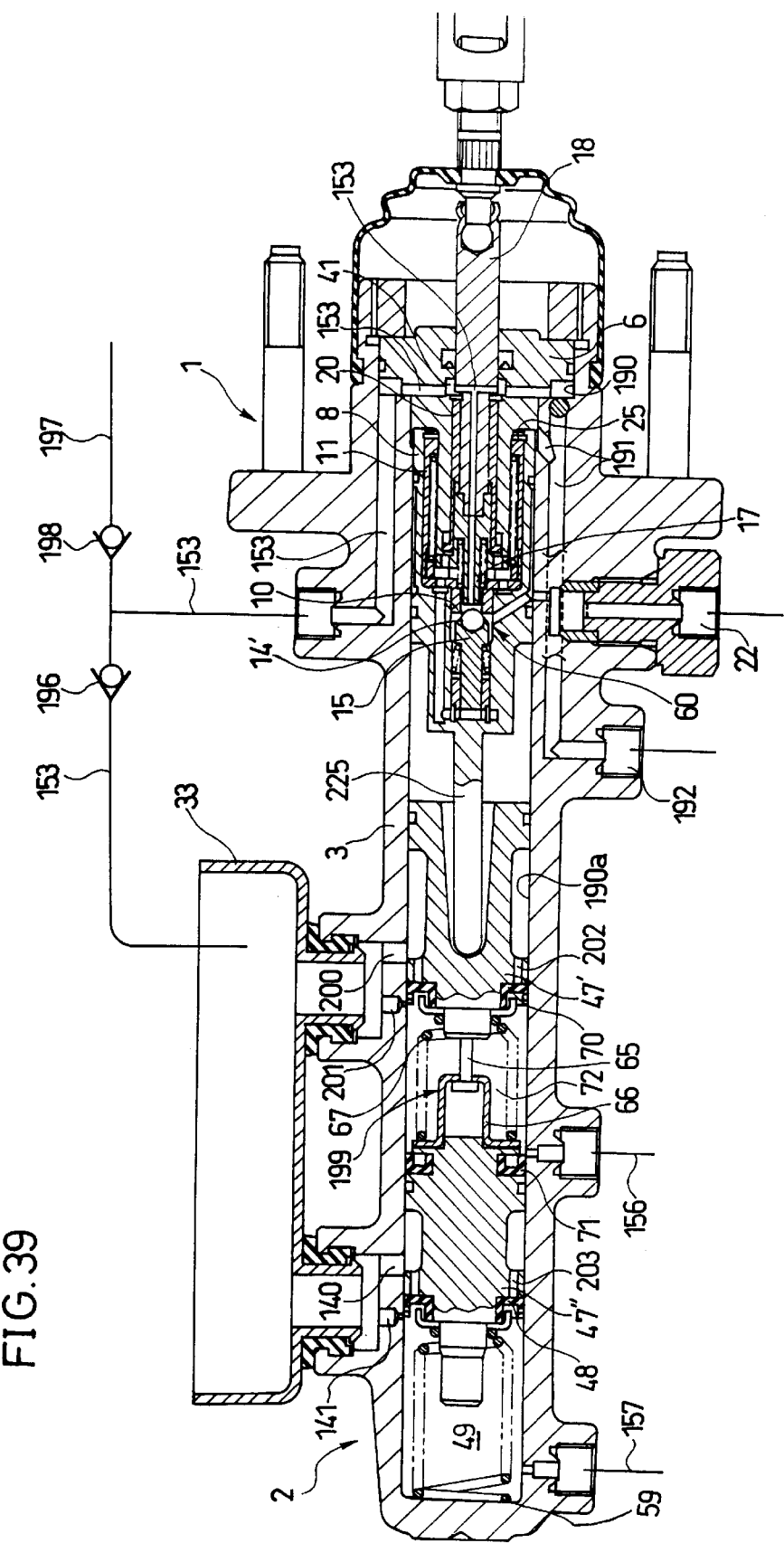
FIG. 39 is a sectional view showing an example of the brake pressure boosting device used for the twenty-third embodiment shown in FIG. 38.
Figure 40:
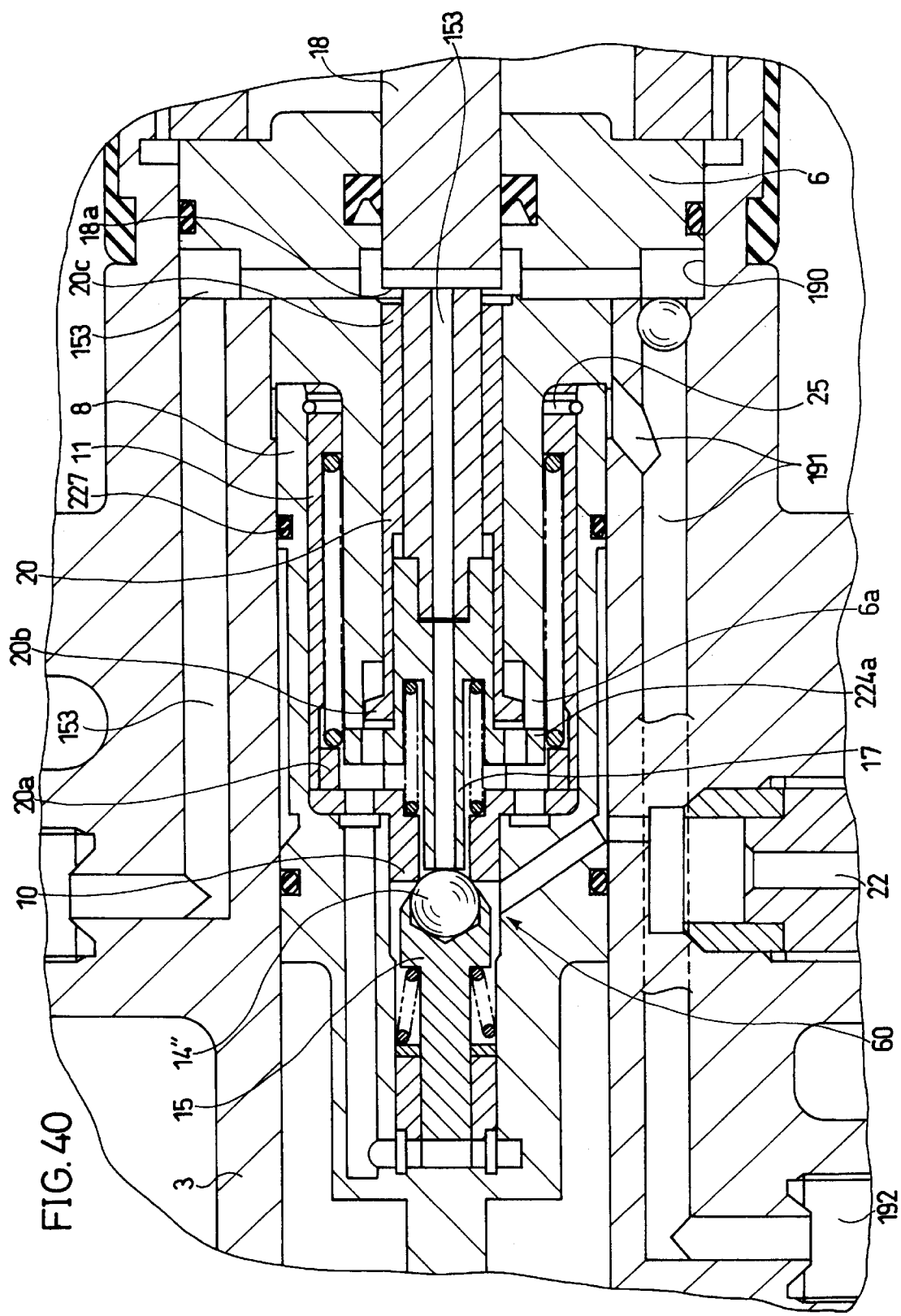
FIG. 40 is a partially enlarged sectional view showing a part of the brake pressure boosting device shown in FIG. 39.

FIG. 38 is a view showing a brake pressure boosting system of the twenty-third embodiment according to the present invention, FIG. 39 is a sectional view showing a brake pressure boosting device in the brake pressure boosting system of the twenty-third embodiment, and FIG. 40 is a partially enlarged sectional view showing the brake pressure boosting device shown in FIG. 39.

As shown in FIG. 38, the brake pressure boosting system 150 of the twenty-third embodiment comprises a brake pressure boosting device 1, a MCY 2, WCYs 28, 29, 51, and 52, a brake pressure controlling device 151 with two circuits for performing the ABS control, the TRC control, the VSC control, and ACC control, and a brake pedal 152.

Figure 52:
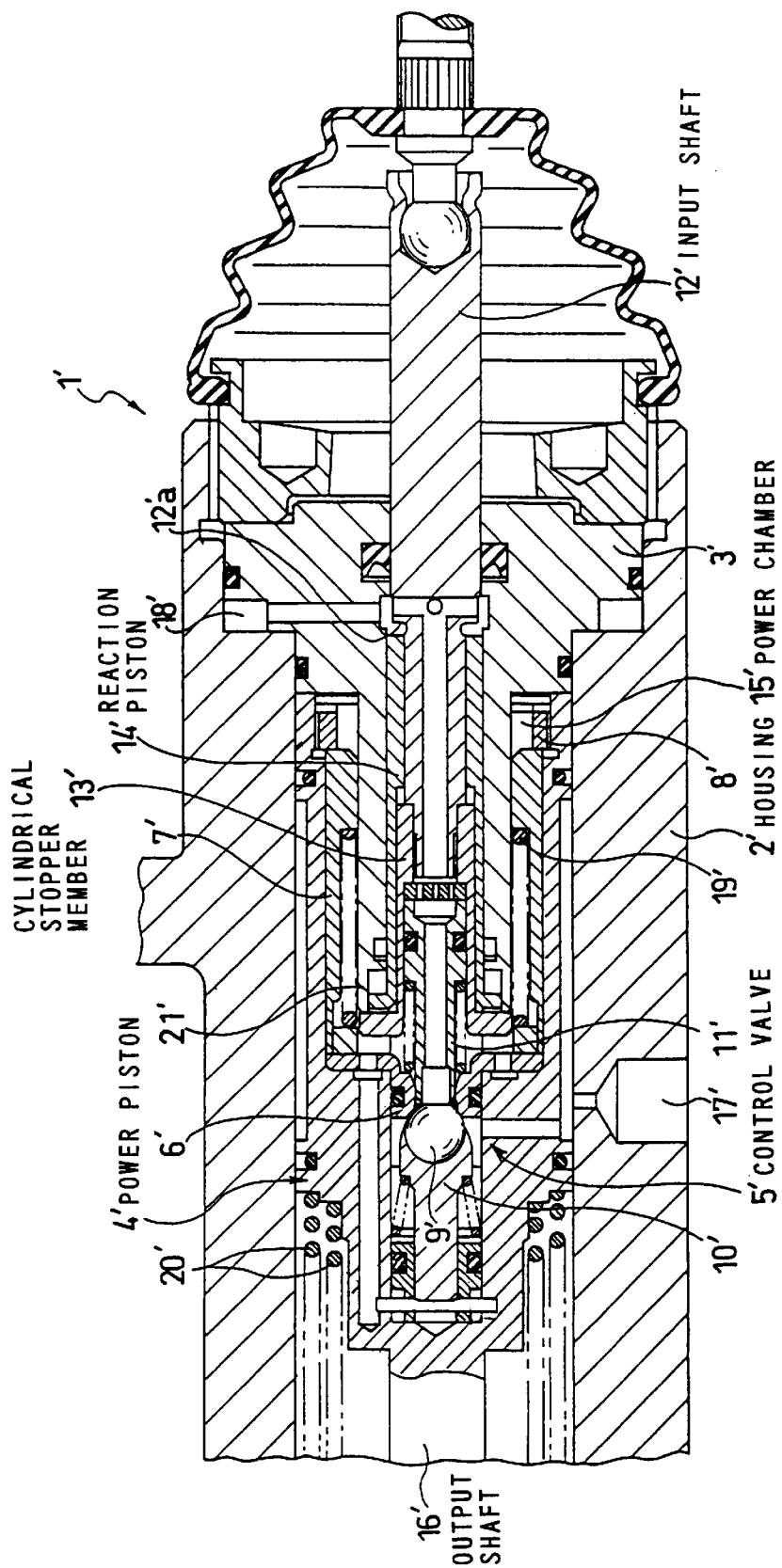
FIG. 52 is a partial sectional view partially showing a conventional brake pressure boosting device.

The brake pressure boosting device 1 of the twenty-third embodiment is substantially the same as the conventional one shown in FIG. 52 mentioned above, except the following points as shown in FIG. 39 and FIG. 40.

The housing 3 is provided with a relatively long stepped hole 190 which extends in the axial direction and opens at the rear end of the housing 3. The stepped hole 190 has a small-diameter portion 190a having a constant sectional area and extending from the brake pressure boosting device 2 to the MCY 2. A power piston 8 is sealingly and slidably disposed in the small-diameter portion 190a of the stepped hole 190.

The housing 3 is provided with a pressure inlet 192 formed therein for communicating with a power chamber 25 through a passage 191. A valve operating member 17 and a cylindrical stopping member 224 are formed integrally so that a stopper 224 is formed in the valve operating member 17.

The other structure of the brake pressure boosting device 1 of the twenty-third embodiment is the same as that of the conventional example shown in FIG. 52.

The brake pressure boosting device 2 has an output shaft 225 which is disposed to be in contact with a primary piston 47'. The output shaft 225 pushes the primary piston 47' when the power piston 8 is operative.

The MCY 2 comprises the primary piston 47' and a secondary piston 47" which are each set to have the same effective pressure receiving area as that of the power piston 8 so that the MCY 2 has substantially the same structure as a typical tandem MCY. The pistons 47', 47" are sealingly and slidably disposed in the small-diameter portion 190a of the stepped hole 190. The maximum distance between the pistons 47', 47" is restricted by a distance restricting means 199. The pistons 47', 47" are biased in a direction separating from each other by a spring 67 compressed and disposed therebetween so that the pistons 47', 47" are set to have the maximum distance when the brake pressure boosting device 1 is inoperative.

A cup sealing member 70 is fitted to the front end of the primary piston 47' and cup sealing members 71, 48 are fitted to the rear end and the front end of the secondary piston 47", respectively. A fluid chamber 72 is defined in the small-diameter portion 4a between the cup sealing members 70 and 71 and a fluid chamber 49 is defined in the small-diameter portion 4a in front of the cup sealing member 48. The fluid chamber 72 is connected to a first line 156 i.e. the WCYs 28, 29 of the driving wheels, while the fluid chamber 49 is connected to a second line 157 i.e. the WCYs 51, 52 of the non-driving wheels.

The housing 3 on the MCY 2 side is provided with fluid supplying ports 200, 140 and fluid compensating ports 201, 141 which are formed therein. The fluid supplying ports 200, 140 and the fluid compensating ports 201, 141 always communicate with the reservoir 33. When the primary piston 47 is in the inoperative position, the cup sealing member 70 is positioned between the fluid supplying port 200 and the fluid compensating port 201. When the secondary piston 47" is in the inoperative position, the cup sealing member 48 is positioned between the fluid supplying port 140 and the fluid compensating port 141. Therefore, while the brake pressure boosting device 1 is inoperative, fluid can flow freely between the fluid chamber 72 and the fluid compensating port 201 and between the fluid chamber 49 and the fluid compensating port 141 in both directions.

When the brake pressure boosting device 1 is operative, the pistons 47', 47" advance and the cup sealing members 70, 48 pass over the fluid compensating ports 201, 141, the flows of fluid from the fluid chambers 72, 49 toward the reservoir 33 are blocked. When the pistons 47', 47" retreat from the operative positions, brake fluid in the reservoir 33 is supplied into the fluid chambers 72, 49 through the fluid supplying ports 200, 140 and axial holes 202, 203 formed in the respective pistons 47', 47". A return spring 59 is provided in the fluid chamber 49 in order to always bias the secondary piston 47" in a direction toward the inoperative position.

In the brake pressure boosting system 151 of the twenty-third embodiment, as shown in FIG. 38, the first line 156 communicating with the fluid chamber is connected to the WCYs 28, 29 relating to one circuit (i.e. the driving-wheel side circuit) through first and second branches 156a, 156b, respectively. The second line 157 communicating with the fluid chamber is connected to the WCYs 51, 52 relating to the other circuit (i.e. the non-driving-wheel side circuit) through first and second branches 157a, 157b, respectively.

As shown in FIG. 38, the brake pressure controlling device 151 is of a return pump type in which brake fluid discharged from WCYs is returned to MCY 2 side. The brake pressure controlling device 151 comprises first through fourth retaining valves 158, 159, 160, and 161 which are normally open solenoid shut-off valves, first through fourth check valves 162, 163, 164, and 165 which are disposed in parallel with the first through fourth retaining valves 158 through 161, first through fourth discharge lines 166, 167, 168, and 169 for discharging the brake fluid in the WCYs 28, 29, 51, and 52, third and fourth passages 170 and 171, first through fourth discharge valves 172, 173, 174, and 175 which are normally closed solenoid shut-off valves disposed on the first through fourth discharge lines 166 through 169, respectively, a fifth line 176 connecting a confluence between the first and second discharge lines 166, 167 and the third line 170 to the first line 156, on which a first pump 154 is disposed, a sixth line 177 connecting a confluence between the third and fourth discharge lines 168, 169 and the fourth line 171 to the second line 157, fifth and sixth check valves 178, 179 disposed on the fifth line 176 such that the first pump 154 is positioned between them, a pump discharge fluid control valve 180 which is a normally closed solenoid shut-off valve disposed on the fifth line 176 between the sixth check valve 179 and the first line 156, a seventh line 181 for connecting the input port 22 of the brake pressure boosting device 1 to a fifth line 176 between the sixth check valve 179 and the pump discharge control valve 180, on which an accumulator 155 is disposed, seventh and eighth check valves 182 and 183 disposed on the seventh line 181 such that the accumulator 155 is positioned between them, a relief valve 184 for controlling the accumulator 3 to have a predetermined pressure, a second pump 185 disposed on the sixth line 177, ninth and tenth check valves 186 and 187 on the sixth line 177 such that the second pump 185 is positioned between them, and first and second differential pressure valves 188 and 189 which are normally open solenoid valves with open positions and relief positions disposed on the first and second lines 156 and 157, respectively.

In the brake pressure controlling device 151, the first branch 156a is connected to the pressure inlet 192 of the brake pressure boosting device 1 through a line 193 on which a normally closed solenoid shut-off valve 194 is disposed and further a eleventh check valve 195 is disposed at the pressure inlet 192 side from the solenoid shut-off valve 194.

Disposed on a fluid discharge line 153 is a twelfth check valve 196 for allowing only flow of brake fluid from reservoir 33 toward the brake pressure boosting device 1. The fluid discharge line 153 positioned at the power chamber side 25 from the twelfth check valve 196 is connected to the first branch 156 through a fifth branch 197 on which a thirteenth check valve 198 for allowing only flow of brake fluid from the fluid discharge line 153 toward the first branch 156a.

The description will now be made as regard to the operation of the brake pressure boosting system 150 of the twenty-third embodiment as structured above. When brakes are inoperative, all structural elements of the brake pressure boosting system 150 are in inoperative state shown in FIG. 38 through FIG. 40. In this inoperative sate, a valve ball 14" of a control valve 60 is seated in the valve seat member 10 and the end of the valve operating member 17 is separated from the valve ball 14". Therefore, the power chamber 25 is shut off from the input port 22 which always communicates with the accumulator 155 and is connected to the reservoir 33 through the fluid discharge line 153, so no fluid pressure is introduced into the power chamber 25. Therefore, the power chamber 25 is at atmospheric pressure so that the power piston 8 is not operated Then, the MCY 2 is also not operated not to develop MCY pressure.

As the normal braking operation is conducted by pedaling the brake pedal 152, the input shaft 18 advances to switch the control valve 60 in the same manner as mentioned above. Then, pressurized fluid is introduced into the power chamber whereby the power piston 8 boosts and outputs force applied on the brake pedal. The output is transmitted to the primary piston 47' of the MCY 2 through the output shaft 225 so that the primary piston 47' advances. As the cup sealing member 70 passes over the fluid compensating port 201 by the advance of the primary piston 47', MCY pressure is developed in the fluid chamber 72. By the developed MCY pressure, the secondary piston 47" advances. As the cup sealing member 48 passes over the fluid compensating port 141 by the advance of the secondary piston 47", MCY pressure is developed in the fluid chamber 49. The respective MCY pressures in the fluid chambers 72, 49 are introduced into the WCYs 28, 29, 51, 52 whereby normal braking is conducted. Since the effective pressure receiving areas of the respective pistons 8, 47', 47" are equal to each other so that the fluid pressures in the respective chambers 25, 72, 49 are equal to each other.

The input-output characteristic of the brake pressure boosting device is completely the same as the conventional example mentioned above in the operative direction as shown in FIG. 41. That is, the jumping control is performed in the initial stage of braking operation, after that, the servo control at a normal servo ratio is performed, and then the full load control is performed.

When the braking release operation is conducted by reducing the force applied on the brake pedal 152, the input shaft 18 retreats to switch the control valve 60 so that the pressurized fluid in the power chamber 25 is about to be discharged through the fluid discharge line 153. However, the pressurized fluid is blocked from such flowing by the twelfth check valve 196 so that the pressurized fluid is not discharged directly to the reservoir 33. Since the fluid pressure in the power chamber 25 at this point keeps the rear end 20e of the reaction piston 20 to be in contact with the step 18a of the input shaft 18, the reaction piston 20 retreats together with the retreat of the input shaft 18. This reduces the volume of the reaction chamber 41, whereby the fluid pressure in the fluid discharge line 153 at the brake pressure boosting device 1 side from the twelfth check valve 196 rises as well as the fluid pressure in the reaction chamber 41. Then, the thirteenth check valve 198 opens so that the pressurized fluid in the power chamber 25 is discharged to the first branch 156a, i.e. the WCYs 28, 29, through the line 197. Therefore, the pressure in the reaction chamber 41 is reduced with keeping the same pressure as the WCY pressure.

Since the pressure in the reaction chamber 41 acts against the fluid pressure in the power chamber 25 (in the same direction as the input of the input shaft 18) acting on the rear end 20e of the reaction piston 20, the brake pressure boosting device 1 becomes in a state where the rear end 20e of the reaction piston 20 is not in contact with the step 18a of the input shaft 18 so that the servo ratio becomes substantially the same as that during the jumping action.

Assuming that the braking release operation is conducted in the full load state of the brake pressure boosting device 1, the output of the brake pressure boosting device 1 drops along a full-load line together with the decrease in the input in the operation release direction. Even when, after that, the output reaches a position on a normal servo-ratio line in the operative direction, the output does not drop along the normal servo-ratio line but drops along the full-load line because the full-load state of the brake pressure boosting device 1 still continues.

As the output reaches a position on a servo-ratio line for the jumping action, the output then drops along the servo-ratio line for the jumping action. As the output is decreased and the biasing force of the spring 21 biasing the reaction piston 20 becomes greater than the force by the fluid pressure in the power chamber acting on the reaction piston, the reaction piston 20 moves forward relative to the input shaft 18 so that the rear end 20e of the reaction piston 20 moves apart form the step 18a of the input shaft 18 and is thus returned to the inoperative state.

As mentioned above, the brake pressure boosting device 1 has different ways of input-output characteristic between the operative direction and the operation release direction. That is, the brake pressure boosting device 1 has large hysteresis. Because the brake pressure boosting device 2 of the twenty-third embodiment has large hysteresis as mentioned above, even with the same input, variable outputs can be obtained within a hysteretic range (range shown by arrow in FIG. 41) of that input. That is, by properly controlling the pressure in the reaction chamber 41, output can be controlled relative to one input to have any value within the hysteretic range.

By using the hysteresis of the brake pressure boosting device 1, the brake pressure boosting system 150 of the twenty-third embodiment can perform brake assist control. The function of the brake assist control will be described hereinafter.

When the braking operation is conducted by pedaling the brake pedal 152, based on the pedaling condition such as the rate of rise of a pedal stroke (detected by a stroke sensor not shown), the electronic control unit determines whether the brake assist control is required or not. When it is determined that the brake assist control is required, the electronic control unit drives a motor M to operate the first pump 154, opens the pump discharge fluid control valve 180, switches the first differential pressure valve 188 to the relief position, and opens the solenoid shut-off valve 194. Then, the discharge pressure in the first pump 154 is introduced into the power chamber 25 through the pump discharge fluid control valve 180, solenoid shut-off valve 194, the eleventh check valve 195, the pressure inlet 192, and the passage 191, so the fluid pressure in the power chamber 25 is increased. Because of the hysteresis of the brake pressure boosting device 1, the fluid pressure in the power chamber 25 rises within the hysteresis range even with the same force applied on the brake pedal.

The pump discharge pressure is introduced into the WCYs 28, 29 of the driving wheels (front wheels) so that the WCY pressure of the WCYs 28, 29 is also increased. At this point, since the pump discharge pressure and the fluid pressure in the power chamber 25 become equal to each other, the WCY pressure rises with keeping the same pressure as the fluid pressure in the power chamber 25. As the fluid pressure in the power chamber 25 is further increased, the output of the power piston 8 is also increased, whereby the MCY pressure developed by the secondary piston 47" is also increased. Since the MCY pressure is introduced into the WCYs 51, 52 of the non-driving wheels (rear wheels), the WCY pressure of the WCYs 51, 52 is also increased. Since the effective pressure receiving areas of the pistons 8, 47', 47" are equal to each other, the WCY pressures and the fluid pressure in the power chamber 25 are increased and balanced to have the same pressure.

During the brake assist control increase in the WCY pressure of the WCYs 28, 29 of the front wheels increases the stroke of the WCYs 28, 29. However, since the differential pressure valve 188 is set in the relief position so as to block the flow of brake fluid from fluid chamber 72 toward the WCYs 28, 29, the increase in stroke of WCYs 28, 29 does not affect the pedal stroke. In this manner, the one circuit does not affect the pedal stroke during the brake assist control, thereby preventing the increase in the pedal stroke during the brake assist control.

The increase in stroke of the WCYs 28, 29 is absorbed by that the fluid pressure in the power chamber 25 is supplied to the WCYs 28, 29. On the other hand, during the brake assist control, the stroke of the WCYs 51, 52 is increased by the increase in WCY pressure of the WCYs 51, 52 of the rear wheels. At this point, the differential pressure valve 189 for the rear wheels is set in the communicating position, so the secondary piston 47" advances so that the brake fluid in the fluid chamber 49 is supplied to the WCYs 51, 52. Therefore, the increase in stroke of the WCYs 51, 52 affects the pedal stroke.

The brake pressure controlling device 151 performs the ABS control by reducing, retaining, and increasing the brake pressure in order to cancel locking tendency of a braked wheel. When, based on rotational speed signals of the respective wheel outputted from a vehicle wheel speed sensor not shown, the electronic control unit detects locking tendency of at least one wheel during braking, the electronic control unit closes the first through fourth retaining valves 158, 159, 160, 161. As a result of this, the WCY pressures of the WCYs 28, 29, 51, 52, i.e. the brake pressures are retained to stop the increase in the braking force. When the locking tendency is still not cancelled even by this pressure-retaining operation, electronic control unit opens one of the first through fourth discharge valves 172, 173, 174, 175 corresponding to the wheel in locking tendency. The WCY corresponding to the wheel is connected to the reservoir 33 so that the pressurized fluid in the WCY is discharged to the reservoir 33 and the brake pressure of the WCY is thus reduced. As the wheel speed of the wheel in locking tendency is therefore recovered to a predetermined speed, the electronic control unit drives the motor M to operate the first and second pumps 154, 185, opens the closed discharge valve, opens the retaining valves 158, 159, 160, 161, and opens the pump discharge fluid control valve 180. Then, the first and second pumps 154, 185 supply the brake fluid from the reservoir 33 to the MCY 2 and the brake pressure is increased by the MCY pressure. As the wheel becomes locking tendency by the increase in the brake pressure, the ABS control is performed by retaining, reducing, and increasing the brake fluid pressures until completely canceling the tendency toward wheel lock.

The brake pressure controlling device 151 performs the TRC control by automatically braking the driving wheels when the driving wheels are in slipping tendency in order to cancel the slipping tendency. When the electronic control unit detects, based on the wheel speed signals of the driving wheel from the wheel speed sensor, the slipping tendency of at least one driving wheel when the vehicle is started and accelerated, the electronic control unit drives the motor M to operate the first pump 154, opens the pump discharge fluid control valve 180, switches the first differential pressure valve 188 to the relief position, and close one of the first and second retaining valve 158, 159 corresponding to the driving wheel which is not in slipping tendency. The first pump 154 allows the supply of brake fluid from the reservoir 33 to the WCY corresponding to the driving wheel which is in slipping tendency, thereby braking the driving wheel.

The electronic control unit controls the switching of the retaining valve and the discharge valve corresponding to the driving wheel, which is in slipping tendency, to supply the discharge fluid from the pump to the WCY, discharge the brake fluid from the WCY to the reservoir so as to regulate the braking pressure according to the degree of slipping tendency. Therefore, the rotational driving force of the driving wheel is reduced, thereby restricting the slipping tendency. As the pump discharge pressure exceeds a predetermined value, a part of the pump discharge pressure is discharged to the reservoir 33 through the differential pressure valve 188, the fluid chamber 72 and fluid compensating port 201 of the inoperative MCY 2 by the relief behavior of the differential pressure valve 188, thereby controlling the pump discharge pressure to be the predetermined value. When the differential pressure valve 188 is in the relief position, the flow of brake fluid from the fluid chamber 72 to the WCYs 28, 29 is interrupted.

As mentioned above, the TRC control is performed by controlling the rotational driving force on the driving wheel by braking the driving wheel in slipping tendency, until completely canceling the slipping tendency.

Though the driving of the motor during the TRC control operates the second pump 185 for the non-driving wheels, the brakes on the non-driving wheels are not actuated because the pump discharge fluid is sent to the reservoir 33 through the second differential valve 189 in the open position and the MCY 2.

The brake pressure controlling device 151 further performs the VSC control by braking inside wheels when the vehicle turns in order to control the attitude of the vehicle. When the electronic control unit detects the vehicle turning based on a wheel speed signal from the wheel speed sensors relating to inside and outside wheels when the vehicle turns, or a steering angle signal is received from a steering angle sensor not shown for detecting the angle of the steering wheel, the electronic control unit drives the motor M to operate the first and second pumps 154, 185, opens the pump discharge fluid control valve 180, switches the first and second differential pressure valves 188, 189 to the respective relief positions, and closes one of the retaining valves corresponding to the outside wheels. Then, the first and second pumps 154, 185 supply the brake fluid in the reservoir 33 to the WCYs relating to the inside wheels, thereby braking the inside wheels. At this point, the electronic control unit controls the switching of the retaining valve and the discharge valve corresponding to the inside wheels to supply the discharge fluid from the pump to the WCYs and to discharge the brake fluid from the WCYs to the reservoir, whereby the brake pressure is regulated according to the vehicle speed and steering angle during the vehicle turns. In this manner, the speed of the inside wheels are reduced, thereby controlling the attitude of the turning vehicle. As mentioned above, the VSC control is performed by controlling the wheel speed of the inside wheels of the turning vehicle by braking the inside wheels when the vehicle turns, until completely canceling the slipping tendency.

The brake pressure controlling device 151 performs the ACC control by braking wheels for controlling the vehicle to run at a constant speed. When the vehicle is set to a constant speed running mode and the electronic control unit detects that the vehicle speed exceeds the set speed based on the wheel speed signals from the respective wheel speed sensors, the electronic control unit drives the motor M to operate the first pump 154, opens the pump discharge fluid control valve 180, and switches the first differential pressure valve 188 to the relief position. Then, the first pump 154 supplies the brake fluid from the reservoir 154 to the WCYs corresponding to the driving wheels, thereby braking the driving wheels. At this point, the electronic control unit controls the switching of the retaining valve and the discharge valve relating to the driving wheels to supply the discharge fluid from the pump to the WCYs and to discharge the fluid pressure from the WCYs to the reservoir, whereby the brake pressure is regulated according to a difference between the vehicle speed and the set speed. In this manner, the vehicle speed is reduced and the vehicle is thus controlled to run at the set speed. As mentioned above, by braking the driving wheels when the vehicle speed exceeds the set speed during the constant speed running mode, the vehicle is controlled to run at the constant speed, performing the ACC control.

It should be noted that a normal open solenoid shut-off valve may be used instead of the first and second differential pressure valves 188, 189.

According to the twenty-third embodiment, the brake pressure boosting device 1 is provided with hysteresis of the input-output characteristic between the operative direction and the operation release direction. In this case, the brake pressure boosting device 1 having hysteresis can be easily made at a low cost only with little change from the conventional brake pressure boosting device because used in this device 1 are the cheap check valves 196, 198 not an expensive solenoid valve.

The brake pressure boosting system 150 can simply and securely provide the brake assist by using the hysteresis of the brake pressure boosting device 1 and by the electronic control unit which controls the solenoid shut-off valve 194 according to the pedaling speed and the force applied to the brake pedal.

Since the pump 154 for performing ABS control, TRC control, VSC control, and ACC control, which is provided in the conventional one, is also used as a second fluid source for supplying fluid pressure to be introduced into the power chamber 25 during braking assist mode, the brake assist function can be provided in the brake pressure boosting system 150 at lower cost without increase in the number of parts. It should be understood that other fluid source may be provided as the second fluid source, but the effect as mentioned above can not be obtained.

Figure 42:
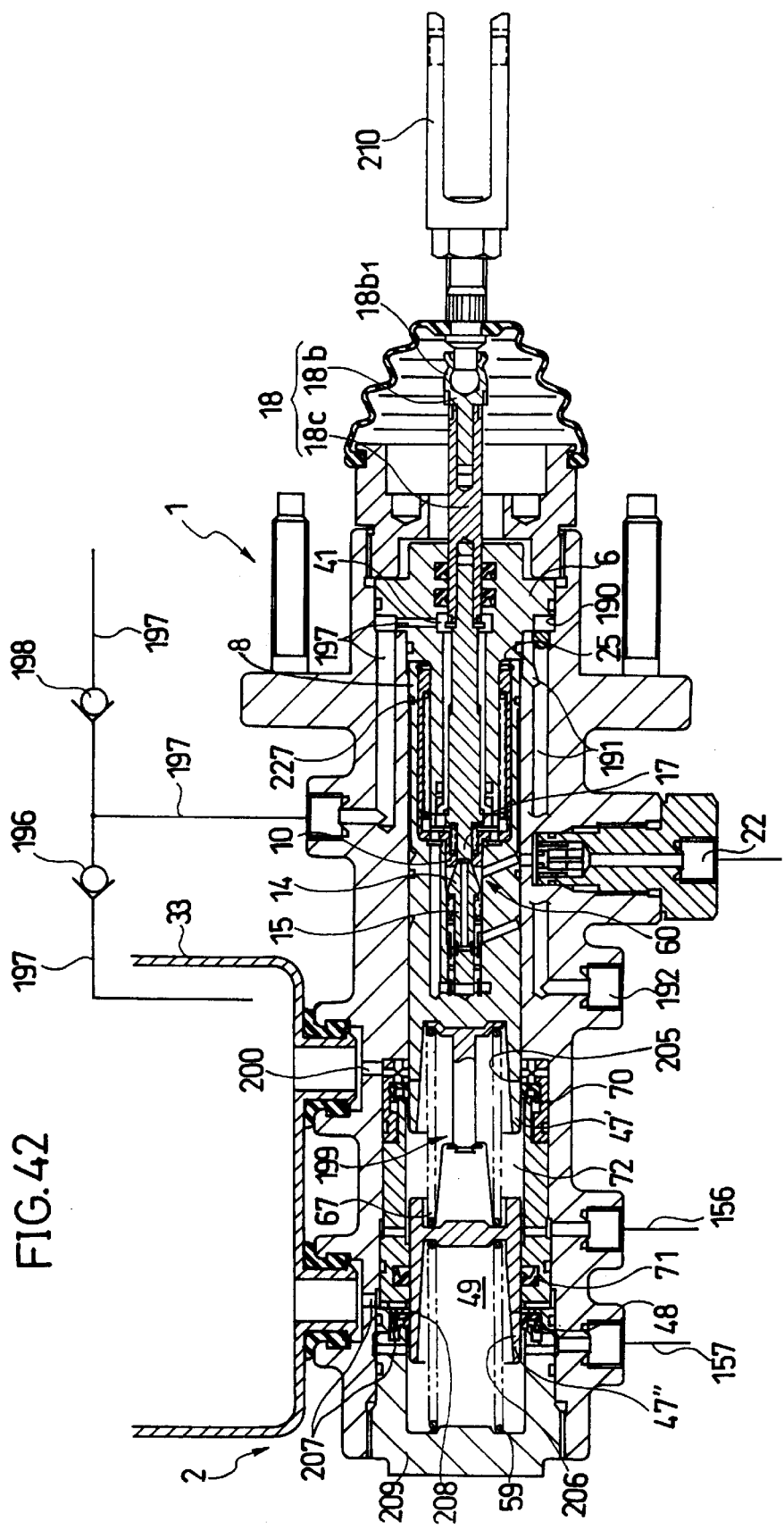
FIG. 42 is a view showing a twenty-fourth embodiment of the present invention.

FIG. 42 is a view showing the twenty-fourth embodiment of the present invention. It should be noted that parts similar or corresponding to the parts of the following embodiment will be marked by the same reference numerals as the preceding embodiments so that the description about the parts will be omitted.

Though the brake pressure boosting device 1 of conventional type in which the cup sealing members 70, 71, 48 are disposed on the pistons 47', 47", respectively, is used and the power piston 8 and the primary piston 47' are formed integrally in the twenty-third embodiment, a brake pressure boosting device 1 of plunger type in which the cup sealing members 70, 71, 48 are disposed at the housing 3 side is used and the power piston 8 and the primary piston 47' are formed integrally.

The primary piston 47' is formed integrally with the front end of the power piston 8. The primary piston 47' is provided with a radial hole 205 formed therein for connecting the fluid chamber 72 to the reservoir 33 through a passage 204 formed in the housing 3. The radial hole 205 is positioned slightly behind the cup sealing member 70 to allow the communication between the fluid chamber 72 and the reservoir 33 when the primary piston is inoperative as illustrated. When the primary piston 47' advances and the radial hole 205 passes over the cup sealing member 70, the radial hole 205 intercepts the communication between the fluid chamber 72 and the reservoir 33.

The secondary piston 47" is formed in a cylindrical shape having an axial hole 206 which opens toward the fluid chamber 49, and a bottom. The secondary piston 47" is provided, at the front end, with a radial hole 208 just like the radial hole 205 for connecting the fluid chamber 49 to the reservoir 33 through the passage 207 of the housing 3. The radial hole 208 is positioned slightly behind the cup sealing member 71 to allow the communication between the fluid chamber 49 and the reservoir 33 when the primary piston is inoperative as illustrated. When the primary piston 47' advances and the radial hole 208 passes over the cup sealing member 71, the radial hole 208 intercepts the communication between the fluid chamber 49 and the reservoir 33.

The housing has a stepped hole 190 which is formed as a penetrating hole which opens at both sides. The end at the MCY 2 side (the left end in the figure) of the stepped hole 190 is sealingly closed by a plug 209. Because the stepped hole 190 is the penetrating hole, parts can be inserted from both ends of the stepped hole 190.

Figure 43:
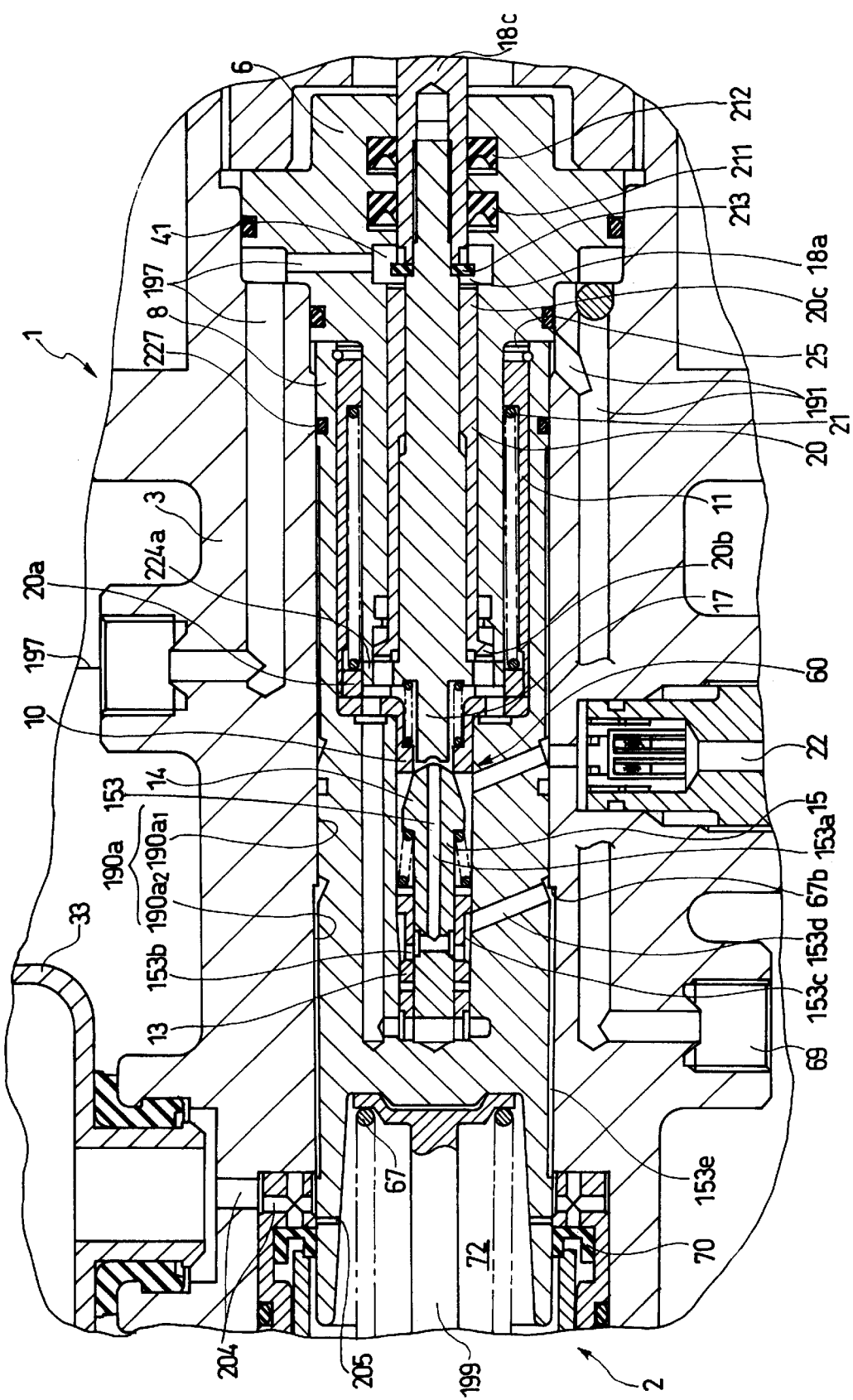
FIG. 43 is a partially enlarged sectional view showing a part of the brake pressure device shown in FIG. 42.

As shown in FIG. 43 in enlarged scale, the stepped hole 190 comprises a small-diameter portion which has slightly different diameters. The inner diameter of a MCY side portion $190a_2$ of the small-diameter portion 190a is larger than the inner diameter of a power piston side portion $190a_1$ of the small-diameter portion 190a. Accordingly, the outer diameter of the pressure receiving portion of the primary piston 47' is larger than the outer diameter of the pressure receiving portion of the power piston 8.

The reason is as follows. Since making the fluid pressure in the power chamber 25 equal to the fluid pressure in the fluid chambers 72, 49 facilitates the control of the braking force to be a predetermined magnitude during the brake assist mode, the effective pressure receiving area of the power piston 8 and the effective pressure receiving area of the pistons 47', 47" of the MCY 2 should be equal. For this, a method of setting the outer diameter of the power piston 8 and the outer diameter of the pistons 47', 47" to be equal to each other may be considered. However, since an O-ring 227 is disposed on the power piston 8 for defining the receiving area of the power piston while the cup sealing member 70, 71, 48 are disposed on the pistons 47', 47", the effective pressure receiving area of the power piston 8 and the effective pressure receiving area of the pistons 47', 47" must be different from each other even after the aforementioned setting. Under the circumstances, the small-diameter portion 190 is formed to be a stepped hole so as to make the effective pressure receiving areas substantially equal.

Since the small-diameter portion 190a of the stepped hole 190 is formed as the stepped hole, the stepped portion 190a has a step 190b. In order to ensure the stroke of the pistons 8, 47 even with the step 190b, the small-diameter portion 190a as a sliding portion of the pistons 8, 47' is formed to be long and a predetermined distance is set between the pistons 8 and 47'.

The valve cone 14 and the valve body 15 of the control valve 60 are integrally formed as a single member. The fluid discharge line 153 is composed of a passage 153a formed in the valve cone 14 and the valve body 15, a radial hole 153b and an annular groove 153c formed in the collar 13 slidably supporting the valve body 15, a radial hole 153d formed in the power piston 8, an axial groove 153e formed in the outer surface of the power piston 8, and a passage 204.

Since the fluid discharge line 153 is provided at the valve cone 14 and the valve body 15 side, the reaction chamber 41 is directly connected to the fifth branch 197. The reaction chamber 41 side of the fifth branch 197 after the thirteenth check valve 198 is connected to the reservoir. The fluid pressure circuit 36 is provided with a twelfth check valve 196.

The input shaft 18 comprises a pedal side portion 18b at the brake pedal 152 side and a control valve side portion 18c at the control valve 60 side which is threaded into the pedal side portion 18b. The reason is as follows. It is necessary, for obtaining a servo ratio as higher as possible for the brake pressure boosting device 1, to make the pressure receiving area of the input shaft 18, on which the fluid pressure in the power chamber 25 is applied, small. For that, it is required to make the outer diameter of the input shaft 18 as smaller as possible. However, the input shaft 8 has a caulked joint $18b_1$ connected to a joint 210 connected to the brake pedal 152, thereby restricting the decrease in the outer diameter of the input shaft 18. In order to solve this problem, the input shaft 18 comprises two parts in such a manner that the caulked joint $18b_1$ can be conserved in the pedal side portion 18b by making the latter relatively large, and the servo ratio can be set at a higher ratio by making the control valve side portion 18c.

The high degree of freedom in setting of the servo ratio can be obtained by preparing various control valve side portions 18c of different outer diameters and properly selecting one of them.

The control valve side portion 18c of the input shaft 18 is sealingly and slidably inserted into the plug 6. The seal between the control valve side portion 18c and the plug 6 is accomplished by a double sealing structure comprising two cup sealing members 211, 212, thereby securely preventing the fluid leak from the reaction chamber 41 to the outside through the input shaft 18.

The control valve side portion 18 of the input shaft 18 and the valve operating member 17 are threaded and connected to each other so as to form a step 18a just like the step 18a of the input shaft 18 in the aforementioned embodiment therebetween. The step 18a is provided with a damping member 213 made of a rubber ring. The damping member 213 is disposed between the control valve side portion 18c and the valve operating member 17 in order to reduce collision noise between the reaction piston 20 and the step 18a.

The other structure of the brake pressure boosting device 1 of the twenty-fourth embodiment is the same as that of the twenty-third embodiment.

In the brake pressure boosting system 150 of the twenty-fourth embodiment as structured above, when the braking operation is conducted by pedaling the brake pedal 152, the input shaft 18 advances in the same manner as the aforementioned embodiment. Though the volume of the reaction chamber 41 is increased so that the pressure in the reaction chamber 41 is directed toward negative pressure at this point, brake fluid is introduced from the reservoir 33 to the reaction chamber 41 through the fluid circuits 36 and the twelfth check valve 196 so that the pressure drop of the reaction chamber is compensated and the input shaft 18 can smoothly advance.

When the brake pedal is released for canceling the braking operation, the input shaft 18 is about to retreat. Since the fluid pressure in the power chamber 25 is set in such magnitude as to retain the rear end 20e of the reaction piston 20 in contact with the step 18a of the input shaft 18 at this point, the reaction piston 20 is also about to retreat together with the input shaft 18. As a result of this, the pressure in the reaction chamber 41 is increased. When the pressure exceeds the WCY pressure in the WCYs 28, 29, the thirteenth check valve 198 opens so that the fluid in the reaction chamber 41 is discharged to the first branch 156a i.e. the WCYs 28, 29 through the line 197. The pressure in the reaction chamber 41 is thus reduced with keeping the same pressure as the WCY pressure.

The decrease in the pressure of the reaction chamber 41 causes the input shaft 18 and the reaction piston 20 retreat together and the valve operating member 2 is separated from the valve cone 14. Then, the pressurized fluid in the power chamber 25 is discharged to the reservoir 33 through a space between the valve cone 14 and the valve operating member 17, the passage 153a, the radial hole 153b, the annual groove 153c, the radial hole 153d, the axial groove 153e, and the passage 204. The pressure in the power chamber 25 is therefore reduced, so the power piston 8 retreats.

Since the pressure in the reaction chamber 41 acts to oppose the fluid pressure in the power chamber 25 (in the same direction of the input of the input shaft 18) acting on the rear end 20e of the reaction piston 20, the brake pressure boosting device 1 becomes substantially the same state where the rear end 20e of the reaction piston 20 is not in contact with the step 18a of the input shaft 18 so that the servo ratio becomes substantially the same as that during the jumping action.

Figure 41:
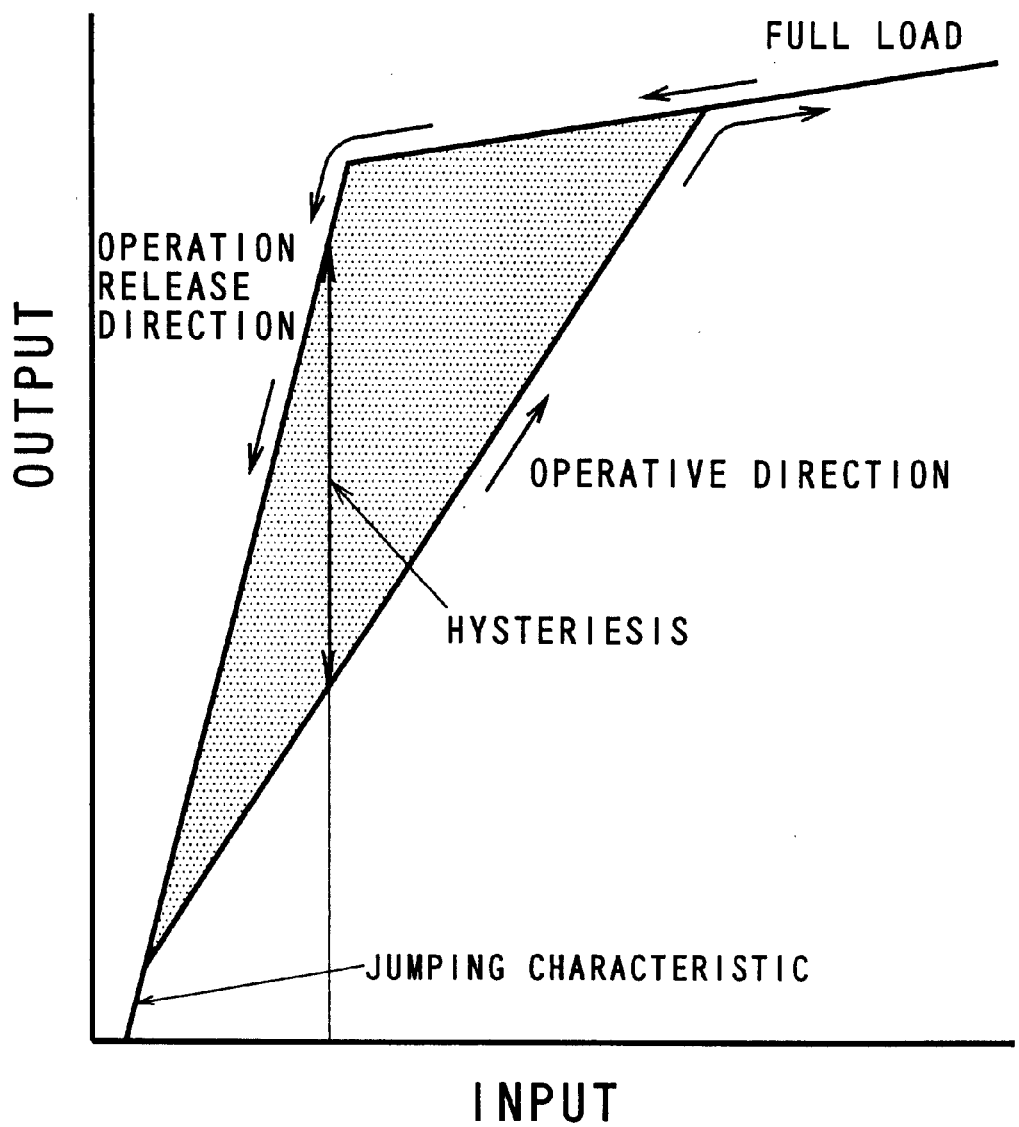
FIG. 41 is a diagram showing input-output characteristics with hysteresis of the brake pressure boosting device shown in FIG. 39.

Also in the brake pressure boosting system 150 of the twenty-fourth embodiment, the input-output characteristic of the brake pressure boosting device 1 is substantially the same as that shown in FIG. 41, that is the brake pressure boosting device 1 has large hysteresis.

The other action and effects of the brake pressure boosting system 150 of the twenty-fourth embodiment are the same as those of the twenty-third embodiment.

Figure 44:
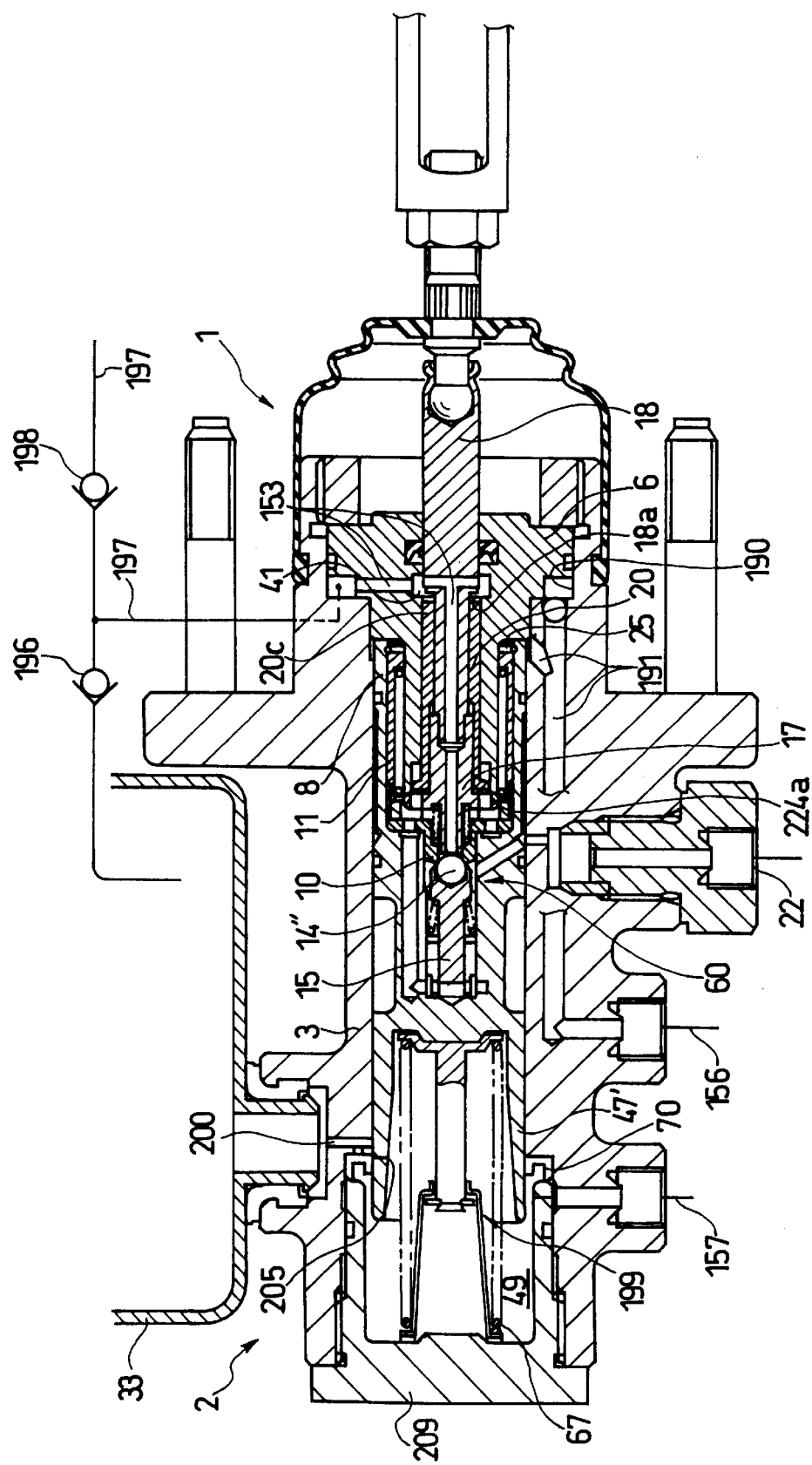
FIG. 44 is a view showing a twenty-fifth embodiment of the present invention.

FIG. 44 is a view showing the twenty-fifth embodiment of the present invention.

As shown in FIG. 44, a brake pressure boosting system 150 of the twenty-fifth embodiment 150 comprises a brake pressure boosting device 1 in which a MCY 2 of plunger type is integrated just like the twenty-fourth embodiment shown in FIG. 42 and FIG. 43 as mentioned above. The MCY 2 of the twenty-fifth embodiment is a single MCY different from the tandem MCY of the twenty-fourth embodiment. In the twenty-fifth embodiment, the brake pressure boosting device 1 has a passage 191 which is connected to a power chamber 25 and also to a first line 156 relating to the one circuit. That is, the power chamber 25 is directly connected to the WCYs 28, 29 of the one circuit.

On the other hand, a fluid chamber 72 of the MCY 2 (hereinafter, it is referred to as just the fluid chamber 72 in this embodiment) is connected to a second line 156 relating to the other circuit. That is, the fluid chamber 72 of the MCY 2 is directly connected to the WCYs 51, 52 of the other circuit.

As mentioned above, in the brake pressure boosting system 150 of this embodiment, the one circuit is of a full power brake type in which the fluid pressure in the power chamber 25 is introduced and the other circuit is of a semi-full power brake type in which the fluid pressure of the MCY 2 is introduced.

In the same manner as the twenty-third embodiment, a discharge line 153 is formed in the valve operating member 17 and the input shaft 18, a twelfth check valve 196 is disposed on the discharge line 153, and a third check valve 198 is disposed on the fifth branch 197 extending from the discharge line 153.

The input shaft 18 has a single structure not to be divided in the same manner as the twenty-third embodiment, and the seal between the plug 6 and the input shaft 18 is single.

The other structure of the brake pressure boosting system 150 of the twenty-fifth embodiment is the same as that of the twenty-fourth embodiment.

In the brake pressure boosting system 150 of the twenty-fifth embodiment as mentioned above, the pressure receiving area of the power piston 8 by the O-ring 227 and the pressure receiving area of the MCY piston 47' of the cup sealing member 70 are set to be equal to each other so that the respective WCY pressures in the WCYs 28, 29, 51, 52 are equal.

Figure 45:
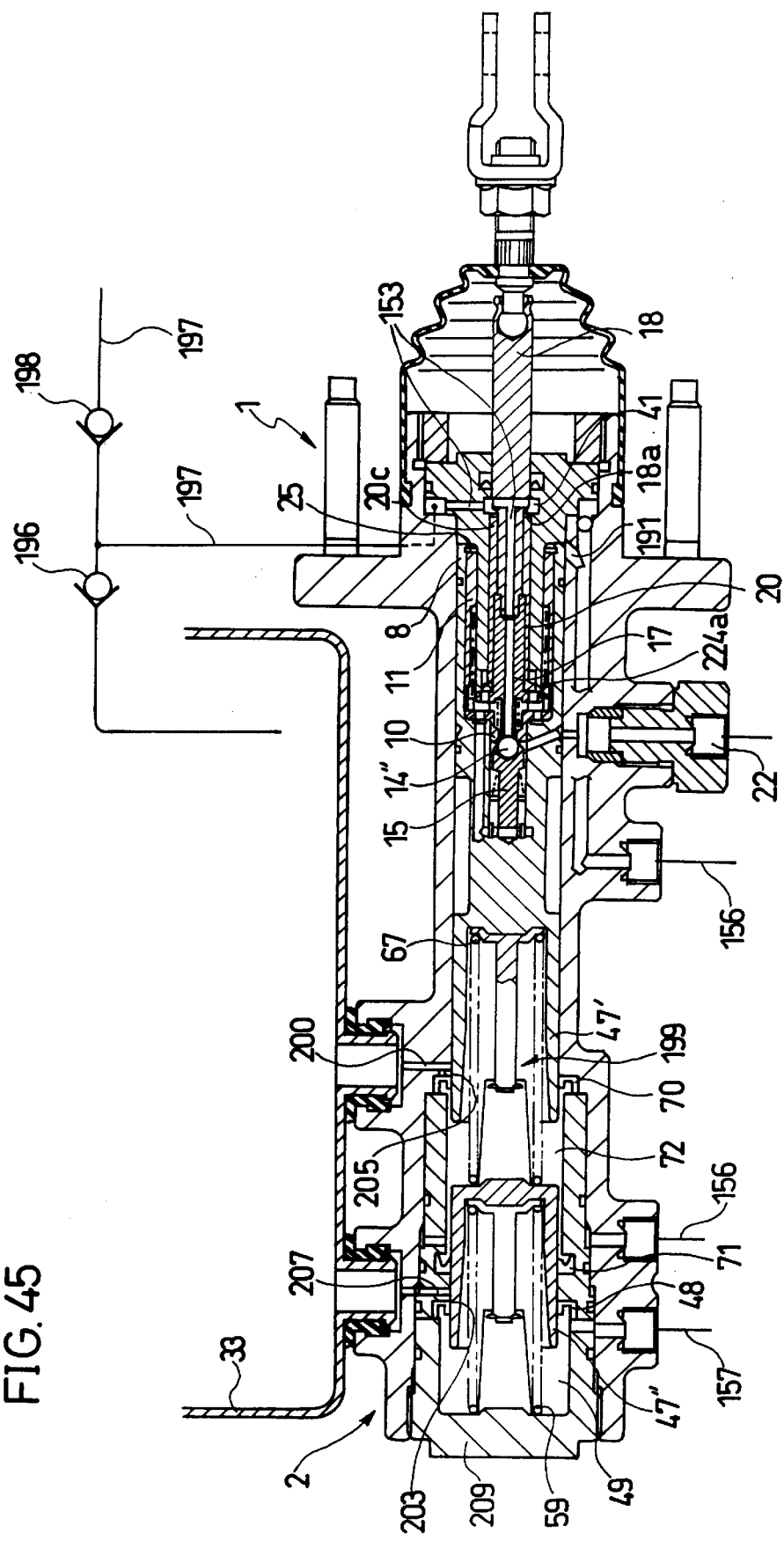
FIG. 45 is a view showing a twenty-sixth embodiment of the present invention.

FIG. 45 is a view showing the twenty-sixth embodiment of the present invention.

Though the MCY 2 is composed of a single MCY in the twenty-fifth embodiment shown in FIG. 44, a MCY 2 is composed of a tandem MCY in a brake pressure boosting system 150 of the twenty-sixth embodiment as shown in FIG. 45. In this case, the fluid chamber 49 is connected to the second line 157 of the other circuit. The fluid chamber 72 of the MCY 2 is connected to, for example, a stroke simulator whereby the fluid chamber 72 can be utilized for other purposes for example controlling the stroke of the brake pedal 152 and functioning as an emergency fluid chamber in case of failure in the fluid pressure source (such as the pump 154 and the accumulator 155).

The other structure, action, and effects of the brake pressure boosting system 150 of the twenty-sixth embodiment are the same as those of the twenty-fifth embodiment mentioned above.

Figure 46:
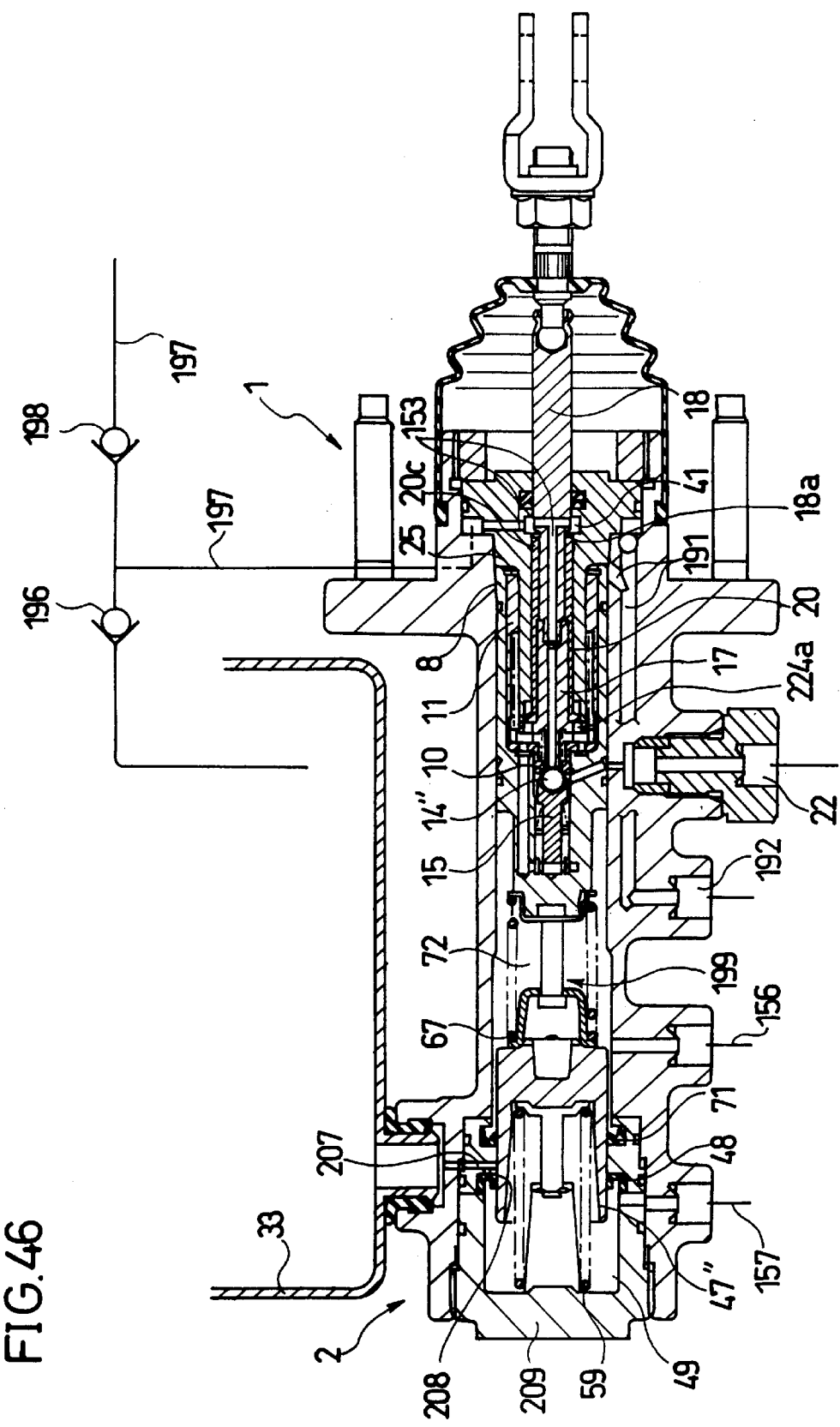
FIG. 46 is a view showing a twenty-seventh embodiment of the present invention.

FIG. 46 is a view showing the twenty-seventh embodiment of the present invention.

Though the power piston 8 and the primary piston 47' of the MCY 2 are formed integrally with each other in the twenty-fifth embodiment shown in FIG. 44, the power piston 8 and the primary piston 47' are formed separately from each other in the brake pressure boosting system in the twenty-seventh embodiment as shown in FIG. 46. The maximum distance between the pistons 8 and 47' is restricted by a distance restricting means 199 in the same manner as the twenty-third embodiment shown in FIG. 39. The pistons 8, 47' are biased in a direction separating from each other by a spring 67 compressed and disposed therebetween so that the pistons 8, 47' are set to have the maximum distance when the brake pressure boosting device 1 is inoperative.

Formed between the power piston 8 and the primary piston 47' is a fluid chamber 72. The fluid chamber 72 is sealed and can be utilized for other purposes for example functioning as a lock chamber for integrally connecting the pistons 8, 47' and controlling the stroke of the brake pedal 152 in the same manner as the twenty-sixth embodiment, and function as an emergency fluid chamber.

The other structure, action, and effects of the brake pressure boosting system 150 of the twenty-seventh embodiment are the same as those of the twenty-fifth embodiment mentioned above.

Figure 47:
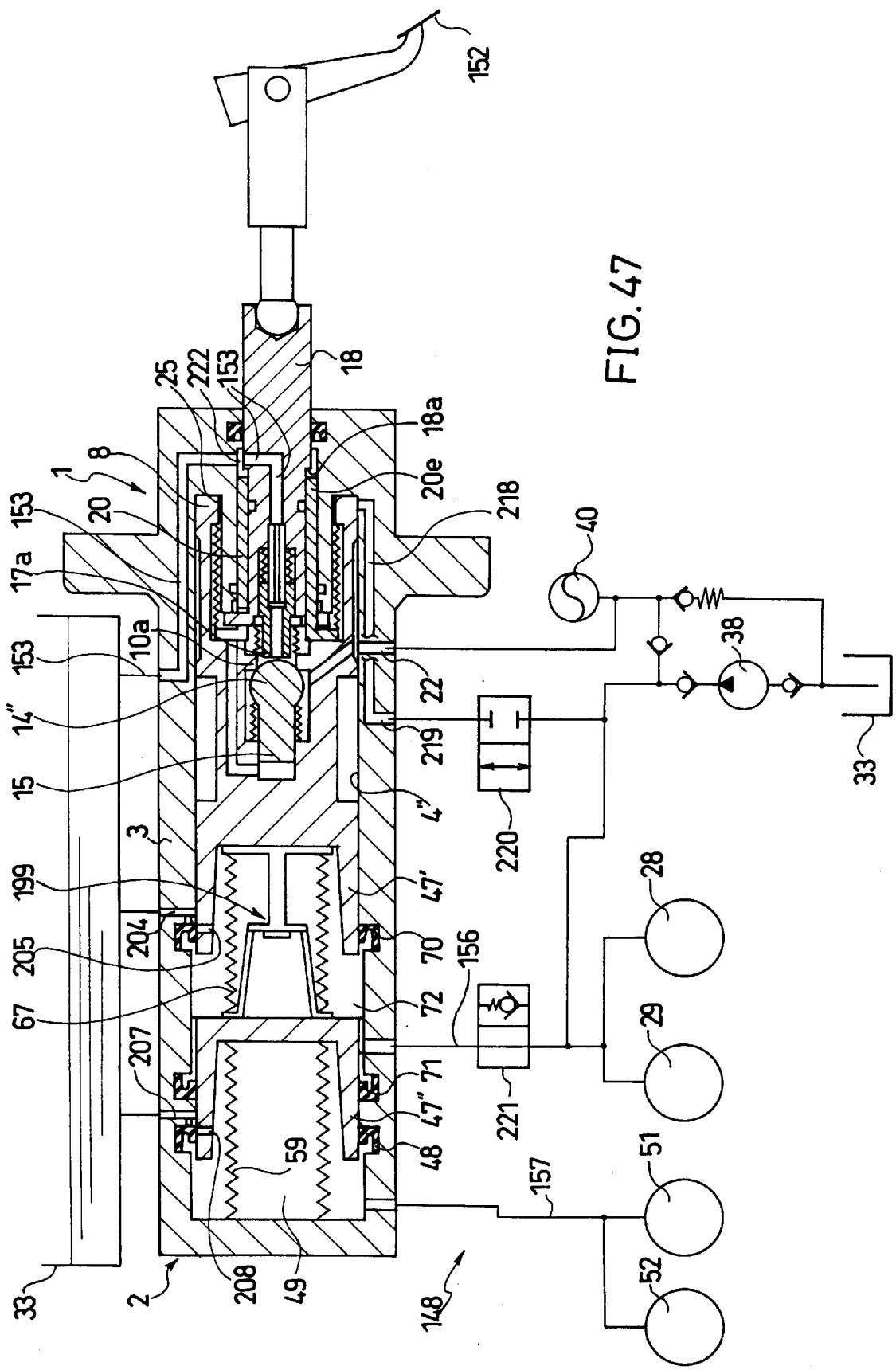
FIG. 47 is a view schematically showing a twenty-eighth embodiment of a pressure boosting device and a brake pressure boosting system of the present invention.
Figure 48:
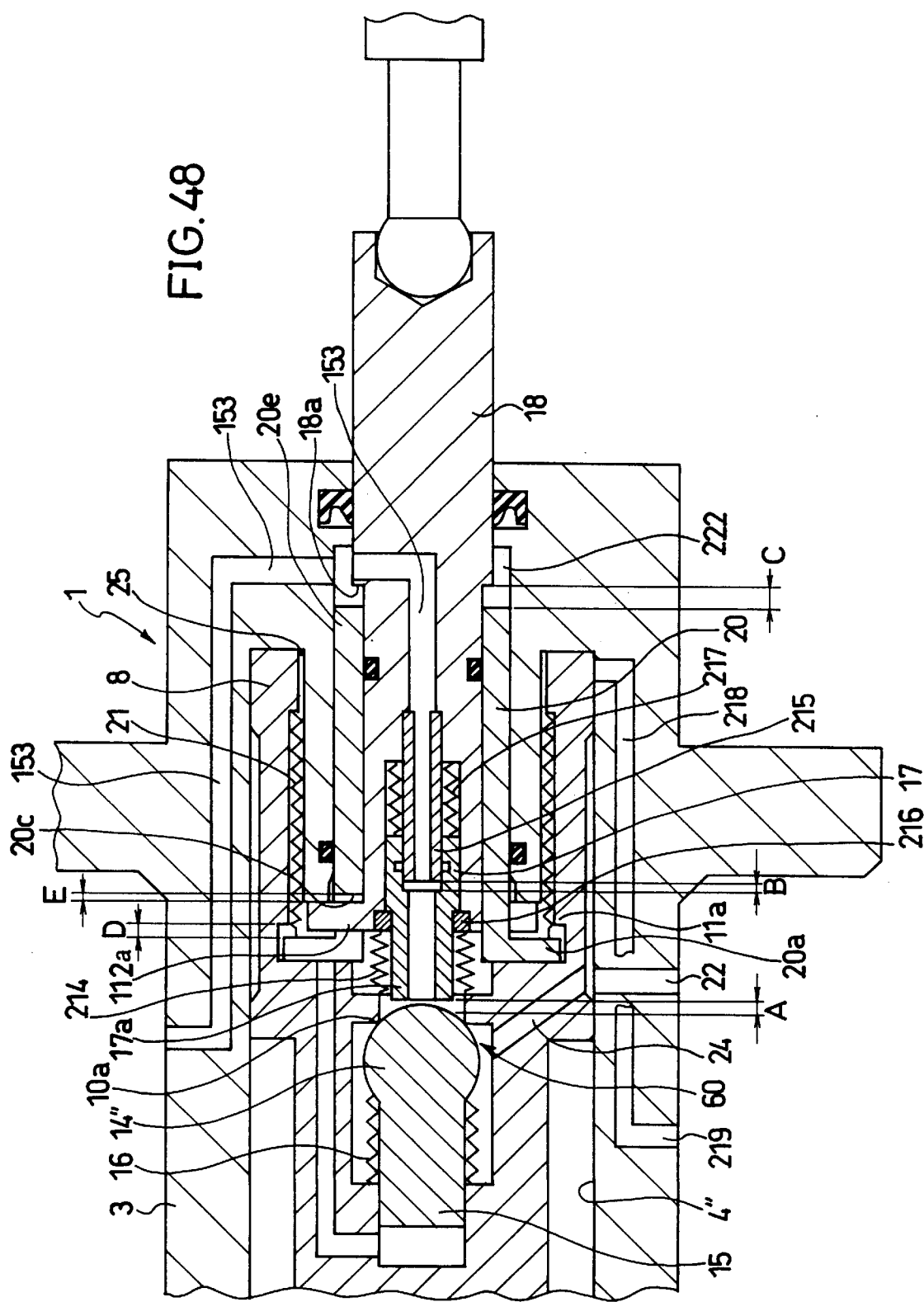
FIG. 48 is a partially enlarged sectional view showing the brake pressure boosting device of the twenty-eighth embodiment of the present invention.

FIG. 47 is an exemplary view showing the twenty-eighth embodiment of a pressure boosting device and a brake pressure boosting system according to the present invention and FIG. 48 is a partially enlarged sectional view showing the brake pressure boosting device of the twenty-eighth embodiment.

Though the cylindrical stopping member 122 is formed separately from the input shaft 18 and is integrally connected to the input shaft 18 in any one of the brake pressure boosting devices 1 of the preceding embodiments, the input shaft 18 and the cylindrical stopping member 112 are integrally formed of a single member in the brake pressure boosting device 1 of the twenty-eighth embodiment as shown in FIG. 47 and FIG. 48. Therefore, the stopper 112a is formed in the input shaft 18.

In the brake pressure boosting device of the twenty-eighth embodiment, a spring 214 directly biases the input shaft 18 and the valve operating member 17 is not biased by the spring 214 and is slidable relative to the input shaft 18. In this case, the valve operating member 17 is sealingly and slidably fitted onto a cylindrical member 215, which is fixed to the center of the front side portion of the input shaft 18 and is slidably fitted into the input shaft 18. In this case, the valve operating member 17 is restricted from advancing relative to the input shaft 18 by a stopper 216 disposed on the front end of the input shaft 18 and is restricted from moving backward relative to the input shaft 18 by the cylindrical member 215. The valve operating member 17 is always biased in a direction toward the stopper 216 by a spring 217 compressed between the valve operating member 17 and the input shaft 18. The spring 217 is set to have biasing force smaller than that of the spring 16 biasing the valve body 15. When the brake pressure boosting device is inoperative, the valve operating member 17 is held in contact with the stopper 216 as illustrated.

In the brake pressure boosting device 1 of the twenty-eighth embodiment, spaces between the respective members in the inoperative positions are set in the following manner. Assuming that a space between the second valve seat 17a and the valve ball 14" (a travel distance that the second valve seat 17a moves until it comes in contact with the valve ball 14") is A, a space between the valve operating member 17 and the cylindrical member 215 (a first predetermined distance that the valve operating member 17 moves until it comes in contact with the cylindrical member 215) is B, a space between the rear end 20e of the reaction piston 20 and the step 18a of the input shaft 18 (a distance that the reaction piston 20 moves relative to the input shaft 18 until it comes in contact with the rear end 18a) is C, a space between the first stopper 20a of the reaction piston 8 and the step 11a of the cylindrical fixing member 11 (a second distance that the first stopper 20a of the reaction piston 20 moves relative to the power piston 8 until it comes in contact with the step 11a) is D, and a space between the stopper 112a of the input shaft 18 and the second stopper 20b of the reaction piston 20 (a travel distance that the stopper 112a moves until it comes in contact with the second stopper 20b) is E, the relation represented by the following equation is established among the spaces A, B, C, D, E:

$$C-A-B<D<C-A \qquad 12.$$

To obtain jumping characteristic, the rear end 20c of the reaction piston 20 should come in contact with the step 18a of the input shaft 18 before the reaction piston 20 comes in contact with the step 11a of the cylindrical fixing member 11. Therefore, the space C should be set to be smaller than the space D when the spaces A, B are both 0, so the condition of producing the jumping characteristic is represented by the following equation:

$$C-(A+B)<D \qquad 13$$

The condition for providing hysteresis to the brake pressure boosting device 1 by setting the servo ratio of the brake pressure boosting device 1 when the braking operation is cancelled to be higher than that in operation is that the rear end 20e of the reaction piston 20 is separated from the step 18a of the input shaft 18 in the operation release direction. If, from the middle load state where the spaces A, B are 0 and the rear end 20e is in contact with the step 18a, the first stopper 20a of the reaction piston 20 comes in contact with the step 11a of the cylindrical fixing member 11 before the input shaft 18 returns and the stopper 216 disposed on the front end of the input shaft 18 comes in contact with the valve operating member 17, the rear end 20e is separated from the step 18a. The space between the stopper 20a and the step 11a when the spaces A, B, C are all 0 is D−C+(A+B) and the stroke of the valve operating member 17 until it reaches the stopper 216 fixed to the input shaft 18 (the valve operating member 17 comes in contact with the cylindrical member 215 fixed to the input shaft 18 in the brake release direction in this state) is B, so a relation represented by the following equation:

$$D-C+(A+B)<B \qquad 14$$

is established and the condition for providing the hysteresis to the brake pressure boosting device 1 is represented by the following equation:

$$D<C-A.$$

From Equation 13 and Equation 15, the condition for enabling that the rear end 20e of the reaction piston 20 comes in contact with the step 18a of the input shaft 18 in the operative direction of the brake pressure boosting device 1 and the rear end 20e is separated from the step in the return direction is represented by Equation 12 as mentioned above.

When the open rate of the valve ball 14" at the start of the operation is set to be at least α (for example, about 1 mm) or more, the open rate is equal to the stroke of the input shaft 18 until the rear end 20e of the reaction piston 20 comes in contact with the step 18a of the input shaft 18 after the spaces A, B both become 0, so a relation represented by the following equation:

$$\alpha<C-(A+B) \qquad 16$$

is established. When the maximum space between the valve ball 14" and the second valve seat 17a (i.e. the maximum open rate of the discharge side) when they return is set to be at least β (for example, about 1 mm) or more, the maximum open rate is A+D+E in the middle load state, A+E (>b) at a time when the stopper 112a of the input shaft 18 comes in contact with the small-diameter projection 6a of the plug 6 i.e. immediately before the termination of return, and A (>0) at the termination of return i.e. in the inoperative state illustrated.

Figure 49:
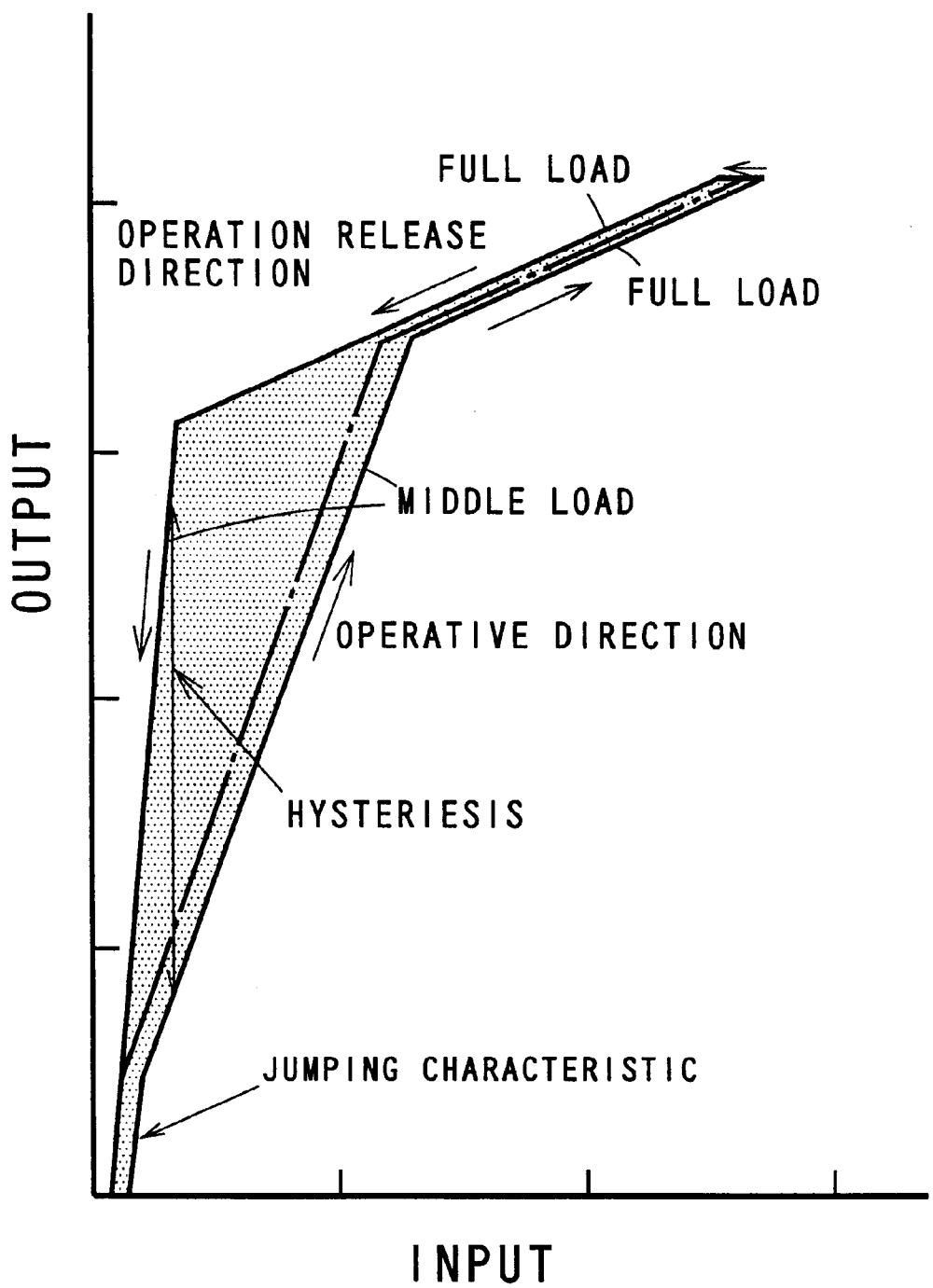
FIG. 49 is a diagram showing input-output characteristics with hysteresis of the brake pressure boosting device shown in FIG. 48.

The input-output characteristic of the brake pressure boosting device 1 in which the respective spaces A, B, C, D, E are set as mentioned above is the characteristic as shown in FIG. 49. In the operative direction, the advance of the input shaft 18 brings the second valve seat 17a in contact with the valve ball 14" and separates the valve ball 14" from the first valve seat 10a in the same manner as the conventional one. As the input increases, the force pushing the valve operating member 17 rearwardly increases. Therefore, the valve operating member 17 moves rearwardly to come in contact with the end of the cylindrical member 215. In this stage i.e. just after the start of operation, the rear end 20e of the reaction piston 20 does not come in contact with the step 18a of the input shaft 18 yet, so the jumping action is performed in the same manner as the conventional example mentioned above. After the rear end 20e of the reaction piston 20 comes in contact with the step 18a of the input shaft 18, the servo control at a relatively low servo ratio for normal braking is performed at the middle load and after that the brake pressure boosting device becomes in the full load state.

In the operation release direction (return direction) from the full load state, after the output is retained until the input decreases a predetermined value by friction of the input shaft and the power piston 8, as the input decreases, the output decreases along the full load line and the fluid pressure in the power chamber 25 becomes lower than the maximum pressure decided by the pressure (accumulated pressure) of the fluid source (a pump, an accumulator as described later). Then, the state is shifted from the full load state to the middle load state. Since the spaces A, B, C, D are set as mentioned above, however, the rear end 20e of the reaction piston 20 is separated from the step 18a of the input shaft 18. Therefore, the pressure receiving area of the input shaft to which the fluid pressure in the power chamber 25 is applied becomes small during the jumping action and the servo control at a higher servo ratio is performed.

As mentioned above, the brake pressure boosting device 1 has different ways of input-output characteristic between the operative direction and the operation release direction. That is, the brake pressure boosting device 1 has large hysteresis.

The housing 3 is provided with a fluid supply port 219 which communicates with the power chamber 25 through the passage 218.

The other structure, action, and effects of the brake pressure boosting device 1 of the twenty-eighth embodiment are the same as those of the conventional example shown in FIG. 52.

As shown in FIG. 47, the brake pressure boosting system 150 of the twenty-eighth embodiment comprises, besides the brake pressure boosting device 1 shown in FIG. 47 and FIG. 48, a tandem master cylinder 2, WCYs 28, 29 relating to one of two circuits and WCYs 51, 52 relating to the other circuit, a pump 38 and an accumulator 40 as a fluid pressure source of the brake pressure boosting device 1, and a brake pedal 152 connected to the input shaft.

The housing for the MCY 2 is common to the housing 3 of the brake pressure boosting device 1. The MCY 2 has a primary piston 47' slidably inserted into a hole 4" formed in the housing 3. The primary piston 47' is formed integrally with the power piston 8. The MCY 2 also has a secondary piston 47" slidably inserted into the hole 4 of the housing 3 in front of the primary piston 47'. The respective effective pressure receiving areas of the power piston 8, the primary piston 47', and the secondary piston 47" are set to be equal to each other. The maximum distance between the pistons 47' and 47" is restricted by a distance restricting means 199 in the same manner as the twenty-third embodiment shown in FIG. 39. The pistons 47', 47" are biased in a direction separating from each other by a spring 67 compressed and disposed therebetween so that the pistons 47', 47" are set to have the maximum distance when the brake pressure boosting device 1 is inoperative as illustrated.

A cup sealing member 70 is provided on the inner surface of the housing 3 where the primary piston 47' is positioned. The primary piston 47' is slidably inserted into the cup sealing member 70 in such a manner that the primary piston 47' is sealed in one direction. Cup sealing members 71, 48 are provided on the inner surface of the housing 3 where the secondary piston 47 is positioned. The secondary piston 47" is slidably inserted into the cup sealing members 70, 48 in such a manner that the secondary piston 47" is sealed in one direction. A fluid chamber 72 is defined in the hole 4" between the two cup sealing member 70 and 71 and a fluid chamber 49 is defined in the hole 4" in front of the cup sealing member 48. The fluid chamber 72 is connected to the WCYs 28, 29 of the one circuit via the first line 156 and the fluid chamber 49 is connected to the WCYs 51, 52 of the other circuit via the second line 157.

The housing 3 of the MCY 2 side is provided with passages 204, 207 behind and near the cup sealing members 70, 48. The passages 204, 207 always communicate with the reservoir 33 in which brake fluid is stored. The primary and secondary pistons 47', 47" are provided with radial holes 205, 208, respectively. Where the primary piston 47' is in the inoperative position, the radial hole 205 is positioned behind the cup sealing member 70. Where the secondary piston 47" is in the inoperative position, the radial hole 208 is positioned behind the cup sealing member 48. Therefore, while the brake pressure boosting device 1 is inoperative, fluid can flow freely between the fluid chamber 72 and the reservoir 33 and between the fluid chamber 49 and the reservoir 33 in both directions.

When the brake pressure boosting device 1 is operative, the pistons 47', 47" advance and the radial holes 205, 208 pass over the cup sealing members 70, 48, the flows of fluid from the fluid chambers 72, 49 toward the reservoir 33 are blocked. When the pistons 47', 47" retreat from the operative positions, brake fluid in the reservoir 33 is supplied into the fluid chambers 72, 49.

A return spring 59 is provided in the fluid chamber 49 in order to always bias the secondary piston 47" in a direction toward the inoperative position.

The accumulator 40 is connected to the input port 22 of the brake pressure boosting device 1. Predetermined constant pressure is always accumulated in the accumulator 40 by the pump 38. The pump 38 is connected to the fluid supply port 219 of the brake pressure boosting device via a fluid supply valve 220 which is a normally closed solenoid shut-off valve. A differential pressure valve 221, which is a solenoid valve with a communicating position and a relief position, is disposed on the first line 156. The pump 38 is connected to the first line 156 relating to the WCYs 28, 29 by the differential pressure valve 221. The differential pressure valve 221 is normally set in the communicating position and is set in the relief position by an electronic control unit during brake assist operation. When the differential pressure valve 221 is set in the relief position, the differential pressure valve 221 opens to allow the relief of the pressure in the WCYs 28, 29 to the fluid chamber 72 when the pressure in the WCYs 28, 29 becomes higher than the pressure in the fluid chamber 72 of the MCY 2 by a predetermined value.

In the brake pressure boosting system 150 of the twenty-eighth embodiment as structured above, as the normal braking operation is conducted by pedaling the brake pedal 152, pressurized fluid in the accumulator 40 is introduced into the power chamber 25 in the same manner as the conventional example, whereby the power piston 8 boosts and outputs force applied on the brake pedal. The output is transmitted to the primary piston 47' of the MCY 2 so that the primary piston 47' advances. As the radial hole 205 passes over the cup sealing member 70 by the advance of the primary piston 47', MCY pressure is developed in the fluid chamber 72. By the developed MCY pressure, the secondary piston 47" advances. As the radial hole 208 passes over the cup sealing member 48 by the advance of the secondary piston 47", MCY pressure is developed in the fluid chamber 49. The respective MCY pressures in the fluid chambers 72, 49 are introduced into the WCYs 28, 29, 51, 52.

In the initial stage of the operation, the brake pressure boosting device 1 performs the jumping action as shown in 49 as mentioned above while plays in strokes of the brake system such as plays in strokes of the WCYs 28, 29, 51, 52 are not cancelled yet. The jumping action rapidly cancel the plays in strokes. As the brake pressure boosting device 1 terminates the jumping action, the servo control at a relatively low servo ratio for normal braking is performed. Since the plays in strokes are already cancelled, braking force is developed so that the brakes substantially work. In this manner, the normal braking operation is conducted. Because the effective pressure receiving areas of the pistons 8, 47, 41 are equal to each other, the fluid pressures of the chambers 25, 72, 49 become equal to each other. When the servo control for normal braking is terminated, the brake pressure boosting device 1 becomes in full load state.

From the full load state of the brake pressure boosting device 1, the brake release operation is performed by reducing the force applied to the brake pedal 152, the output of the brake pressure boosting device 1 decreases along the full load line after it is held constant. Accordingly, the braking force is reduced. As the brake pressure boosting device 1 shifts from the full load state to the middle load state, the rear end 20e of the reaction piston 20 is separated from the step 18a of the input shaft 18, so the servo control at a large servo ratio is performed in the middle load state. As the force applied on the brake pedal is completely cancelled, the brake pressure boosting device 1, the MCY 2, and the WCYs 28, 29, 51, 52 are inoperative, thereby canceling the brakes.

In the brake pressure boosting system 150 of the twenty-eighth embodiment, the brake assist control can be performed by utilizing the hysteresis of the brake pressure boosting device 1. The action of the brake assist control will be described hereinafter.

The electronic control unit decides whether the brake assist control is necessary or not, based on pedaling condition such as increasing speed of the pedal stroke (detected by a stroke sensor not shown) or force applied on the brake pedal 152 (detected by a pedal force sensor not shown) when the braking operation is performed by pedaling the brake pedal 152. When the electronic control unit decides that the brake assist control is necessary, the electronic control unit drives the pump 38 and opens the fluid supply valve 220. Then, the discharge pressure of the pump 38 is introduced into the power chamber 25 through the fluid supply valve 220, the fluid supply port 219, and the passage 218, to provide the fluid pressure in the power chamber 25. Because of the hysteresis of the brake pressure boosting device 1, the fluid pressure in the power chamber 25 rises within the hysteresis range even with the same force applied on the brake pedal.

As the fluid pressure in the power chamber 25 increases, the output of the power piston 8 increases. Therefore, the MCY pressures produced by the primary piston 47' and the secondary piston 47" also increase. Since the increased MCY pressure is introduced into the WCYs 28, 29, 51, 52 of both circuits, the WCY pressures also increase. Since the effective pressure receiving areas of the pistons 8, 47', 47" are equal to each other, the WCY pressures and the fluid pressure in the power chamber 25 are increased and balanced to have the same pressure. Therefore, the braking forces are intensified, thereby performing the brake assist control.

During the brake assist control, increase in the WCY pressure of the one circuit increases the stroke of the WCYs 28, 29. However, since the differential pressure valve 221 is set in the relief position so as to block the flow of brake fluid from fluid chamber 72 toward the WCYs 28, 29, the increase in stroke of WCYs 28, 29 does not affect the pedal stroke. In this manner, the one circuit does not affect the pedal stroke during the brake assist control, thereby preventing the increase in the pedal stroke during the brake assist control.

The increase in stroke of the WCYs 28, 29 is absorbed by that the pressurized fluid the power chamber 25 (the discharged fluid of the pump 38) is supplied to the WCYs 28, 29. On the other hand, during the brake assist control, the stroke of the WCYs 51, 52 of the other circuit is increased by the increase in WCY pressure of the WCYs 51, 52. Since the brake fluid in the fluid chamber 49 is supplied to the WCYs 51, 52, the increase in stroke of the WCYs 51, 52 affects the pedal stroke.

According to the twenty-eighth embodiment, the brake pressure boosting device 1 is provided with hysteresis of the input-output characteristic between the operative direction and the operation release (return) direction. In this case, the brake pressure boosting device 1 having hysteresis can be easily made with little increase in cost because little change from the conventional brake pressure boosting device is required.

Figure 50:
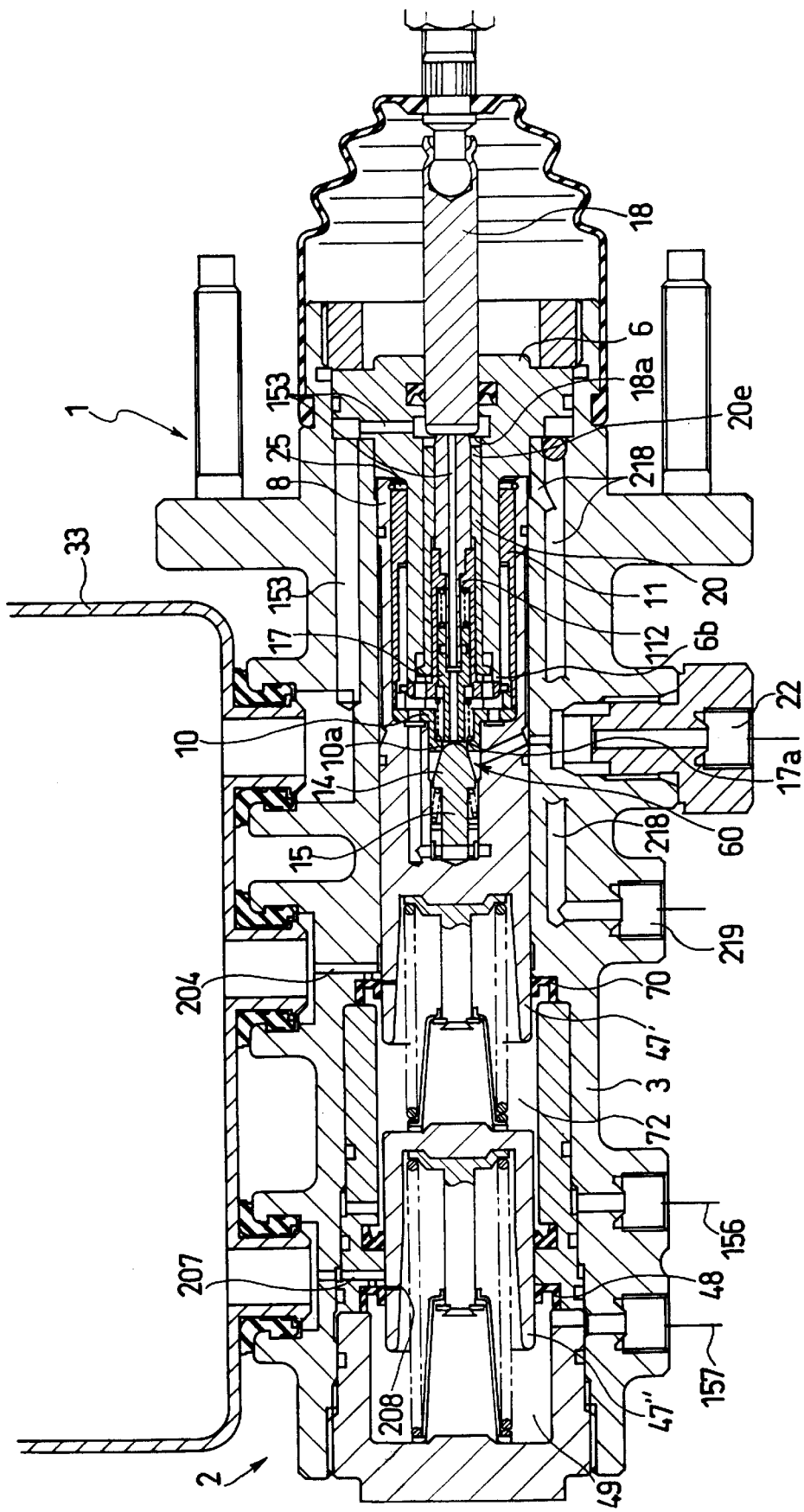
FIG. 50 is a sectional view of a concrete example of a fluid pressure boosting device shown in FIG. 47.

In addition, since the pump 38 which is the fluid pressure source of the brake pressure boosting device 1 is also used as the second fluid pressure source for supplying fluid pressure to be introduced into the power chamber 25 during the brake assist control, the brake pressure boosting system 150 can provide the brake assist function at a lower cost without increase in the number of the parts.

Where the brake pressure boosting system 150 is provided with ABS and/or TRC, a pump for the ABS and/or TRC may be used common to the second fluid pressure source for the brake assist control. It should be understood that an exclusive fluid pressure source may be provided as the second fluid pressure source, but the effect as mentioned above can not be obtained. A brake pressure boosting device 1 formed according to the twenty-eighth embodiment is shown in FIG. 50, but the description about the structures and the action is omitted.

Figure 51:
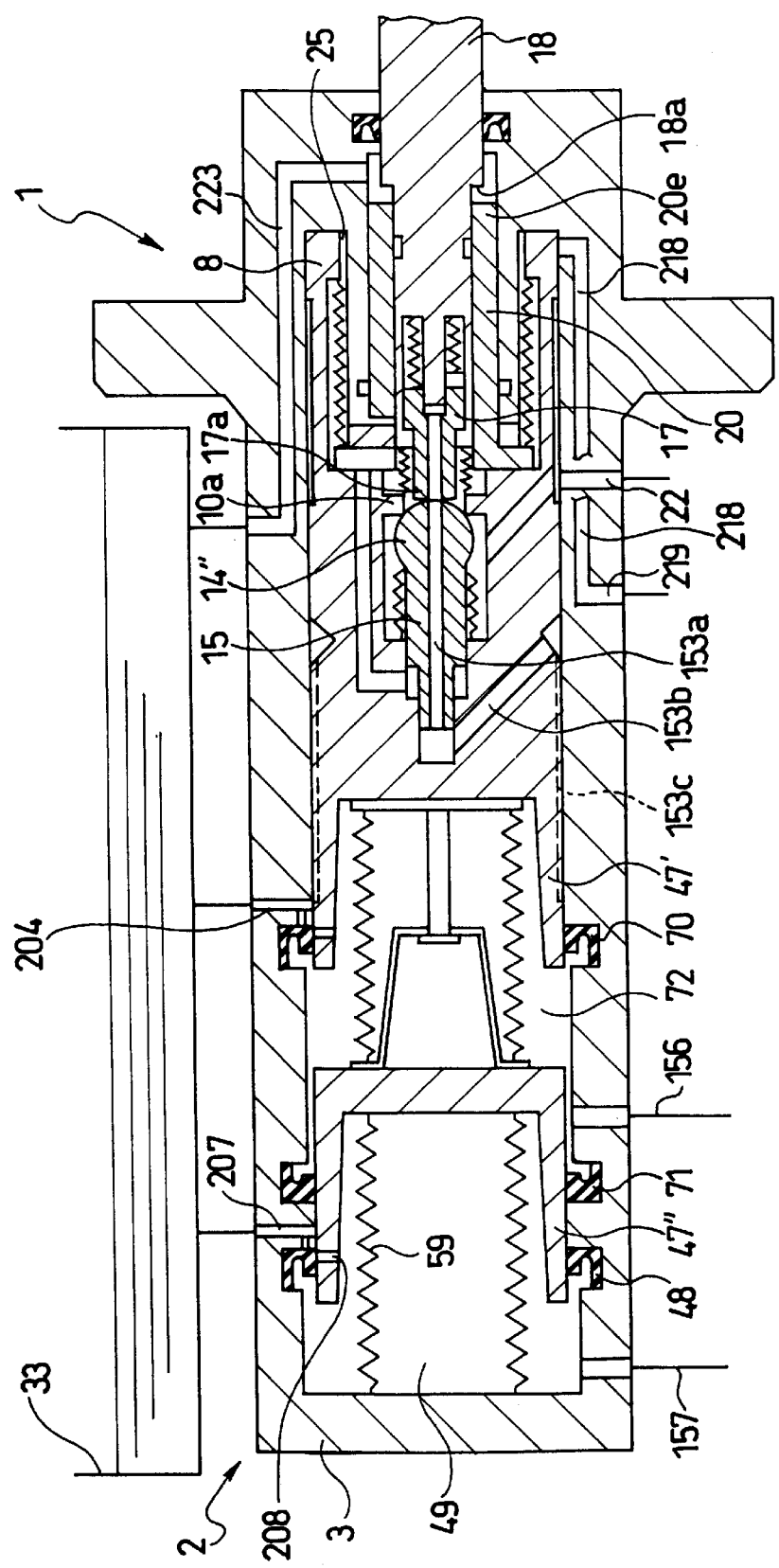
FIG. 51 is a view schematically showing a twenty-ninth embodiment of the present invention.

FIG. 51 is a view schematically showing the twenty-ninth embodiment of the present invention.

Though the fluid discharge line 153 is provided on the input shaft 18 side in the twenty-eighth embodiment, the fluid discharge line 153 is provided on the valve ball 14" and the valve body 15 side in the twenty-ninth embodiment as shown in FIG. 51. The fluid discharge line 153 is composed of a passage 153a formed in the valve ball 14" and the valve body 15, a passage 153b formed in the power piston 8 and communicating with the passage 153, an axial groove 153c communicating with the passage 153b, and the passage 204 communicating with the axial groove 153c. Therefore, when the brake operation is cancelled, the pressurized fluid in the power chamber 25 is discharged to the reservoir 33 through the passages 153a, 153b, the groove 153c, and the passage 204.

A chamber 222 is connected to the reservoir 33 through the passage 223 so that the variation in pressure in the chamber 222 due to the advance and the retreat of the input shaft 18 is absorbed. Therefore, the input shaft 18 can smoothly move back and forth.

The structure, action, and effects of the twenty-ninth embodiment are the same as those of the twenty-eighth embodiment.

The present invention has been described by applying the fluid pressure boosting device of the present invention to the brake pressure boosting device in any one of the aforementioned embodiments, the present invention can be applied to various fluid pressure boosting devices other than brakes.

As apparent from the above description, the fluid pressure boosting device 1 of the present invention can be provided with the jumping characteristic as well as the reversed two-stage servo characteristic with the simple structure. Therefore, output larger than the normal output can be obtained by input exceeding a predetermined value.

The servo-ratio switching point can be varied, thereby flexibly corresponding various input-output characteristic.

Since the solenoid proportional control valve is employed, the servo ratio can be smoothly varied.

According to the present invention, with simple structure, the brake pressure boosting system can provide quick increase in braking force by the jumping characteristic, can provide quickly large braking force during emergency braking by the reversed two-stage servo characteristic, and can assist an inexpert driver to securely produce large braking force.

According to the present invention, with simple structure, the fluid pressure boosting device can be provided with the reversed two-stage servo characteristic. Therefore, output larger than the normal output can be obtained by input exceeding a predetermined value. In addition, since the device utilizes a step of a stepped power piston which has been widely used, large engineering change is not required so that the device can be manufactured in further simple structure. In this case, the servo-ratio switching point can be varied, thereby flexibly corresponding various input-output characteristic. Since the solenoid proportional control valve is employed, the servo ratio can be smoothly varied.

According to the present invention, with simple structure, the brake pressure boosting system can provide quick increase in braking force by the jumping characteristic, can provide quickly large braking force during emergency braking by the reversed two-stage servo characteristic, and can assist an inexpert driver to securely produce large braking force.

Further according to the present invention, with simple structure, the fluid pressure boosting device can be provided with the two-stage servo characteristic in which the shift from a higher servo ratio to a lower servo ratio is performed during the servo control. In this case, the servo-ratio switching point can be varied, thereby flexibly corresponding various desired input-output characteristic. Since the solenoid proportional control valve is employed, the servo ratio can be smoothly varied.

In the brake pressure boosting system according to the present invention, the two-stage servo control is performed with simple structure, thereby improving the operational feeling.

According to the present invention, the fluid pressure boosting device can be mechanically provided with hysteresis of the input-output characteristic between the operative direction and the operation release direction. In this case, the pressure boosting device having hysteresis can be easily made at a low cost only with little change from the conventional pressure boosting device because a reaction piston and a reaction chamber which are conventionally provided for jumping characteristic can be used without change.

The present invention enables to reduce collision noise produced when the reaction piston collides with the step of the input shaft.

According to the present invention, the brake pressure boosting system can output larger braking force when the brake assist is required, by the hysteresis of the fluid pressure boosting device and the fluid pressure of the second fluid pressure source. In this case, even with the same input, variable outputs can be obtained within a hysteretic range of the input-output characteristic of the fluid pressure boosting device.

In this case, the brake pressure boosting device having hysteresis can be easily made at a low cost because used in this device are the cheap check valves not an expensive solenoid valve.

According to the present invention, the brake pressure boosting system can simply and securely provide brake assist when the brake assist is required such as in the event of emergency braking.

According to the present invention, since the pump, which is conventionally used, for performing ABS control, TRC control, and/or VSC control is also used as the second fluid pressure source for supplying the fluid pressure to be introduced into the power chamber during the brake assist control, the brake pressure boosting system with brake assist function can be made at a lower cost without increase in the number of the parts.

What we claim is:

1. A fluid pressure boosting device comprising:

a fluid pressure source for producing fluid pressure;

a reservoir for storing fluid;

a power piston having a pressure receiving surface and producing an output;

a power chamber confronting the pressure receiving surface of said power piston;

a control valve communicating with the fluid pressure source and the reservoir, said control valve, in its inoperative state, shutting off said power chamber from said fluid pressure source and connecting said power chamber to said reservoir, and in its operative state, shutting off said power chamber from said reservoir and connecting said power chamber to said fluid pressure source to introduce pressured fluid in said fluid pressure source into said power chamber corresponding to its operation;

an input shaft for controlling an operation of said control valve, having a step on the outer periphery thereof; and a reaction chamber formed around a part of the input shaft so that the step of said input shaft is positioned in the reaction chamber, a pressurized fluid at a servo-ratio control pressure being introduced into said reaction chamber to act on the step of the input shaft to thereby control a servo ratio.

2. A fluid pressure boosting device as claimed in claim 1, wherein said input shaft has a small-diameter portion at a control valve side and a large-diameter portion at a side opposite to the control valve, said pressurized fluid at the servo-ratio control pressure being applied to the step to confront an input of the input shaft.

3. A fluid pressure boosting device as claimed in claim 2, further comprising a reaction piston which is formed in a cylindrical shape to have an outer diameter larger than that of the large-diameter portion of said input shaft and is slidably fitted onto the small-diameter portion of said input shaft, a front end of said reaction piston confronting said power chamber and a rear end of said reaction piston being able to be in contact with the step of said input shaft;

a spring which normally biases said reaction piston in such a direction that the rear end of the reaction piston is separated from the step of said input shaft and allows the rear end of said reaction piston to be in contact with the step of said input shaft when the fluid pressure in said power chamber exceeds a first predetermined value;

operational means to which the input is applied to operate said input shaft, and a pressure control valve for the servo ratio, which introduces said pressurized fluid at the servo-ratio control pressure into said reaction chamber when the fluid pressure in said power chamber exceeds a second predetermined value that is higher than said first predetermined value, and which discharges the pressurized fluid in said reaction chamber to said reservoir when the fluid pressure in said power chamber is lower than said second predetermined value.

4. A fluid pressure boosting device as claimed in claim 3, wherein said servo-ratio control pressure is a fluid pressure of said power chamber or said fluid pressure source which was controlled by said pressure control valve for the servo ratio.

5. A fluid pressure boosting device as claimed in claim 3, wherein said pressure control valve for the servo ratio is composed of one switching valve or two shut-off valves.

6. A fluid pressure boosting device as claimed in claim 5, wherein said switching valve or said shut-off valves are controlled by the fluid pressure in said power chamber or by electromagnetic force excited corresponding to the fluid pressure in said power chamber.

7. A fluid pressure boosting device as claimed in claim 3, wherein said pressure control valve for the servo ratio is a solenoid proportional control valve which is controlled corresponding to fluid pressure in said power chamber, and said servo-ratio control pressure is pressure which is developed by controlling the fluid pressure of said power chamber or said fluid pressure source by said solenoid proportional control valve.

8. A fluid pressure boosting device as claimed in claim 2, further comprising a pressure control valve for the servo ratio, which introduces the pressurized fluid at said servo-ratio control pressure into said reaction chamber when the fluid pressure in said power chamber is between a first predetermined value and a second predetermined value that is higher than said first predetermined value, and which discharges the pressurized fluid in said reaction chamber to said reservoir when the fluid pressure in said power chamber is lower than said first predetermined value or is higher than said second predetermined value.

9. A fluid pressure boosting device as claimed in claim 8 wherein said pressure control valve for the servo ratio is composed of two switching valves, said switching valves being controlled by the fluid pressure in said power chamber.

10. A fluid pressure boosting device as claimed in claim 8, further comprising at least an orifice on a line between said pressure control valve for the servo ratio and said reaction chamber, and a low pressure accumulator positioned on said line at a pressure control valve side than said orifice.

11. A fluid pressure boosting device as claimed in claim 10, further comprising a check valve disposed in parallel with said orifice for allowing only flow of fluid from said reaction chamber to said pressure control valve for the servo ratio.

12. A fluid pressure boosting device as claimed in claim 2, further comprising a pressure control valve for servo ratio, which introduces the atmospheric pressure into said reaction chamber when the fluid pressure in said power chamber is lower than a predetermined value, and which introduces the pressurized fluid at said servo-ratio control pressure into said reaction chamber when the fluid pressure in said power chamber exceeds said predetermined value.

13. A fluid pressure boosting device as claimed in claim 1, wherein said input shaft has a large-diameter portion at a control valve side and a small-diameter portion at an opposite side of the control valve, and said step of said input shaft is formed therebetween.

14. A fluid pressure boosting device as claimed in claim 13, further comprising a pressure control valve for the servo ratio, which introduces said pressurized fluid at said servo-ratio control pressure into said reaction chamber when the fluid pressure in said power chamber is lower than a first predetermined value or exceeds a second predetermined value that is higher than said first predetermined value, and which discharges the pressurized fluid in said reaction chamber to said reservoir when the fluid pressure in said power chamber is between said first predetermined value and said second predetermined value.

15. A fluid pressure boosting device as claimed in claim 14, further comprising an orifice which is disposed on a line for introducing the fluid pressure in said power chamber in order to obtain an operational signal for controlling operation of said pressure control valve for the servo ratio by the fluid pressure in said power chamber.

16. A fluid pressure boosting device as claimed in claim 13, further comprising a pressure control valve for the servo ratio, which introduces the pressurized fluid at said servo-ratio control pressure into said reaction chamber when the fluid pressure in said power chamber exceeds a predetermined value, and which discharges the pressurized fluid in said reaction chamber to said reservoir when the fluid pressure in said power chamber is lower than said predetermined value.

17. A fluid pressure boosting device as claimed in claim 1, characterized in that servo-ratio control pressure is the fluid pressure of said power chamber or the fluid pressure of said fluid pressure source.

18. A fluid pressure boosting device:
as claimed in claim 1;
further comprising:
a master cylinder which is controlled by the output to produce brake fluid pressure; and
brake cylinders into which the brake fluid pressure of said master cylinder is introduced to produce braking force.

19. A fluid pressure boosting device:
as claimed in claim 1, further comprising:
a master cylinder which is controlled by the output to produce brake fluid pressure;
at least one brake cylinder relating to one of two circuits for a brake system into which the fluid pressure of said power chamber is introduced to produce braking force; and
at least one brake cylinder relating to the other of the two circuits into which the brake fluid pressure of said master cylinder is introduced to produce braking force, so that the brake system provides semi-full power brakes.

20. A fluid pressure boosting device as claimed in claim 1, wherein a pressure introduced during an advance of the input shaft and a pressure introduced during a retreat of the input shaft are different from each other so that said fluid pressure boosting device has hysteresis in which input-output characteristics are different between the advance and the retreat of said input shaft.

21. A fluid pressure boosting device as claimed in claim 20, wherein said input shaft has a small-diameter portion at a control valve side and a large-diameter portion at an opposite side of the control valve, and said step of said input shaft is formed therebetween.

22. A fluid pressure boosting device as claimed in claim 21, further comprising a reaction piston which is formed in a cylindrical shape to have a larger outer diameter than that of the large-diameter portion of said input shaft and is slidably fitted onto the small-diameter portion of said input shaft, a front end of said reaction piston confronting said power chamber and a rear end of said reaction piston being able to be in contact with the step of said input shaft, and a pressure control means which introduces pressure into said reaction chamber wherein the pressure introduced during the advance of said input shaft and the pressure introduced during the retreat of said input shaft are different from each other.

23. A fluid pressure boosting device as claimed in clam 22, wherein the pressure introduced into said reaction chamber during the advance of said input shaft is atmospheric pressure while the pressure introduced into said reaction chamber during the retreat of said input shaft is a pressure corresponding to the output of said power piston.

24. A fluid pressure boosting device as claimed in claim 22, further comprising a damping member disposed on the step of said input shaft or the rear end of said reaction piston.

25. A fluid pressure boosting device as claimed in claim 23 further comprising:

a master cylinder having a master cylinder piston which produces master cylinder pressure by the output of said fluid pressure boosting device;

brake cylinders into which the master cylinder pressure is introduced to produce braking force;

a second fluid pressure source for producing fluid pressure;

a fluid pressure supply valve composed of a solenoid valve which, in the operative state, introduces the fluid pressure from said second fluid pressure source to said power chamber not through said control valve; and an electronic control unit which controls said fluid pressure supply valve as necessary, wherein said pressure control means is composed of a first check valve, which is disposed on a line connecting said reaction chamber to said reservoir and allows only a flow of fluid from said reservoir toward said reaction chamber, and a second check valve, which is disposed on a line connecting said reaction chamber to said brake cylinders and allows only a flow of fluid from said reaction chamber toward said brake cylinders.

26. A fluid pressure boosting device as claimed in claim 25, further comprising a fluid discharge line for discharging the fluid in said power chamber to said reservoir connected to said reaction chamber and the fluid in said power chamber is discharged to said reservoir through said reaction chamber, said second check valve, and a line through which the fluid in said brake cylinders is discharged to said reservoir.

27. A brake pressure boosting device as claimed in claim 25, wherein an the pressure receiving surface of said power piston and an pressure receiving surface of said master cylinder piston are set to be equal to each other.

28. A fluid pressure boosting device as claimed in claim 25, wherein the electronic control unit controls said fluid pressure supply valve corresponding to a speed of an operational member for operating said input shaft or a force applied on the operational member.

29. A fluid pressure boosting device as claimed in claim 25, further comprising at least one of an anti-lock control system, a traction control system, a vehicle stability control system, and an auto cruise control system, wherein said second fluid pressure source is common to a fluid pressure source for the control systems.

* * * * *